United States Patent [19]

Saito et al.

[11] Patent Number: 5,161,739
[45] Date of Patent: Nov. 10, 1992

[54] MULTI-TYPE AIR HEATING APPARATUS UTILIZING PHASE VARIATION OF HEATING MEDIUM

[75] Inventors: Kazuo Saito, Fujisawa; Katuyoshi Kumazawa, Yamato; Fusao Hirasawa, Tokyo; Tetsuo Sano, Yokohama; Tutomu Hatakubo, Fujisawa; Hideto Kuyama, Yokohama, all of Japan

[73] Assignee: Kabushiki Kaisha Toshiba, Kawasaki, Japan

[21] Appl. No.: 633,630

[22] Filed: Dec. 6, 1990

[30] Foreign Application Priority Data

Dec. 8, 1989 [JP] Japan .................................. 1-317772
Mar. 1, 1990 [JP] Japan .................................. 2-47325

[51] Int. Cl.⁵ .............................................. F24D 1/00
[52] U.S. Cl. ...................................... 237/9 R; 237/67
[58] Field of Search ............. 237/8 R, 8 C, 67, 9 R, 237/13

[56] References Cited

U.S. PATENT DOCUMENTS 3,147,797 9/1964 Miner ............................ 237/8 R X
4,192,455 3/1980 Rasmussen et al. ................ 237/8 R

FOREIGN PATENT DOCUMENTS 63-318445 12/1988 Japan .
2-29558 1/1990 Japan .

Primary Examiner—Henry A. Bennet
Attorney, Agent, or Firm—Cushman, Darby & Cushman

[57] ABSTRACT

An outdoor unit comprises a combustion unit for presenting combustion heat, a heating medium heating part for heating the heating medium with the combustion heat to vary in phase from liquid to gas, and a heating medium transferring part. A plurality of indoor units each have an indoor heat exchanger and a required heating capacity detecting part for detecting a required heating capacity in a region to be heated required for the indoor heat exchanger. The detecting part comprises a room temperature setting part, a room temperature detector, and a required heating capacity data output part for delivering required heating capacity data in the region to be heated depending on the difference between the preset room temperature and the detected room temperature. The distributing part couples the plural indoor units parallel to the outdoor unit so as to form individual enclosed heating medium circulation cycles. The controller controls the combustion quantity of the combustion unit and the heating medium transferring capacity according to the sum of the required heating capacity data, and controls the heating medium distribution amount of the distributing part for distributing the heating medium into each indoor heat exchanger depending on the ratio of the required heating capacity data.

50 Claims, 92 Drawing Sheets

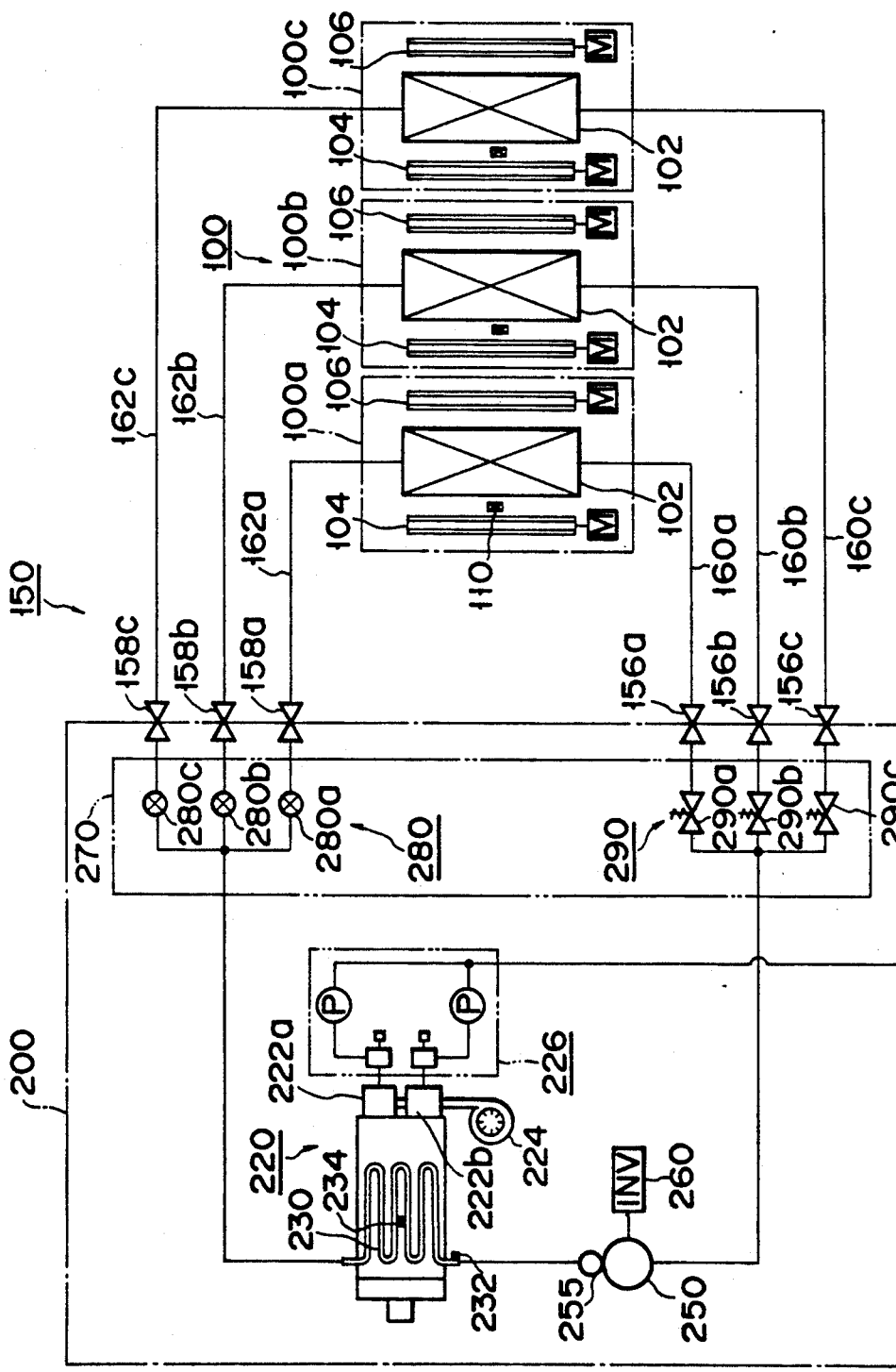
F I G. 2

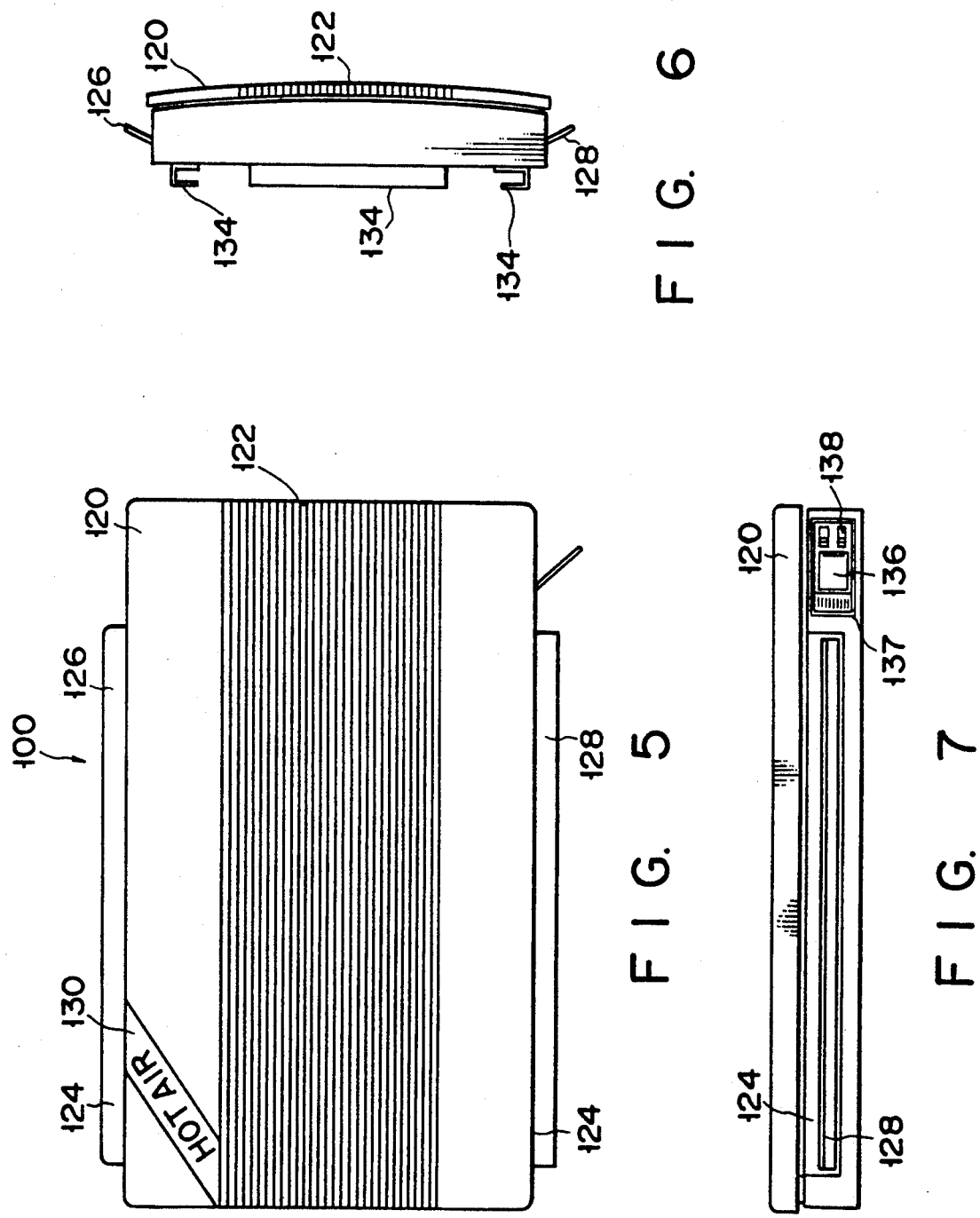

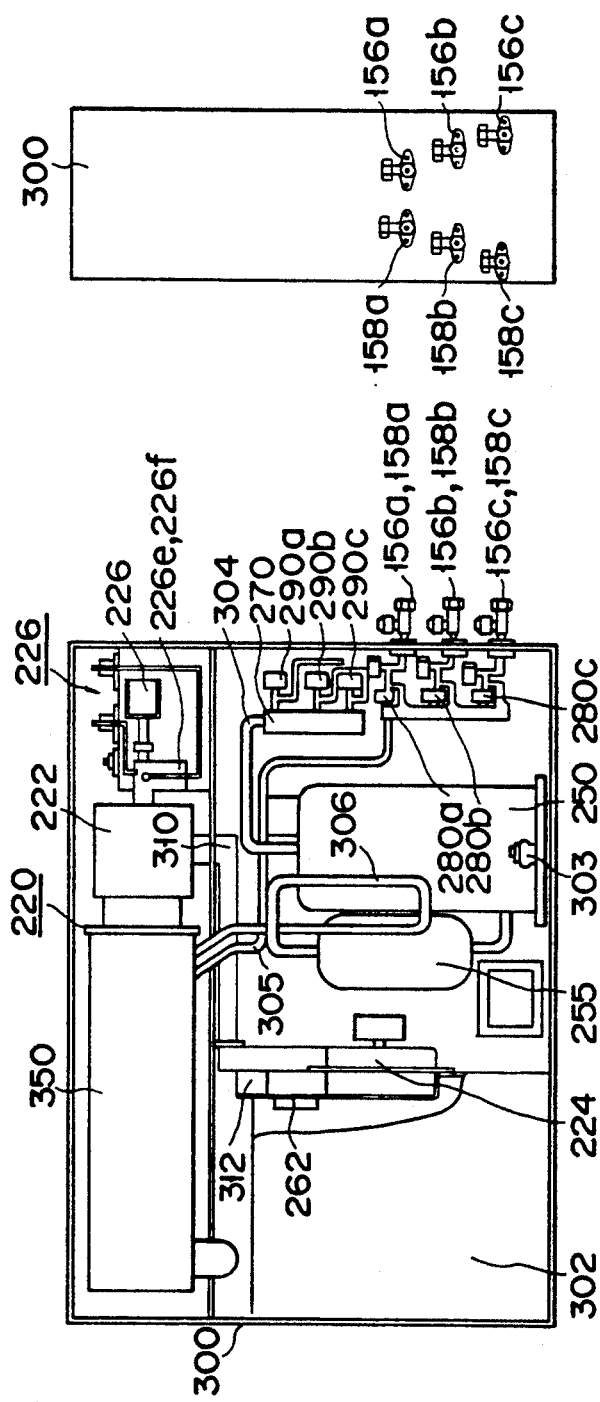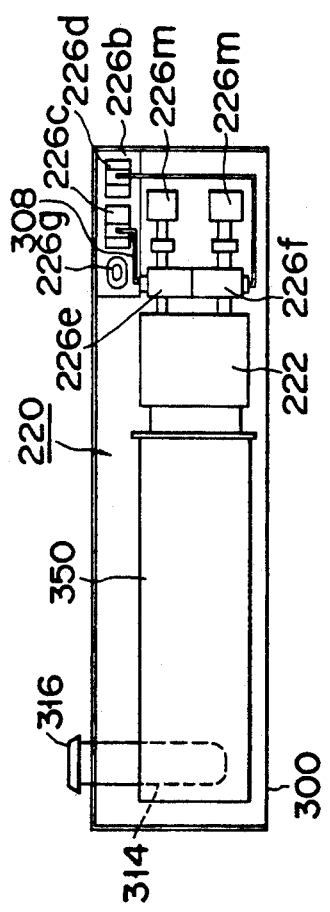

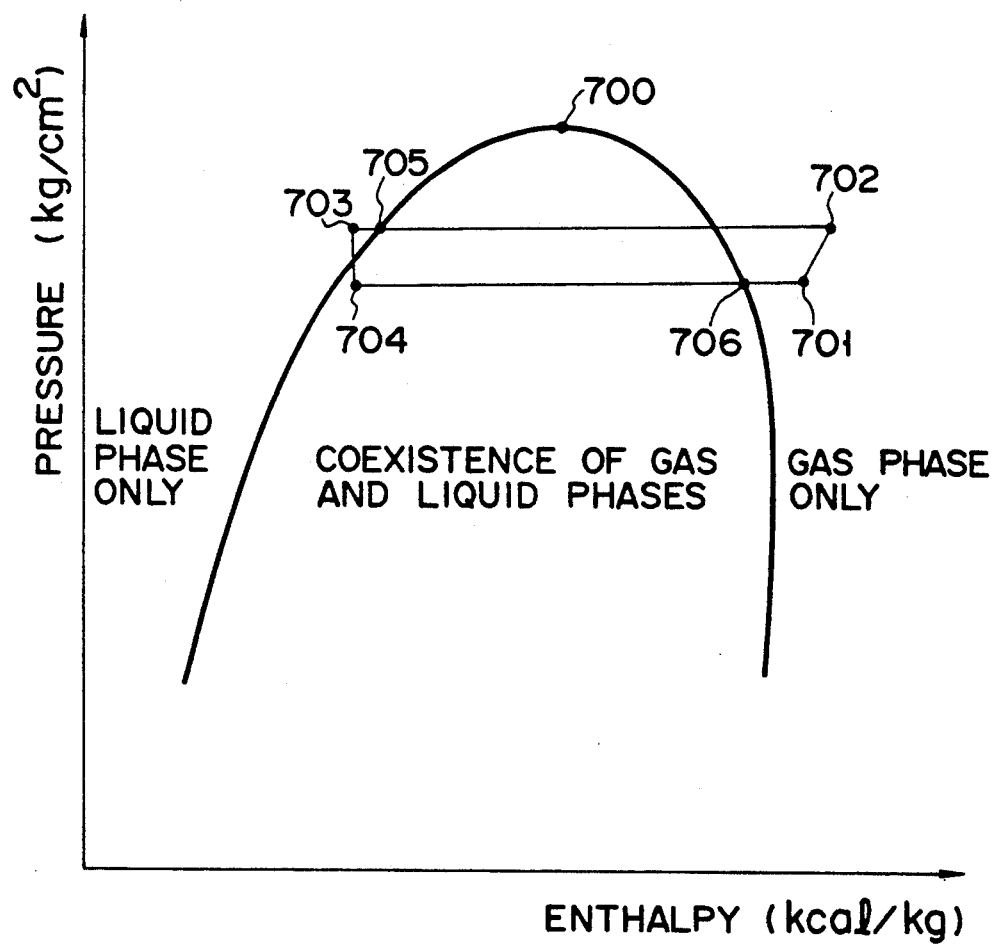
F I G. 29

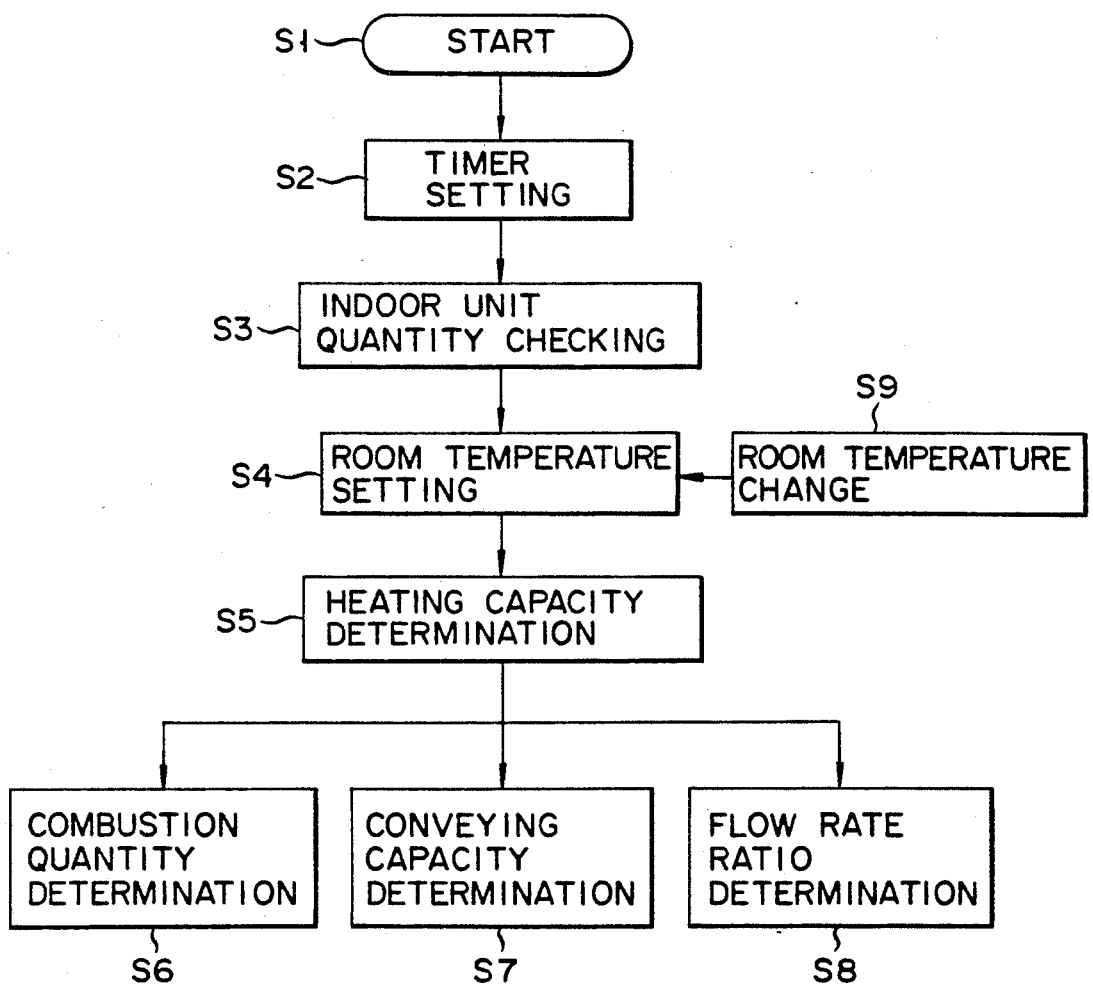
F I G. 30

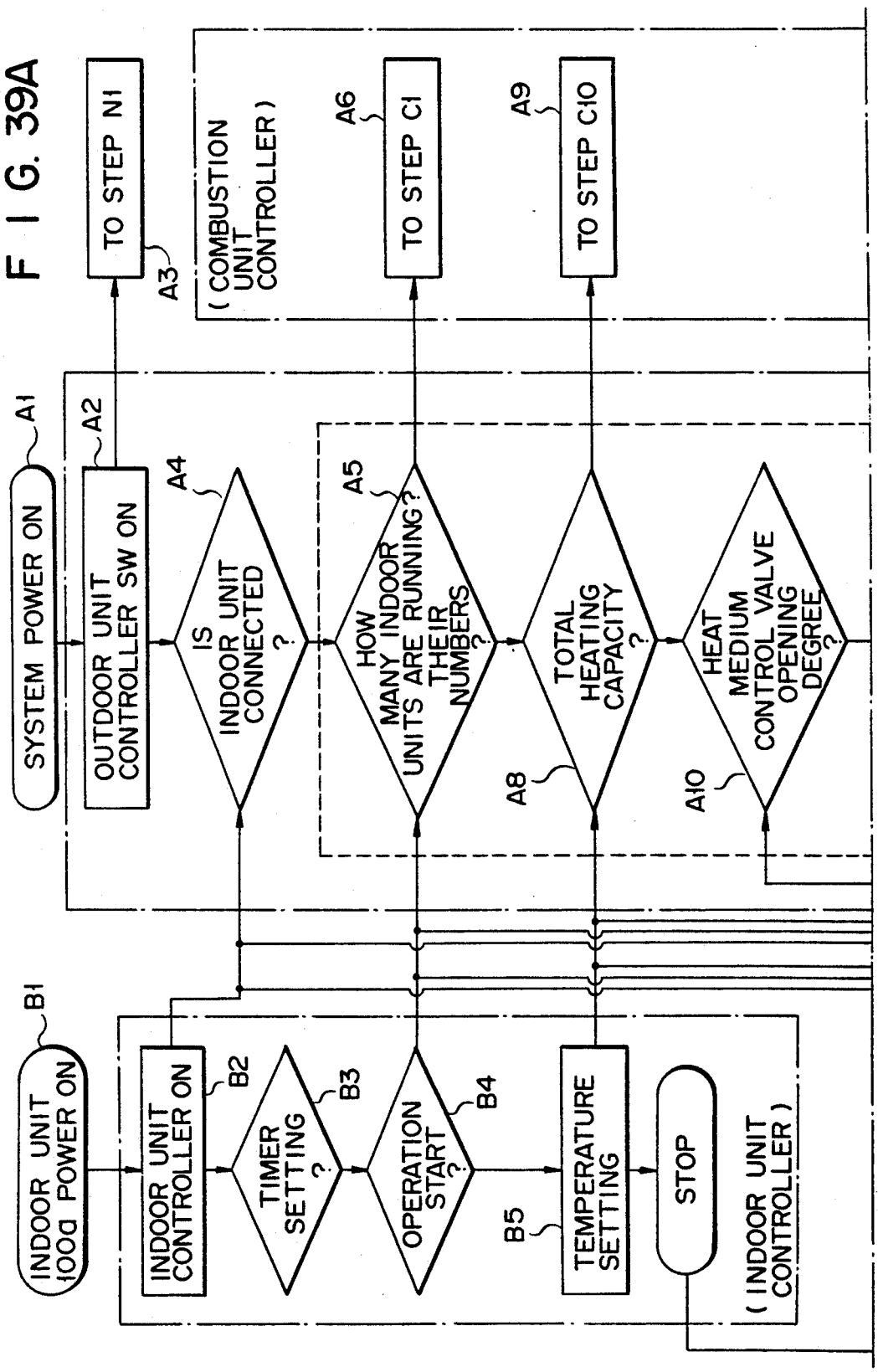

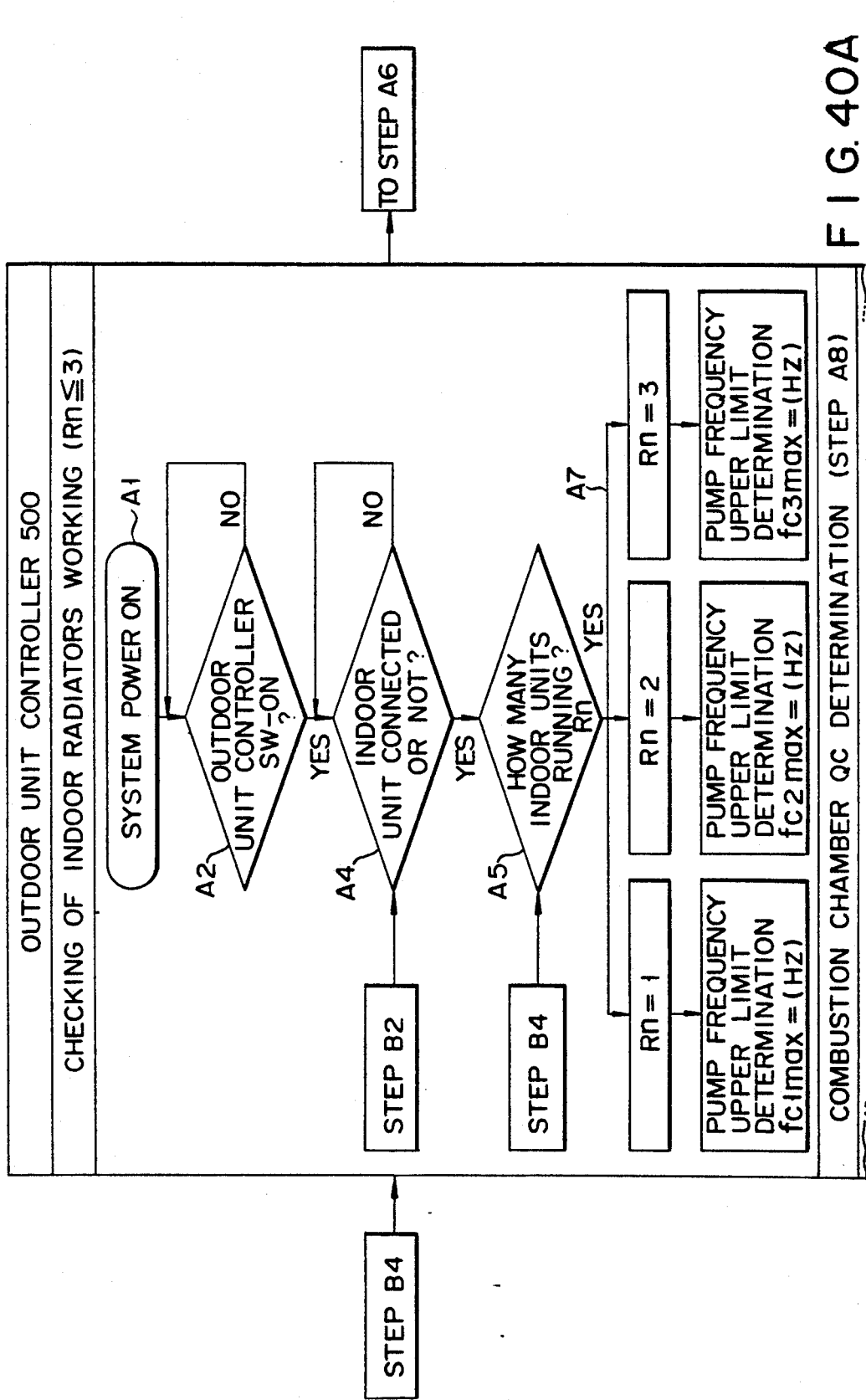

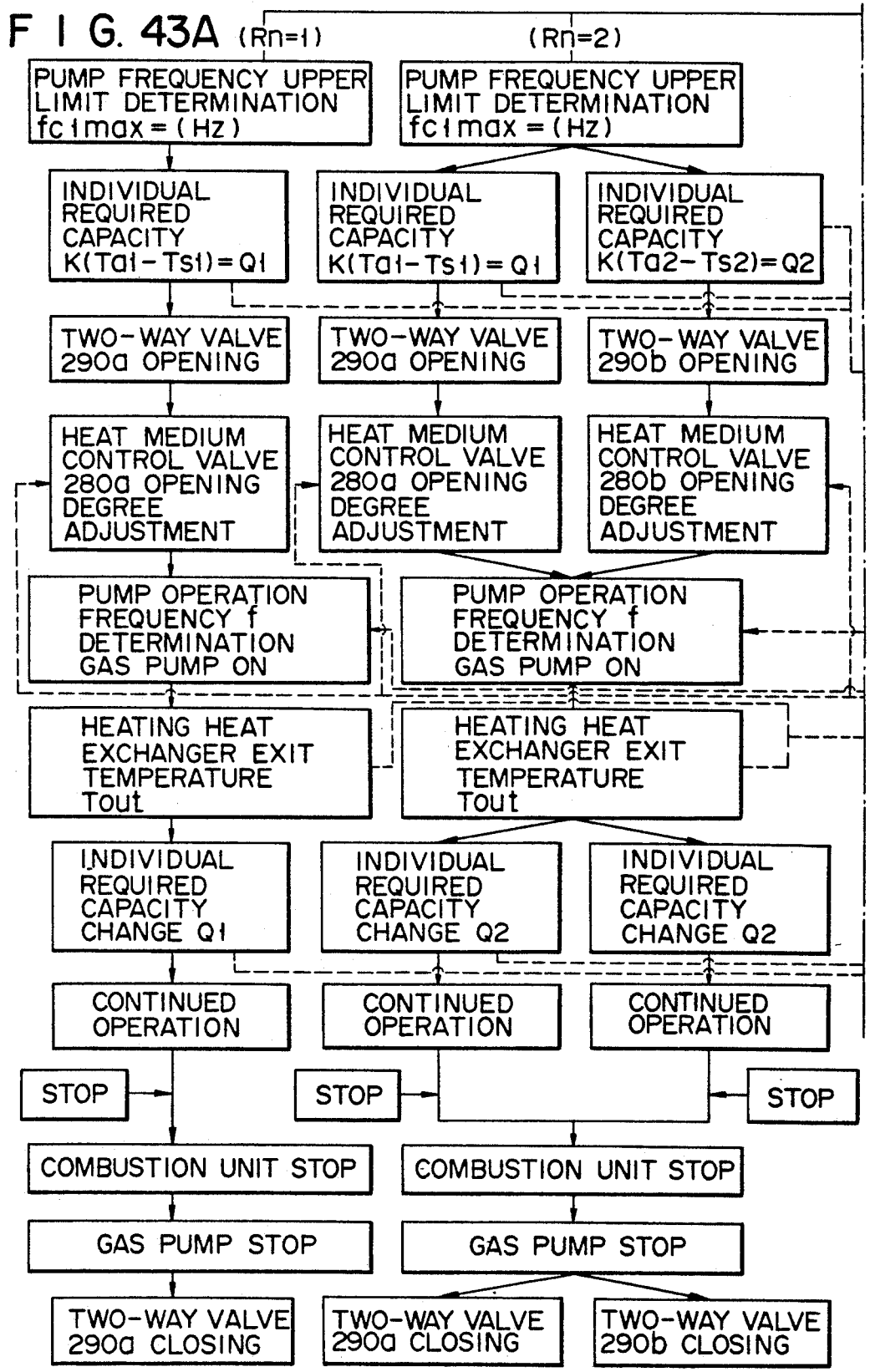

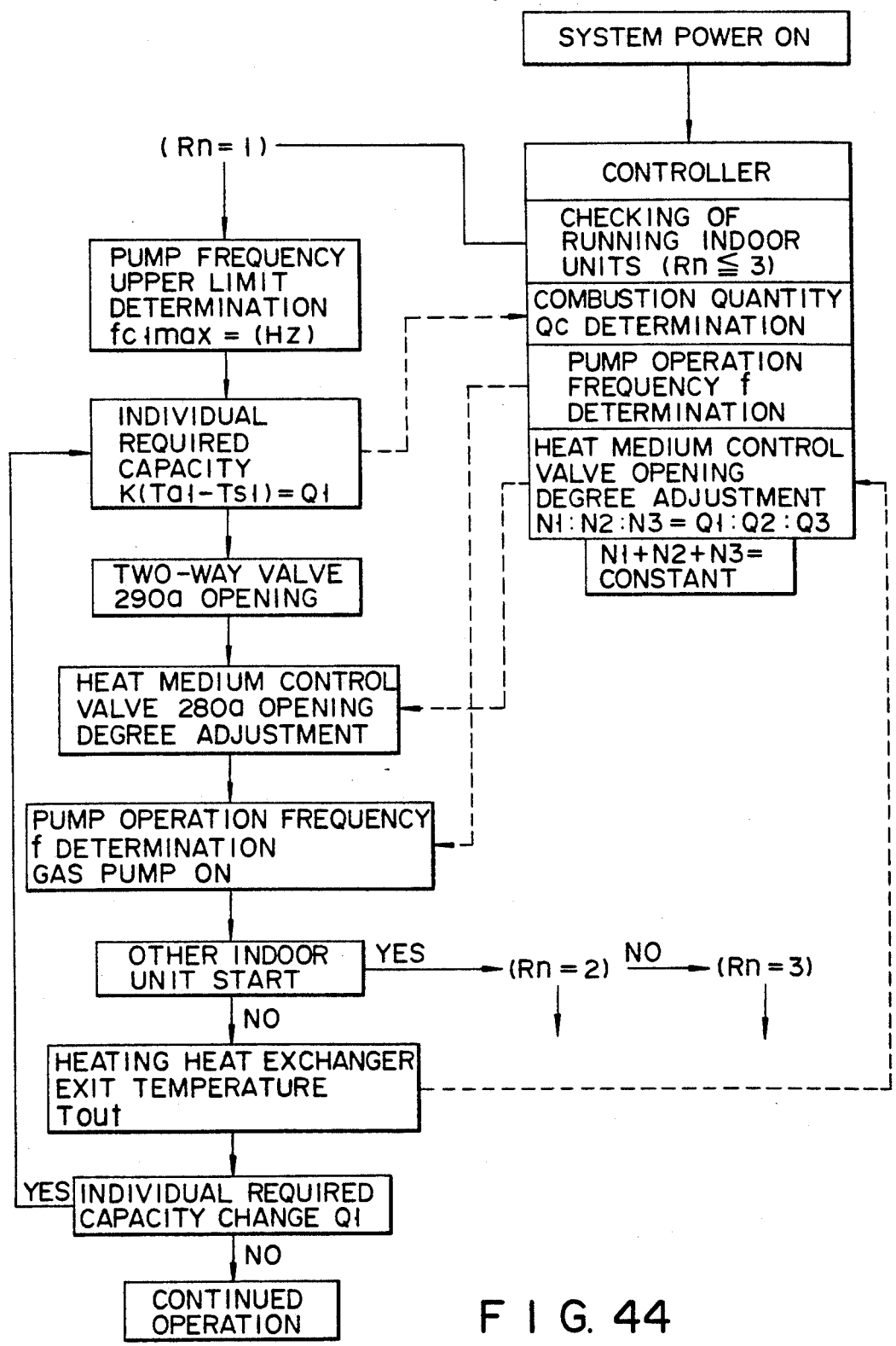
F I G. 44

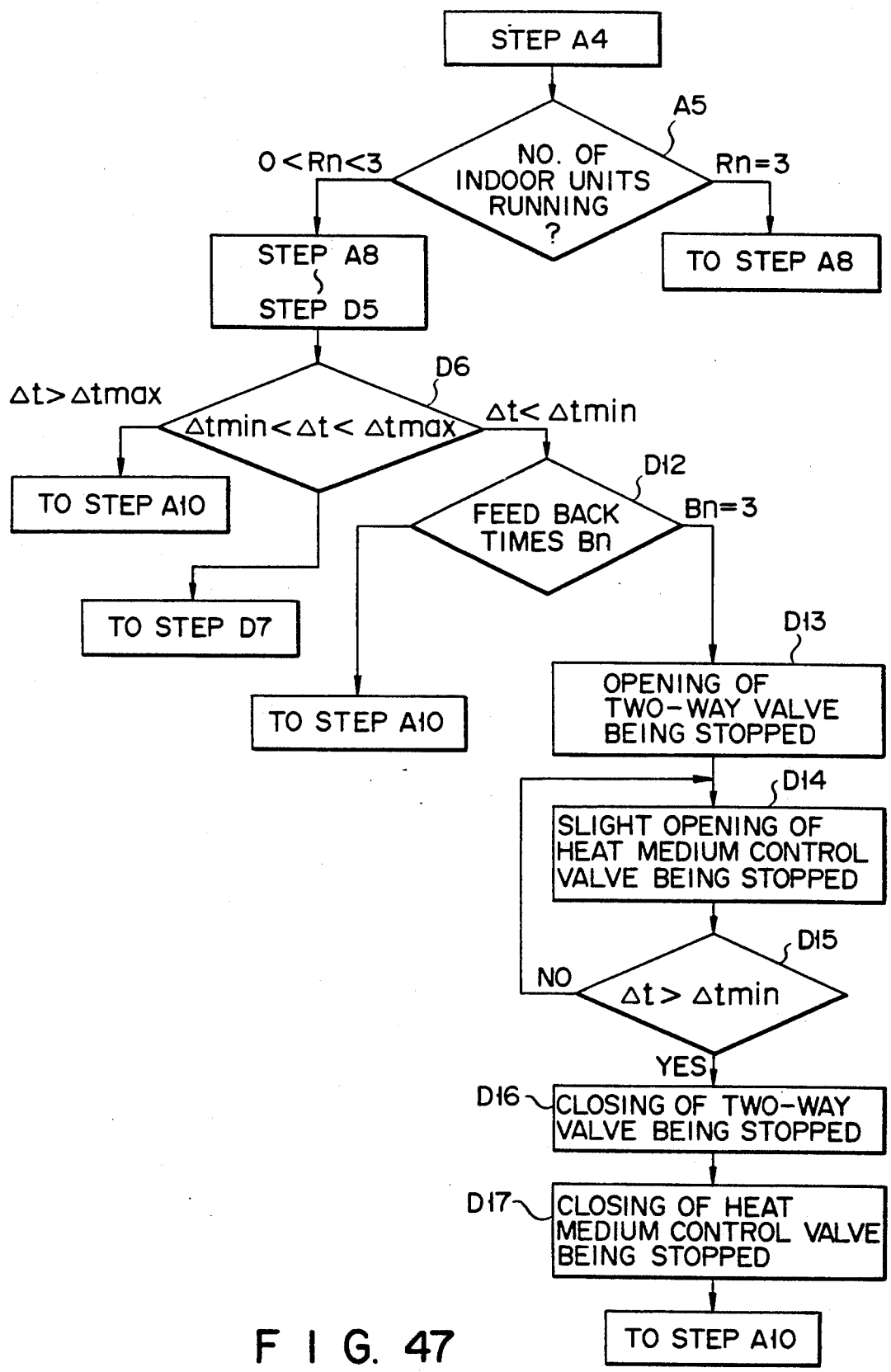
F I G. 47

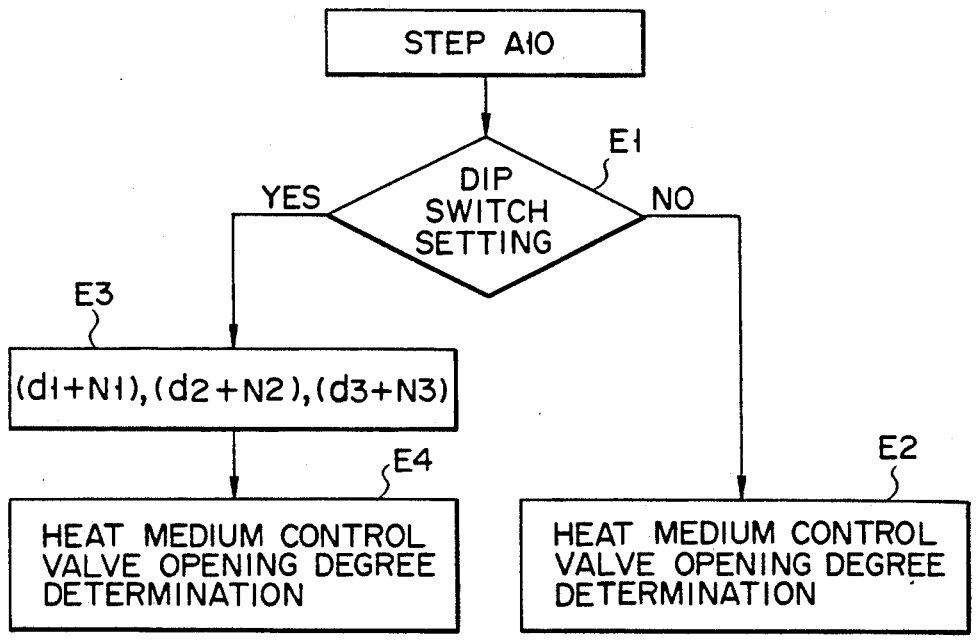
F I G. 49
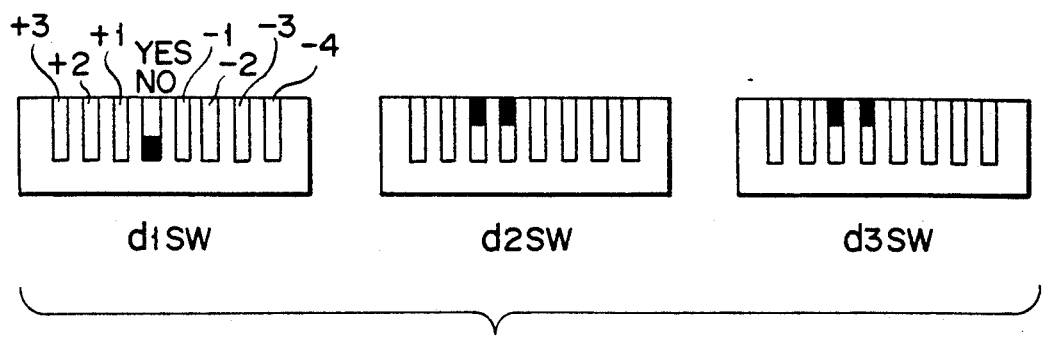
F I G. 50

| COMBUSTION UNIT CONTROLLER | | | | | | |
|---|---|---|---|---|---|---|
| DETERMINATION OF NUMBER OF RUNNING COMBUSTION UNITS | | | | | | |
| OPERATION PATTERN | | NO. OF INDOOR RADIATORS RUNNING $R_n$ | SUPPLY UPPER LIMIT $Q_{max}$ | REQUIRED COMBUSTION QUANTITY $Q_c$ | NO. OF RUNNING COMBUSTION UNITS AND MODE OF OPERATION | |
| (I) | -1 | 1 | 3000 kcal/h | $Q_0 < 600$ | S | ON-OFF |
| | -2 | | | $600 \leq Q_0 < 3000$ | | CON-TINUOUS |
| | -3 | 2 | 6000 kcal/h | $Q_0 < 600$ | S | ON-OFF |
| | -4 | | | $600 \leq Q_0 < 2000$ | | CON-TINUOUS |
| | -5 | 3 | 6000 kcal/h | $Q_0 < 600$ | S | ON-OFF |
| | -6 | | | $600 \leq Q_0 < 2000$ | | CON-TINUOUS |
| (II) | -1 | 2 | 6000 kcal/h | $2000 \leq Q_0 \leq 6000$ | D | CON-TINUOUS |
| | -2 | 3 | 6000 kcal/h | $2000 \leq Q_0 \leq 6000$ | D | CON-TINUOUS |

S: SINGLE, D: DOUBLE

FIG. 52A

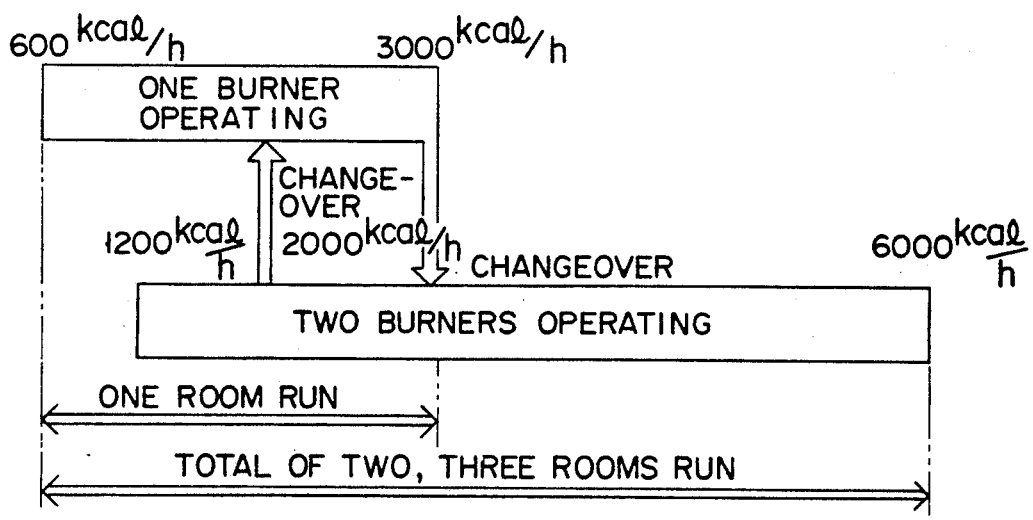

FIG. 52B

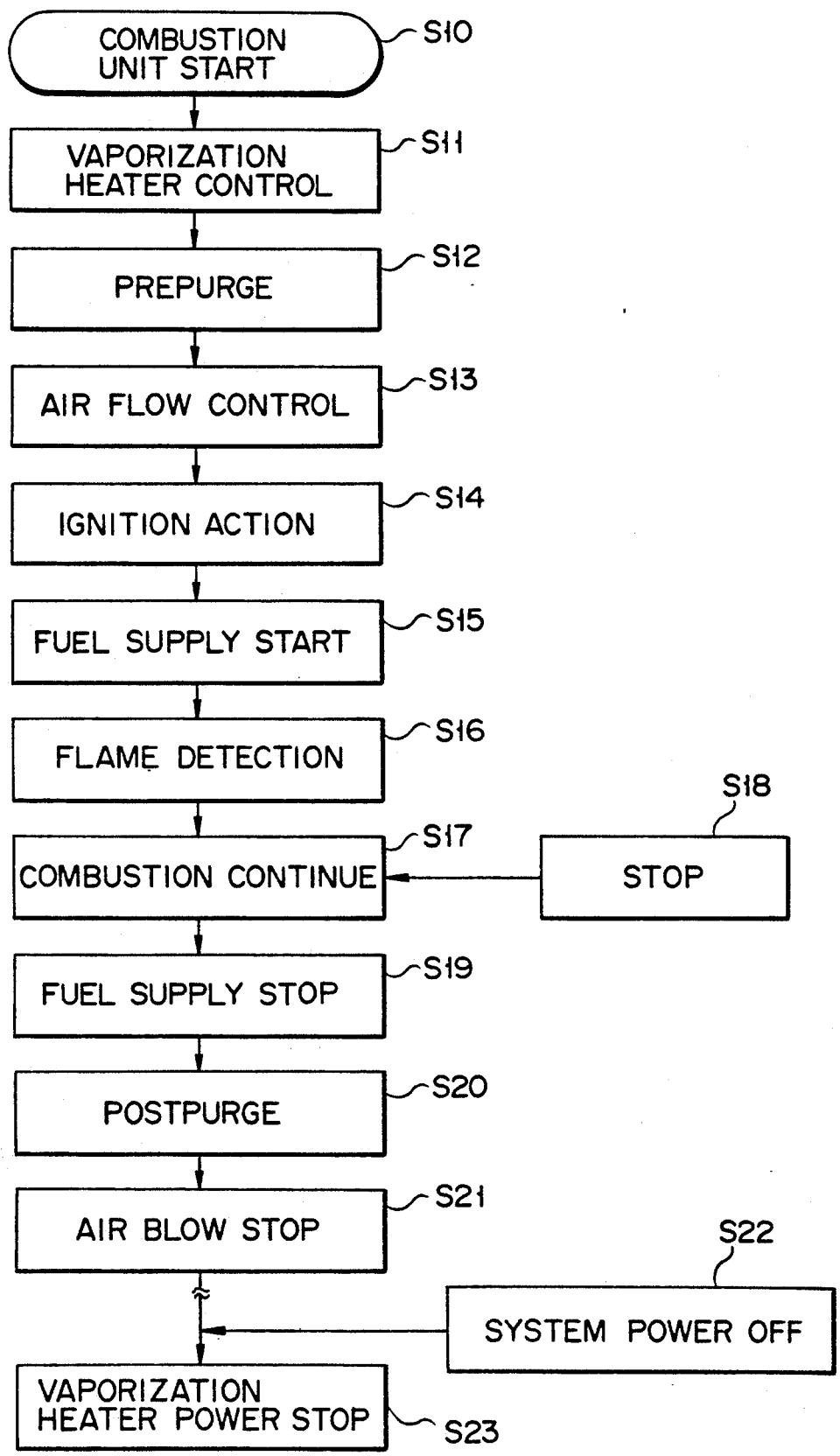
F I G. 53

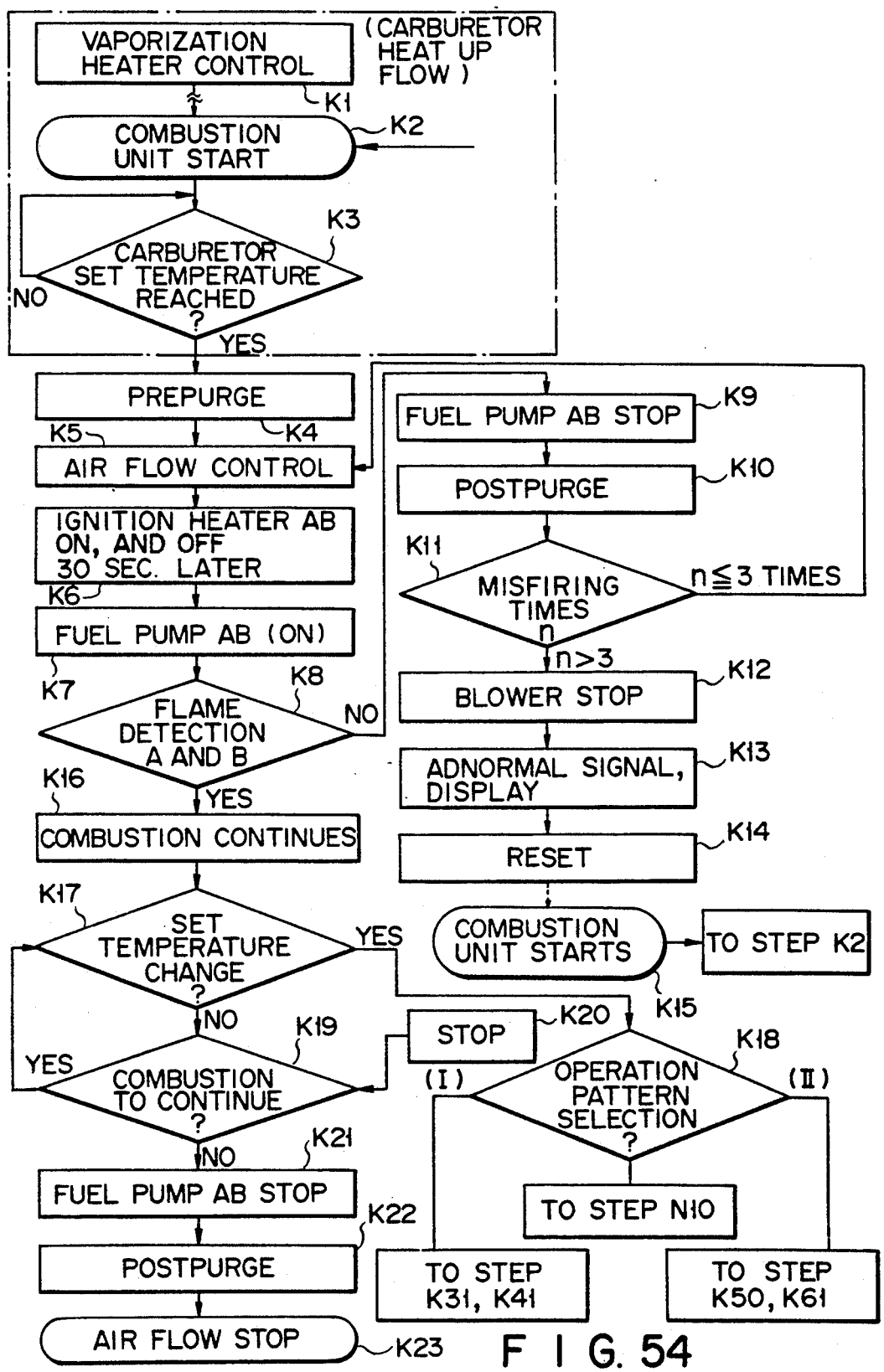
F I G. 54

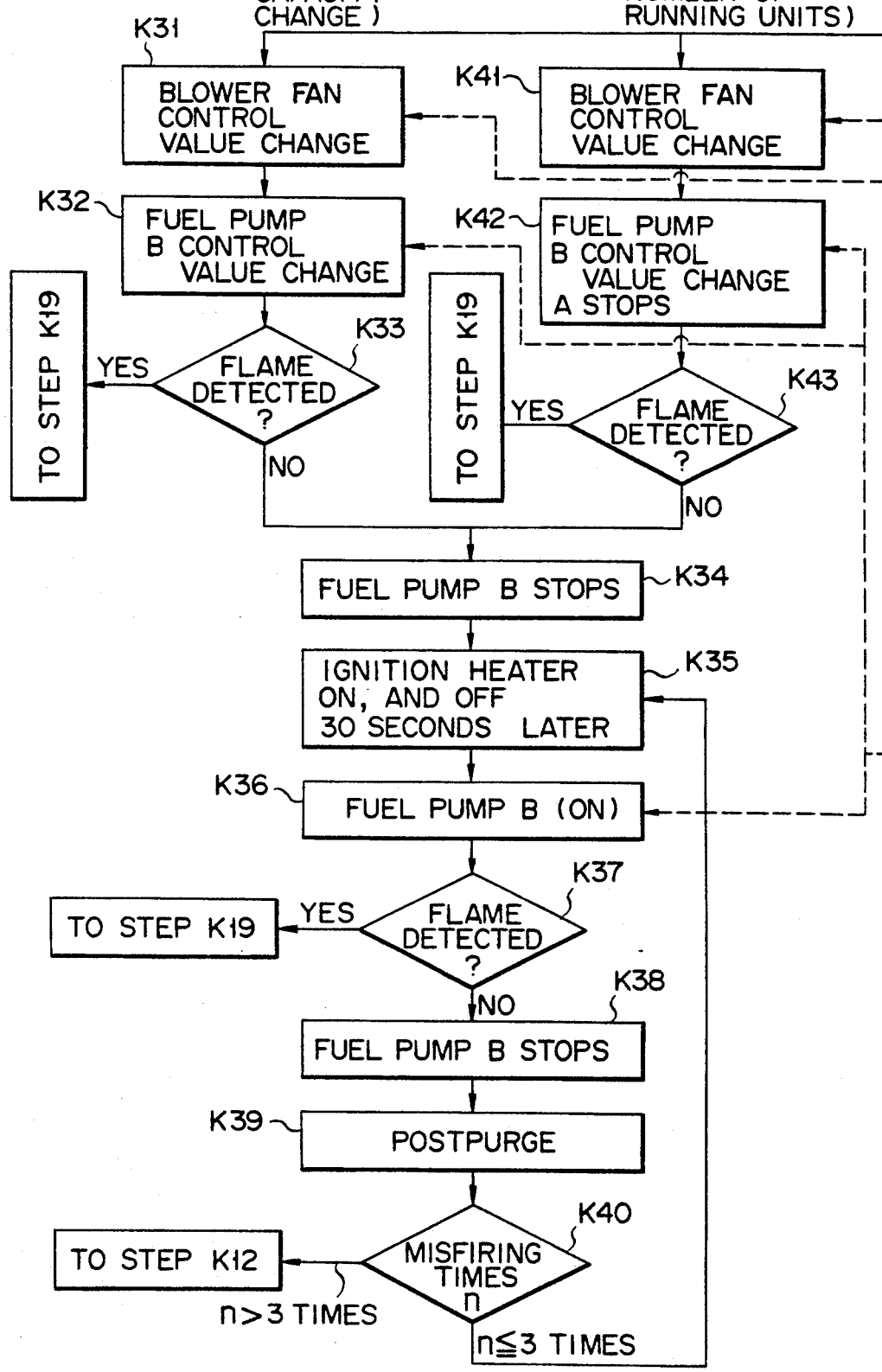

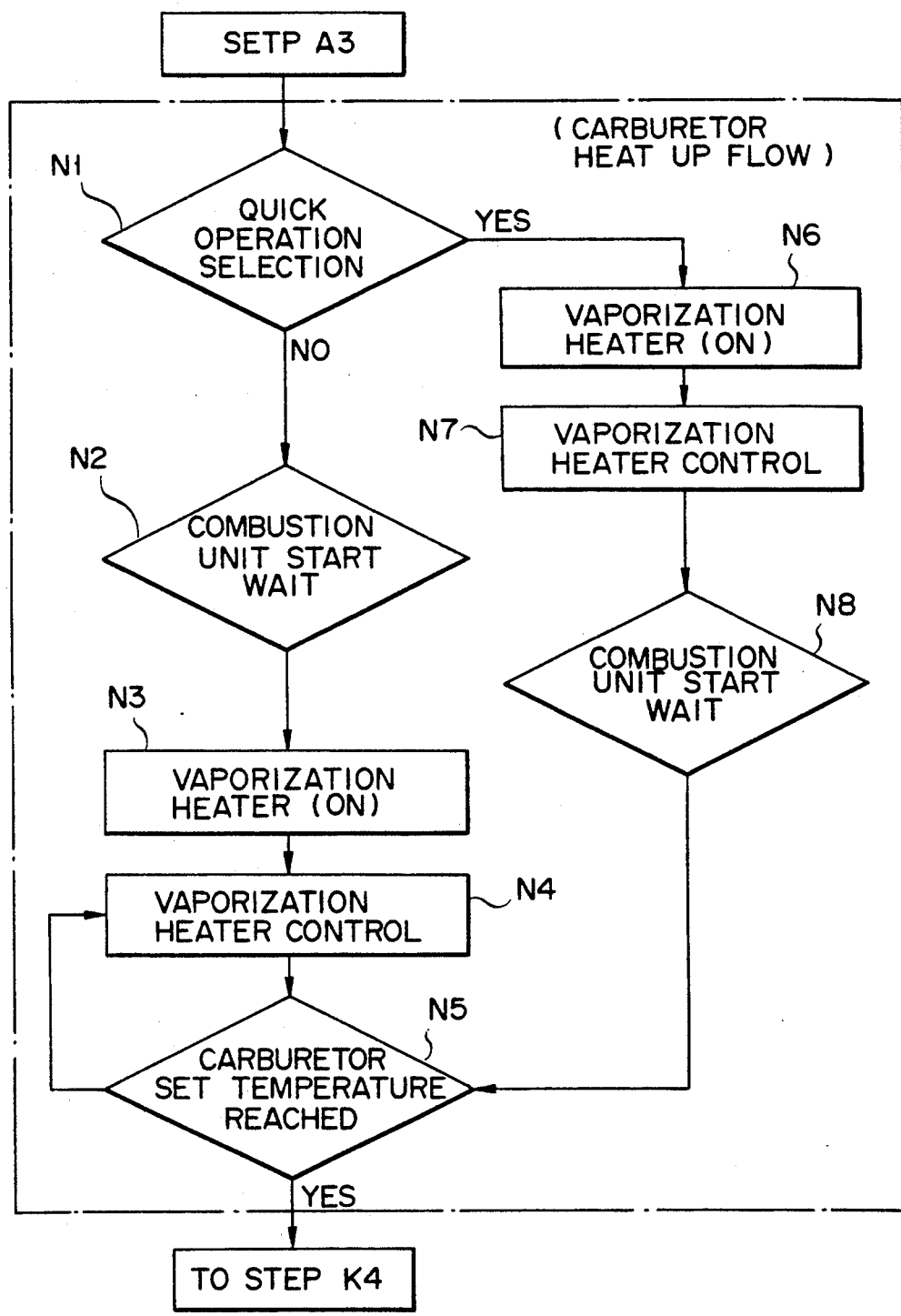
F I G. 57

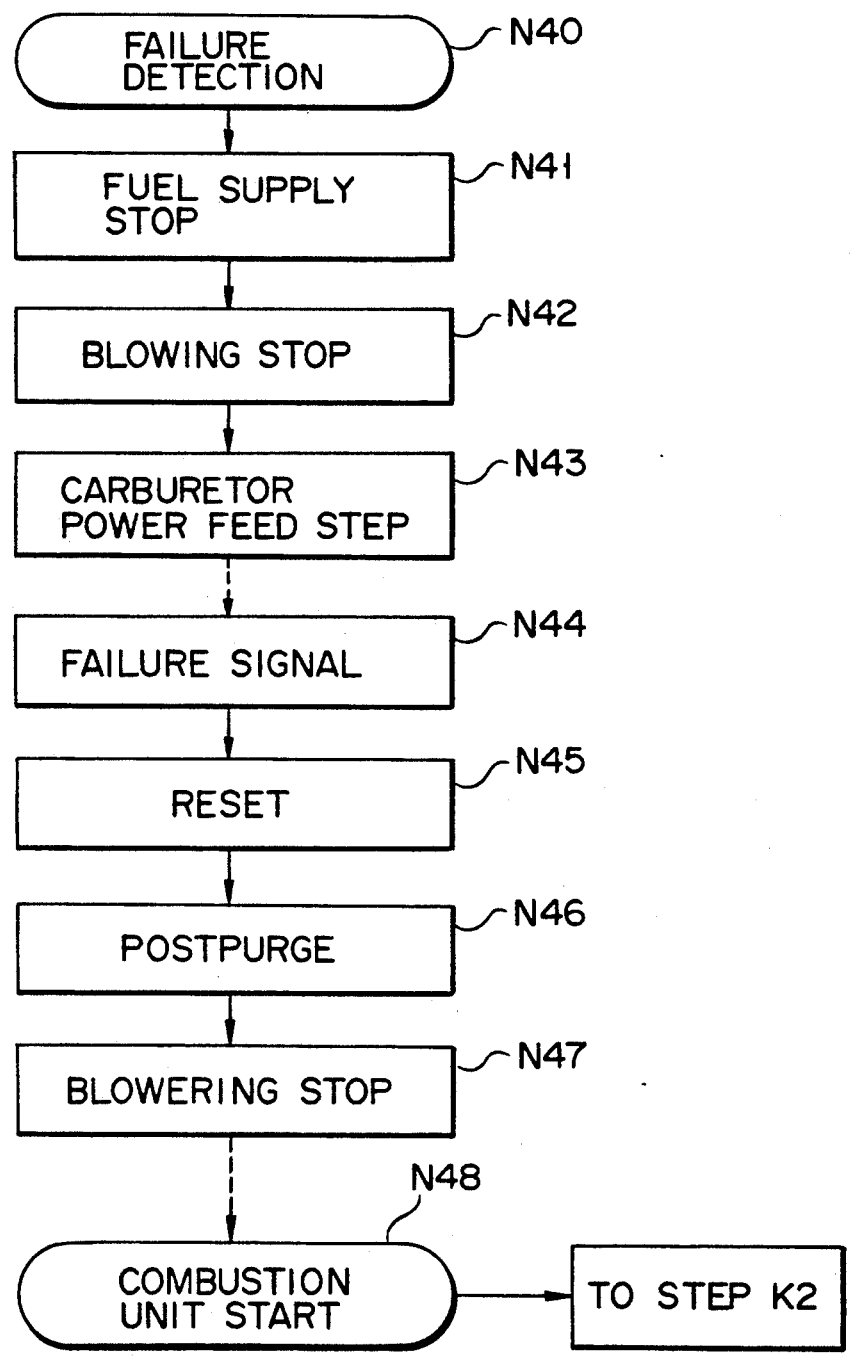
F I G. 61

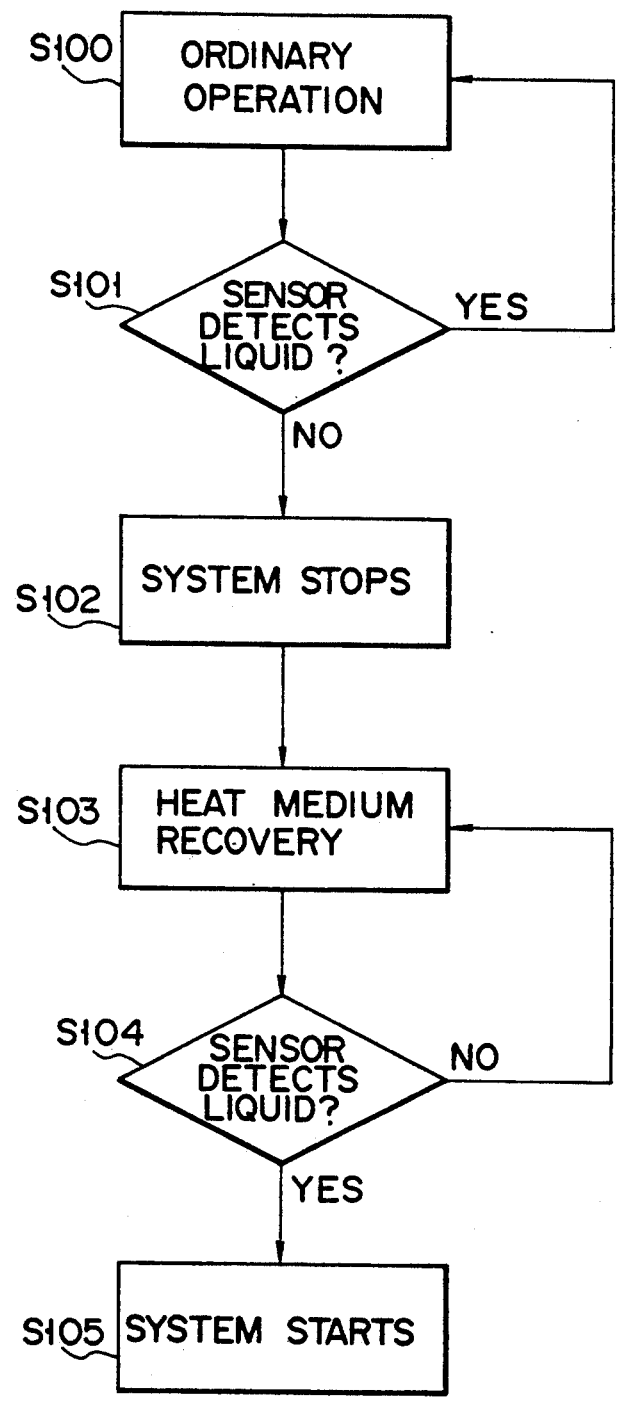
F I G. 65

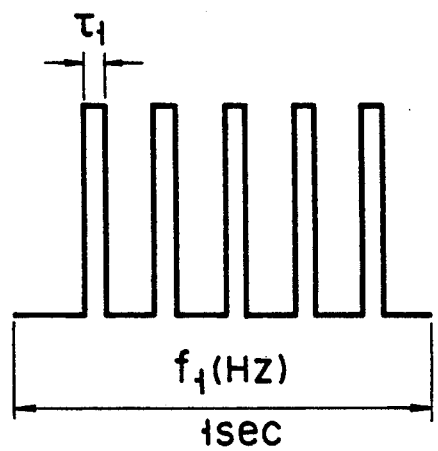
F I G. 67A
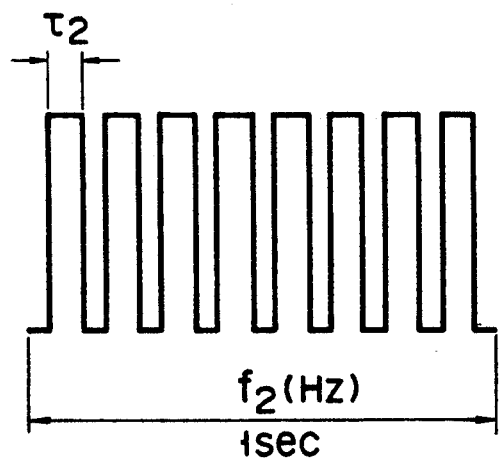
F I G. 67B

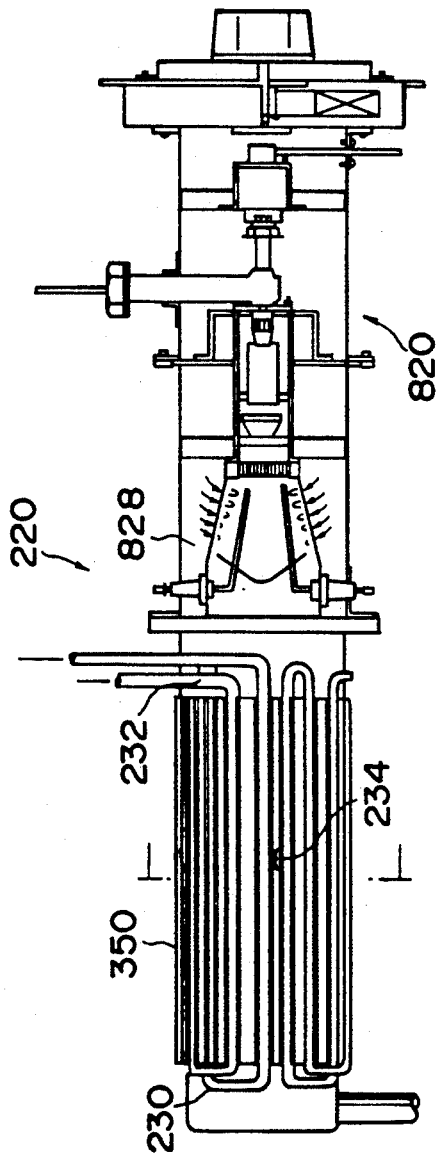
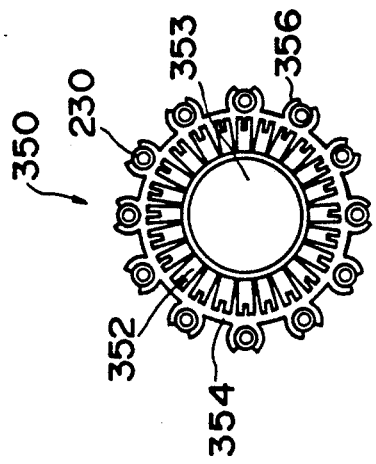
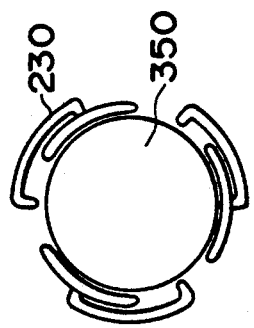
FIG. 71
FIG. 73
FIG. 72

| COMBUSTION UNIT CONTROLLER 600 | | |
|---|---|---|
| COMBUSTION QUANTITY UPPER LIMIT DETERMINATION | | |
| OPERATION PATTERN | NO. OF INDOOR UNITS RUNNING $R_n$ | UPPER LIMIT $Q_{max}$ |
| [I] | 1 | 3000 kcal/h |
| [II] | 2 | 6000 kcal/h |
| | 3 | |

FIG. 76

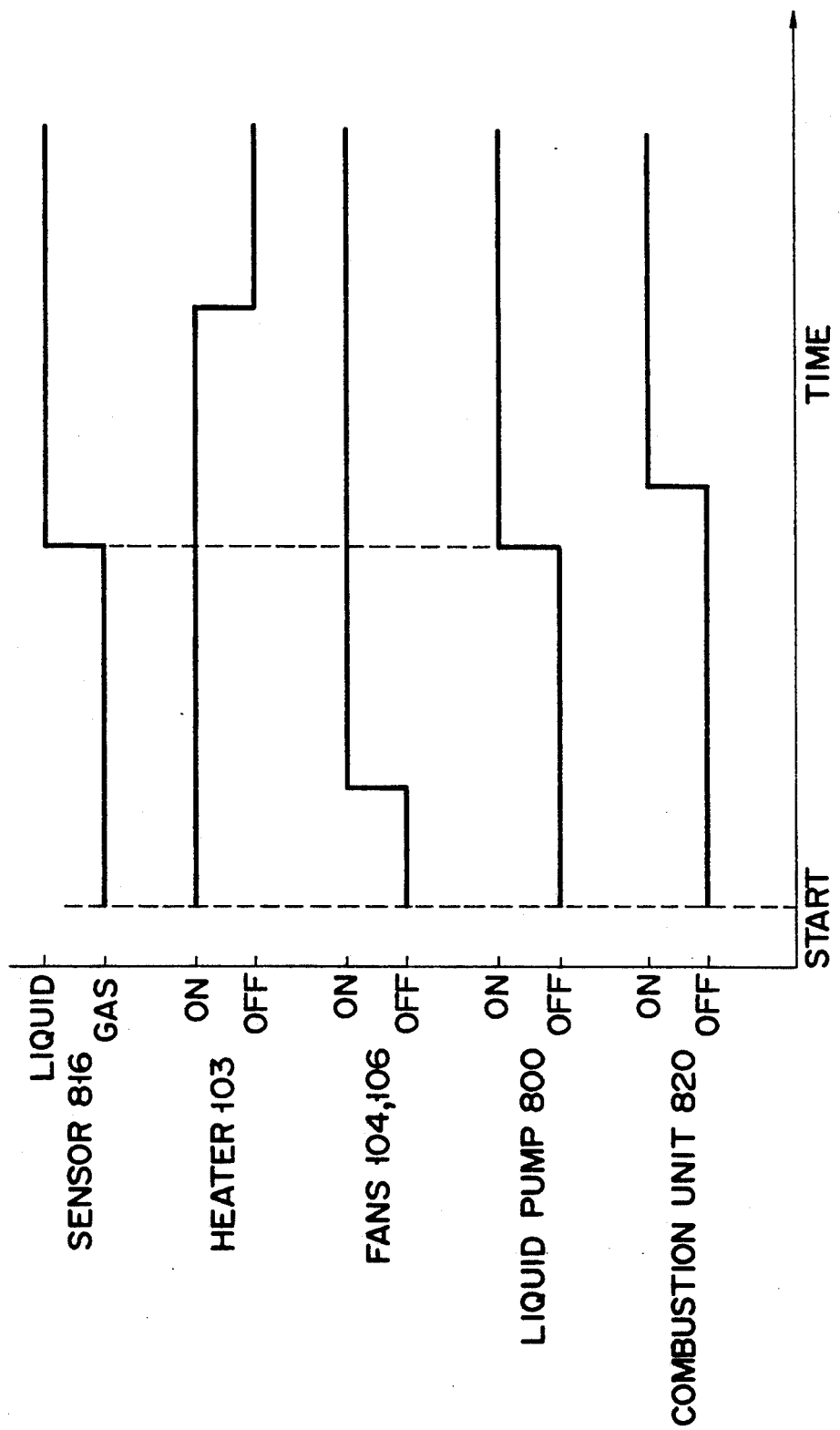

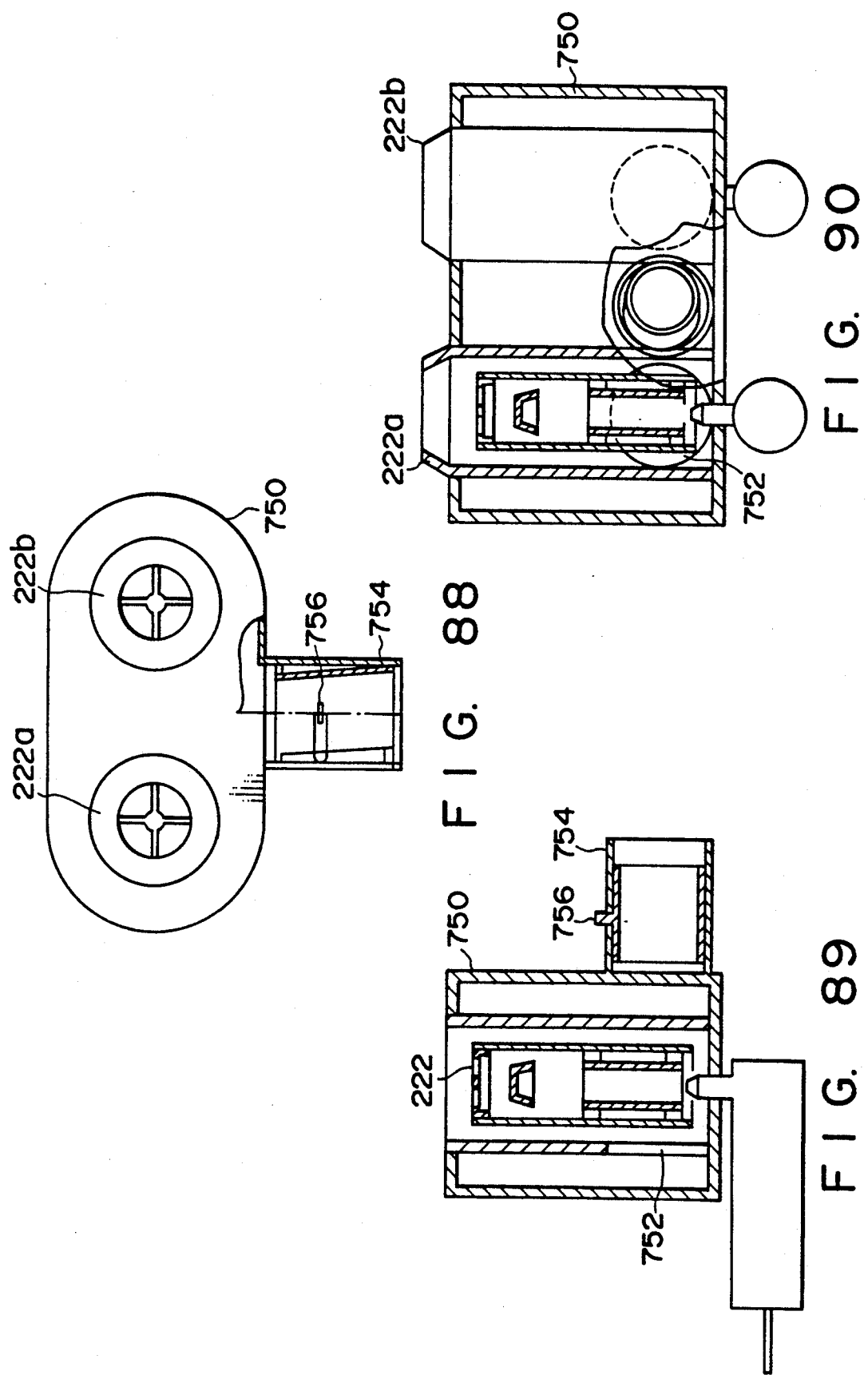

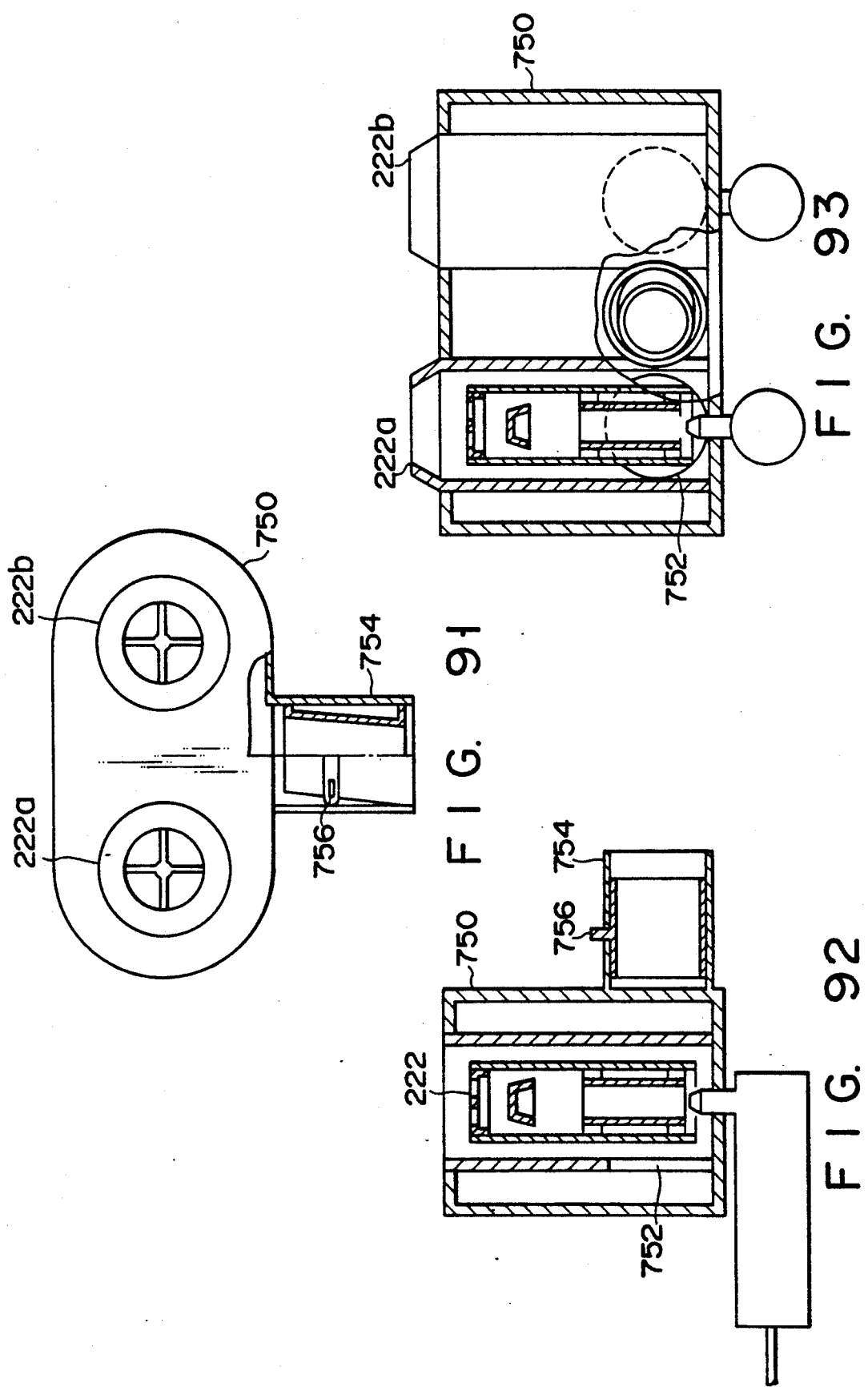

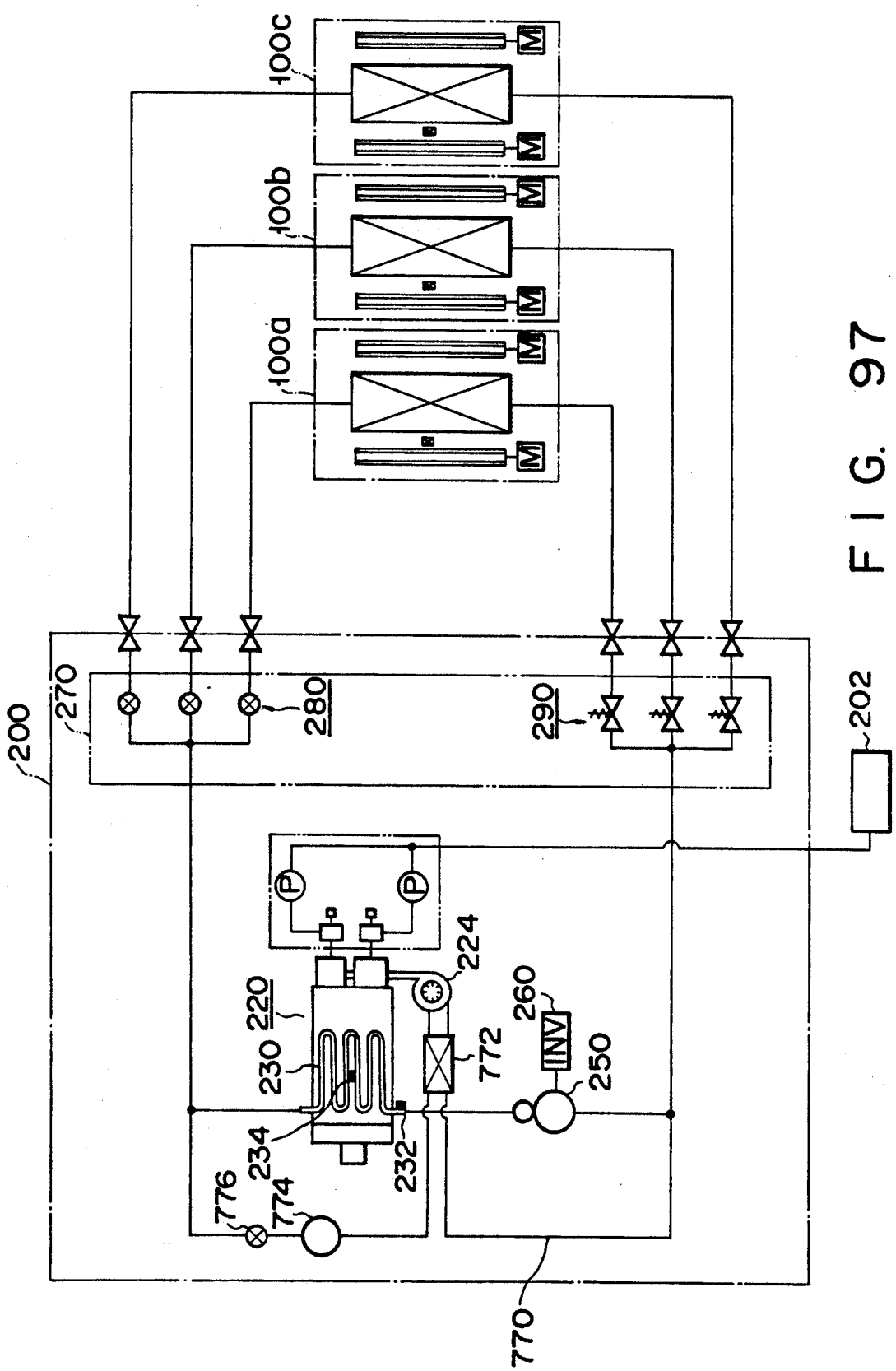
F I G. 97

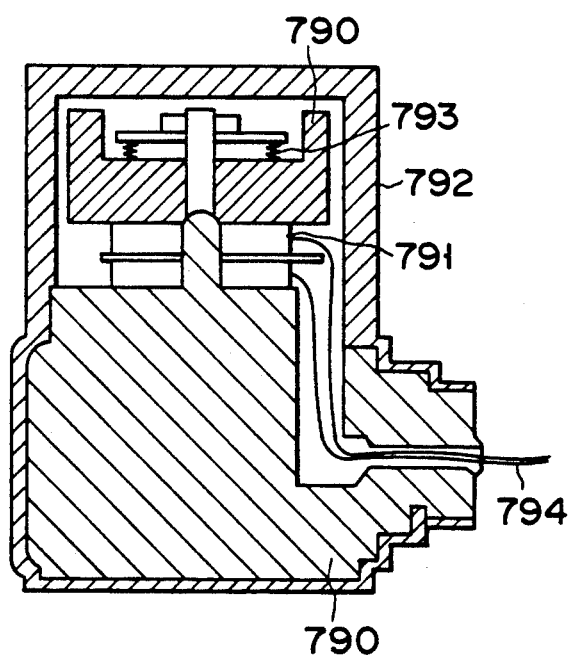
F I G. 100

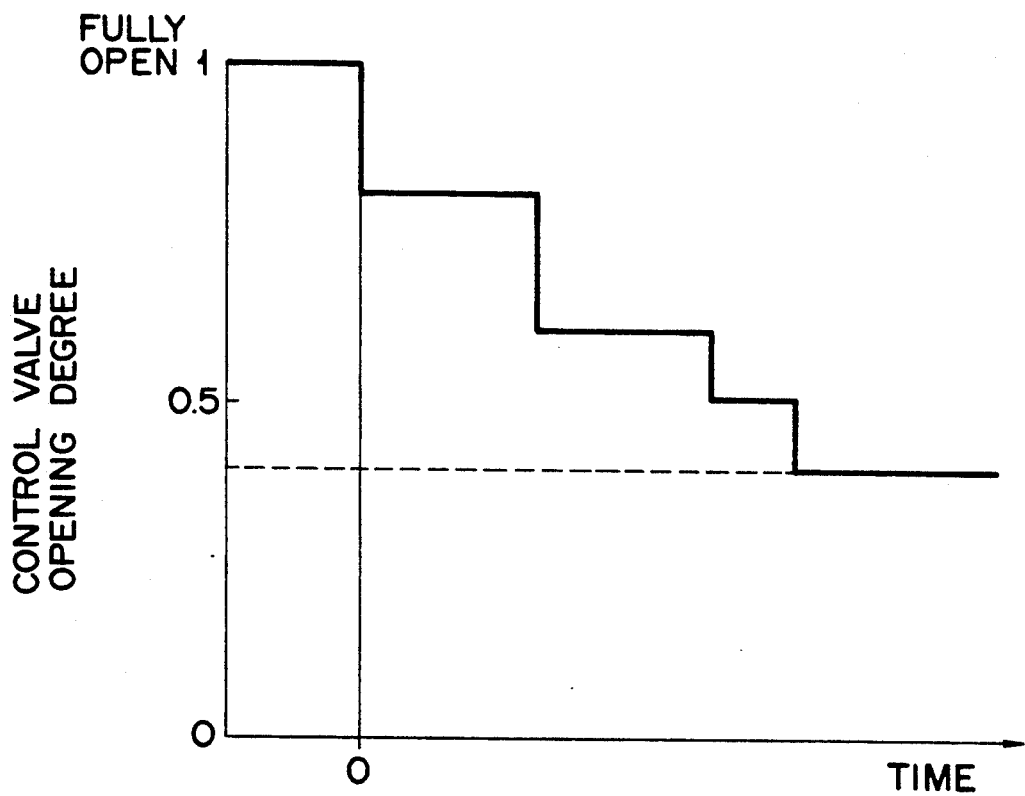
F I G. 103

5,161,739

MULTI-TYPE AIR HEATING APPARATUS UTILIZING PHASE VARIATION OF HEATING MEDIUM

BACKGROUND OF THE INVENTION

1. Field of the Invention

The present invention generally relates to a central heating apparatus and, more particularly, to a multi-type air heating apparatus utilizing a phase variation of a heating medium, which heats plural rooms simultaneously by utilizing the combustion heat as an exclusive heating apparatus.

2. Description of the Related Art

Conventional heating apparatuses for heating only by making use of combustion heat include, among others, an open stove for burning the fuel by using the indoor air and releasing the combustion gas into the room to heat, a forced air intake/exhaust stove for burning the fuel by using the outdoor air and releasing the combustion gas outdoors, and a forced exhaust stove for burning the fuel by using the indoor air and releasing the combustion gas outdoors.

The open stove is high in heating efficiency, and is noted for the lowest running cost if using the same fuel, and is compact in size and is portable. In this type of stove, however, since the combustion gas is released in the room, it smells for the people in the room, and the indoor air must be ventilated periodically, otherwise it may be fatal for human life due to shortage of oxygen or increase of carbon monoxide. This stove also involves the risk of inducing burns or tumbling, in a family with children, if children touch the stove unexpectedly.

By contrast, the forced air intake/exhaust stove is smaller in the risk of oxygen shortage or poisoning with carbon monoxide as experienced in the open stove because the combustion gas is discharge outdoors, but the entire size of the apparatus becomes large because combustion unit and heat exchanger are contained in the apparatus, and also the apparatus must be installed at the wall side of the room in order to extend the exhaust pipe outdoors, and therefore it is not portable and it occupies a wide space in the room, and it was particularly bothersome when it is not in use in the off-season such as a summer.

The forced exhaust stove possesses nearly the same problems as the forced air intake/exhaust stove, and as a further greater demerit, if the pressure difference between indoors and outdoors varies, for example, when exposed to a strong wind such as typhoon, the supply of air for combustion is not constant, and the combustibility is largely influenced.

Besides, when such combustion heat is used, the heating apparatus is always accompanied by the latent risk of fire because the combustion unit itself is installed indoors, and only the installed room is heated, and it was necessary to install in each room when desired to heat plural rooms at the same time.

The heating apparatus of the type of installing the combustion unit outdoors is also already available on market. One of such apparatuses is the hot water heating apparatus utilizing water as the heating medium. In this hot water heating apparatus, the hot water is heated by the combustion unit in the outdoor unit installed outdoors, and is circulated by pump, and its heat is released by the indoor radiator to heat, and its feature is that plural indoor units can be heated simultaneously by one outdoor unit. In this type of heating apparatus, however, since water is used as the heating medium, in the extremely cold district, the water in the pipe for passing the heating medium is frozen while the hot water heating apparatus is not used and the pipe may be broken, or since the cycle in the pipe is not a closed loop, water decreases due to slight evaporation, and it is necessary to add water in the beginning of the heating season, or it is required to change the whole water if rotten, and other maintenance was required.

As other type of installing the combustion unit outdoors, a refrigerant heating air-conditioning for both heating and cooling is known. In this type, chlorofluorocarbon R-22, the refrigerant presently used in heat pump air conditioner as the heating medium when heating is directly heated and evaporated by the combustion heat, and the evaporation latent heat is conveyed into the indoor unit to heat. The radical different point is that the evaporation latent heat is used in the refrigerant heating type, while the sensible heat is used in the hot water heating apparatus.

In the conventional refrigerant heating type air conditioners, however, the fatal disadvantage is that the system is mainly designed for cooling. That is, in order to cool by using Freon, it is necessary to circulate in the freezing cycle by raising the pressure and compressing from the suction gas pressure of about 5 kg/cm$^2$ to the discharge gas pressure of over 21 kg/cm$^2$. Accordingly, it is required to use a compressor. Therefore, if the height or distance from the outdoor heat exchanger to the indoor heat exchanger becomes high or long, the load on the compressor increases, and a large compressor is needed. Furthermore, when the number of indoor heat exchangers for cooling and heating increases, the compressor similarly increases in size. Accordingly, the power consumption becomes larger. This is a problem always encountered when cooling or heating by the evaporation and condensation action by the compression action of the Freon refrigerant by the compressor.

Therefore, in the conventional refrigerant heating type air conditioners, since both heating and cooling actions are designed, the heating capacity is limited by the design value of the cooling capacity. In other words, the capacity of the compressor used mainly in the refrigerant heating air conditioner for household use at the present is of one horsepower class, and in the air conditioner of this class, only one room can be heated or cooled.

Besides, among the heating apparatuses for heating by installing the combustion unit indoors, the open stove has the problem of ventilation because the indoor air is contaminated, and the forced air intake/exhaust stove and forced exhaust stove occupy a wide space and are not portable. Moreover, these apparatuses give a latent anxiety about fire to the users and can heat only one room, and it was necessary to install the combustion unit in each room in order to heat plural rooms simultaneously.

In the heating apparatus using water as heating medium, it involved the problems of freezing in cold district and maintenance of water.

The aforesaid refrigerant heating type air conditioner is supplementarily described below.

The refrigerant heating air conditioner comprises, as principal constituent elements in the refrigerant heating cycle, refrigerant heater, compressor, indoor heat exchanger, outdoor heat exchanger used for cooling, expansion valve, four-way valve for changing over cooling and heating, two-way valve, and check valve. In this cycle, since the compressor can operate only in the gas state of the refrigerant, when heating, the refrigerant flows in the cycle of refrigerant heater, compressor, four-way valve, indoor heat exchanger, two-way valve and back to refrigerant heater.

Therefore, in such refrigerant heating cycle, since the refrigerant being handled is in gas form in the atmosphere of ordinary temperature and atmospheric pressure, in order to install plural indoor heat exchangers, it is required to use means for dividing the gas-form refrigerant flow, condensing in each indoor heat exchanger to return to liquid, and then converging the flows again.

In a multiple system, moreover, it is necessary to pass the refrigerant to each indoor heat exchanger at a proper flow rate suited to the required heating capacity, but it is difficult detect the flow rate, unlike water, because of the phase variation, and it is furhter difficult to pass a proper flow rate to each indoor heat exchanger. In this cycle, structurally, since the compressor is installed at the downstream side of the refrigerant heater, it is impossible to raise the temperature or pressure of the refrigerant more than the temperature or pressure resistant limit of the compressor.

Incidentally, the compressor requires lubricating oil, but the heat withstanding temperature of the oil is not so high. Therefore, it desired to set the blow-out temperature from the indoor unit higher in order to obtain a more comfortable heating, the limit was about 60° C. in the existing refregerant heating air conditioner.

SUMMARY OF THE INVENTION

It is, therefore, an object of the present invention to provide a new and improved multi-type air heating apparatus utilizing a phase variation of a heating medium which can heat multiple rooms cleanly, comfortably and safely by using combustion heat.

According to the present invention, there is provided a multi-type air heating apparatus comprising:

an outdoor unit at least including a combustion unit for heating a heating medium of liquid, by combustion heat, to thereby change a phase of the heating medium from liquid to gas;

a plurality of indoor units each including at least an indoor heat exchanger for heat-releasing the heating medium of gas supplied to a region to be heated and phase-changing into the heating medium of liquid, and means for detecting the required heating capacity in the region to be heated required in the indoor heat exchanger, in which the required heating capacity detecting means comprises means for setting a desired room temperature, means for detecting a room temperature, and means for delivering the required heating capacity data in the region to be heated according to the difference between a set temperature by the room temperature setting means and a detected temperature by the room temperature detecting means;

distributing means coupling the plurality of indoor units parallel to the outdoor unit in order to form enclosed heating medium circulation cycles, the distributing means being presented corresponding to the enclosed heating medium circulation cycles; and control means for controlling a combustion quantity of the combustion unit of the outdoor unit and amount of the heating medium to be supplied to the enclosed heating medium circulation cycles according to the sum of the required heating capacity data from the required heating capacity detecting means of the plurality of indoor units, and controlling the heating medium distribution amount of the distributing means in order to distribute the heating medium into each indoor heat exchanger of the plurality of indoor units according to the ratio of the required heating capacity data.

In order to achieve the above object, furthermore, the heating apparatus of the invention comprises the combustion unit, and the enclosed heating medium circuit means for repeating the operation of distributing and supplying the heating medium changed in phase from liquid to gas as being heated by the combustion heat of this combustion unit into plural regions to be heated, releasing heat in these regions to be heated, heating the condensed heating meidum again by the combustion heat, and supply again to the plural regions to be heated, and therefore since the phase variation of the heating medium is exclusively utilized in heating, multiple rooms can be heated by a small driving electric power not requiring compression action.

Besides, according to the heating apparatus of the invention, the calorific quantity released from the enclosed heating medium circuit means into the plural regions to be heated is capable of controlling with an excellent heating feeling by setting depending on the difference between the set temperature in each region to be heated and the measured temperature.

Still more, according to the heating apparatus of the invention, the heating quantity of the heating medium by the combustion unit can be set by corresponding to the sum of the required heating capacity determined by the calorific quantity set by the difference of at least the set temperature of each region to be heated and the measured temperature, and hence it is possible to control with an excellent heating feeling by preventing overheating of the heating medium packed in the enclosed heating medium circuit means.

In the heating apparatus of the invention, furthermore, the quantity of the heating medium supplied in the plural regions to be heated in the enclosed heating medium circuuit means is set by corresponding to the sum of the required heating capacity determined by the calorific value set by the difference between at least tne set temperature in each region to be heated and the measured temperature, and therefore the system is stabilited by preventing overheat of the heating medium packed in the enclosed heating medium circuit means.

Moreover, according to the heating apparatus of the invention, the enclosed heating medium circuit means distributes and supplies the heating medium depending on the ratio of the required heating capacity determined by the calorific value set by the difference from the set temperature in each region to be heated into the plural regions to be heated, and prevents uneven heat release to a specific region to be heated, so that the calorific value suited to the heating load in each region to be heated can be supplied.

According to the heating apparatus of the invention, depending on the ratio of the required heating capacity in each region to be heated, the quantity of heating medium to be distributed and supplied in each region to be heated can be controlled so as to be suited to the required heating capacity in each region to be heated, by compensating the ratio of distribution and supply of the heating medium depending on the distance and/or height from the heat source of the heating medium to the heat release point in each region to be heated.

According further to the heating apparatus of the invention, the correction value of the required heating capacity is set as a preset value determined as the correction value by the selected switch of the plural external operation switches attached to the control means for controlling the enclosed heating medium circuit means, so that the adjustment to the distance and/or height may be easy.

Also in the heating apparatus of the invention, the flow rate distribution of the heating medium corresponding to the ratio of the required heating capacity in every region to be heated is set by controlling the flow passage sectional area of the passage in which each heating medium runs.

The flow passage sectional area can be set by means of a mechanical part capable of setting the initial value for correcting the ratio of distributing and supplying the heating medium depending in the distance and/or height from the heating source of the heating medium till the heat releasing point in each region to be heated, so that the correction to the distance and/or height may be corrected easily same as in the switch means above.

According also to the heating apparatus of the invention, the correction value of the required heating capacity is preset by learning, by employing the heating medium circulation amount so that the required heating capacity of each region to be heated may be the same capacity by supplying the heating medium independently into each region to be heated before setting the enclosed heating medium circuit means into ordinary operation, as the correction value for distributing and supplying the heading medium in each region to be heated, so that the correction value of that amount will be an optimum value.

Further according to the heating apparatus of the invention, the quantity of heating medium distributed and supplied in each region to be heated depending on the ratio of the required heating capacity of each region to be heated is controlled by measuring the flow rate of the heating medium passing in each region to be heated of the enclosed heating medium circuit means, and therefore the flow rate of the heating medium is controlled by the information closely related with the heating state of the region to be heated.

According to the heating apparatus of the invention, the flow rate of the heating medium in each region to be heated is set in proportion to the required heating capacity in region to be heated.

In the heating apparatus of the invention, the heating medium flow rate in each region to be heated is detected from the vapor speed of the heating medium passing through the enclosed heating medium circuit means in each region to be heated, and therefore the control of flow rate will be extremely correct because the vapor speed is the information directly related with the flow rate of the heating medium flowing in the enclosed heating medium circuit means.

According to the heating apparatus of the invention, even if a fluctuation occurs in the difference between the set temperature and measured temperature in each region to be heated and the required heating capacity in each region to be heated varies, unless the sum of the required heating capacity is not changed, the heating medium in each region to be heated is constantly maintained in the total of the ratio to be distributed and supplied, and the heating medium is distributed in the quantity depending on the ratio of the required heating capacity in each region to be heated and supplied into each region to be heated, by installing control means, so that the heating quantity into the enclosed heating medium circuit means is not changed, thereby making it possible to distribute the heating medium depending on the required heating capacity of each region to be heated.

Further according to the heating apparatus of the invention, if a fluctuation occurs in the difference between the set temperature and measured temperature at least in one region to be heated and the sum of the required heating capacity in each region to be heated is changed, control means is employed to maintain the total of the ratio of distributing and supplying the heating medium in each region to be heated at a value corresponding to the variation of the of the sum of the required heating capacity and changed to the total, and supply by distributing to the heating medium of the quantity depending on the ratio of the required heating capacity in each region to be heated, and therefore the heating medium suited to the quantity corresponding to the variation of the sum of the required heating capacity is supplied by increasing or decreasing, and the heating operation suited to the required heating capacity in each region to be heated is continued automatically.

According further to the heating apparatus of the invention, when the total of the ratio to distribute and supply the heating medium in each region to be heated is increased, the enclosed heating medium circuit means once increases the supply of the heating medium to the region to be heated and then increases the heating quantity of the combustion unit, or when the total is decreased, the heating quantity of the combustion unit is decreased and then the supply of the heating medium to the region to be heated is decreases, so that overheat of the heating quantity of the heating medium to the enclosed heating medium circuit means is prevented, and a stable operation of the system is realized.

According to the heating apparatus of the invention, the enclosed heating medium circuit means, when controlling stop and start of heat release by supply and stop of heating medium independently in each one of plural regions to be heated, and when starting heat release in plural desired regions to be heated, once increases the supply of heating medium to the regions to be heated and then increases the heating quantity of the combustion unit, then stops heat release in the desired regions, or when starting heat release in plural desired regions to be heated, the enclosed heating medium circuit means once increases the supply of the heating medium to the regions to be heated and increases the heating quantity of the combustion unit, or when stopping heat release to desired regions, after once decreasing the heating quantity of the combustion unit and then the supply of the heating medium into the regions to be heated is decreased, and therefore in spite of sudden fluctuations of the required heating capacity, the enclosed heating medium circuit means is not overheated, and a stable operation of the system is maintained.

According also to the heating apparatus of the invention, the maximum combustion amount of the combustion unit is variable almost corresponding to the sum of the maximum required heating capacity set in each of plural regions to be heated at least, and by setting the sum of the design values of the maximum required heating capacity preset in the regions to be heated as the upper limit, even if the required heating capacity of the regions to be heated rises infinitely, since the heating quantity of the enclosed heating medium circuit means is controlled, the system can be operated safely.

Also in the heating apparatus of the invention, by setting the combustion quantity by the combination of plural combustion units, the combustion units of the combustion amount variable easily in a side range may be achieved.

Further according to the heating apparatus of the invention, the maximum combustion quantity of plural combustion units possesses the combustion quantity nearly corresponding to the heating quantity of the combustion quantity corresponding to the sum of the maximum required heating capacity of at least plural regions to be heated being divided by the number of the combustions unit being used, and thus it is easy to share the fans for combustion air supply among plural combustion units, and furthermore since the combustion quantity is nearly the same, flames will not interfere with each other during simultaneous combustion.

According to the heating apparatus of the invention, moreover, when the sum of the required heating capacities from at least two regions to be heated out of the plural regions to be heated is a heating capacity corresponding to a range from the combustion quantity smaller than the specified combustion quantity less than the maximum combustion quantity of one combustion unit and the preset minimum combustion quantity, or when a heating request is made from one region to be heated, the heating medium is heated by one combustion unit, and when the sum of the required heating capacities is over the heating capacity corresponding to the specified combustion quantity and heating is requested from plural regions to be heated, the heating medium is heated by combination of plural combustion units, and usually the heating medium is heated by combination of two combustion units as far as possible to meet the heating request, and thus heating of the heating medium by one combustion unit is decreases, thereby decreasing the ignition and extinction actions of the combustion units.

According further to the heating apparatus of the invention, when heating the heating medium by combination of plural combustion units, the heating medium is heated by the combustion quantity equal to the quotient of the sum of the required heating capacities of the regions to be heated divided by the number of the combustion units, so that mutual interference of flames during combustion of the combustion units is prevented.

According to the heating apparatus of the invention, by detecting the state of flame of the combustion unit, if the flame is abnormal, once the fuel supply to the combustion unit is stopped, and the operation in the sequence of the combustion chamber purification action, ignition, fuel supply, and flame state detection is repeated by a specified number of times to judge to continue or stop combustion, and judging errors in determination of abnormality of the heating apparatus are minimized, so that effects on the heating feel of the user are decreased.

In the heating apparatus of the invention, while heating the heating medium of the enclosed heating medium circuit means by combination of plural combustion units, when the above judging action of at least one combustion unit is actuated, the same judging action is simultaneously repeated including the normally working combustion units, so that the operations of the combustion units may be synchronized.

In the heating apparatus of the invention, while heating the heating medium of the enclosed heating medium circuit means by combination of plural combustion units, when abnormality of flame is detected by the above judging action, excluding the detected combustion unit, the other combustion units continue operation to heat the enclosed heating medium circuit means, thereby preventing sudden drop of the heating capacity.

According to the heating apparatus of the invention, when the operation of detection of flame state of the combustion units exceeds a specified number of times, after stopping the operation of the combustion units, the distribution and supply action of the heating medium of the enclosed heating medium circuit means is stopped to prevent overheating of the enclosed heating medium circuit means, and therefore, if the combustion unit becomes abnormal, the heating apparatus may be stopped safely.

The heating apparatus of the invention is also characterized by transmitting and displaying the state of stopping of the operation of the combustion unit to the regions to be heated.

During heating operation by one of the plural combustion units, if a heating request of the heating medium by combination of plural combustion units is raised, the plural combustion units start combustion in the heating quantity nearly corresponding to the heating quantity as the quotient of the required heating capacity divided by the number of hating units, so that combustion in the heating quantity corresponding to the required heating capacity is achieved without mutual interference of flames.

Furthermore, according to the heating apparatus of the invention, during heating operation by the heating capacity of one combustion unit which is enough for satisfying the required heating capacity from the regions to be heated out of plural combustion units, if the required combustion capacity for the combustion unit varies and the required heating capacity after change is at least twice the required heating capacity during heating operation by one combustion unit and heating by combination of plural combustion units is requested, the heating quantity to the heating medium to meet the required heating capacity is increased while controlling the combustion quantity of the combustion unit to be ignited newly without lowering the heating capacity of the combustion unit in operation, so that it is possible to enter into heating operation in the heating medium heating quantity suited to the required heating capacity quickly.

Also according to the heating apparatus of the invention, at least until the combustion unit newly entering in ignition action reaches the same combustion quantity as the combustion unit previously in operation, by restarting the ignition action of the combustion unit already in action, it is possible to prevent extinction of the flame in combustion due to the interference of the combustion unit newly put in operation.

According to the heating apparatus of the invention, the combustion unit is designed to burn the mixed gas of the liquid field preliminarily vaporized and gasified by an electric heater and the air for combustion, and when the vaporization heater is set in always energizable state before start of combustion, the waiting time for vaporization of the liquid fuel may be shortened, and heating may be started promptly.

According to the heating apparatus of the invention, still more, the always energizable state before start of combustion of the vaporization heater of the combustion unit is set by the priority operation, so that the excessive power consumption may be prevented.

Again, according to the heating apparatus of the invention, comprising a combustion unit with a variable combustion quantity, nearly corresponding to the sum of the set maximum required heating capacities of the regions to be heated at least in the maximum combustion quantity, heat absorbing means for heating the heating medium by the combustion heat of this combustion unit, heat release means disposed in plural regions to be heated, and enclosed heating medium circulation system of variable supply type for supplying the heating medium heated by the heat absorbing means to these heat release means, it is possible to heat in the heating quantity and circulation quantity of the heating medium corresponding to the sum of the required heating capacities of the regions to be heated.

Further according to the heating apparatus of the invention, as the heating medium circulation means of the enclosed heating medium circulation system, when the heating medium is supplied to the heat absorbing means for absorbing the combustion heat of the combustion unit, the heating medium is circulated by the vaporization pump installed at the heating medium exit side of the heat absorbing means, so that the compressor may be used also for the purpose of vaporization pump.

According also to the heating apparatus of the invention, plural heat release means installed in the enclosed heating medium circulation system are connected parallel individually, and each heat release means is connected in series to the heat absorbing means and vaporization pump to compose the enclosed heating medium circulation system, so that the heating capacity may be controlled in the heat release amount of each heat release means, that is, the circulation amount of the heating medium accompanying the required heating capacity.

According to the heating apparatus of the invention, since the control means for controlling the circulation flow rate of heating medium independently is connected to each heat release means, it is possible to control the heating operation independently in each region to be heated.

According again to the heating apparatus of the invention, as the circulation flow rate control means of the heating medium, a control valve for controlling the sectional area of the flow passage in proportion to the circulation flow rate is used at the downstream side of each heat release means, and since the control valve is installed at the downstream side of each heat release means, the flow rate of the heating medium in liquid phase is controlled, and therefore control of flow rate is easy and accurate.

The heating apparatus of the invention comprises a combustion unit with a variable combustion quantity, enclosed heating medium circuit means for distributing and supplying the heating medium varying in phase from liquid to gas as being heated by the combustion heat of this combustion unit into plural regions to be heated, releasing heat in the plural regions to be heated, heating the condensed heating medium again with the combustion heat, supplying again into the plural regions to be heated, repeating the same operation, and setting the quantity of the heating medium to be supplied into the plural regions to be heated in correspondence with the sum of the required heating capacities determined by the difference between the set temperature and measured temperature of at least the regions to be heated, and heating quantity control circuit means for releasing heat by supplying a part of the heating medium heated by the combustion heat out of the plural regions to be heated when the minimum heating quantity from the combustion unit to the enclosed heating medium circuit means exceeds the sum of the required heating capacities in the regions to be heated, so that the enclosed heating medium circuit means is prevented from being superheated, thereby making it possible to perform feeble heating operation continuously.

The heating apparatus of the invention also comprises a combustion unit with a variable combustion quantity, heat absorbing means for heating the heating medium with the combustion heat of this combustion unit, heat release means disposed at plural regions to be heated, and a bypass circuit for connecting the heating medium exit side of these heat release means and the heating medium suction side of the heat absorbing means, and also connecting the enclosed circulation circuit means having a vaporization pump installed between the heating medium exit side of the heat absorbing means and the heating medium suction side of the heat release means, and also the heating medium discharge side of the vaporization pump and the heating medium suction side of the heat absorbing means, wherein superheating of the circulation circuit means and dew condensation on the heat absorbing means may be prevented during feeble heating operation.

According to the heating apparatus of the invention, the bypass circuit selectively allows to pass part of the heating medium circulating in the enclosed heating medium circuit, so that the bypass circuit may be operated only when the minimum heating quantity of the combustion unit exceeds the sum of the required heating capacities of the regions to be heated.

According also to the heating apparatus of the invention, the bypass circuit in which a part of the heating medium circulating in the enclosed heating medium circuit controls the flow rate of the heating medium passing the circuit, and moreover the flow rate control means of the heating medium circulating in the bypass circuit is capable of controlling the flow passage sectional area of the passage from full closure to full opening, and therefore the bypass circuit may be operated only for the portion of the sum of the required heating capacities exceeding the minimum heating quantity.

The bypass circuit has a capillary tube connected on its way, and controls the flow rate of the passing heating medium so that the heating medium may be always flowing by a small portion, superheating and dew condensation on the heat absorbing means may be prevented.

According also to the heating apparatus of the invention, the bypass circuit comprises a tank for temporarily holding the liquefied heating medium passing the passage in the midst of the passage aside from the flow rate control means of the passing heating medium, and therefore an adequate heating medium quantity to the enclosed circuit means may be maintained even if the heat release quantity of the heat release means varies or when the heat release means are increased or decreased.

Further according to the heating apparatus of the invention, by comprising heating means for setting the heating quantity corresponding to the required heating capacity of plural regions to be heated by the combination of plural combustion units, heat absorbing chamber installed at the downstream side of the combustion unit of the heating means in which the combustion gas flows. heat absorbing pipe for passing the heating medium disposed closely to the heat absorbing chamber, heat release pipe installed in plural regions to be heated, and enclosed heating medium circulation means composed of these heat release pipe and heat absorbing pipe and a pump for circulating the heating medium sealed in these pipes, the heat absorbing pipe adjacent to the heat absorbing chamber is disposed along the flow direction of the combustion gas flowing in the heat absorbing chamber, so that the heat absorbing pipe can be heated uniformly by the combustion gas.

According again to the heating apparatus of the invention, the plural combustion units are disposed parallel in the horizontal direction, and the heat absorbing chamber is connected next to the downstream side combustion chamber of the combustion units, and by installing these devices in the horizontal direction, the heightwise direction of the heating apparatus is controlled so as to achieve configuration with other devices.

In the heating apparatus of the invention, the heat absorbing pipe adjacent to the heat absorbing chamber is disposed parallel by bringing closer the exit side and entrance side of the heat absorbing pipe for passing the heating medium, and the heat absorbing pipe is disposed while folding over parallel from the pipe at the heating medium entrance side on the wall of the heat absorbing chamber along the flow direction of the combustion gas flowing in the heat absorbing chamber, and the heat absorbing pipe from the midway of the heating medium passage of the heat absorbing pipe to the heating medium exit side is disposed on the heat absorbing chamber wall while folding over from the pipe to the pipe closely arranged at the heat absorbing chamber wall.

According to the heating apparatus of the invention, dividing into plural chambers along the flow direction of the combustion gas of the combustion unit, the combustion chamber of the combustion unit is further divided into plural combustion units, and the inside of the heat absorbing chamber is divided along the flow direction of the combustion gas, so that the combustion quantity can be lowered to minimize the heat release from the heat absorbing wall, thereby reducing the condensation of dew.

In the heating apparatus of the invention, the heating medium gas entrance side end an exit side end of the heat absorbing pipe adjacent to heat heat absorbing chamber are adjacent on the heat absorbing chamber wall surface in the boundary region in the flow direction of gas of the plural combustion units, thereby preventing dew condensation in the heat absorbing chamber.

According to the heating apparatus of the invention, when it is requested to heat by one combustion unit out of plural combustion units, the other combustion units continue combustion in the minimum set combustion quantity of combustion unit, so that dew condensation in the heat absorbing chamber is prevented because the heat absorbing chamber is insulated with the combustion gas of the small combustion.

Furthermore, the heating apparatus of the invention also comprises a combustion unit, heat absorbing means for heating the heating medium by the combustion heat of this combustion unit, heat release means disposed in plural regions to be heated, being connected parallel individually, enclosed heating medium circulation circuit means having a pump for circulation for supplying the heating medium absorbing heat by the heat absorbing means to these heat release means, passage opening and closing means for controlling the supply and stop of heating medium supplied to the individual heat release means from this mean independently in every heat release means, means for detecting the temperature of the heat absorbing means, and control means for opening the passage opening and closing means disposed in the heat release means while the supply of heating medium is stopped in the stopped state of the heat release action, when the detected temperature of the heat absorbing means becomes higher than the specified value in the stopped state of the supply of heating medium to at least one heat release means, wherein the heat absorbing means detects the exit side temperature of the heat absorbing means of the heating medium.

Still more, the heating apparatus of the invention comprises a combustion unit, heat absorbing means for heating the heating medium by the combustion heat of this combustion unit, heat release means disposed in plural regions to be heated and connected parallel individually, enclosed heating medium circulation circuit means furnished with the pump for circulation for supplying heating medium absorbing heat by the heat absorbing means to these heat release means, passage opening and closing means for independently controlling supply and stop of the heating medium supplied to these heat release means by this means in every heat release means, means for detecting the temperature of the heat release means, and control means for opening the passage opening and closing means disposed in the heat release means while stopping supply of the heating medium, in the stopped state of the heat release action, when the detected temperature of the heat release means by the temperature detecting means becomes lower than the specified value in the stopped state of the supply of heating medium to at least one heat release means.

In a different embodiment of the invention the heating apparatus comprises a combustion unit, heat absorbing means for heating the heating medium by the combustion heat of this combustion unit, heat release means disposed in plural regions to be heated and connected parallel individually, enclosed heating medium circulation circuit means possessing a pump for circulation for supplying the heating medium absorbing heat by the heat absorbing means into these heat release means, passage opening and closing means for controlling the supply and stop of heating medium supplied to the individual heat release means by this means independently in each heat release means, and control means for opening the passage opening and closing means periodically in the stopped state of the heat release action, when the supply of heating medium to the heat release means is stopped by the passage opening and closing means, wherein the heating medium staying in the heat release means in stopped state due to spontaneous leak of the heating medium when the supply of the heating medium to the heat release means is stopped is returned to the enclosed circuit including the heat release means in heating operation, so that safe operation of the system is achieved without overheating the heating medium.

According to the heating apparatus of the invention, the control means for opening the passage opening and closing means widens the passage sectional area continuously or intermittently when opening the passage, and the heating medium is gradually returned into the circuit inoperation, so that the heating medium in liquid form may not suddenly flow into the circuit.

Also according to the heating apparatus of the invention, the passage opening and closing means is composed of a series circuit of a two-way valve for controlling the supply and stop of heating medium into the passage, and a proportional control valve for controlling the circulation quantity of the heating medium for supplying into the heat release means, so that the operation of supply and stop of heating medium may be achieved independently in each heat release means in a simple constitution.

According further to the heating apparatus of the invention, the control means for opening the passage opening and closing means closes the passage opening and closing means after a specified time after opening the passage opening and closing means, or closes the passage opening and closing means by detecting the temperature of the heat release means after opening the passage opening and closing means and when exceeding a specified temperature, or closes the passage opening and closing means by detecting when the detected temperature of the heat absorbing means becomes lower than the specified value.

Moreover, the heating apparatus of the invention comprises a combustion unit, heat absorbing means for heating the heating medium by the combustion heat of this combustion unit, heat release means disposed in plural regions to be heated and connected parallel individually, enclosed heating medium circulation circuit means having a pump for circulation to supply the heating medium absorbing heat by the heat absorbing means into the heat release means, passage opening and closing means capable of supplying the heating medium by independently controlling the supply amount of the heating medium supplied into the heat release means by this means independently in each heat release means, and control means for passing the heating medium into the passage opening and closing means as the passage opening and closing means restricts the quantity of the heating medium to be supplied into the heat release means in a smaller supply quantity as compared with the heat release means in the heat relation action while the heat release means is stopped in the heat release action to the regions to be heated during operation of the circulation pump, wherein by passing the heating medium always into the heat release means while the heat release is stopped, the heating medium is prevented from staying in the heat release means while the heat release action is being stopped.

According to the heating apparatus of the invention, the restriction of the supply quantity of the heating medium into the heat release means is achieved by sharing with the means for controlling the heat release action by controlling the heating medium supply quantity to the heat release means by reducing the passage sectional area of the passage in which the heating medium flows.

According further to the heating apparatus of the invention, the heating medium circulation means of the enclosed heating medium circulation system is composed of the liquid pump installed at the heating medium entrance side for supplying the heating medium to the heat absorbing means for absorbing the combustion heat of the combustion unit, thereby making it possible to convey the heating medium in liquid phase, and therefore it is possible to control by raising the heating temperature of the heating medium by the combustion unit, and also to raise the heat release temperature from the heat release means.

According also to the heating apparatus of the invention, at the suction side of the heating medium of the liquid pump, the heating medium liquefied by releasing heat by the heat release means is temporarily stored to separate into gas and liquid, and a liquid tank for supplying the heating medium in liquid form into the pump is installed, and the heating medium in liquid phase may be securely returned to the pump, thereby preventing abnormality of the circulation action of the heating medium.

Moreover according to the heating apparatus of the invention, the liquid tank possesses a larger capacity than the total volume of the enclosed heating medium circulation system at least including the heat absorbing means, heat release means and liquid pump excluding the liquid tank, and hence its operation is further ensured, and still more the liquid tank is installed at a higher position than the installation position of the liquid pump, and also the liquid outlet from the liquid tank is relatively positioned with the liquid tank and liquid pump so as to be higher than the liquid suction port position of the liquid pump, and the operation becomes further reliable.

According to the heating apparatus of the invention, the liquid tank promotes the storage of the heating medium in liquid phase into the liquid tank from the enclosed heating medium circulation system into the liquid tank when the liquid level stored in the liquid tank is lower than the specified level.

Such promotion of storage of heating medium in the liquid tank is effected by controlling the liquid pump and/or combustion unit, or by stopping the liquid pump and/or combustion unit.

In the heating apparatus of the invention, the liquid level stored in the liquid tank acts to promote the storage of heating medium in the tank, by detecting the liquid level of the heating medium in the liquid tank, detecting the state when the liquid level in the liquid tank becomes too low, thereby stopping the circulation pump or stopping the heating of the heating medium by the combustion unit.

Furthermore, in the heating apparatus of the invention, opening and closing valves are disposed at the suction side and discharge side of the heating medium of the liquid pump, and by closing them when the heating operation is stopped to entrap the heating medium in liquid phase in the liquid pump, so that the circulation action of the heating medium may be restarted securely when resuming the heating operation.

According further to the heating apparatus of the invention, by installing a bypass circuit for circulating a part of the heating medium circulating in the enclosed heating medium circulation system between the suction side of the heating medium and discharge side of the heating medium of the liquid pump, the heating operation suited to the required heating capacity of each room may be continued without stopping the heating operation when the heating quantity in the minimum combustion state exceeds the required heating capacity.

In the heating apparatus of the invention, the bypass circuit is provided with control means capable of controlling the flow rate of the heating medium flowing in this circuit, and it is possible to continue the heating operation more finely.

In the heating apparatus of the invention, moreover, the flow rate control means is capable of controlling the sectional area of the passage in a range from full closure to full opening.

According to the heating apparatus of the invention, the heat release means incorporates the heating means for heating the heating medium before starting the liquid pump, and therefore the heating may be started by returning the heating medium staying in the heat release means into the heater side.

According also to the heating apparatus of the invention, comprising the control means for supplying, when starting operation, the heating medium in a larger quantity than the heating medium supply quantity into each region to be heated of the enclosed heating medium circuit means determined by the required heating capacity set depending on the difference between the set temperature and measured temperature, and firing the combustion unit in the combustion quantity corresponding to the required essential heating capacity being delayed by a specified time, and the operation to increase the supply of the heating medium is effected for the preset time when starting the operation, and therefore it is possible to avoid the trouble that the necessary flow rate of the heating medium is not achieved at the rotating speed depending on the combustion quantity until the pressure is raised in the enclosed circuit.

Furthermore, according to the heating apparatus of the invention, when starting operation, the supply amount of the heating medium determined by the required essential heating capacity determined by the difference between the set temperature and measured temperature is supplied into each region to be heated, and the combustion unit gradually raises the combustion quantity from the combustion quantity corresponding to the preset minimum required heating capacity to reach the combustion quantity suited to the required essential heating capacity, so that the operation may be started by keeping balance between the heating medium flow rate and the heating quantity, thereby compensating for the shortage of the flow rate of the heating medium when starting operation.

When finishing the specified control operation after starting up the operation, the heating medium supply amount into the regions to be heated is controlled so that the detected temperature may settle within the predetermined temperature range while monitoring the temperature of the heating medium heated by the combustion heat, thereby preventing the internal pressure of the heating medium circulation system from rising abnormally.

Also according to the heating apparatus of the invention, in the enclosed heating medium circulation system of variable heating medium supply type, a circulation pump of which conveying capacity is controlled by the power source frequency is used, and the driving frequency of the circulation pump is determined by the inverter circuit for converting the frequency of the commercial power source into the frequency corresponding to the conveying capacity of the pump based on the required heating capacity.

According further to the heating apparatus of the invention, the switching element for converting the frequency of the inverter circuit is disposed on the way of the air passage for combustion to be supplied to the combustion unit, and therefore exclusive cooling fan is not required, and the air is heated and supplied into the combustion unit, so that the operation of the combustion unit may be stabilized.

In addition, according to the heating apparatus of the invention, which comprises a combustion unit, heat absorbing means for heating the heating medium with the combustion heat of this combustion unit, heating medium circulation pump connected in series to this heat absorbing means, heating medium suction port group and heating medium discharge port group disposed by branching off by the number of heat release means connected to the heating medium inlet side and heating medium outlet side of the heating medium circuit connected in series thereto, and stop valve group for entrapping the heating medium medium disposed at each one of these ports, the combustion unit, heat absorbing means and heating medium circulation pump are incorporated into one housing, and the stop valves for entrapping the heating medium are disposed in stairs so that the heating medium suction port group and discharge port group of the valves may not overlap vertically or laterally in the central lines in the flow direction of each heating medium on the wall surface of the housing, so that the piping installation work may be extremely easy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiments of the invention and, together with the general description given above and the detailed description of the preferred embodiments given below, serve to explain the principles of the invention.

FIG. 1 to FIG. 62 relate to a first embodiment of the heating apparatus of the invention, in which:

FIG. 1 is a configuration diagram showing the entire mounting state of each element, FIG. 2 is an entire system block diagram, FIG. 5 is a front view of an indoor radiator, FIG. 6 is a side view of an indoor radiator, FIG. 7 is a bottom view of an indoor radiator, FIG. 11 is a front view of an outdoor unit, FIG. 12 is a top view of an outdoor unit, FIG. 13 is a side view of an outdoor unit, FIG. 29 is a Mollier chart, FIG. 30 is a basic control flow chart, FIGS. 39A and 39B are basic operation flow charts of the system, FIGS. 40A and 40B are outdoor unit controller function diagrams, FIGS. 43A-43C to FIG. 45 are control charts of the entire cycle, FIG. 47 is a heating medium optimum supply control flow chart in ordinary heating operation, FIG. 49 is a weighted control flow chart of the opening degree of the heating medium control valve, FIG. 50 is a DIP switch structural drawing, FIGS. 52A, 52B are operation pattern diagrams of combustion unit, FIG. 53 is a basic operation control flow chart of combustion unit, FIG. 54 is a control flow chart in the case of a plural cylinder start of combustion unit, FIGS. 56A to 56C are control flow charts when changing operation pattern of combustion unit, FIG. 57 is a control flow chart of quick start of combustion unit, FIG. 61 is a control flow chart showing emergency stop due to safety device, FIG. 62 is a control flow chart in the case of fuel shortage, FIG. 65 is a control flow chart of liquid heating medium in liquid tank, FIGS. 67A and 67B are control signal waveform diagrams of an electromagnetic pump, FIG. 71 is a structural front view of a heating medium heater, FIG. 72 is a structural side view of a heating medium heater, FIG. 73 is a sectional view of a heating medium heater, FIG. 76 is a combustion unit operation pattern diagram.

Moreover, FIG. 78 through FIG. 106 show modification examples and application examples of the heating apparatus of the invention, in which:

FIG. 78 and FIG. 79 are operation diagrams of an indoor radiator,

FIG. 80 is a system structural drawing incorporating a heating medium control valve into an indoor radiator, FIG. 81 is a system structural drawing for detecting the heating medium temperature of the indoor radiator, FIG. 82 is a system structural drawing for detection of overcooling degree, FIG. 83 is a system structural drawing for disposing the heating medium control valve at the upstream side of an indoor radiator, FIG. 84 is a system structural drawing installing a capillary tube at the upstream side of an indoor radiator, FIG. 85 is a sectional structural view of an indoor radiator, FIG. 86 is a flow chart for recovery of heating medium, FIG. 87 is a timing chart for recovery of heating medium, FIGS. 88 to 90 are top view, side view and front view of a combustion air adjusting part, FIGS. 91 to 93 are top view, side view and front view of a combustion air adjusting part, FIG. 94 is a system structural drawing installing a bypass circuit, FIG. 95 is a heating medium circulation flow chart of installing a bypass circuit, FIG. 96 is an operation flow chart of installing a bypass circuit, FIG. 97 is a system structural drawing of installing other bypass circuit, FIG. 98 is a system structural drawing for prevention of idling of liquid pump, FIG. 99 is a liquid tank structural drawing, FIG. 100 is a structural drawing of a pressure type acceleration meter, FIG. 101 is a system structural drawing of installing a temperature sensor at the upstream side of an indoor radiator, FIG. 102 is a system structural drawing showing a modification example of adjustment of opening degree of a heating medium control valve, FIG. 103 is a characteristic diagram showing the relation between the opening degree of a heating medium control valve and the time, FIG. 104 is a system structural drawing of installing a cartridge tank, FIG. 105 is a system structural drawing in which the indoor radiator is distant from the outdoor unit, and FIG. 106 is a side view of an outdoor unit.

DETAILED DESCRIPTION OF THE PREFERRED EMBODIMENTS

Figure 1:
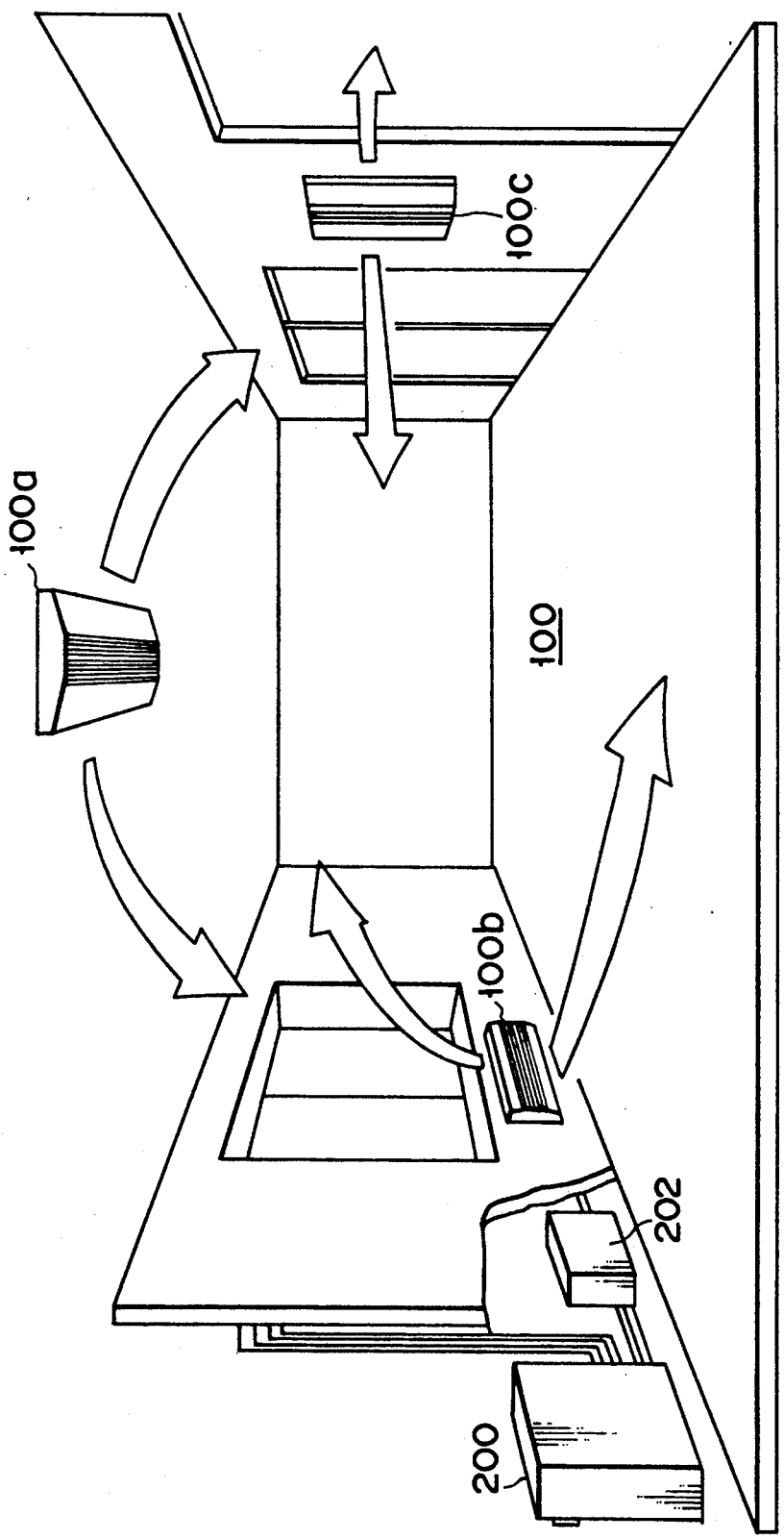

Reference will now be made in detail to the presently preferred embodiments of the invention as illustrated in the accompanying drawings, in which like reference characters designate like or corresponding parts throughout the several drawings.

Referring now to the drawings, some of the preferred embodiments of the invention are described in detail below.

FIG. 1 is a configuration diagram showing the entire mounting state of elements of a heating apparatus of the invention. In the drawing, numeral 100 is an indoor radiator consisting of 100a to 100c, in which three indoor radiators 100a, 100b and 100c are installed in one room, but actually the indoor radiators 100a to 100c are installed in individual rooms separately.

Outdoors, as shown in the drawing, an outdoor unit 200 housing a heating medium heater, gas pump, flow divider and others to be mentioned later is installed, separately from a fuel tank 202. This fuel tank 202 is to contain the fuel necessary for the heater in the outdoor unit 200. Indoors, more specifically, the indoor radiators 100a to 100c are installed, and the indoor radiator 100a is mounted on the ceiling, the indoor radiator 100b is mounted laterally on the wall, and the indoor radiator 100b is mounted vertically on the wall. Thus, combustion units for heating the heating medium are not installed at the indoor radiator 100 side, but are provided at the outdoor unit 200 side, and therefore it is not necessary to mount them on the wall surface as in the indoor unit of the conventional air conditioner or provide measures for drain of the indoor unit for heating only, and hence it is possible to reduce the thickness of the structure and mount on the ceiling. Moreover, the back side of the indoor radiator is structured as described below, and it is possible to mount freely, vertically or laterally, on the ceiling or wall, and the degree of freedom of installation is great, and it is possible to install a heating apparatus in a room in which it was previously impossible to install because of the lack of mounting space.

FIG. 2 is a system structural drawing of a heating apparatus according to a first embodiment of the invention. This drawing illustrates the basic system composition of heating cycle of the invention.

This heating cycle 150 comprises, as principal constituent elements, plural indoor radiators 100a, 100b and 100c (three in this embodiment), and an outdoor unit 200, and they are connected with heating medium pipings to form an enclosed cycle.

Each indoor radiator 100 is composed of a heat exchanger (radiator) 102 for exchanging heat between the heating medium (e.g. R22) and indoor air, varying in phase from liquid to gas by heating, circulating in the cycle, two indoor fans 104 and 106 for feeding indoor air into the room after exchanging heat with the heating medium by this heat exchanger 102, and a temperature sensor 110 for measuring the indoor temperature (Ta), and the required calorific value (required heating capacity) of each room is determined from the difference between the indoor temperature (Ta) measured by this temperature sensor 110 and the temperature (Ts) preset by the user.

The outdoor unit 200 includes a heating medium heater 220 for heating the heating medium passing in this closed cycle and preserving the heat in the heating medium as latent heat, a gas pump 250 for conveying (circulating) the heating medium in each indoor radiator 100, and a flow divider 270 for controlling the quantity of heating medium distributed and supplied into the heat exchanger 102 of each indoor radiator 100.

The heating medium heater 220 comprises two combustion units 22a and 22b. These two combustion units 222a and 222b possess same capacity so as to make it unnecessary to control the volume of air for combustion. By combining two combustion units, it is possible to vary the combustion quantity in a wide range from the combustion quantity corresponding to the sum of the preset maximum required heating capacities of the indoor radiators 100a to 100c (maximum combustion quantity) to the combustion quantity corresponding to the preset minimum required heating capacity of one indoor radiator (e.g. 100a only) (minimum combustion quantity). Accordingly, this heating medium heater 220 is suited to multi-type air heating apparatus required to vary the capacity in a wide range.

The minimum combustion quantity is the minimum value of the combustion quantity of one combustion unit, while the maximum combustion quantity is the sum of the maximum values of the combustion quantity of two combustion units.

The heating medium heater 220 comprises an air blow fan 224 for blowing combustion air into the combustion units 222a and 222b, a fuel supply system 226 for feeding fuel (petroleum) from the fuel tank 202 into the combustion units 222a and 222b, and a heating medium heating heat exchanger (heat absorbing unit) 230 for heating the heating medium with the heat from the high temperature combustion gas produced by combustion of the combustion units 222a and 222b and preserving the heat in the heating medium as latent heat. At the heating medium exit side (exit of heater 220) of this heating medium heating heat exchanger 230, a temperature sensor 232 is installed, and another temperature sensor 234 is provided in the middle part of the heating medium heating heat exchanger 230. These temperature sensors 232 and 234 are designed to measure the heating medium temperature (Tout) passing near the exit of the heating medium heating heat exchanger 230 and the heating medium temperature (Tmid) passing near the middle part.

The heating medium heating heat exchanger 230 is required to control the heating medium temperature (Tout) at the exit of the heater 220 within specified values (Tmin<Tout<Tmax), where Tmin: minimum allowable temperature, Tmax: maximum allowable temperature.

This is because if Tmin>Tout, so-called liquid pack is caused to lower the conveying capacity of the gas pump 250, and the function itself is adversely affected, or if Tout>Tmax, the pressure in the pipe elevates to result in a critical state.

When the heating medium temperature (Tout) goes out of the specified values, the combustion is stopped immediately.

The gas pump 250 is for circulating the heating medium in the cycle, and an inverter circuit 260 is connected to this gas pump 250. By this inverter circuit 260, the rotating speed of the motor of the gas pump 250 is controlled in frequency, and the circulation amount of the heating medium (circulation capacity) is variably controlled. At the heating medium inlet side of the gas pump 250, a suction cup 255 is provided, and the heating medium is separated into gas and liquid by this suction cup 255.

The flow divider 270 comprises a heating medium control valve (electronic expansion valve) 280 for controlling the distribution ratio (dividing ratio) of the heating medium to be supplied into the individual indoor radiators 100 (which consists of 280a, 280b and 280c), and a two-way valve 290 for controlling the supply and stop of heating medium (which includes 290a, 290b and 290c).

The two-way valve 290 is for distinguish the indoor radiators 110 in operation and in stopping. To the stopped indoor radiator 100, by closing both the two-way valve 290 and the heating medium control valve 280, unnecessary heat release is prevented. On the other hand, by selecting the conveying destination of the heating medium, a sufficient heating medium may be supplied into the running indoor radiator 100.

In the off-season when shutting down the heating apparatus for a long time, due to the ambient temperature difference, the heating medium moves from the outdoor unit 200 into the indoor radiator 100, and when resuming operation for the first time in the heating season, the heating temperature may rise (Tout>Tmax) due to shortage of heating medium to disturb operation, but in this case, too, by closing the heating medium control valve 280, move of the heating medium can be prevented.

Contrary to the manner of use mentioned above, the excess heating medium produced while stopping operation in one or two rooms can be stored in the stopped indoor radiator 100 by arresting the migration.

The heating medium control valve 280 is connected in series to the downstream side (heating medium exit side) of the indoor radiator 100. This is because the above function is not achieved if the heating medium control valve 280 is connected parallel to the indoor radiator 110.

When the heating medium control valve 280 is disposed at the downstream side (heating medium exit side) of the indoor radiator 100, the heating medium is controlled in a liquid phase. By contrast, the heating medium control valve 280 may be also installed at the upstream side (heating medium inlet side) of the indoor radiator 100. In this case, the heating medium is controlled in a gas phase, and therefore, the heating medium control valve 280 itself becomes slightly larger than when it is installed at the downstream side of the indoor radiator 100, but the control performance is better. Or if the heating medium control valve 280 is parallel to the indoor radiator 100, and heat of the heating medium is not sufficiently release in the indoor radiator 100, and returns to the heating medium heater 220 (not overcooled).

The state of the heating medium within individual constituent elements and the connection relation of principal constituent element parts are described below. The heating element transformed into gas as being heated by the combustion heat of the combustion units 222a, 222b of the heating medium heater 220 is supplied into the gas pump 250. In this gas pump 250, the conveying volume of the heating medium into each indoor radiator 110 is controlled, and the heating medium is conveyed into the individual indoor radiators 110 through the two-way valve 290 of the flow divider 270 provided in the outdoor unit 200. The heating medium sent to the indoors radiators 100a to 100c releases the heat conveyed by the heating medium through the radiator 102 in the indoor radiator 100 in the room. As a result, the state of the heating medium in the heat exchanger (radiate a) 102 in the indoor radiator 100 is gas at the upstream side of the radiator 102, mixture of gas and liquid in the radiator 102, and liquid at the downstream side of the radiator 102. The liquefied (condensed) heating medium returns to the heating medium heater 220 via the heating medium control valve 280 of the flow divider 270 disposed in the outdoor unit 200 from each indoor radiator 100, and the heating medium is heated again by this heating medium heater 220, and the heated heating medium is supplied again into the individual indoor radiators 100, thereby repeating the same operation.

Meanwhile, the outdoor unit 200 and the individual indoor units 100 are connected through packed valves 156a, 156b, 156c, 158a, 158b and 158c provided in the outdoor unit 200. These packed valves 156a to 156c and 158a to 158c, and the indoor radiators 100a to 100c are connected respectively through heating medium pipings 180a to 180c and 162a to 162c. These connections are made through the flow divider 270 in the outdoor unit 200, and therefore the two-way valve 290a in the flow divider 270 and the packed valve 156a are connected, and this packed valve 156a and the upstream side of the radiator 102 of the indoor radiator 100a are connected through the heating medium piping 160a, and the downstream side of this radiator 102 is connected with the packed valve 158a of the outdoor unit 200 through the heating medium piping 162a, and this packed valve 158a is connected to the heating medium control valve 28a in the flow divider 270. Similarly, the two-way valve 290b of the flow divider 270, packed valve 156b, heating medium piping 160b, radiator 102 of indoor radiator 100b, heating medium piping 162b, packed valve 158b, and heating medium control valve 280b of the flow divider 270, and also the two-way valve 290c of the flow divider 270, packed valve 156c, heating medium piping 160c, radiator 102 of indoor radiator 100c, heating medium piping 162c, packed valve 158c, and heating medium control valve 280c of the flow divider 270 are connected.

These six packed valves 156a to 156c and 158a to 158c are intended to keep the heating medium within the outdoor unit 200 when newly installing the heating apparatus of the invention or moving the outdoor unit 200. Or, due to some factor, if the heating medium in the heating cycle 150 decreases, the heating medium can be supplemented, or when installing newly the indoor radiator 100 or when cutting off (decreasing) the indoor radiator 100, discharge (leak) of the heating medium can be prevented.

The flow divider 270 may be installed separately from the outdoor unit 200, but in this case, another two packed valves are needed for connecting the outdoor unit 200 and the flow divider 270, thereby requiring a total of eight packed valves including the six packed valves for connecting the flow divider 270 to the respective indoor radiators 100, and therefore eight connection points are needed; in this embodiment, meanwhile since the flow divider 270 is built in the outdoor unit 200, the number of packed valves required is six, and the number of packed valves can be decreased as compared with the case of separate installation of the flow divider 270 and outdoor unit 200, so that such works as new installation or extension may be done smoothly.

Figure 3:
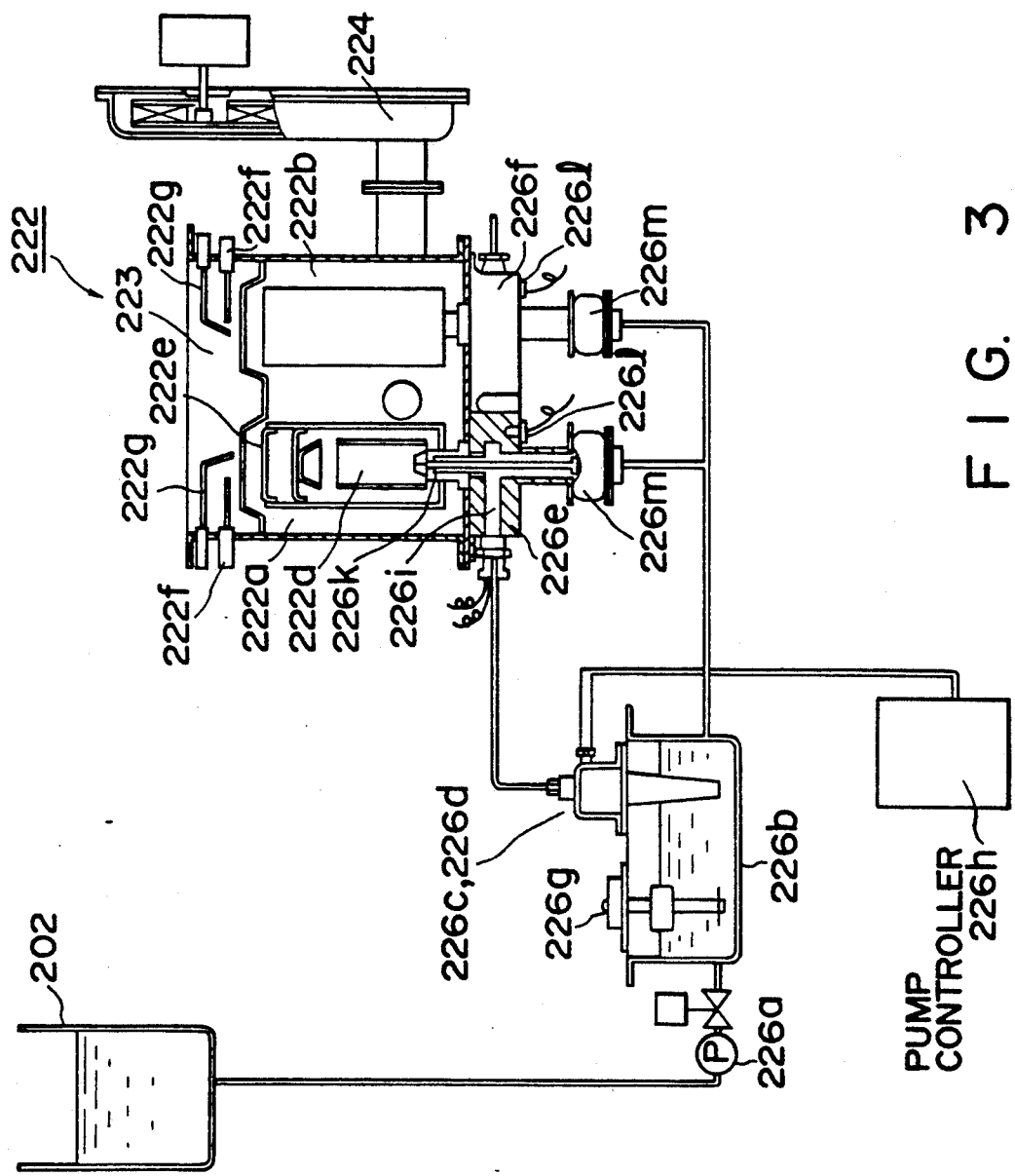
FIG. 3 is a front view of the combustion unit system configuration.
Figure 4:
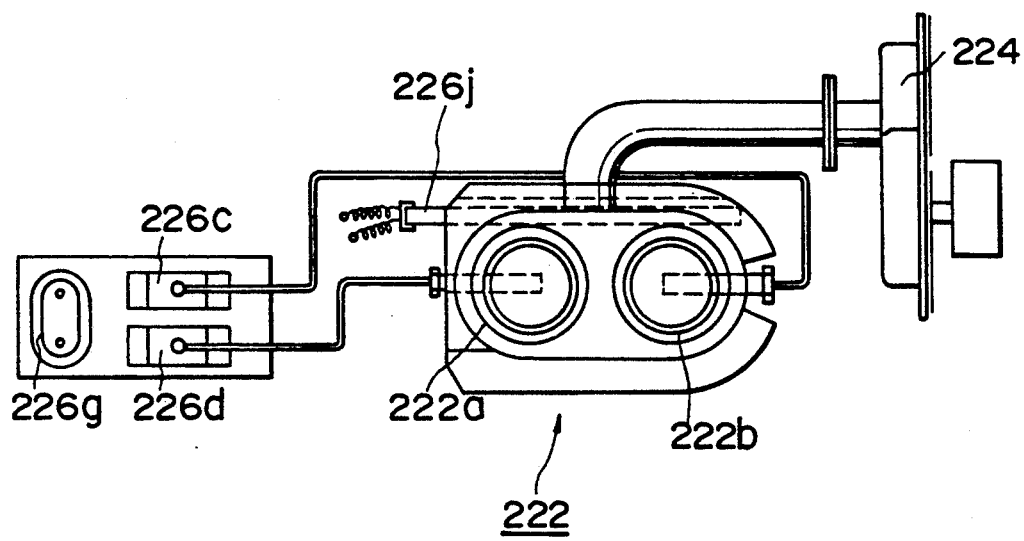
FIG. 4 is a top view of the combustion unit system configuration.

The basic system configuration of the combustion unit system of the heating medium heater 220 mentioned above is described below by reference to the combustion system composition front view and top view of the heating apparatus of the first embodiment shown in FIG. 3 and FIG. 4, respectively.

Principal constituent elements of this system include a combustion unit main body 222 (two combustion units 222a and 222b), an air blow system (air blow fan) 224 for blowing air into the combustion unit main body 222, and a fuel supply system 226 for supplying fuel to the combustion unit 222. The principal constituent elements of the combustion unit system are described below.

The fuel supply system 226 is composed of oil feed pump 226a, auxiliary tank 226b, two fuel pumps 226c and 226d, and two carburetors 226e and 226f, and others.

The operation of this fuel supply system 226 is as follows. The fuel in the fuel tank 202 installed separately from the outdoor unit 200 is pumped up into the auxiliary tank 226b by the oil feed pump 226a. A level gauge 226 is provided in this auxiliary tank 226b, and when the fuel is supplied form a specific level in the auxiliary tank 226b, the oil feed pump 226b is stopped. The fuel in the auxiliary tank 226b is supplied into the carburetors 226e and 226f by means of fuel pumps 226c and 226d. The fuel pumps 226c and 226d vary the frequency and pulse width of the plunger pump depending on the control signal from the pump control unit 226h, thereby changing the fuel flow rate to be supplied into the carburetors 226e and 226f, respectively. When the fuel is supplied to the carburetors 226e and 226f, the fuel in the auxiliary tank 226b decreases, and this decrease is detected by the level gauge 226g, and the oil feed pump 226a is operated again to supply the fuel from the fuel tank 202, and the fuel level may be kept nearly constant in the auxiliary tank 226b by repeating is operation. The liquid fuel sent into the individual fuel pumps 226c and 226d is supplied into the corresponding carburetors 226e and 226f.

At the fuel supply port of the carburetors 226e and 226f, a spiral metallic wire mesh 226i is inserted for evaporating the liquid fuel. The liquid fuel supplied into the carburetors 226e and 226f is heated by vaporization heater 226j (see FIG. 4), and is gradually evaporated to be supplied into a fuel nozzle 226k. The carburetors 226e and 226f are provided with a temperature sensor 226l. By this temperature sensor 226l, the temperature of carburetor is detected, and the vaporization heater 226j is controlled so as to keep constant the temperature of the carburetors 226e and 226f. The fuel (vapor) supplied into the fuel nozzle 226k is fed into a mixing chamber 222d, simultaneously with start of combustion of combustion units 222a and 222b by the actuation of an electromagnetic valve 226m.

The air blow system (air blow fan) 224 is to send the combustion air taken in from outside the outdoor unit 220 into the combustion units 222a and 222b, and it is connected so as to supply uniformly into the combustion unit main body 222a and 222b. The air flow of this fan 224 is controlled by the control signal from the pump control unit 226h. That is, because of the air/fuel constant control in which the combuston air volume varies together with the change of the fuel flow rate, the exhaust gas loss is almost constant whether in minimum combustion or in maximum combustion.

The combustion unit main body 222 premixes the vapor fuel ejected from the fuel nozzle 226k and the combustion air supplied from the air blow fan 224 in the mixing chamber 222d, thereby producing a premixed air. This premixed air is mixed with a secondary air supplied from the air blow fan 224 from around the flame opening 222e, thereby forming a flame at the flame opening 222e of the combustion chamber 223. This premixed air is ignited by a ceramic heater 222f, and when a flame is formed, the flame is detected by a flame rod 222g.

Briefly described so far are the basic system of the heating cycle of the invention, and the basic system of the combustion unit system, and the detail of each constituent element is explained hereinafter. The constituent elements are narrated in the following sequence.

Figure 22:
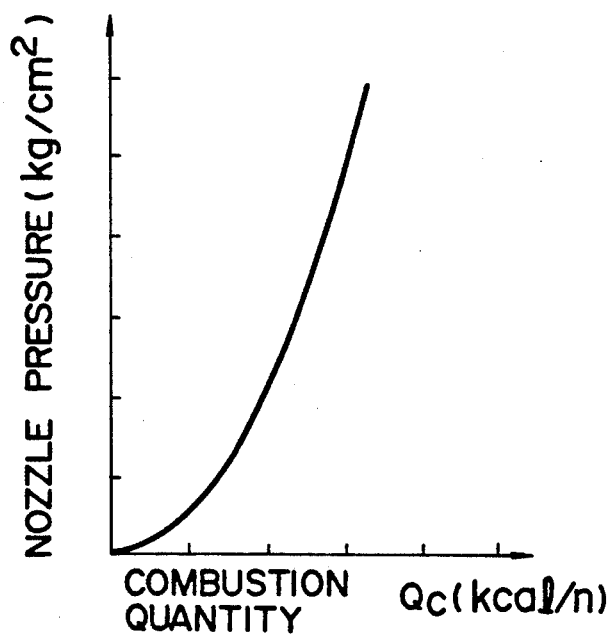
FIG. 22 is a characteristic diagram showing the combustion quantity against the nozzle pressure.
Figure 23:
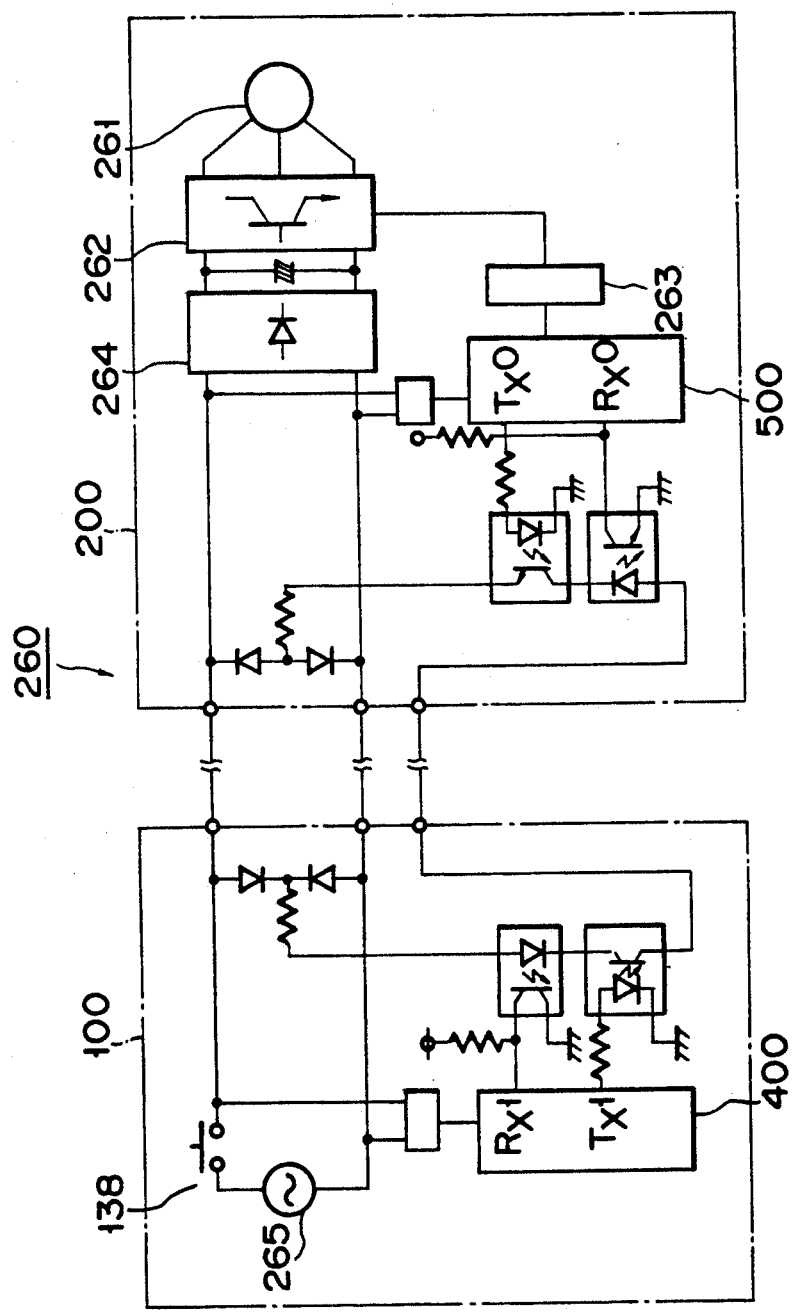
FIG. 23 is a structural drawing of an inverter circuit.
Figure 24:
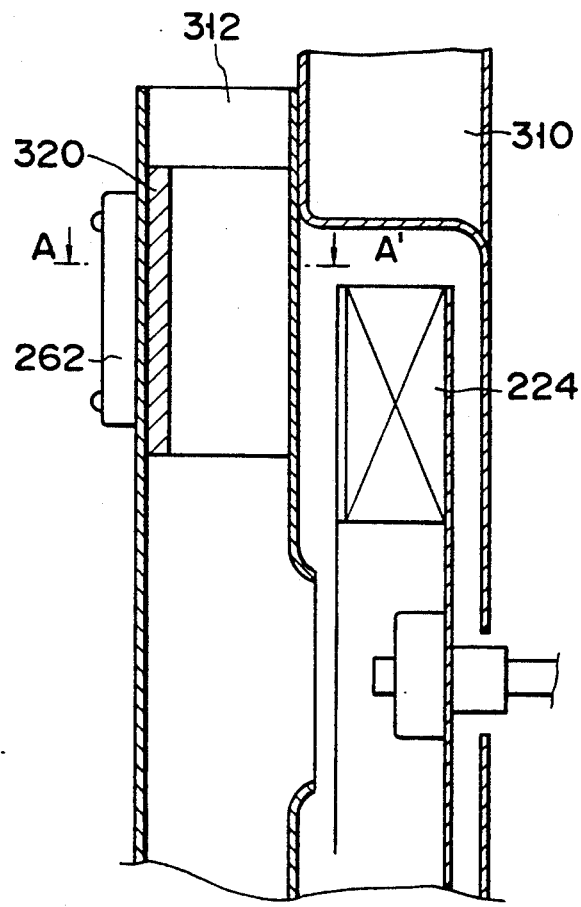
FIG. 24 is a structural drawing of an air feeding unit for combustion.
Figure 25:
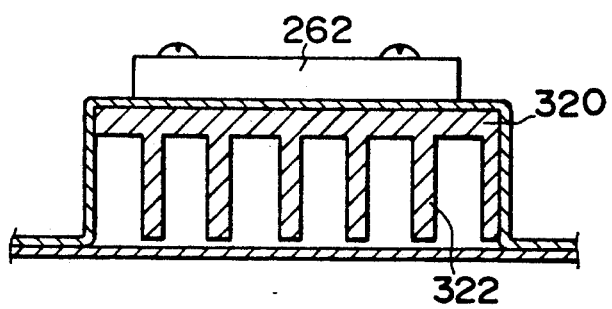
FIG. 25 is an A—A sectional view of the air feeding unit for combustion of FIG. 24.

1. FIG. 5 to FIG. 9 relate to the structure of the indoor radiator 100.
2. FIG. 10 to FIG. 13 relate to the structure of the outdoor unit 200.
3. FIG. 14 to FIG. 18 relate to the structure of the heating medium heater 220.
4. FIG. 19 to FIG. 22 relate to the structure of the fuel pumps, 226c, 226d.
5. FIG. 23 to FIG. 25 relate to the inverter circuit of the gas pump 250.
6. FIG. 6 relates to the structure of the heating medium control valve 280.

[Structure of indoor radiator]

To begin with, the indoor radiator 100 is explained. The appearance of the indoor radiator 100 is composed as shown in the front view, side view and bottom view of the indoor radiator according to this embodiments in FIG. 5 to FIG. 7.

On the front side of the indoor radiator 100, a front panel 120 is disposed. The front panel 120 is detachable freely from the indoor radiator 100. Plural fixed louvers 122 are disposed in the middle part of the front panel 120, and these louvers 122 function as suction ports of indoor circulation air, and from the gaps of the louvers 122, the indoor circulation air is taken into the indoor radiator 100. Moreover, movable louvers (turn louvers) 126, 128 are disposed at hot air blowout ports 124 at both sides (upper, lower surfaces in the drawing) in the longitudinal direction of the indoor radiator 100. These turn louvers 128 and 128 are composed of a single vane individually.

The turn louvers 126 and 128 are intended to blow out the indoor circulation air becoming a hot air as being heat-exchanged with the high temperature heating medium in the heat exchanger 102 installed in the indoor radiator 100, again in to the room from the blowout ports 124 at both sides in the longitudinal direction of the indoor unit 100, and these turn louvers 126 and 128 are installed in a composition for opening and closing the blowout ports 124, at the blowout ports 124, so that the direction of the hot air blown out from the blowout ports 124 may be freely changed, so that the blowout ports 124 can be closed in order to block the blowout of hot air into the room. These operations are controlled by a motor for driving the turn louvers.

Meanwhile, as shown in FIG. 5, the front panel 120 is provided with a nameplate 130 so that it may not feel for the user if the mounting direction (vertical mounting or lateral mounting) of the indoor radiator 100 main body is changed. At the back side 132 of the indoor radiator 100, plural mounting hooks 134 are provided so that the mounting direction of the indoor radiator 100 main body may be freely selected. Moreover, at one side of the both sides in the longitudinal direction of the indoor unit 100, there are a display unit 136 for displaying the operating state of the indoor radiator 100 and outdoor unit 200, a receiving unit 137 for receiving signals sent in from the remote control unit for setting the room temperature and timer, and a power switch (on/off switch) 138 for the main body of the indoor radiator 100.

Figure 8:
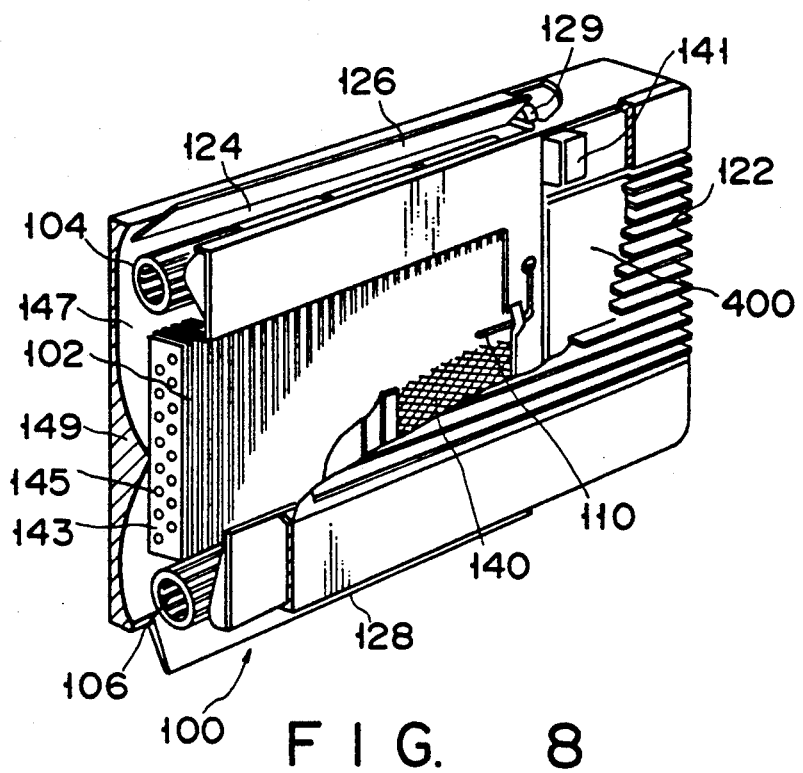
FIG. 8 is a perspective sectional view of an indoor radiator.

The internal structure of the indoor radiator 100 mentioned above is described below by referring to the perspective sectional view of the indoor radiator of the embodiment in FIG. 8. Inside the indoor radiator 100, there are a filter 140 for removing dust from the indoor circulation air taken in from the louvers 122, installed at the back side of the louvers 122 of the front panel 120, a heat exchanger (radiator) 102 for exchanging heat between the high temperature heating medium and the indoor circulation air, installed at the further back side from this filter 140, indoor fans 104, 106 for sending out the heat-exchanged indoor circulation air again from the blowout ports 124, installed near the blowout ports 124, a driving motor 141 for driving these fans 104 and 106, a driving motor 129 for driving the turn louvers 126 and 128, a room temperature sensor 110 for detecting the room temperature (indoor circulation air temperature), installed in the middle of the back side of the louvers 122, and an indoor unit controller 400 for controlling the turn louvers 126 and 128, indoor fans 104 and 106, and other driving parts in the indoor radiator 100, with control signals sent out from the outdoor unit 200 side. This indoor unit controller 400 is also connected with the display unit 136 for displaying the operating state of the indoor unit 100 and the receiving unit 137 of the remote control.

The heat exchanger 102 is a fin and tube type heat exchanger, and it is composed in a state in which a copper piping (heating medium piping) 145 is penetrating through plural plate fins 143.

The flow of the indoor circulation air in thus composed indoor radiator 100 is described below.

The indoor circulation air (cool air in the room) taken in from the louver is sent into the filter 140 installed at the back side of the louver, and dust particles in the air are removed. The temperature of this indoor circulation air is detected by the room temperature sensor 110. The indoor circulation air purified by the filter 140 flows into the heat exchanger 102 installed at the further back side of this filter 140, and runs into the gaps in the fin 143 of the heat exchanger 102. While the indoor circulation air is passing through gaps in the fin 143, it is heat-exchanged with the high temperature heating medium flowing in the heating medium piping 145 to be a hot air, and it flows into the air passage 147 at the back side of the indoor radiator 100. In this air passage 147, a partition board 149 is installed in the middle as shown in FIG. 8. This partition board 149 is formed in such a shape as to equalize the flow rate distribution of the hot air flowing into the indoor fans 104 and 106 installed at both sides in the longitudinal direction of the indoor radiator 100. The hot air flowing into the indoor fans 104 and 106 is supplied into the room from the blowout ports 124 by the rotation of the fans. At this time, the blowout angle and other conditions of the hot air are adjusted by the turn louvers 126 and 128.

The flow of the heating medium in this indoor radiator 100 is explained below. The high temperature heating medium (vapor) heated by the heating medium heater 220 in the outdoor unit 200 enters the indoor radiator 100 from the outdoor unit 200 by way of the gas pump 250 and the two-way valve 290 of the flow divider 270. This heating medium runs through the heating medium piping 145 from the rear part of the main body of the indoor radiator 100, and flows into the heat exchanger 102. The heating medium, while flowing in this heat exchanger 102, is heat-exchanged with the indoor circulation air, and the high temperature heat of the heating medium is gradually released. When completely passing over the heat exchanger 102, the heating medium has released its heat, and changes from the vapor (gas) into condensate (liquid), and flows again from the rear part of the main body of the indoor radiator 100 into the outdoor unit 200 through the heating medium piping 145. Incidentally, the phase of the heating medium in the heat exchanger 102 is gas at the inlet upstream side of the heat exchanger 102, mixture of gas and liquid in the heat exchanger 102, and liquid at the exit (downstream side) of the heat exchanger 102.

Figure 9:
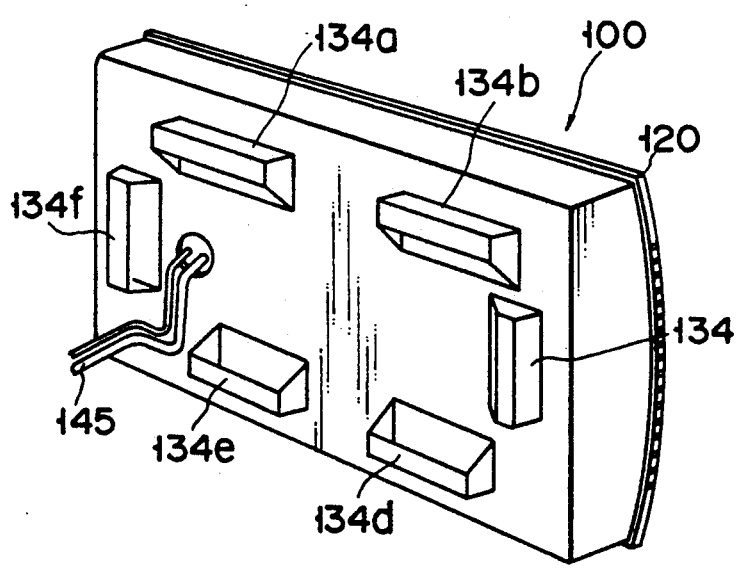
FIG. 9 is a rear structural drawing of an indoor radiator.

FIG. 9 shows the rear configuration of the indoor radiator 100 of the embodiment. Plural mounting hooks 134a to 134f are provided at the rear side of the indoor radiator 100.

The hooks 134a and 134b are disposed at a specific interval in the upper part of the rear side in the longitudinal direction of the indoor radiator 100. Likewise, the hooks 134d and 134e are disposed in the lower part of the rear side in the longitudinal direction of the indoor radiator 100 at the same interval as of the hooks 134a and 134b. The hooks 134c and 134f are positioned opposedly to each other at the rear side in the direction orthogonal to the longitudinal direction of the indoor radiator 100.

This is because this heating apparatus is for heating only, and dew is not condensed in the heat exchanger 102 of the indoor radiator 100, so that the user can freely select the mounting position and mounting direction of the indoor radiator 100. In other words, when installing the indoor radiator 100 laterally, the hooks 134a and 134b, or the hooks 143d and 134e are applied on yokes attached to the wall surface in the room, or when installing the indoor unit 100 vertically, the hook 134c or the hook 134f is applied on the yoke attached to the wall surface in the room, so that both vertical and lateral mounting may be freely possible. Meanwhile, when the hooks 134a and 134b are applied on the yokes attached to the room wall, the other hooks 134c to 134f play the role of spacers for keeping the spacing between the indoor radiator 100 and the wall surface, and similarly when mounted on the wall by the hook 134c, the other hooks 134a and 134b and 134d to 134f function as spacers. These hooks 134a to 134f are formed like a key, but both sides of these hooks are plugged, and when the yokes on the room wall side are coupled with these hooks, the indoor radiator 100 is prevented from shifting in the lateral direction.

The hooks 134a to 134f have a uniform thickness.

Besides, as mentioned above, the indoor radiator 100 is for heating only, and dew is not condensed on the heat exchanger 102, and therefore drain measures are not needed. Hence, the thickness of the indoor radiator 100 (the depthwise dimension) may be reduced to about ⅔ of the thickness of the indoor unit of the heat pump type air conditioner of general use, so that the indoor radiator 100 may be composed in a thin structure.

[Structure of outdoor unit]

The outdoor unit 200 is described below. The outdoor unit 200 is composed of the parts as shown in the see-through view, front view, top view and side view of the outdoor unit in the embodiment of the invention in FIG. 10 to FIG. 13.

The outdoor unit 200 is covered with a cabinet 300. Inside the cabinet 300, a control unit 302 is installed. This control unit 302 contains, in its inside, an outdoor unit controller 500, a combustion unit controller 600 and others as mentioned later. The individual constituent elements are so wired that the control signal sent out from this control unit 302 may be transmitted to the individual constituent elements. The gas pump 250 is fixed in the bottom of the cabinet 300 with bolts 303. The discharge side of this gas pump 250 is connected to the heating medium piping 304. This heating medium piping 304 is branched off in three directions by the flow divider 270, each being connected to two-way valves 290a, 290b and 290c. These two-way valves 290 are connected to three packed valves 156a, 156b, 156c disposed and fixed at one side of the cabinet 300. These packed valves 156a, 156b and 156c are connected to the indoor radiator 100. On the other hand, on the same side of the cabinet 300, another three packed valves 158a, 158b and 158c are fixed. These are connection parts with the indoor radiator 100 for returning the heating medium (liquid) after releasing heat in the indoor radiator 100 back to the outdoor unit 200. These packed valves 158a, 158b and 158c are connected to three heating medium control valves 280a, 280b and 280c of the flow divider 270 through the heating medium piping. The heating medium pipings from these heating medium control valves 280a, 280b and 280c are assembled again into one line at the exit of the flow divider 270, and connected to the entrance of the heating medium heating heat exchanger 230 disposed adjacently to the surrounding of the heat absorbing chamber 250 of the heating medium heater 220 through the heating medium piping 305. The flow divider 270 including the two-way valve 290 and heating medium control valve 280 is disposed between the side of the cabinet 300 containing the packed valves 156a to 156c, 158a to 158c, and the gas pump 250 installed in the cabinet 300.

The exit of the heating medium heating heat exchanger 230 disposed adjacently to the surrounding of the heat absorbing chamber 350 of the heating medium heater 220 is connected to the suction cup 255 of the gas pump 250 by means of the heating medium piping 306.

The heating medium heater 220 is positioned in the upper part in the cabinet 300. The portion of the heat absorbing chamber 350 possessing the heat exchanger 230 for heating the heating medium of this heating medium heater 220 is located in the upper part of the control unit 302 in the cabinet 300, and the combustion unit 22 is disposed consecutively to the upstream side of the heat absorbing chamber 350 possessing this heat exchanger 230 for heating the heating medium, also carburetors 226e and 226f of the fuel supply system 226 consecutively to the upstream side of the combustion unit 222, and the electromagnetic valve 226 consecutively to these carburetors 226e and 226f. At a position close to the fuel supply system 226, fuel pumps 226c and 226d, and auxiliary tank 226b comprising level gauge 226g are disposed. This auxiliary tank 226b is intended to preserve the fuel from the fuel tank 202 installed outside the outdoor unit 200.

The fuel pumps 226c and 226d, and the carburetors 226e and 226f are connected by means of pipes 308 and 309, respectively, so that the fuel supplied from the fuel pumps 226c and 226d may flow into the carburetors 226e and 226f.

The air blow fan 224 is located between the control unit 302 and the gas pump 250. The air taken in from the air intake port 312 of the air blow fan 224 is designed to be supplied into the combustion unit 222 through the duct 310. The exhaust gas from the combustion unit 222 is discharged from the exhaust port 136 disposed at the side of the cabinet 300 of the outdoor unit 200 through the exhaust duct 314. The air is taken into the air intake port 312 of the air blow fan 224 through the air intake part (louver) 318 disposed at the side of the cabinet 300. Furthermore, at the air intake port 312 of the air blow fan 224, there is a giant transistor 262 which is one of the constituent parts of the inverter circuit 260 for controlling the rotation of the motor of the gas pump 250.

Figure 10:
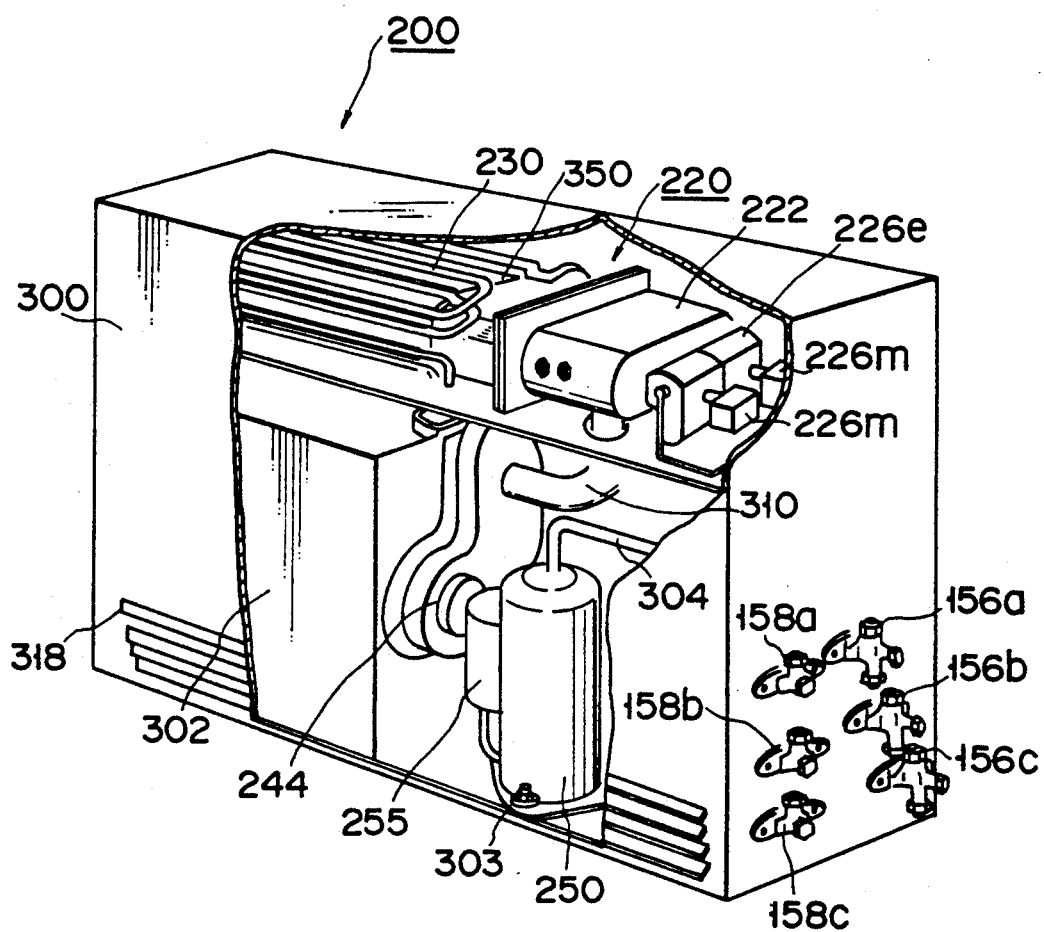
FIG. 10 is a see-through view of an outdoor unit.

The outdoor unit 200 and individual indoor radiators 100 are connected by means of six heating medium pipings 160a, 160b, 160c, 162a, 162b and 162c as shown in FIG. 2. Of them, the heating medium pipings 160a to 160c, in which the heating medium (vapor) passes from the outdoor unit 200, are heating medium vapor pipings. The heating medium pipings 162a to 162c, in which the heating medium (liquid) passes after being cooled and condensed in the indoor radiators 100, are liquid pipings. The diameter of the heating medium piping is smaller in the liquid pipings 162a to 162c than in the vapor pipings 160a to 160c. For individual indoor radiators 100, the liquid piping (for example 162a) and vapor piping (for example 160a) from the outdoor unit 200 are connected as a set. Therefore, a total of six heating medium pipings 160a to 160c and 162a to 162c are taken out from the outdoor unit 200. For taking out these six heating medium pipings from the outdoor unit 200, considering the possibility of wrong piping works or ease of piping works, as shown in FIG. 10 and FIG. 13, all packed valves (piping systems) 156a to 156c and 158a to 158c are concentrated in the lower part of one lateral side of the cabinet 300 of the outdoor unit 200. What is more, these six packed valves 156a to 156c and 158a to 158c are installed in an inverted V-shape. Furthermore, the packed valves installed in an inverted V-shape are combined and installed in the horizontal direction in each indoor unit 100. That is, the packed valves 156a and 158a make up a set and is installed in the upper part in the horizontal direction, the packed valves 156b and 158b are a set in the middle part in the horizontal direction, and the packed valves 156c and 158c are a set in the lower part in the horizontal direction. By arranging in this manner, piping to one indoor radiator 100 is made in the horizontal direction, and wrong piping hardly occurs, and moreover since the convenience for heating medium piping work into individual indoor units 100 is taken into consideration, a certain gap is provided between the upper and lower part of the packed valve. The reason of concentrating the packed valves in the lower part is to increase the strength of the cabinet 300 of the outdoor unit 200.

[Structure of heating medium heater]

The heating medium heater 220 is described below. This heating medium heater 220 is composed as shown in the structural drawings of the heating medium heaters used in the embodiment in FIG. 14 to FIG. 18.

The heating medium heater 220 comprises a heat absorbing chamber 350 having a heat exchanger (heat absorber) 230 for heating the heating medium disposed adjacently in the circumference, and combustion units 222 (222a and 222b). For the combustion units 222, in this invention, vaporization Bunsen type combustion units are used.

The reason of using the vaporization Bunsen type for the combustion unit 222 is explained below.

Various combustion method are known for firing liquid fuel, including the vaporization Bunsen type, pot type, pressure spray type, and rotary atomization type.

A general vaporization type combustion unit structure is briefly described in the first place. A needle is placed in the nozzle for injecting vaporization field, and when the fuel pump is put in action when starting combustion, the needle tip simultaneously opens the nozzle opening to inject fuel. This is the role of preventing the remaining fuel from gasifying and ejecting before the ignition action when heating up the vaporizer. On the other hand, when stopping combustion, the nozzle opening is closed by the tip of the nozzle to prevent after-firing of fuel so as to avoid release of offensive smell. It also has the role of refreshing by cleaning off the tarry matter depositing on the nozzle opening when closing. In certain apparatus, the controllability is enhanced by installing a mechanism for operating such needle by a solenoid.

However, as the condition for applying in the invention, as mentioned above, since plural rooms are heated in this invention, the combustion variable width should be broad, the time for turning on the start switch till start of combustion unit should be short in order to improve the quick heating performance, the combustion should be possible even at low combustion level, the combustion exhaust gas should be clean, the combustion unit main body should be contact, and many other conditions are required. It is the vaporization Bunsen type that fits all these requirements, and in the other three methods, the combustion variable width is not so broad, and in particular there is a high possibility of generating combustion exhaust gas harmful for human health (CO, etc.) at low combustion level, and hence it is not suited to low combustion. In this embodiment of the invention, therefore, the combustion variable width is expanded by using two vaporization Bunsen type combustion units (222a and 222b).

These two combustion units 222a and 222b are arranged parallel in the horizontal direction, and a heat absorbing chamber 350 is disposed consecutively at the downstream side of the combustion units 222a and 222b. The heat absorbing chamber 350 is disposed along the flow direction of combustion gas of the combustion units 222a and 222b. Along this flow direction, the combustion chamber 223 of the combustion units 222a and 222b is partitioned for each combustion units 222a and 222b. Furthermore, corresponding to these combustion chambers 223, the inside of the heat absorbing chamber 350 is also divided by partition boards 350a and 350b along the flow direction of the combustion gas. This is because it is necessary to vary the combustion quantity of the combustion unit 222 to a combustion quantity suited to the heating capacity when the heating capacity load in the room changes. For example, when requiring the maximum heating capacity set in plural (three) indoor radiators 100 (the sum of the required heating capacities of three indoor radiators 100), the combustion units 222 burn at the maximum combustion quantity. To the contrary, when the indoor radiator 100 is in the minimum capacity of operating one unit, the combustion unit 222 burns at the minimum combustion quantity. In this way, the combustion units can be varied in a wide range from the maximum combustion quantity to the minimum combustion quantity, and the best combustion state must be obtained in all combustion conditions. At this time, if the combustion quantity varies largely in the heat absorbing chambers 350 of same capacity, there is a limit to the suitable calorific value applied to the heating medium, and therefore, the heat absorbing chamber 350 is divided into two by the partition boards 350a and 350b. Since the heat absorbing chamber 350 is combined with the combustion units 222, it is better when the passage resistance in the heat absorbing chamber 350 be small, considering the capacity of the air blow fan 224. Or when the combustion quantity is reduced, if the internal area in the heat absorbing chamber 350 is large, the wall temperature in the heat absorbing chamber 350 may drop. By this temperature drop, the steam contained in the combustion gas is condensed, and it is likely to condense dew on the wall surface inside the heat absorbing chamber 350 or on the wall surface of the combustion chamber 223. Besides, when the combustion quantity is small, if the internal area of the heat absorbing chamber 350 is large, the load of the heat absorbing chamber 350 becomes small, and the flame itself is cooled, and the CO concentration tends to be high. From this reason, a partition board 351 parallel to the flow direction of the combustion gas generated from the combustion unit 222 is provided, and the heat absorbing chamber is divided into two sections, so that the combustion units 222a and 222b may correspond to the heat absorbing chambers 350a and 350b.

Figures 17, 18:
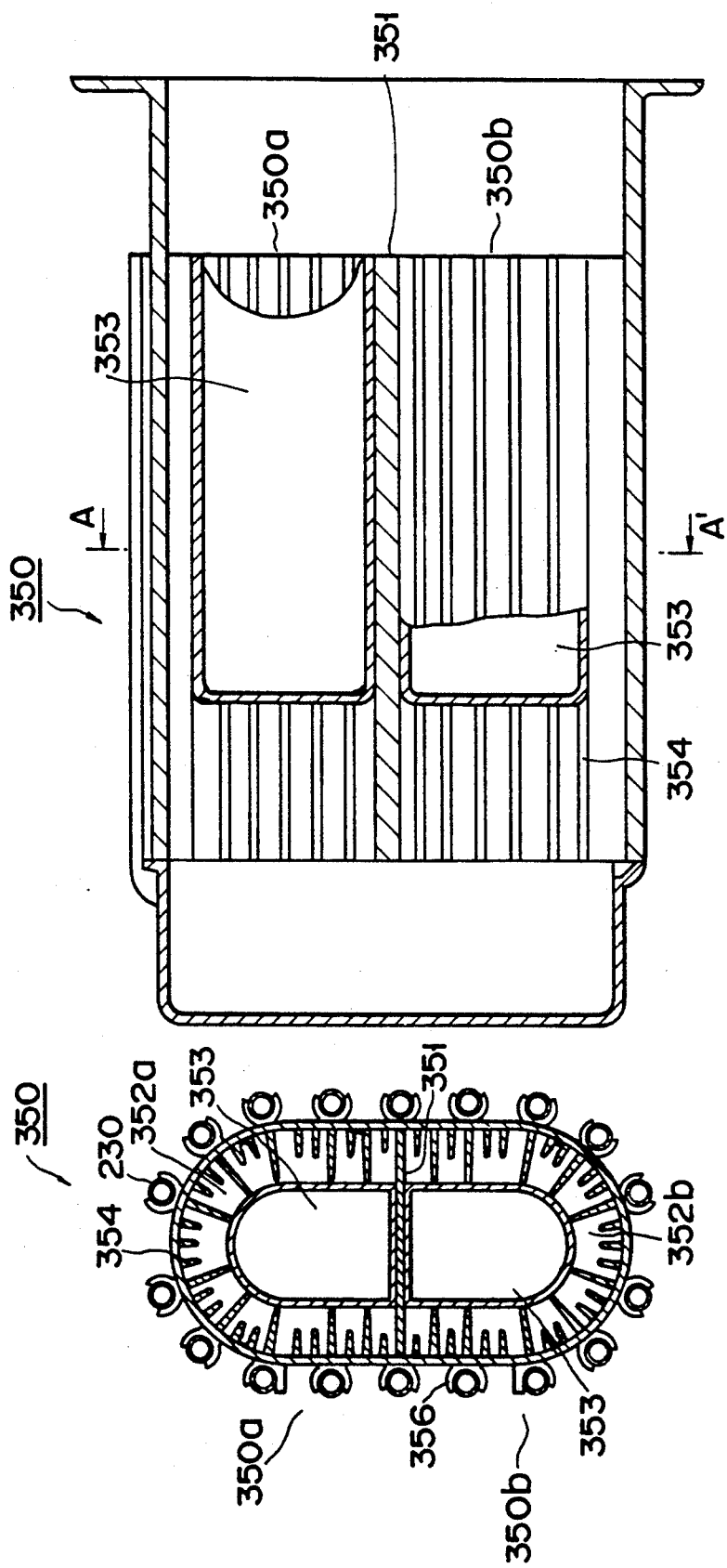
FIG. 17 is a structural drawing of a heat absorbing chamber.
FIG. 18 is an A—A sectional view of the heat absorbing chamber in FIG. 17.
Figure 19:
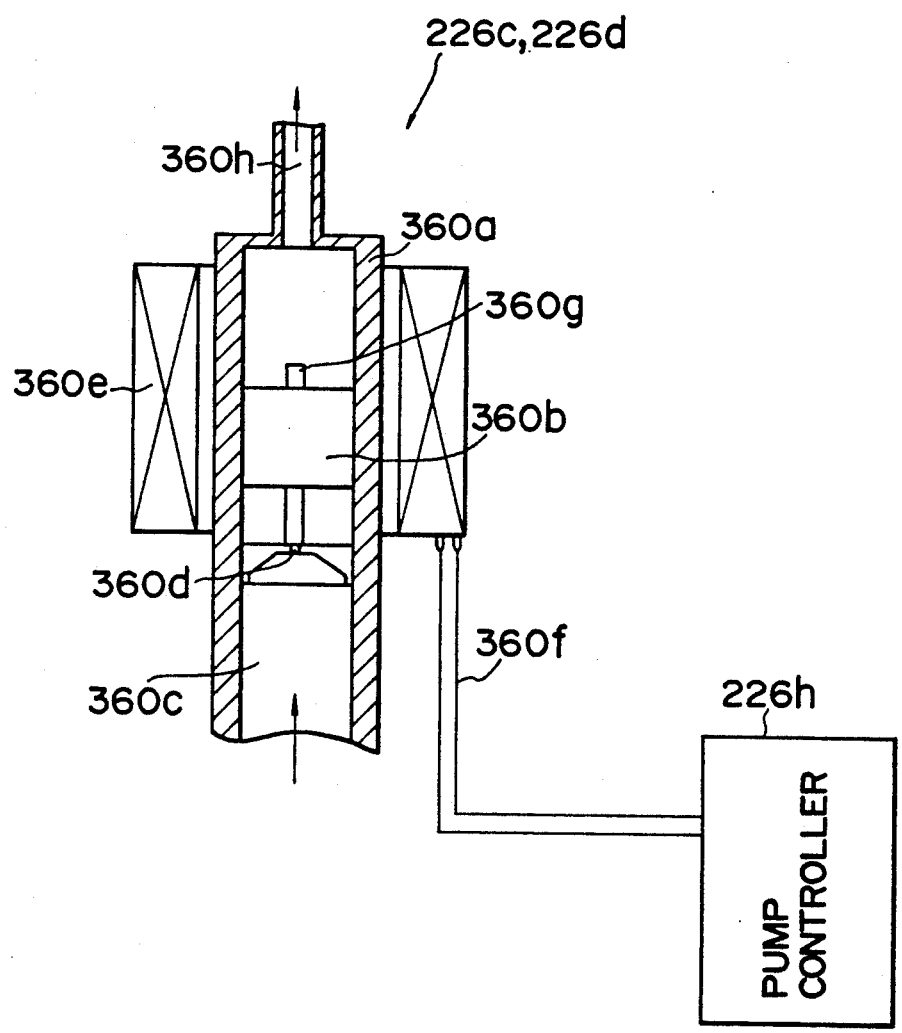
FIG. 19 is a structural drawing of an electromagnetic pump.

These two heat absorbing chambers 350a and 350b are composed as shown in the heat absorbing chamber structural drawings in FIG. 17 and FIG. 18. That is, a cup 353 is provided in the middle of the passage 352a and 352b in which combustion gas from the combustion units 222a and 222b passes, and the heat absorbing chambers 350a and 350b are composed so that the combustion gas may not flow into this cup 353, and plural heat absorbing fins 354 are provided in the passages 352a and 352b. These heat absorbing fins 354 are provided parallel to the flow direction of combustion gas in order to lower the passage resistance of the combustion gas, and the combustion gas is designed to pass among the plural heat absorbing fins 354 of these passages 352a and 352b.

Figure 14:
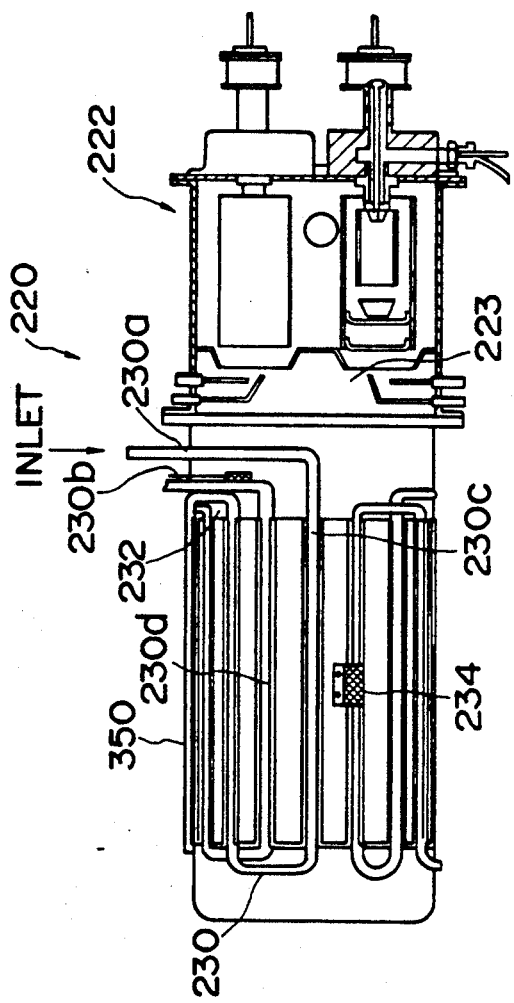
FIG. 14 is a top view of a heating medium heater.
Figure 15:
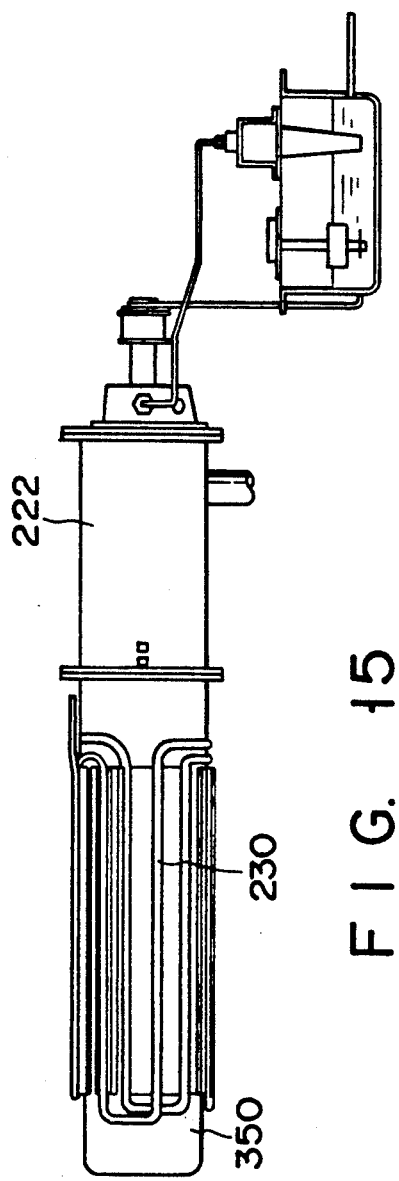
FIG. 15 is a front view of a heating medium heater.
Figure 16:
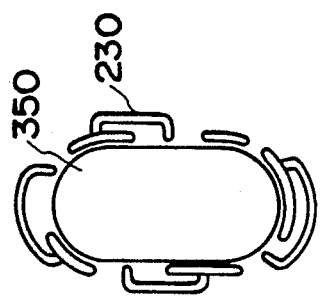
FIG. 16 is a side view of a heating medium heater.

The heat exchanger 230 for heating the heating medium disclosed adjacently to the surrounding of the heat absorbing chamber 350 is disposed along the flow direction of the combustion gas flowing in the heat absorbing chamber 350 as shown in FIG. 14, FIG. 15, and FIG. 16. The heating medium piping 230a at the heating medium inlet side of the heat exchanger 230 for heating the heating medium, and the heating medium piping 230b at the heating medium outlet side are disposed parallel adjacently to each other. The heat exchanger 230 for heating the heating medium is disposed while folding back the wall surface of the heat absorbing chamber 350 parallel from the heat exchanger 230c for heating the heating medium at the heating medium inlet side along the flow direction of the combustion gas flowing in the heat absorbing chamber 350, while the heat exchanger 230d for heating the heating medium from the midway of the heating medium passage of the heat exchanger 230 for heating the heating medium up to the heating medium outlet side is disposed on the wall surface of the heat absorbing chamber 350 while folding back between the heat exchanger 230c for heating the heating medium at the heating medium inlet side disposed closely to the wall of the heat absorbing chamber 350 and the heat exchanger 230c for heating the heating medium (disposing the heat exchangers 230 for heating the heating medium at every other piece). Furthermore, the heating medium gas inlet side and heating medium gas outlet side of the heat exchanger 230 for heating the heating medium are disposed adjacently to the wall surface of the heat absorbing chamber 350 of the boundary region in the flow direction of the combustion gas of individual combustion units 222a and 222b. This is because the heat exchangers 230 for heating the heating medium may be disposed at every other piece when the combustion quantity is small to keep almost uniform the wall surface temperature of the heat absorbing temperature 350, thereby making it possible to prevent lowering of the wall surface temperature of the heat absorbing chamber 350, so that dew condensation on the wall surface of the heat absorbing chamber 350 may be prevented.

Near the heating medium exit of the heat exchanger 230 for heating the heating medium, there is a temperature sensor 232 for detecting the heating medium temperature at the outlet (Tout) of the heat exchanger 230 for heating the heating medium, and another temperature sensor 234 for detecting the temperature of the heating medium (Tmid) flowing near the middle of the heat exchanger 230 for heating the heating medium is provided in the middle part of the heat exchanger 230 for heating the heating medium. These temperature sensors 232 and 234 are installed in a state of contacting with the heat exchanger 230 for heating the heating capacity. From the difference of the detected temperatures by these sensors 232 and 234 superheat at the outlet of the heat exchanger 230 for heating the heating medium is detected. (Since it is difficult to detect the heating medium temperature in the middle part of the heat exchanger 230 for heating the heating medium, a sensor may be installed at the heating medium inlet part of the heat exchanger 230 for heating the heating medium, and the superheat may be detected from the temperature difference between the inlet and outlet.)

The heat exchanger 230 for heating the heating medium is installed in the heat exchanger mounting part 356 arranged in the entire outer periphery of the heat absorbing chamber 350 formed by aluminum extrusion method as shown in FIG. 18.

The flows of combustion gas and heating medium in thus composed heating medium heater 220 are explained below.

The combustion gas generated by combustion of combustion units 222a and 222b flows among the heat absorbing fins 354 in the passages 352a and 352b of the heat absorbing chambers 350a and 350b to transmit heat to the heat absorbing fins 354. The heat preserved in the heat absorbing fins 354 is used to exchange heat with the heating medium (liquid) flowing in the heat exchanger 230 disposed adjacently around the heat absorbing chamber 350 to convert the heating medium into vapor, thus preserving heat in the heating medium. This heating medium vapor is conveyed into the indoor radiators 100 by the gas pump 250.

In this embodiment, there are two combustion units 222 (222a and 222b) as mentioned above. The combustion units 222a and 222b possess same heating capacities, that is, equal combustion capacities, and the combustion quantity is set by combining the combustion units 222a and 222b.

The maximum combustion quantity of two combustion units 222a and 222b at least possesses the combustion quantity corresponding to the heating quantity as the quotient of the combustion quantity corresponding to the sum of the required maximum heating capacity of each indoor radiator 100 divided by the number of running units of the combustion units 222a and 222b. Of the three indoor radiators 100, if the sum of the required heating capacities from at least two indoors radiators (for example, 100a and 100b) is a heating capacity corresponding to the range from the combustion quantity smaller than the specified quantity less than the maximum combustion quantity of one combustion unit 222 (for example, 222a) to the set minimum combustion quantity, or if there is a heating request from one indoor radiator 100 (for example, 100a only), the heating medium is heated by using only one combustion unit 222 (for example, 222a), and otherwise the two combustion units 222a and 222b are combined to burn to heat the heating medium. By thus operating, the variable width of the combustion quantity can be set in a wide range.

[Structure of combustion pump]

This is to explain the fuel pumps 226c and 226d for feeding fuel from the auxiliary tank 226b into combustion units 222a and 222b. In these fuel pumps 226c and 226d, electromagnetic pumps 360 of plunger type are used as mentioned above. The electromagnetic pump 360 is composed as shown in the structure drawing in FIG. 19.

The electromagnetic pump 360 is composed of a cylinder 360a, a plunger 360b provided in this cylinder 360a, a fuel nozzle 360d disposed at the fuel inlet 360c side from the auxiliary tank 226b of this cylinder 360a, and a solenoid coil (magnetic field generating part) 360e. This magnetic field generating part 360e is connected to the fuel pump control device 226h by means of a signal wire 360f. The basic operation of thus composed electromagnetic pump 360 is explained below.

The control signal generated from the pump control device 226h is transmitted to the magnetic field generating part 360e of this electromagnetic pump 360 by way of the signal wire 360f. A magnetic field is generated in this magnetic field generating part 360e by this control signal. By this change by generation of magnetic field, the plunger 360b is also synchronized to move up and down in the cylinder 360a.

Figure 20A:
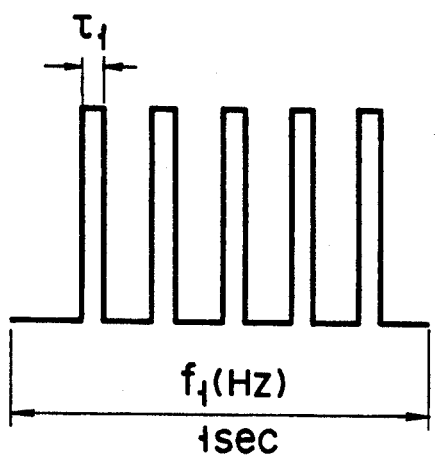
FIGS. 20A and 20B are control signal waveform diagrams of an electromagnetic pump.
Figure 20B:
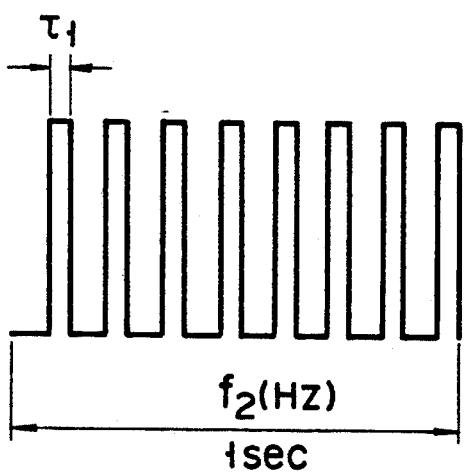

The fuel entering from the fuel nozzle 360d disposed at the fuel inlet part 360c enters the lower part of the cylinder 360a and the vertical groove 360g disposed in its peripheral wall. At this time, the plunger 360b is in the lower part of the cylinder 360a, and the next moment the plunger 360b is pulled into the upper part of the cylinder 360a by generation of magnetic field in the magnetic field generating part 360e, and by this operation, the fuel is discharged from the fuel outlet 360h to be supplied into the combustion unit 222. The plunger 360b, the next moment, stops generation of magnetic field from the magnetic field generating part 360e, thereby returning to the original position in the lower part of the cylinder 360a by the force of a spring (not shown). By repeating this operation, the fuel is sent from the auxiliary tank 226b into the combustion unit 222. This repetition frequency f is controlled in the following manner. That is, the duration in which the plunger 360b is pulled up into the upper part of the cylinder 360a is adjusted by the number of pulses of the control signal generated from the pump control device 226h. In other words, as shown in FIGS. 20A and 20B, when reducing the supply of fuel from the auxiliary tank 226b into the combustion unit 222, the number of pulses possessing the width of t1 is reduced as shown in FIG. 20A to decrease the frequency f1. To increase the supply, to the contrary, the number of pulses is increased to widen the frequency f2 as shown in FIG. 20B. By thus controlling the frequency f, the supply of the fuel sent into the combustion unit 222 may be controlled freely.

Figure 21:
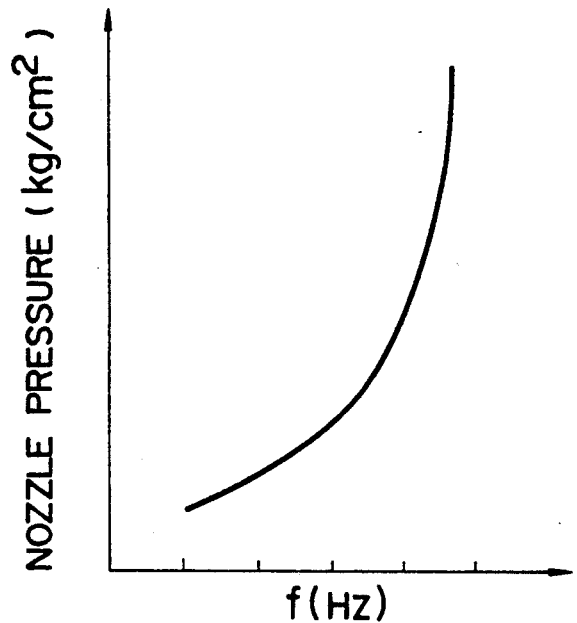
FIG. 21 is a characteristic diagram showing the nozzle pressure against the frequency.

The relation between the frequency f and the nozzle pressure P is shown in FIG. 21. In this diagram, the axis of abscissas denotes the frequency f, while the axis of ordinates represents the nozzle pressure P (kg/cm$^2$), showing the characteristic of the relation of the nozzle pressure P to the frequency f.

As shown in the diagram, as the frequency f increases, the fuel flow rate becomes larger. That is, since the diameter of the nozzle injection port of the fuel nozzle 360d is constant, the nozzle pressure P goes up. The relation between the nozzle pressure P (kg/cm$^2$) and the combustion quantity Qc (kcal/h) is shown in FIG. 22. In this diagram, the axis of abscissas denotes the combustion quantity Qc, and the axis of ordinates represents the nozzle pressure P, showing the characteristic diagram of the relation of the nozzle pressure P to the combustion quantity Qc. As shown in the diagram, as the nozzle pressure P goes up, the combustion quantity Qc increases. In other words, by varying the fuel flow rate to be supplied into the combustion unit 222 by the control signal from the pump control device 226h, the combustion quantity Qc of the combustion unit 222 is adjusted. At this time, the rotating speed of the fan of the air blow fan 224 is designed to be controlled simultaneously with the control signal from the control device 226h.

While the two combustion units 222a and 222b are burning, they operate in the same combustion capacity. This is because only one air blow fan 224 is used for two combustion units 222a and 222b, and the combustion air is supplied in an optimum quantity corresponding to the sum of the combustion quantities, and therefore, if the combustion quantity of the combustion unit 222a and the combustion quantity of the combustion unit 222b differ, the distribution of the primary air to be supplied into the combustion units 222a and 222b varies, so that a favorable combustion may not be obtained. Accordingly, while two combustion units 222a and 222b are burning, in order to set the combustion quantity of each to ½ of the combustion quantity required in the total, the fuel supply amount supplied from the fuel pumps 226 and 226d is set to ½. Or while only one combustion unit 222a is burning, only one fuel pump 222c runs, while the other fuel pump 222d is stopped.

[Structure of gas pump inverter circuit]

This is to explain the inverter circuit 260 for controlling the rotating speed of the motor of the gas pump 250. This inverter circuit 260 is composed as shown in FIG. 23.

The inverter circuit 260 comprises, among others, a giant transistor 262 for driving a motor (three-phase induction motor) 261 of the gas pump 250, an inverter drive circuit 263 for transmitting a motor drive frequency signal to this giant transistor 262, a rectifier circuit 264 composed of diode and capacitor for rectifying the AC voltage from the AC power source 265 mentioned later and supplying into the giant transistor 262, an outdoor unit controller 500 for transmitting the control signal of this inverter driver circuit 263, and an indoor controller 400. The AC power source 265 is connected to the indoor unit 100 side through a power switch 138. In each indoor radiator 100, the indoor controller 400 is provided. The outdoor unit is furnished with the motor 261, giant transistor 262, inverter drive circuit 263, rectifier circuit 264, outdoor controller 500, etc.

In thus composed inverter circuit 260, the total required calorific value corresponding to the necessary heating capacity required from each indoor unit 100 is transmitted from the indoor unit controller 400 into the outdoor unit controller 500 disposed in the outdoor unit 200. This total required heat is stratified in the outdoor unit controller 500, and the stratified signal (frequency) is sent into the inverter drive circuit 263. By the signal (frequency) from this inverter drive circuit 263, the giant transistor 262 is controlled, and by driving this giant transistor 262, the rotating speed of the motor 261 is controlled. That is, the motor 261 is to control the rotating speed in gradual steps.

The giant transistor 262 is self-heated, and the degree of heat generation is nearly proportional to the frequency change from the inverter circuit 260, and when the frequency increases, the temperature of the giant transistor 262 elevates, and when the frequency decreases, the temperature of the giant transistor 262 declines.

When the temperature of the giant transistor 262 exceeds a specific temperature (100° C.), the giant transistor 262 is broken down. Accordingly it is necessary to cool by force. To cool the giant transistor 262, in this invention, as shown in FIG. 24 and FIG. 25, an aluminum made cooling plate 320 is attached near the air intake port 312 of the air blow fan 224 installed for blowing combustion air into the combustion unit 222, and the package of the giant transistor 262 is tightly mounted on this cooling plate thermally, thereby preventing temperature rise of the giant transistor 262.

The cooling plate 320 is provided with plural cooling fins 322, and it is designed so that the combustion air may pass among the cooling fins 322.

In this constitution, the heat generation from the giant transistor 262 is transmitted to the cooling plate 320 by heat transfer, and is led into the air side by the cooling fins 322 of this cooling plate 320. This air is originally used for combustion, but if this air temperature changes slightly, it does not matter for cooling the heat generated from the giant transistor 262.

In this embodiment, the cooling plate 320 is provided near the air intake port 312 of the air blow fan 224 of the combustion unit 222, and the giant transistor 262 is mounted on this cooling plate 320, in structure. It is meanwhile also possible to install the cooling plate 320 at the blow air outlet side of the air blow fan 224, that is, at the combustion air supply side (duct 310) and mount the giant transistor 262 on this cooling plate 320.

The degree of heat generation of this giant transistor 262 and the change of the combustion air volume tend to change similarly. That is, as the heat generation of the giant transistor 262 increases, the combustion air volume increases, and hence the temperature of the giant transistor 262 may be kept almost at a specific temperature (about 40° to 50° C.), so that breakdown of the giant transistor 262 may be prevented.

[Structure of heating medium control valve (electronic expansion valve)]

Next is described the heating medium control valve 280. This valve 280 is installed in the outdoor unit 200 at the downstream side (heating medium exit side) of the individual indoor radiators 100 in this embodiment, and it is intended to control the distribution quantity of heating medium (liquid) after releasing heat in the indoor radiator 100, and to adjust the quantity of heating medium to be sent into the indoor radiator 100. For such heating medium control valve 280, a proportional control valve capable of freely setting the opening degree is used.

Figure 26:
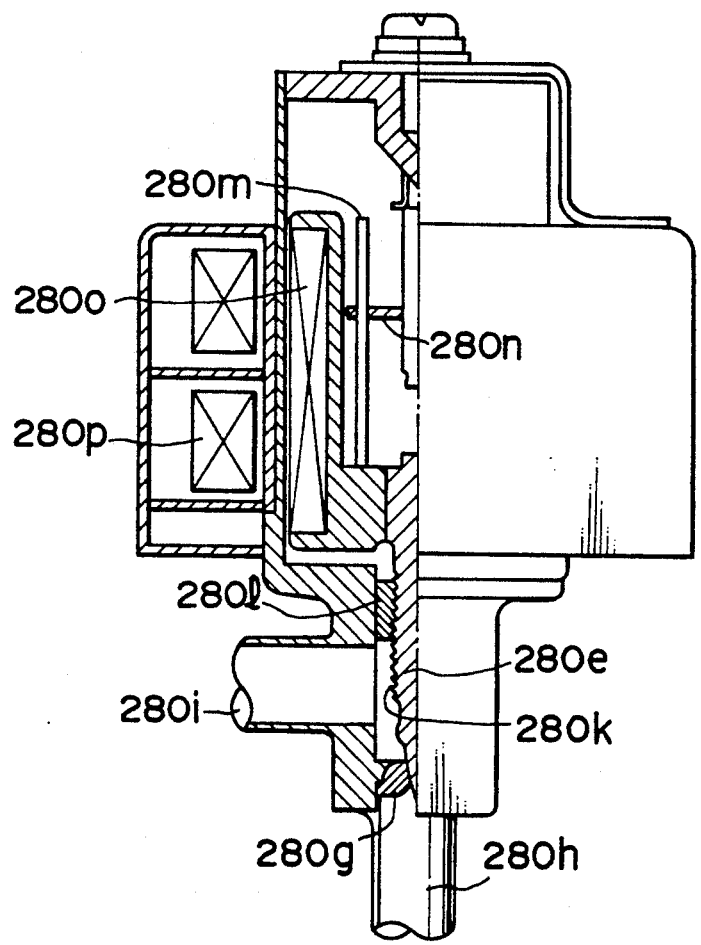
FIG. 26 is a structural drawing of a heating medium control valve.

The heating medium control valve 280 is composed as shown in the structural drawing in FIG. 26.

Basically, the structure of the heating medium control valve 280 is same as that of a needle valve, and it is designed to control the distribution quantity of heating medium by moving a needle 280e up and down by a four-phase stepping motor 280f to vary the sectional area of an orifice 280g. The opening degree of the heating medium control valve 280 is controlled in steps. The flow of the heating medium at this time is formed by linking a connection pipe 280i to the upstream side (heating medium inlet side) of the heating medium heater 220 in the outdoor unit 200.

The role of the heating medium control valve 280 is to stop (fully close) the supply of the heating medium into the stopped indoor radiator 100, to supply a proper quantity of heating medium into the running indoor radiator 100, and to adjust the circulation rate of the heating medium flowing in the entire heating cycle.

The role of the heating medium control valve is described in detail later.

In this embodiment, the outdoor unit 200 is supposed to incorporate the heating medium heater 220, gas pump, and flow divider 270 composed of two-way valve 290 and heating medium control valve 280, but it is also possible to install the flow divider separately from the outdoor unit 200 as an independent unit.

This ends the description of the structure and operation of individual constituent elements of the embodiment.

Figure 27:
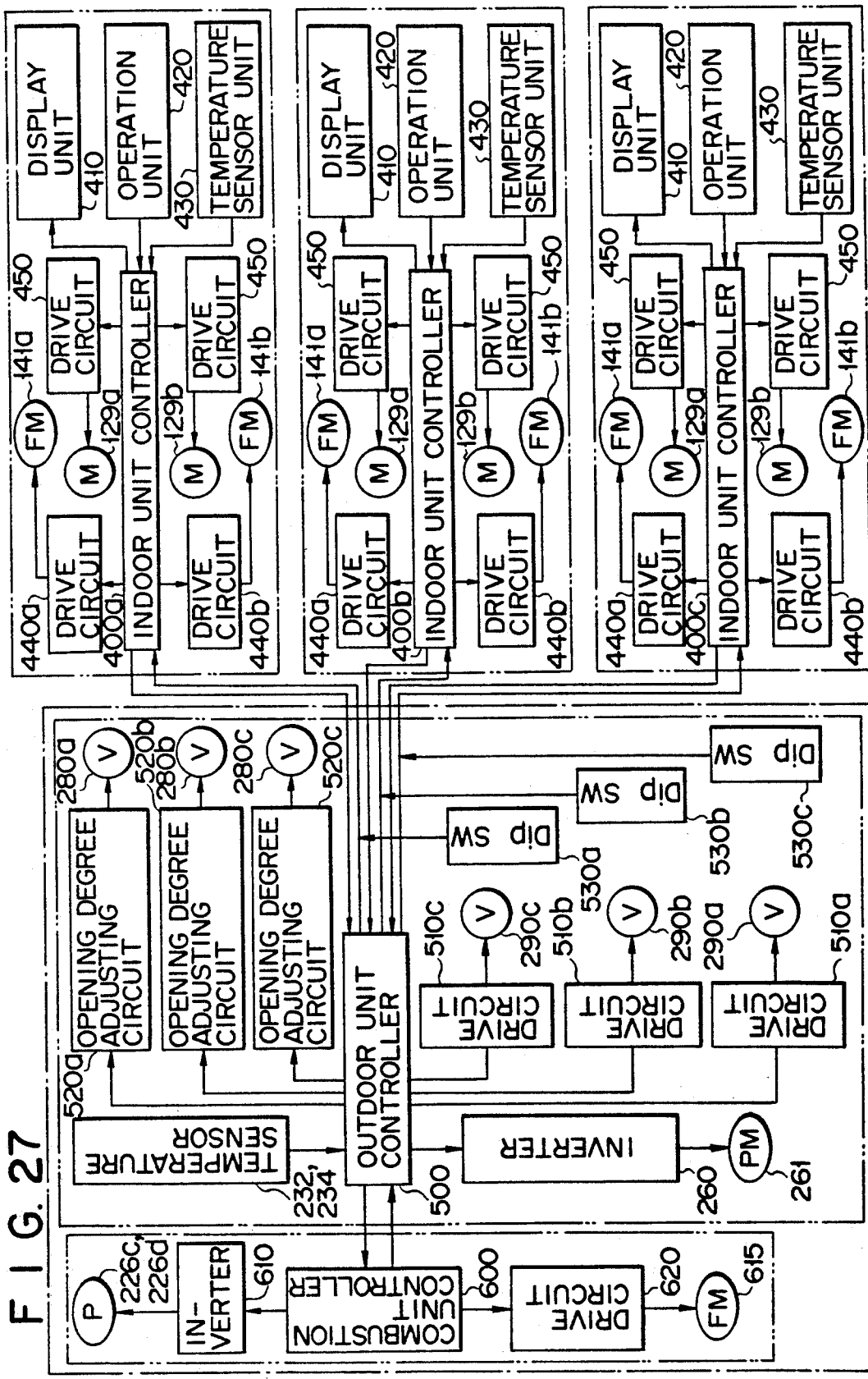
FIG. 27 is an entire control block diagram.

Below is explained the entire constituent blocks of the electric circuit system for controlling the heating apparatus of the invention. FIG. 27 is an entire composition block diagram for controlling the heating apparatus of the embodiment.

As shown in the drawing, the individual indoor radiators 100a to 100c are provided with outdoor unit controllers 400a to 400c. These indoor radiators 100a to 100c are also equipped with display unit 410, operation unit 420, and temperature sensor 430. The individual indoor radiators 100a to 100c are further furnished with drive circuits 440a and 440b for controlling fan drive motors 141a and 141b of two indoor fans 104 and 106 of the indoor radiator 100, and drive circuits 450a and 450b for controlling drive motors 129a and 129b of turn louvers 126 and 128 installed at the hot air blow outlet 124 at both sides in the longitudinal direction of the indoor radiator 100.

Figure 28:
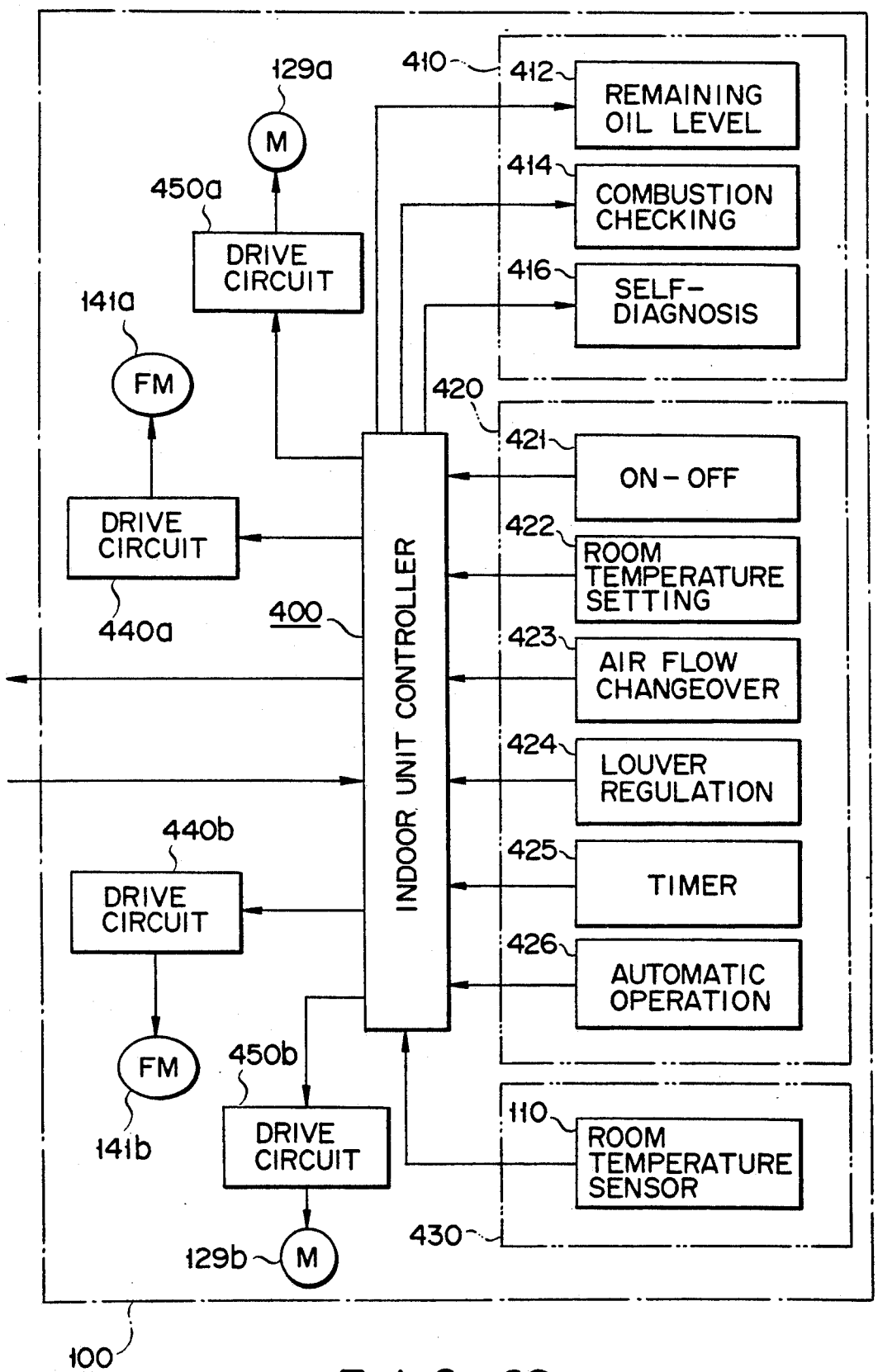
FIG. 28 is a control block diagram of an indoor unit.

Each display unit 410, operation unit 420 and temperature sensor 430 of the indoor radiators 100a to 100c are composed as shown in the block diagram of the indoor radiator mechanism for controlling the heating medium of the invention in FIG. 28.

More specifically, the display unit 410 is provided with, in order to monitor the equipment, a remaining oil level indicator 412 for displaying the remaining amount of fuel in the fuel tank 202, combustion checking indicator 414 for checking the combustion state of the combustion unit 222, and self-diagnosis unit 416 for displaying trouble or abnormal state.

The operation unit 420 comprises an on/off switch 421 for setting operation start/stop of the indoor radiator 100, room temperature setting switch 422 to set the room temperature requested by the user, air flow changeover switch 423 for changing over the air flow of the indoor fans 104 and 106, louver variable switch 424 for changing the direction of turn louvers 126 and 128, timer switch 425 for setting the start/stop time of operation by timer, automatic operation switch 426 for automatic operation, and other setting switches for the ease of manipulation of the indoor radiator 100.

The temperature sensor 430 comprises a room temperature sensor 110 for measuring the room temperature set by the indoor radiator 100. The room temperature sensor 110 is disposed at the back side of the louver 122 of the indoor radiator 100 as mentioned earlier.

Each indoor controller 400 receives information from the operation unit 420 and temperature sensor 430, sends control signals to drive circuits 440a and 440b, 450a and 450b, and controls the drive motors 141a and 141b of indoor fans 104 and 106, and drive motors 129a and 129b of turn louvers 126 and 128. The indoor unit controller 400 is for receiving and transmitting the signals with the outdoor unit controller 500 installed in the outdoor unit 200.

The outdoor unit 200 is provided with an outdoor unit controller 500 and combustion unit controller 600.

The combustion unit controller 600 controls the fuel pumps 226c and 226d for adjusting the fuel flow rate to be supplied into the combustion unit 222 by means of an inverter circuit 610. The combustion unit controller 600 is to control a fan motor 615 of the air blow fan 224 for adjusting the flow rate of the combustion air to be supplied into the combustion unit 222 by means of driver circuit 620. The combustion unit controller 600 is also designed to transmit and receive signals with the outdoor unit controller 500.

The outdoor unit controller 500 controls the pump motor 261 of the gas pump 250 by the inverter circuit 260, by means of the heating medium temperature information sent from the temperature sensors 282 and 234 disposed at the heating medium exit side of the heating medium heating heat exchanger 230 of the heating medium heater 220 and in the middle part of the heat exchanger 230, and the information signals sent from the indoor unit controller 400 and combustion unit controller 600 of the indoor radiators 100, also controls the two-way valves 290a to 290c of the flow divider 270 by the drive circuits 510a to 510c, and further controls the heating medium control valves 280a to 280c of the flow divider 270 by the opening degree adjusting circuits 520a to 520c. The DIP switches 530a, 530b and 530c are for preliminarily weighting the opening degree of the heating medium control valves 280a to 280c, depending on the installation position of the indoor radiators 100 (the level difference of indoor radiators 100, length of heating medium pipings 160a to 160c), and these DIP switches 530a to 530c are disposed in the outdoor unit 200 so as to correspond to the indoor radiators 100a to 100c. When installing this apparatus in the house, the DIP switches 530a to 530c are changed over in order to set the weighting of the opening degree of the heating medium control valves 280a to 280c depending on the position of installation of the indoor radiators 100.

The control blocks of the invention are composed in this way, and the basic controls by this control block composition are as follows.

These indoor unit controllers 400 are intended to determine the heating capacities Q1 to Q3 necessary in each room depending on the difference between the room temperatures Ts1 to Ts2 preset by the users, and the indoor temperatures Ta1 to Ta3 measured actually by the room temperature sensors 110 installed in the indoor radiators 100. The information of the heating capacities Q1 to Q3 determined by the indoor unit controllers 400 is sent into the outdoor unit controller 500 built in the outdoor unit 200, and the outdoor unit controller 500 controls the opening degree adjusting circuit 520 of the heating medium control valve 280 in the flow divider 270 depending on the information of heating capacities Q1 to Q3, and controls the heating medium control valves 280a to 280c of the flow divider 270 so as to pass the heating medium in the flow rate suited to the heating capacities of the indoor radiators 100a to 100c. The control of the heating medium control valves 280a to 280c determines the opening degrees N1 to N3 of the valves in proportion to the heating capacities Q1 to Q3.

In addition, the outdoor unit controller 500 calculates the sum ΣQi of the heating capacities from the information of the heating capacities Q1 to Q3 of the individual rooms, and sends the information of the total heating capacity ΣQi to the combustion unit controller 600, and the combustion quantity of the combustion unit 222 is controlled depending on this total heating capacity ΣQi to control the fuel pumps 226c and 226d and air blow fan 224 so as to burn the total required combustion quantity, while the inverter circuit 260 of the gas pump 250 is controlled so as to circulate the heating medium circulation rate corresponding to the total required combustion quantity, thereby controlling the rotating speed of the motor 261 of the gas pump 250.

The principle of system operation of the heating apparatus of the embodiment is described below while referring to the Mollier chart in FIG. 29.

The Mollier chart is a characteristic diagram generally expressing the status quantity of refrigerant, in which the axis of abscissas denotes the enthalpy (kcal/kg) representing the energy quantity possessed by the refrigerant, and the axis of ordinates refers to the pressure (kg/cm$^2$) of the refrigerant. This characteristic chart is very convenient for expressing the cycle status of the refrigeration cycle using a refrigerant, and is widely employed generally. In the heating cycle 150 of the embodiment, the working fluid flowing in the heating cycle 150 is called a heating medium, and therefore in the explanation on the basis of the Mollier chart, it is mentioned heating medium instead of refrigerant.

The arched parabolic curve on the Mollier chart is the saturation curve of heating medium, and the peak 700 of this saturation curve is known as the critical point. The inside of this saturation curve is the region in which the heating medium exists in a mixed state of gas phase and liquid phase, and in this region, at a same pressure, if the energy state (enthalpy) of the heating medium varies, the temperature does not change (saturation temperature). That is, the temperature of the heating medium is a function in terms of pressure only. The right portion of the outside of the saturation curve is a region in which the heating medium exists in a gas phase, and in this region, at a same pressure, if the energy state (enthalpy) of the heating medium varies, the temperature also changes. Of course, the temperature of the heating medium at this time is higher than the saturation temperature at the same pressure, and in this heating cycle 160, the temperature difference at this time is called the superheat. The left portion of the outside of the saturation curve is a region in which the heating medium exists in a liquid phase, and in this region, at a same pressure, when the energy state of the heating medium varies, temperature also changes. The temperature of the heating medium at this time is lower than the saturation temperature at the same pressure, and in this heating cycle 150, the temperature difference at this time is called undercooling.

The principle of system operation of this apparatus is explained below. The cycle diagram of the system of this embodiment is indicated by thick solid line.

From point 701 to point 702, the pressure rises by gas pump 250, and the heating medium increases at this time slightly in pressure and energy by the work of the gas pump 250. From point 702 to point 703, it indicates the heat release or condensation process in each indoor radiator 100, and the heating medium loses energy nearly at a same pressure at this time, and transforms into liquid phase, going across the saturation curve. At this moment, the temperature difference between point 705 and point 703 is the undercooling. From point 703 to point 704, it means pressure loss due to heating medium control valve 280, and the heating medium slightly drops in pressure. From point 704 to point 701, it means the evaporation process by the heating medium heater 220, and the heating medium increases its energy almost at a same pressure at this time. In other words, in the heating medium heater 220, the heating medium is evaporated to change gradually from liquid phase into gas phase, finally changing to the gas phase with a certain superheat. This superheat corresponds to the temperature difference between point 701 and point 706. This cycle is to repeat the above operation.

What is of note in the cycle of this embodiment is that the pressure difference between the pressure in condensation and the pressure in evaporation is extremely small as compared with the cycle of the conventional heat pump apparatus. In other words, in the heat pump apparatus, it is necessary to absorb heat from the atmosphere, and accordingly the saturation temperature of the evaporator must be lowered to a temperature sufficiently lower than the ambient temperature, and for this purpose the pressure in the evaporator must be a sufficiently low pressure. By contrast, in the present apparatus, the heating medium in the heat exchanger 230 (evaporator) for heating the heating medium in the heating medium heater 220 obtains heat by the high temperature combustion heat due to combustion of the combustion unit 222 of the heating medium heater 220, and therefore it is not necessary to lower the pressure. This is a great difference from a general heat pump. When the pressure difference is small, it is not necessary to use a compressor for raising pressure from the evaporator to the condenser as required in a general heat pump. That is, it is not necessary to compress the heating medium vapor, and a circulation pump or the like is enough for this purpose. At the same time, the power consumption is greatly saved.

In this embodiment, an example of using gas pump 250 is given, and a caution for operation by using the gas pump 250 is that the heating medium is in gas phase at the entrance of heating medium of the gas pump 250. This is because if the heating medium in liquid phase enters the gas pump 250, the liquid is compressed in a gas pump using rotary cylinder, and the cylinder may be locked. Therefore, the heating medium entrance side of the gas pump 250 must keep the heating medium in a superheated state in any operating condition. However, undercooling is not always necessary.

Or, instead of the gas pump, a compressor may be used.

The principle of operation of the basic control of the heating apparatus in this embodiment is described below by referring to the basic control flow chart of the heating apparatus of the invention in FIG. 30.

In the first place, to use the heating apparatus, the power switch of any one of the indoor units 100 is turned on. As a result, the outdoor unit controller 500, combustion unit controller 600 built in the outdoor unit 200, and indoor unit controller 400 incorporated in each indoor radiator 100 are initialized (step S1).

The power source of a desired one of indoor radiators 100a to 100c is turned on by the on/off switch 421 of the operation unit 420 disposed in each indoor radiator 100.

At this time, when setting the timer operation, that is, when operating by the timer action, the operation start or operation stop time is set by the timer switch 425 in the operation unit 520 disposed in the indoor radiator 100 (step S2).

When the on/off switch 421 is turned on, a signal is transmitted from the indoor unit controller 400 in the indoor radiator 100 which has been turned on, to the outdoor unit controller 500 in the outdoor unit 200, and the number of running units of the indoor radiators 100 can by checked by this outdoor unit controller 500 (step S3). When the number of running units is confirmed, in order that the heating medium may not flow into the indoor radiator 100 at rest, the outdoor unit controller 500 controls the two-way valve 290 in the flow divider 270 installed in the outdoor unit 200 by means of the drive circuit 510, and the heating medium control vale 280 by the opening degree adjusting circuit 520. That is, the two-way valve 290 and heating medium control valve 280 are closed.

As for the indoor radiator 100 set in operation, the user sets to a desired room temperature by means of the room temperature setting switch 422 of the control unit 420 in the indoor radiator 100 (step S4).

Sequentially, by the room temperature sensor 110 installed in the middle of the back side of the louver 122 of the front panel 120 of the indoor radiator 100, the temperature Tai of the room in which the indoor radiator 100 is installed is measured. This temperature information is sent to the indoor unit controller 400, and it is compared with the preset temperature Tsi by the user in this indoor unit controller 400 in the following equation, and the temperature difference $\Delta Ti$ between the preset room temperature and the actually measured room temperature is calculated.

$$\Delta Ti = Tsi - Tai \tag{1}$$

By thus calculated temperature difference $\Delta Ti$, the required heating capacity Qi of each room is determined. Usually, this required heating capacity Qi is estimated at the temperature difference $\Delta Ti$. In other words, if there is a large difference between the preset temperature Tsi and the measured temperature Tai, a large heat is required for raising the room temperature quickly to the preset temperature Tsi, or when the temperature difference $\Delta Ti$ is small, a small heat is required in that room. Simply, therefore, the required heating capacity Qi of each room is determined by the difference $\Delta Ti$ between the preset temperature Tsi and the measured temperature Tai (step S5). This required heating capacity Qi is determined in the form proportional to the temperature difference $\Delta Ti$ as shown in the equation below.

$$Qi = K \cdot \Delta Ti \tag{2}$$

where K is the proportional constant, and the subscript i denotes an individual room.

Figure 31:
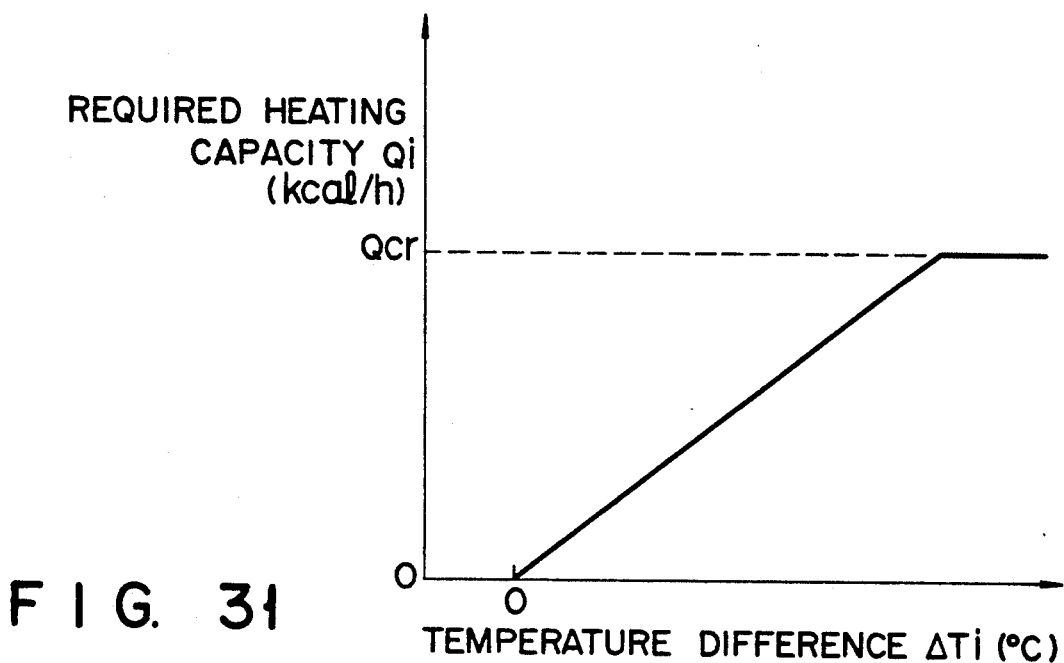
FIG. 31 is a characteristic diagram showing the relation between the necessary heating capacity and the combustion quantity.

This relation is shown in the relative characteristic diagram of required heating capacity and temperature difference in FIG. 31. As shown in the diagram, since there is a limitation in each indoor radiator 100, the following condition is defined.

$$Qi < Qcr \tag{3}$$

where Qcr is the limit of the heating capacity of the indoor radiator 100. That is, when the required heating capacity of the indoor radiator 100 reaches Qcr at the limit heating capacity, however large the temperature difference $\Delta Ti$ may be, the outdoor unit controller 500 controls the heating capacity so as not to exceed the limit heating capacity Qcr.

Next, the information of the required heating capacity Qi of each indoor radiator 100 determined by each indoor unit controller 400 is transmitted to the outdoor unit controller 500. By this outdoor unit controller 500, the ratio of the sum of the required heating capacities Qi of the entire indoor radiators 100, to the required heating capacity Qi of individual indoor radiators 100 is determined. The total required heating capacity is expressed as follows.

$$Qt = \Sigma Qi \tag{4}$$

where Qt is the total heating capacity, and $\Sigma$ is the sum.

In consequence, the outdoor unit controller 500 transmits the signal corresponding to the required total heating capacity Qt to the combustion unit controller 600 installed in the same outdoor unit 200. At the same time, the outdoor unit controller 500 transmits the control signals to the inverter circuit 260 of the gas pump 250 and the opening degree adjusting circuit 520 of the heating medium control valve 280 of the flow divider 270. The control of gas pump 250 and heating medium control valve 280 is described later.

Figure 32:
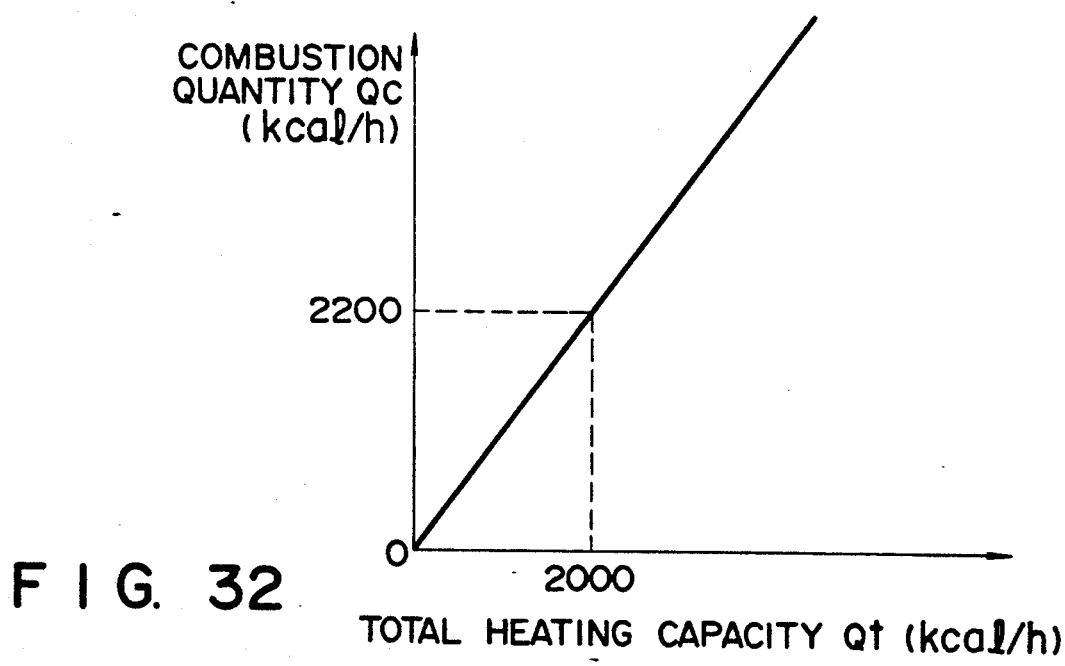
FIG. 32 is a characteristic diagram showing the relation between the total heating capacity and combustion quantity.

In this heating apparatus, the heat input is nearly determined by the combustion quantity of the combustion unit 222 of the heating medium heater 220. Accordingly, the total required heating capacity Qt is nearly equal to the heat output from the combustion unit 222, and as shown in the relative characteristic diagram of total heating capacity and combustion quantity in FIG. 32, the total heating capacity Qt and the combustion quantity of combustion unit 222 are almost in a proportional relation, which can be expressed as follow.

$$Qt = Qc \cdot \lambda \qquad (5)$$

where Qc is the combustion quantity, and $\lambda$ is the thermal efficiency of the heating medium heater 220.

In this diagram, the thermal efficiency $\lambda$ is set at 0.9. Namely, if the total heating capacity Qt is, for example, 2,000 kcal/h, the combustion quantity Qc is 2,200 kcal/h. Thus, from the signal of the total heating capacity Qt transmitted from the outdoor unit controller 500, the combustion unit controller 600 determines the heating quantity of the heating medium of the combustion unit 222 of the heating medium heater 220, that is, the combustion quantity Qc (step S6). Accordingly, the combustion unit controller 600 transmits the information signal of the determined combustion quantity Qc to the combustion unit 222, and the fuel supply amount and air flow rate to the inverter circuit 610 and drive circuit 620, thereby controlling the fuel pumps 226c and 226d of the combustion unit 222 by the inverter circuit 610. By the drive circuit 620, the air blow fan 224 of the combustion unit 222 is controlled.

The outdoor unit controller 500 determines the circulation amount of the heating medium circulating in the heating cycle 150, corresponding to this total heating capacity Qt, from the total heating capacity mentioned above in the following equation.

$$G = Qt/(Hin - Hout) \qquad (6)$$

where G is the heating medium circulation amount, Hin is the enthalpy of the heating medium flowing near the entrance of the heat exchanger 230 for heating the heating medium of the heating medium heater 220, and Hout is the enthalpy of the heating medium flowing near the exit of the heat exchanger 230 of the heating medium heater 220.

Figure 33:
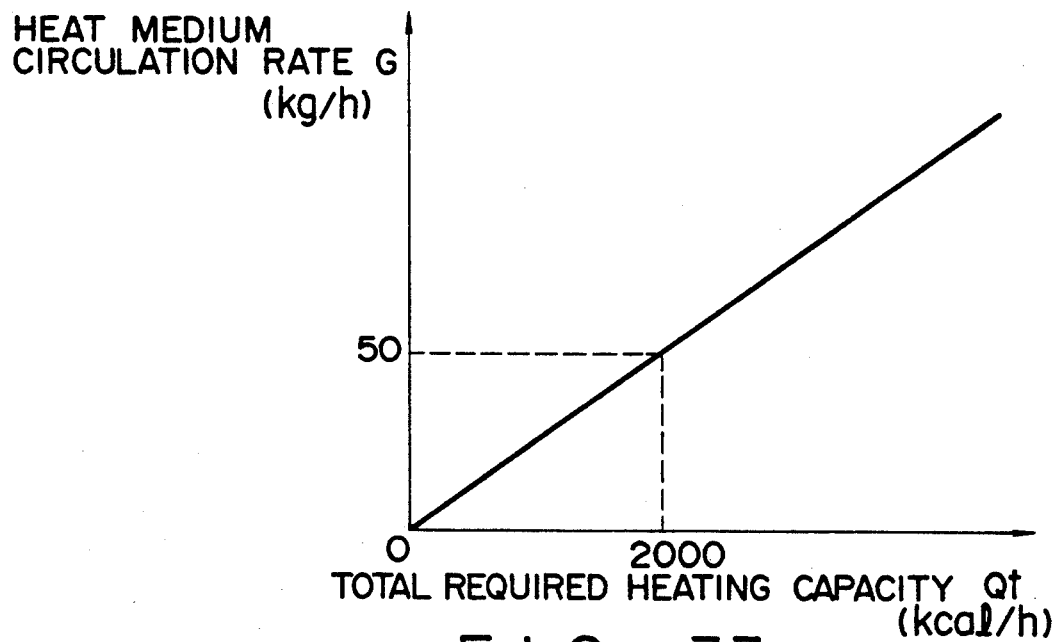
FIG. 33 is a characteristic diagram showing the relation between the total heating capacity and heating medium circulation quantity.

These enthalpies Hin, Hout are determined by the temperature and pressure of the heating medium. In this apparatus, which is operates so that the enthalpies of the heating medium may be nearly constant in the middle point and the exit of the heat exchanger 230 of the heating medium heater 220, the enthalpy difference is almos constant, too. Therefore, the heating medium circulation amount G is determined only by the total required heating capacity Qt. This mode is shown in the relative characteristic diagram of the total required heating capacity Qt and the heating medium circulation amount G in FIG. 33. In this diagram, in the condition of the enthalpy Hin of 155 kcal/kg and enthalpy Hout of 115 kcal/kg, the heating medium circulation amount G (50 kg/h in this example) at the total required heating capacity Qt of 2,000 kcal/h is indicated by broken line.

In this way, the outdoor unit controller 500 determines the circulation amount G of the heating medium circulating in the heating cycle 150, and by this circulation amount G, the rotating speed of the motor 261 of the gas pump 250 is calculated, and the heating medium conveying capacity of the gas pump is determined (step S7).

That is to say, between the heating medium circulation amount G and the motor rotating speed of the gas pump 250, it is known that a nearly proportional relation is established. Accordingly, this relation may be expressed as follows.

$$G = f \cdot V \cdot \eta / v \qquad (7)$$

where f is the rotating speed of the motor of the gas pump 250, V is the cylinder displacement of the gas pump 250, $\eta$ is the volume efficiency of gas pump 250, and v is the specific value of the heating medium vapor in the cylinder of the gas pump 250.

Figure 34:
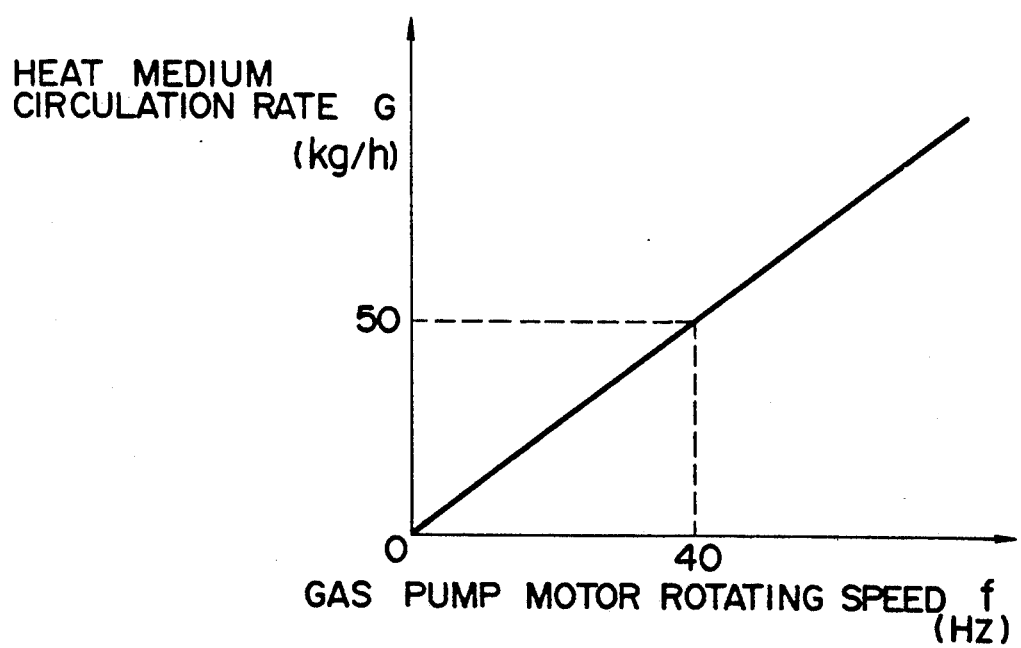
FIG. 34 is a characteristic diagram showing the relation between the gas pump rotating speed and heating medium circulation quantity.

The cylinder displacement V of the gas pump is constant, and the volume efficiency n and the specific volume v may be regarded nearly constant as far as the running condition does not vary significantly. Therefore, a nearly proportional relation is established between the heating medium circulation amount G and the motor rotating speed of the gas pump 250. This relation is expressed in the relative characteristic diagram of the gas pump rotating speed and heating medium circulation amount in FIG. 34. In this diagram, to produce the heating medium circulation amount G of 50 kg/h in the heating cycle 150, it means that the motor rotating speed of the gas pump 250 is required to reach 40 Hz.

If the heating medium circulation amount G corresponding to the total required heating capacity Qt is not obtained, the heating medium enthalpy at the exit of the heat exchanger 230 for heating the heating medium of the heating medium heater 230 becomes large, and the superheat goes up. If the circulation amount G is significantly insufficient, the temperature of the heating medium may exceed the allowable limit, which may result in serious problems for the cycle operation, such as decomposition of heating medium, deposition of lubricating oil circulating together with the heating medium, or breakace of the gas pump 250. To the contrary, if the heating medium circulation amount G is too much, as mentioned above, the superheat of the heating medium is not achieved, and the liquid may be compressed when the gas pump 250 is used. Accordingly, in the running condition of the apparatus, for example, between when the individual required heating capacities are maximum while operating in three rooms, and when the required heating capacity is minimum while operating only in one room, the total heating capacity Qt changes about 10:1, and hence the gas pump 250 should be capable of supplying the heating medium by varying the circulation amount by about 10:1 in order to cope with such changes.

In this way, the information of the motor rotating speed of the gas pump 250 corresponding to the heating medium conveying capacity of the gas pump 250 determined by the outdoor unit controller 500 is transmitted to the inverter circuit 260 of the gas pump 250, and by this inverter circuit 260 the rotating speed of the motor 261 of the gas pump 250 is controlled. The control of this rotating speed is intended to vary the rotating speed in steps. Besides, the fuel flow rate to be supplied into the combustion unit 222 of the heating medium heater 220 for controlling the combustion quantity Qc corresponding to the total required heating capacity Qt, that is, the fuel flow rate for controlling the fuel pumps 226c and 226d by the inverter circuit 610 is also changed in steps. Therefore, both the combustion quantity Qc and heating medium circulation amount G change in steps, so that the heating medium circulation amount G depending on the total required heating capacity Qt may be supplied.

However, as shown in equation (7), since the circulation amount G is also a function of the specific volume v of the heating medium, in the stepwise change of rotating speed of the motor of the gas pump 250, it may be impossible to adjust the superheat at the exit of the heat exchanger 230 of the heating medium heater 220 delicately. That is, if the combustion quantity Qc is the same, when the room temperature is low or the air flow from the indoor fans 104 and 106 of the indoor radiator 100 is too much, the operating pressure of the cycle becomes low and the specific volume v of the heating medium becomes small, and the substantial heating medium circulation amount G may be somewhat smaller. Or a reverse case may be also considered. Therefore, for adjustment of superheat, aside from the stepwise change of the rotating speed of the gas pump 250, some other means is required. In this apparatus, by the outdoor unit controller 500, the delicate adjustment of the superheat is attempted by controlling the opening degree adjusting circuit 520 of the heating medium control valve 280 of the flow divider 270 installed in the outdoor unit 200, thereby fine-adjusting the opening degree of the heating medium control valve 280. That is, the heating medium control valve 280 plays the role of controlling the superheat of the heating medium, aside from the function of distributing and supplying a proper amount of heating medium to each indoor radiator 100. This superheat adjustment is achieved by varying the total of the opening degree of each heating medium control valve 280, and it is controlled from the outdoor unit controller 500 that the ratio of the opening degree of each heating medium control valve 280 may be always constant.

By the ratio (Q1:Q2:Q3) of the required heating capacities Qi of the individual indoor radiators 100 calculated by the outdoor unit controller 500 mentioned above, in order to distribute and supply the heating medium depending on the required heating capacity Qi of each indoor radiator 100 to the individual indoor radiators, the outdoor unit controller 500 sends a signal for adjusting the opening degree of the heating medium control valves 280 of the flow divider 270 to the opening degree adjusting circuit 520. The ratio of distribution of heating medium into each indoor radiator 100 by the adjustment of opening degree of the heating medium control valve 280 is determined as follows.

During heating operation, in each indoor radiator 100, the required heating capacity Qi is often different, and it is necessary to distribute and supply the heating medium in a quantity corresponding to the heating capacity Qi of the indoor radiator 100 into the indoor radiator 100. That is, $$Gi = Qi/(Hiin - Hiout) \qquad (8)$$

where Gi is the heating medium circulation amount flowing in each indoor radiator 100, Hi is an enthalpy of heating medium at a specific point in each indoor radiator 100, and the subscript in denotes the inlet, and out is the outlet.

Considering here a favorable operating condition of the indoor radiator 100, the heat exchange (heat release) is said to be done most efficiently when the heating medium having a certain adequate superheat enters the heat exchanger 102 of the indoor radiator 100, and leaves the heat exchanger 102 in a state having a certain adequate undercooling. This is because heat exchange in a two-phase state of gas and liquid having the highest heat transfer rate and a large heat conveying amount per unit weight is done in the majority of the indoor radiator 100, while the heat obtained from the outdoor unit 200 is spent completely. If the heating medium circulation amount Gi of one indoor radiator (e.g. 100a) is much greater than the proper value and the state of the heating medium at the exit is still in gas-liquid two-phase state (the heat is present as evaporation latent heat), it returns to the heating medium heater 220 before it is completely rid of heat. On the other hand, in other indoor radiator (e.g. 100b), the heating medium circulation amount Gi becomes smaller than the proper value (since the entire heating medium circulation amount G is constantly determined in terms of the total heating capacity Qt), the state of the heating medium is in liquid phase to the contrary, and sufficient heat cannot be supplied in the room.

Reviewing the cycle of the apparatus, since the state of the heating medium (superheat) at the entrance of each indoor radiator 100 is all the same mostly, the heating medium circulation amount Gi is controlled so as to achieve the same state at the exit. Therefore, the heating medium circulation amount Gi is controlled to be proportional to the required heating capacity Qi.

As mentioned above, a nearly proportional relation is present between the required heating capacities Qi (Q1, Q2 and Q3) of the indoor radiators 100, and the heating medium flow rates Gi (G1, G2 and G3) required by respectively indoor radiators 100. This relation is expressed below.

$$G1:G2:G3 = Q1:Q2:Q3 \qquad (9)$$

where the subscript indicates each indoor radiator 100.

In this apparatus, since the indoor radiators 100 are disposed parallel in the cycle, the pressure is nearly the same at the downstream side and upstream side of each heating medium control valve 280, and the flow ratio of heating medium is nearly proportional to the opening sectional area of the heating medium control valve 280. Therefore, the opening degree ratio (distribution ratio of heating medium) of each heating medium control valve 280 is determined in the following equation (step S8).

$$N1:N2:N3 = Q1:Q2:Q3 \qquad (10)$$

where N denotes the opening degree of each heating medium control valve 280.

In this way, the outdoor unit controller 500 controls the opening degree adjusting circuit 520 so as to distribute and supply the heating medium suited to each heating capacity Qi to the individual indoor radiators 100, and adjusts the opening degree of the heating medium control valve 280 accordingly.

Next, when changing the room temperature (step S9), the set room temperature is changed by the room temperature setting switch 422 of the operation unit 520 of the indoor radiator 100. When the room temperature setting is thus changed, the operation from step S4 to step S8 is repeated, and the temperature of only a desired room can be changed and controlled without changing the temperature in other rooms.

Or when changing the number of rooms to be heated, by turning on or off the on/off switch 421 installed in each indoor radiator 100, the number of the indoor radiators being used is checked (step S3), and the operation from step S4 to step S8 is repeated, so that the heating operation suited to the required heating capacity Qi of each room is carried out.

Incidentally, when the installation height of each indoor radiator 100 varies in the heightwise direction, the control technique of opening degree of heating medium control valve is as follows. A feature of this apparatus is that the pressure difference in the cycle is about ⅓ to 1/6 of the conventional heat pump system. When the pressure difference is thus small, the circulation amount of the heating medium is likely to be influenced by the mounting position of the indoor radiator 100, and its countermeasure is needed. To begin with, it is necessary to know why it is likely to be influenced. Considering the state of heating medium in the heating medium piping into the indoor radiator 100, the heating medium is nearly in vapor state when going, and is nearly in liquid state when returning. In such state, since the liquid side density is greater than the vapor side density, if, for example, the indoor radiator 100 is installed at a higher position than the outdoor unit 200, the heating medium is pulled by the downward gravitational action of the liquid in the liquid side piping, and the apparent pressure loss in this indoor radiator becomes small. To the contrary, when the indoor radiator 100 is installed at a position lower than the outdoor unit 200, the apparent pressure loss becomes large. If this pressure loss value is great for the entire pressure difference, its effect becomes large. For example, see the ratio of the pressure difference of the upstream and downstream side of the heating medium control valve 280 to the pressure loss due to gravitational action of the heating medium liquid in the liquid piping, it is known that $$Pr = \Delta P1 / \Delta Pt \quad (11)$$

where ΔP1 is the pressure loss due to gravitational action of heating medium liquid in the liquid piping, ΔPt is the pressure difference of the upstream and downstream side of the heating medium control valve, and Pr is its ratio.

If this ratio is great, the heating medium flow rate flowing in the indoor radiator 100 is influenced.

In this apparatus, the pressure difference ΔPt is about 4 kg/cm², and Pr is as much as 0.25 (in an ordinary heat pump, the pressure difference ΔPt is 20 kg/cm² or more, and Pr is about 0.05). That is, at a same heating capacity, if the opening degree of the heating medium control valve 280 is same, more heating medium flows into the upper indoor radiator 100.

Figure 35:
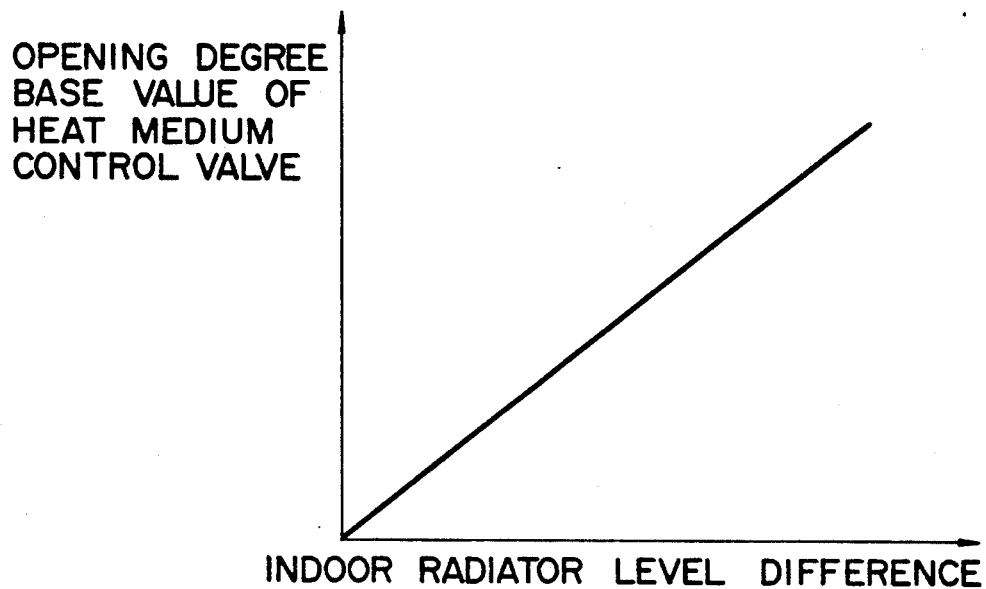
FIG. 35 is a characteristic diagram showing the relation between the height difference of the indoor radiator and the base value of opening degree of heating medium control valve.

Accordingly, in this apparatus, the DIP switch 530 is provided in the outdoor unit 200, and by this DIP switch 530, the base value of the opening degree of each heating medium control valve 280 is set in each indoor radiator 100. The relation between the opening degree base value of the heating medium control valve 280 and the difference in the heightwise direction of the indoor radiator 100 is shown in FIG. 35. The heightwise direction difference is to indicate the position in the heightwise direction of each indoor radiator 100 on the basis of the indoor radiator 100 installed at the lowest position, and the opening degree base value of the heating medium control valve 280 is used in the following formula for setting the valve opening degree.

$$Ni' = Ni - Nib \quad (12)$$

where Ni' is the opening degree of the heating medium control valve 280 after correction, and Nib is the base value.

Moreover, not only the installation position of the indoor radiator 100 in the heightwise direction, but also the length of the heating medium pipings 160, 162 is related with the difference of pressure loss, and if this length differs greatly, it can be corrected in the same manner as mentioned above.

Figure 36:
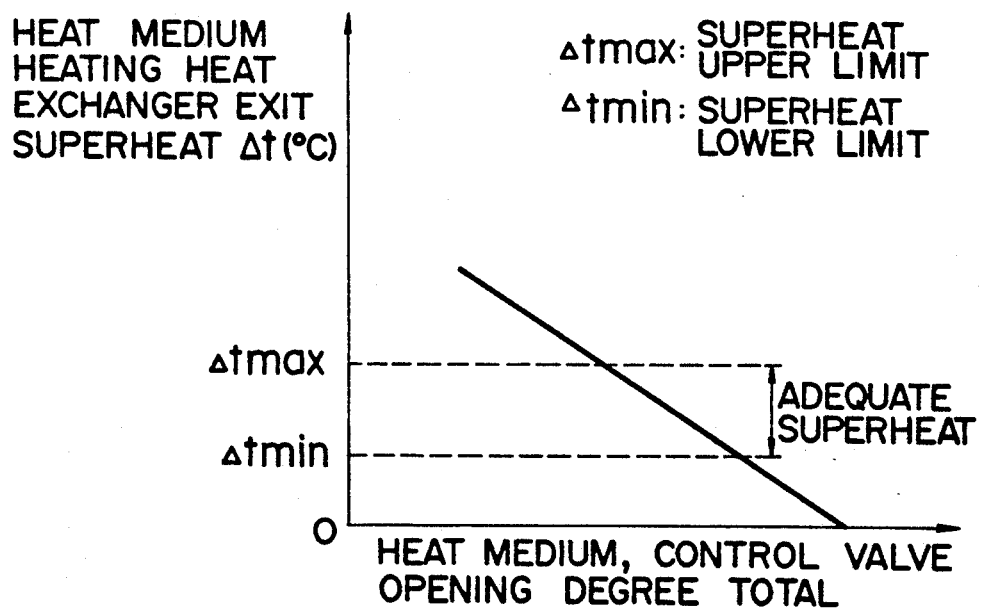
FIG. 36 is a characteristic diagram showing the relation between the total of the opening degree of the heating medium control valve and superheat.
Figure 37:
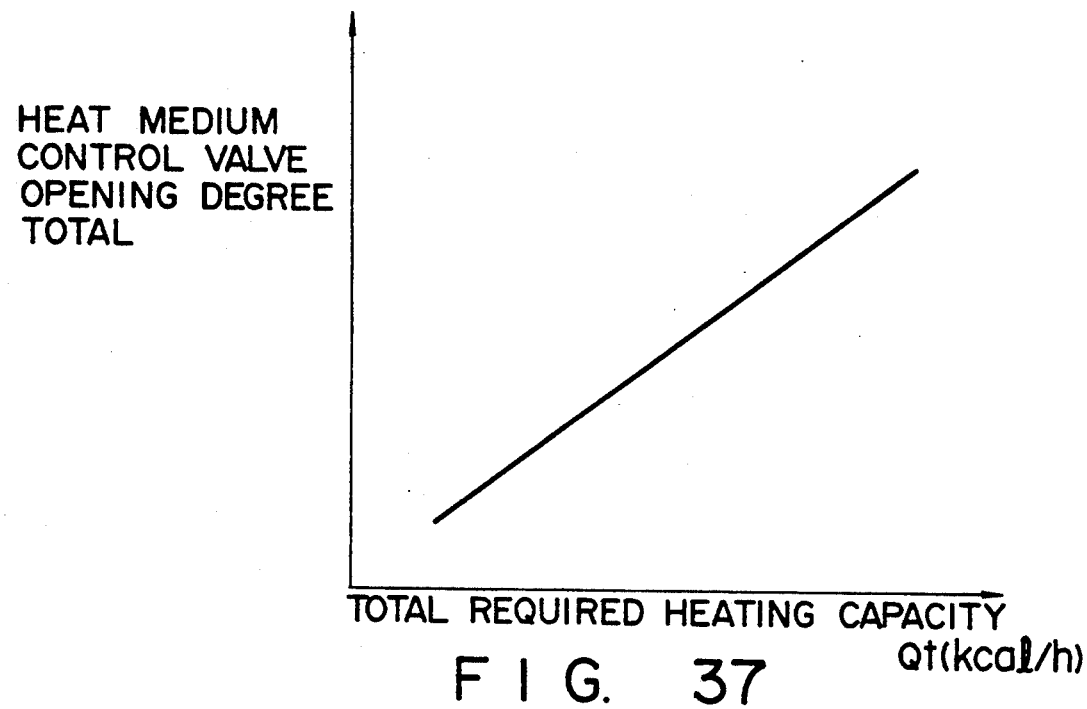
FIG. 37 is a characteristic diagram showing the relation between the total of heating medium control valve and total heating capacity.

Explained next is the control of the heating medium circulation amount G by fine adjustment of the heating medium control valve 280. In this case, it is set by the outdoor unit controller 500 so that the heating medium circulation amount G may be somewhat larger regardless of the rotating speed of the motor of the gas pump 250 (with the heating medium control valve 280 fully open), and it is intended to obtain an appropriate heating medium circulation amount G by controlling to throttle the opening degree of the heating medium control valve 280 by means of the opening degree adjusting circuit 520. To judge if the heating medium circulation amount G is proper or not, the superheat of the heating medium at the exit side of the heat exchanger 230 for heating the heating medium of the heating medium heater 220 or the temperature of the heating medium is detected to determine the judgement. The opening degree of the heating medium control valve 280 is the total of opening degrees of all valves, and the opening degree of each heating medium control valve 280 is, as mentioned already, set so as to distribute a proper circulation amount Gi suited to the required heating capacity Qi of each indoor radiator 100 into the indoor radiator 100. FIG. 36 is a relative characteristic diagram of the sum of the opening degrees of the heating medium control valves 280 and the superheat at the exit of the heat exchanger 230 for heating the heating medium. As shown in the diagram, when the opening degree of the heating medium control valve 280 is smaller, the heating medium circulation amount G decreases, so that the overheat goes up. In actual control, by preliminarily determining the opening degree (total) of the heating medium control valves 280, it is controlled to adjust while observing the super heat. Control with an excellent response is realized when this opening degree is varied depending on the heating medium circulation amount G of the entire cycle, that is, the total heating capacity Qt. FIG. 37 is a characteristic diagram showing the relation of the total of the preset values of the heating medium control valves and the total heating capacity Qt. As shown in the diagram, it is known that this relation is almost proportional.

The technique for forcing out the heating medium liquid staying in the indoor radiator 100 into the outdoor unit 200 is explained below.

This apparatus features, as mentioned above, that the pressure difference of the heating medium in the cycle is small as compared with the ordinary heat pump apparatus. Therefore, in heating operation, the heating medium may gradually collect in the heat exchanger 102 of the indoor radiator 100 at rest, and the heating medium circulating in the cycle may run short. If the circulation amount G of the heating medium declines blow the specified allowable value, the superheat at the exit of the heat exchanger 230 for heating the heating medium of the heating medium heater 220 exceeds the allowable limit, which may lead to the entire system failure. The reason of tendency of collection of heating medium in the indoor radiator 100 is as follows. The indoor radiator 100 not in use is low in temperature, and hence the condensing pressure of the heating medium is also low. On the other hand, the pressure is high in the cycle, and even if flow of heating medium into the indoor radiator 100 not in use is blocked by closing the two-way valve 290 of the flow divider 270 installed in the outdoor unit 200, the heating medium leaks gradually owing to the large pressure difference. In the ordinary heat pump apparatus, since a low pressure part is present in the cycle, by connecting the downstream side of the indoor unit to this low pressure part, staying of the heating medium may be prevented, but in this apparatus, since the pressure is very high at both upstream and downstream sides of the indoor radiator 100, the heating medium is very likely to leak out, and the leak of the heating medium cannot be forced out of the indoor radiator 100 in this state.

Accordingly, this apparatus is composed as follows in order to force out the stagnant liquid heating medium by the vapor of the heating medium.

When the heating medium circulating in the heating cycle 150 becomes insufficient, the heating medium temperature at the exit of the heat exchanger 230 for heating the heating medium of the heating medium heater 220 goes up. This temperature is measured by the temperature sensor 232 installed at the heating medium exit side of the heat exchanger 230. When this temperature exceeds a certain allowable limit, the outdoor unit controller 500, receiving the temperature information from the temperature sensor 232, opens the two-way valve 290 and the heating medium control valve 280 in the flow-divider 279 flowing into the indoor radiator 100 not in use by means of the drive circuit 510 and opening degree adjusting circuit 520 to pass the heating medium vapor, thereby forcing out the heating medium in liquid phase staying in the indoor radiator 100. At this time, of course, the indoor fans 104 and 106 in the indoor radiator 100 remain stopped. In this case, if the two-way valve 290 and heating medium control valve 280 are opened suddenly, a large volume of heating medium in liquid phase runs into the cycle momentarily, and the apparent circulation volume of the heating medium increases, and therefore the heating medium in the heating medium heater 220 is not evaporated completely, but a part returns to the gas pump 250 in liquid phase, and a liquid counterflow phenomenon into the gas pump 250 occurs, which may result in blockage of the pump. Therefore, in this apparatus, the heating medium in liquid phase staying in the indoor radiator 100 is returned gradually into the cycle.

Figure 38:
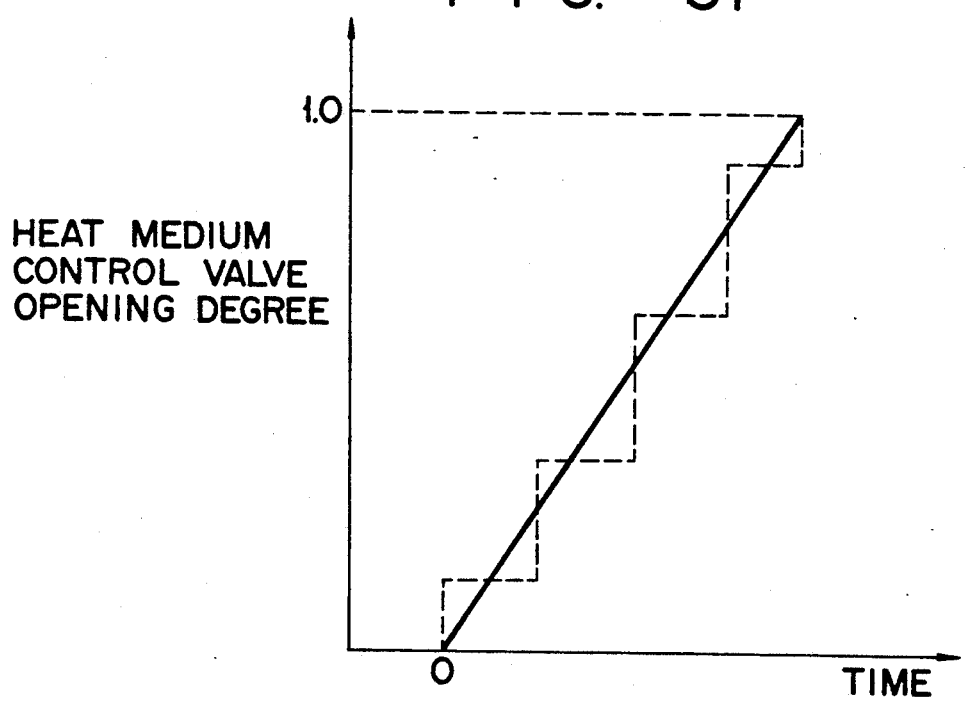
FIG. 38 is a characteristic diagram showing the relation between the opening degree of the heating medium control valve and the time.

FIG. 38 is a characteristic diagram showing the relation between opening degree of the heating medium control valve and the time. The diagram shows the state of the opening process of the heating medium control valve 280 after the open command for the two-way valve 290 is issued from the outdoor unit controller 500. As indicated by solid line, it is opened continuously and gradually, or as indicated by broken line a stepwise opening method is also known. In this apparatus, as shown in the diagram, by controlling the heating medium control valve 280, since the opening degree of the heating medium control valve 280 increases along with the passing of the time, the trouble of sudden entry of the liquid heating medium in the indoor radiator 100 into the cycle is prevented.

Below is explained the timing of stopping the heating medium vapor after forcing out the liquid heating medium stagnant in the indoor radiator 100. As this technique, it is known to measure the temperature of the heating medium after passing through the indoor radiator 100 and close the two-way valve 290 when this temperature becomes nearly equal to the heating medium vapor temperature. In this case, a temperature sensor is installed at the heating medium exit side of the indoor radiator 100, and the heating medium temperature is measured by this temperature sensor, and this temperature information is transmitted to the outdoor unit controller 500, and the two-way valve drive circuit 510 is controlled by the outdoor unit controller 500, thereby closing the two-way valve 290. Besides, same as mentioned above, after a certain time setting, the two-way valve 290 is closed, or in other technique the exit temperature of the heat exchanger 230 for heating the heating medium of the heating medium heater 220 is measured by the temperature sensor, and when this temperature becomes less than a specified value, the two-way valve drive circuit 510 is controlled by the outdoor unit controller 500 to close the two-way valve.

So far is described the basic controls of the heating apparatus of the invention by reference to the basic control flow chart in FIG. 30, and thereafter details of various controls of the apparatus are explained by referring to corresponding flow charts. The controls are explained in the following sequence.

Figure 39B:
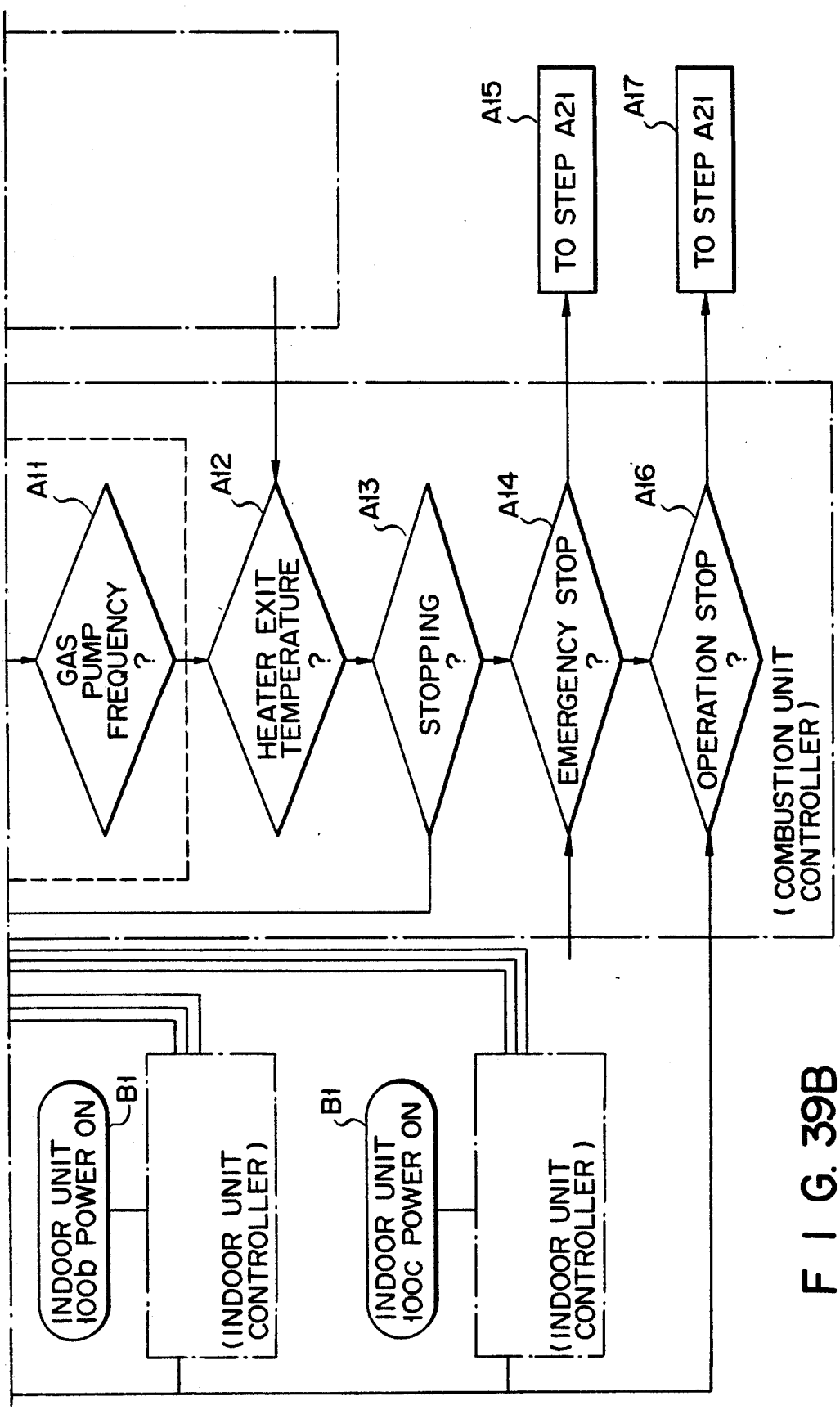
Figure 40B:
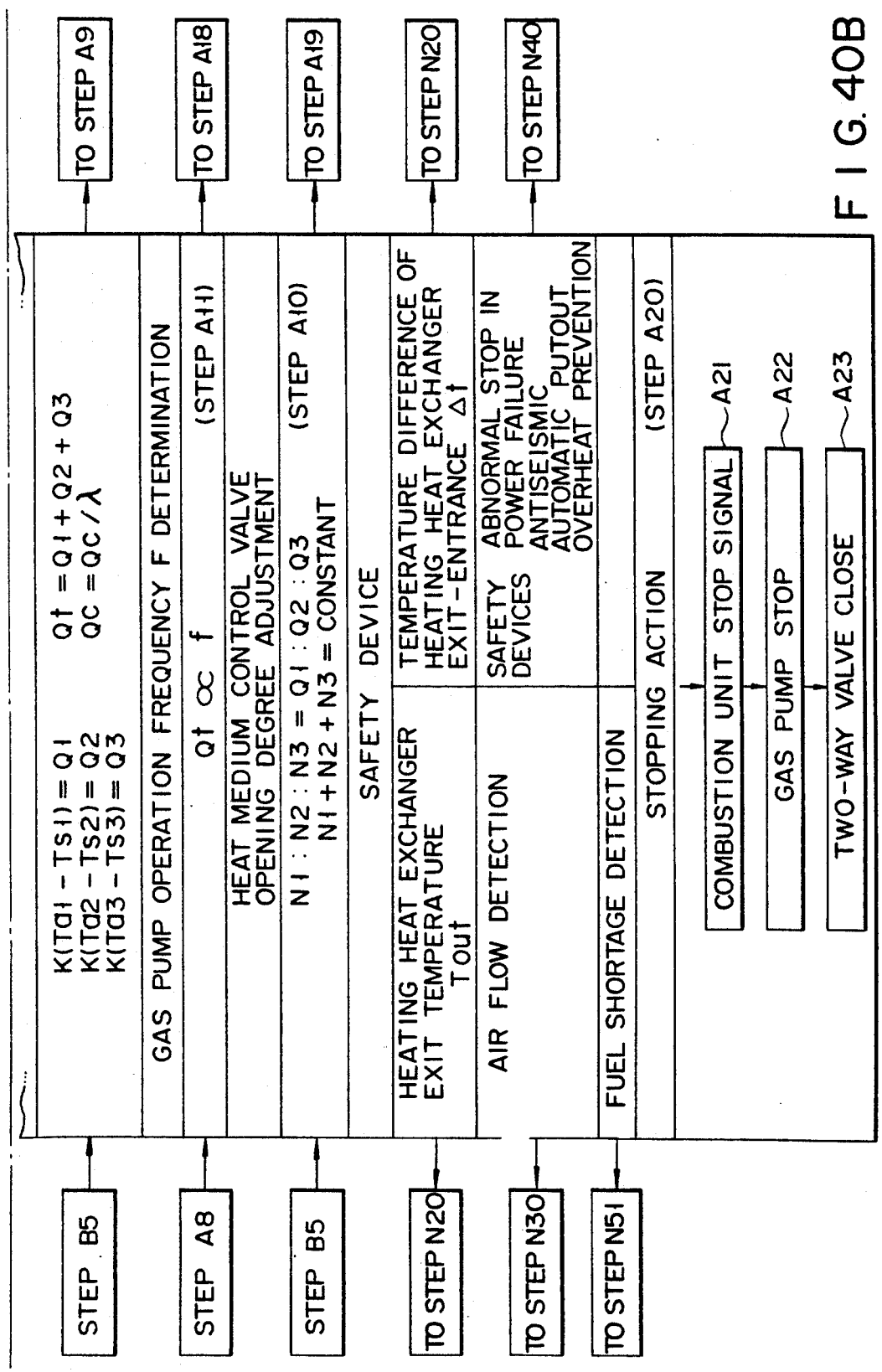
Figure 41A:
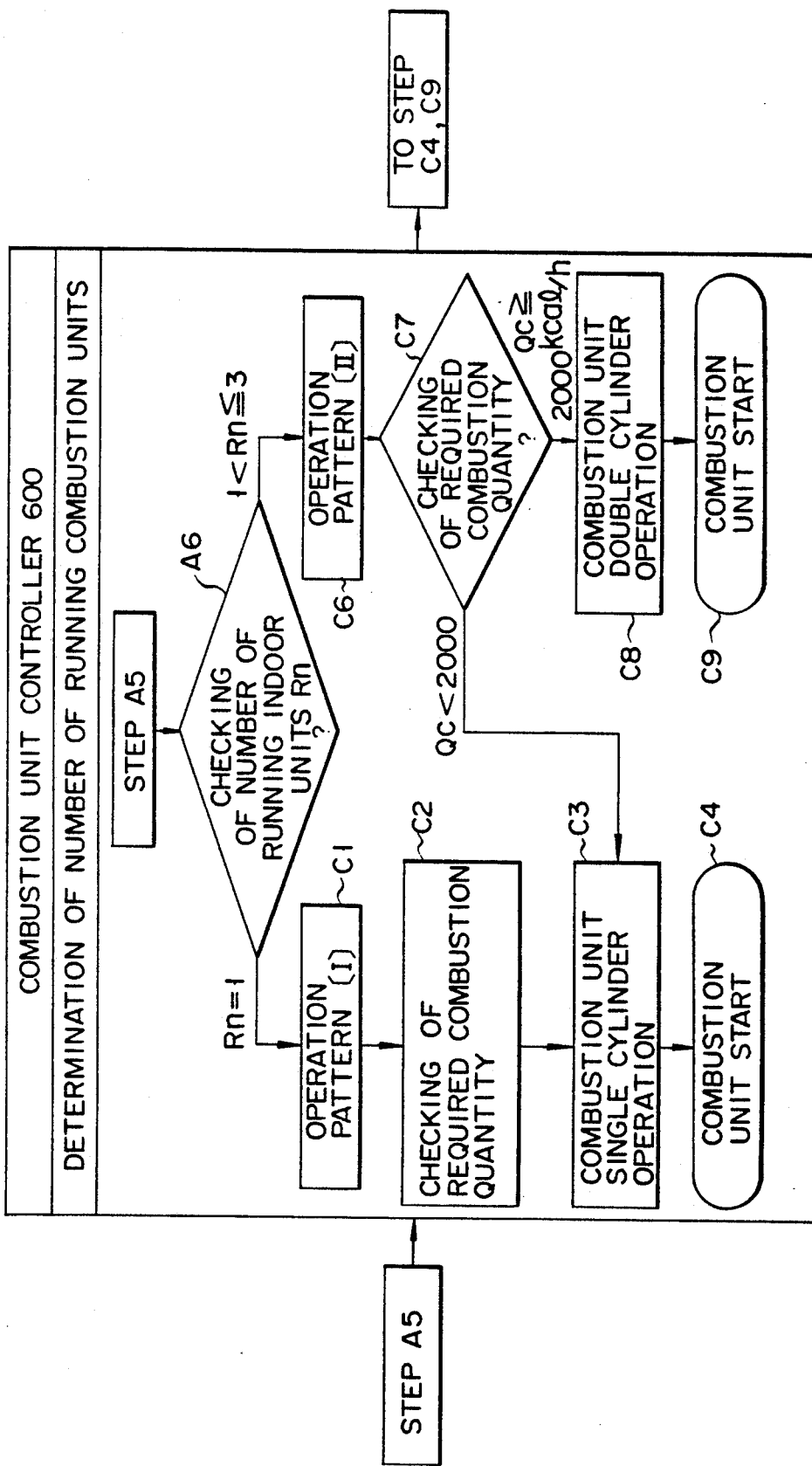
FIGS. 41A to 41C are combustion unit controller function diagrams.
Figure 41B:
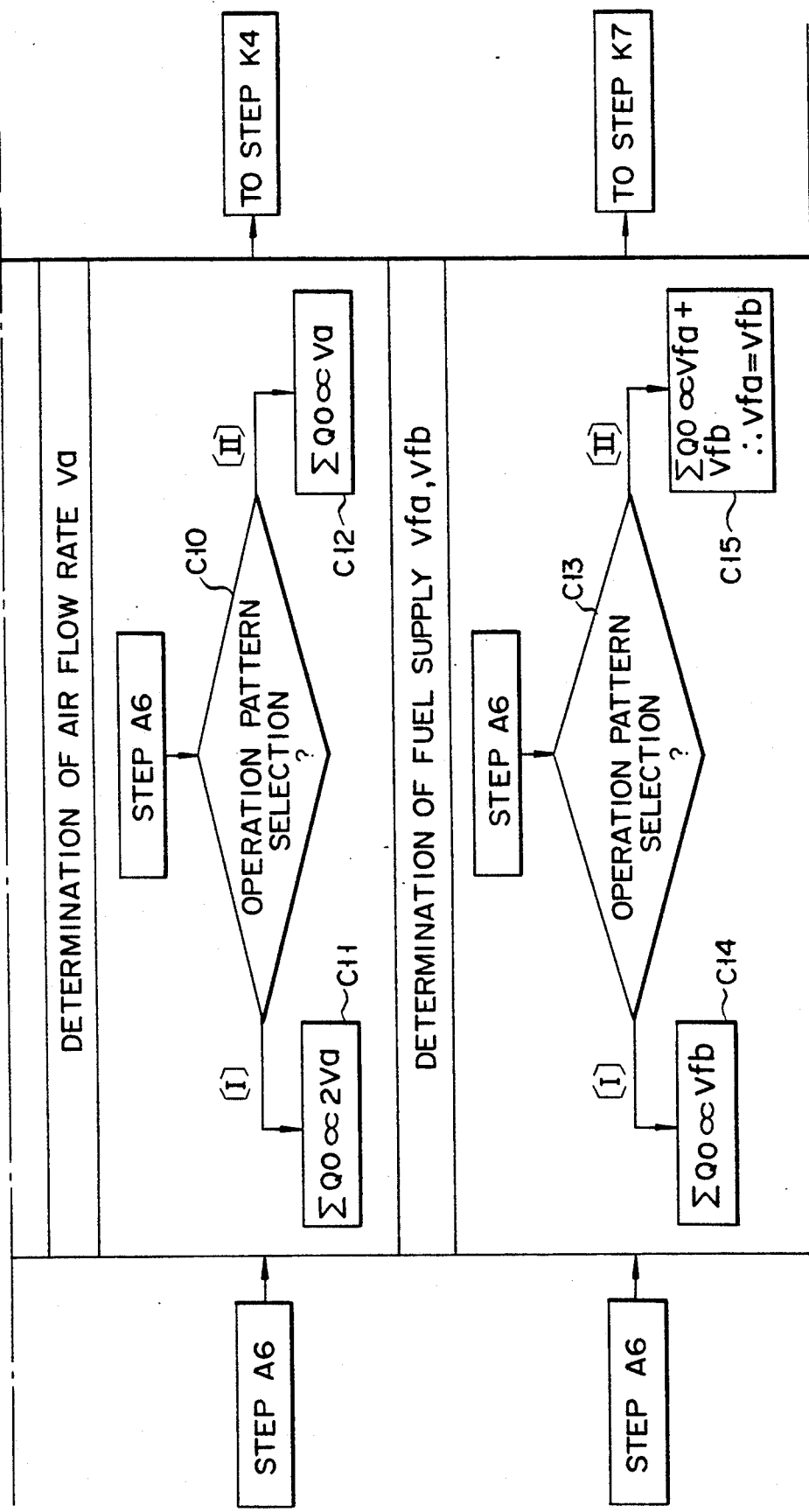
Figure 41C:
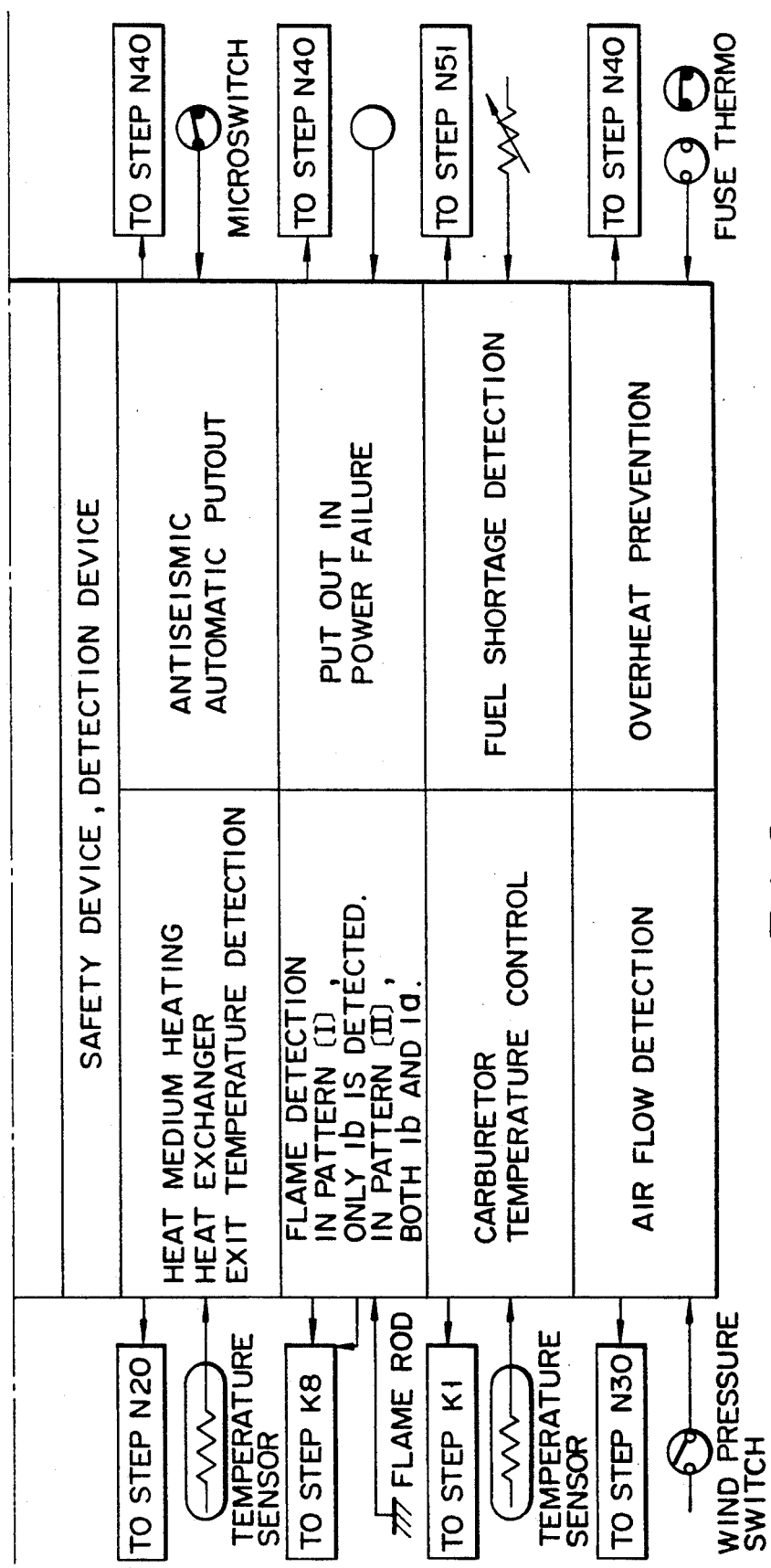
Figure 42:
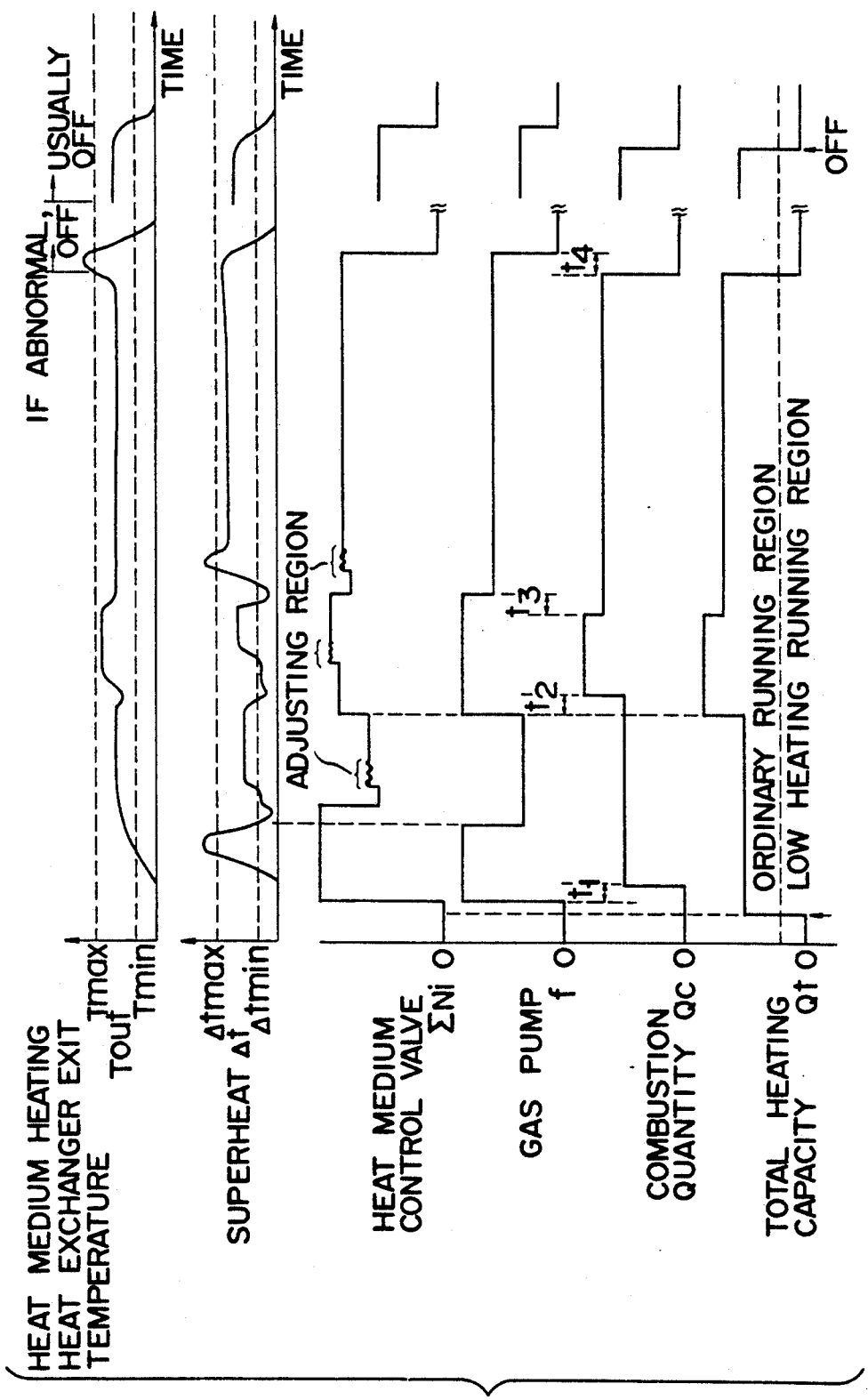
FIG. 42 is an operation timing chart.
Figure 43B:
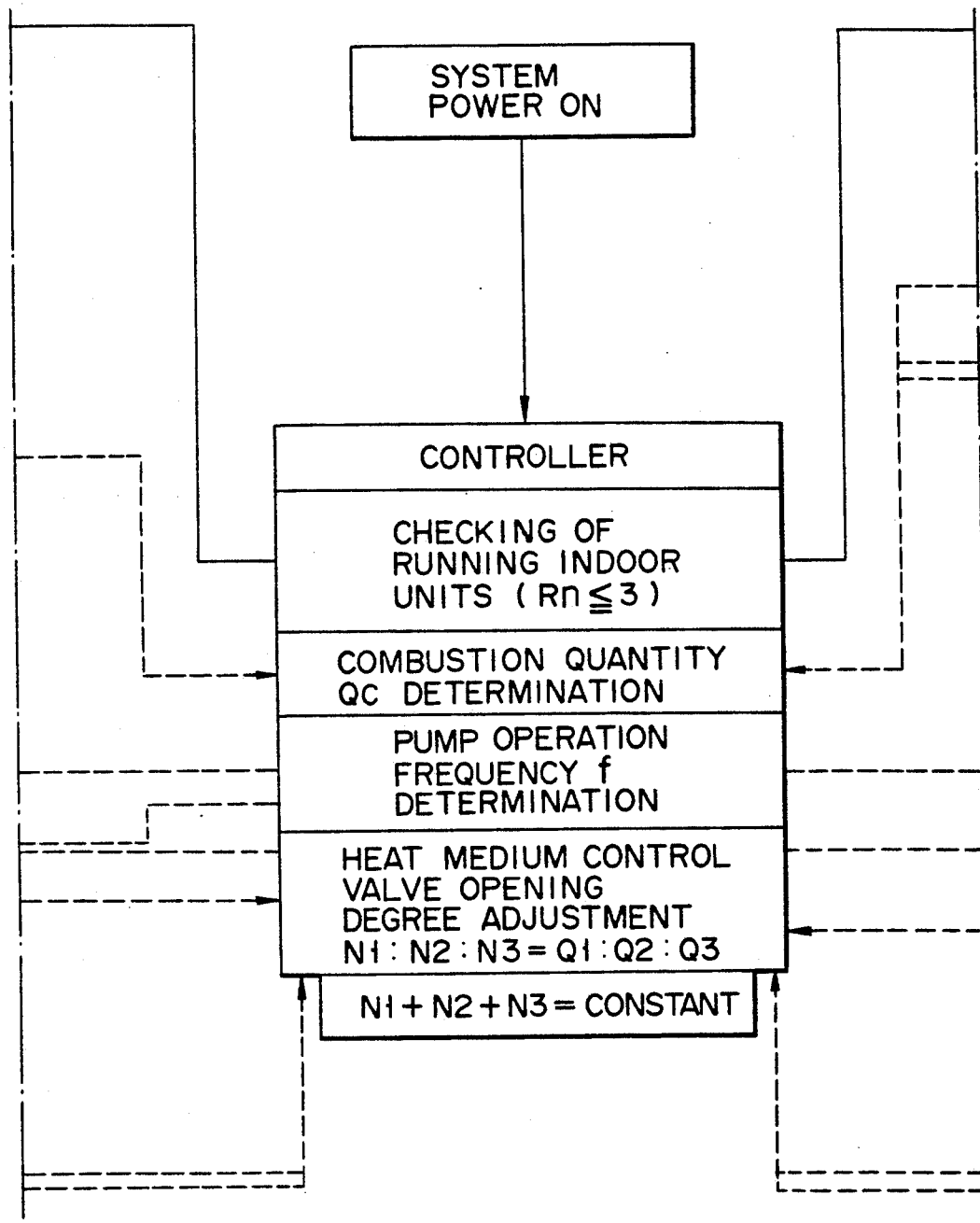
Figure 43C:
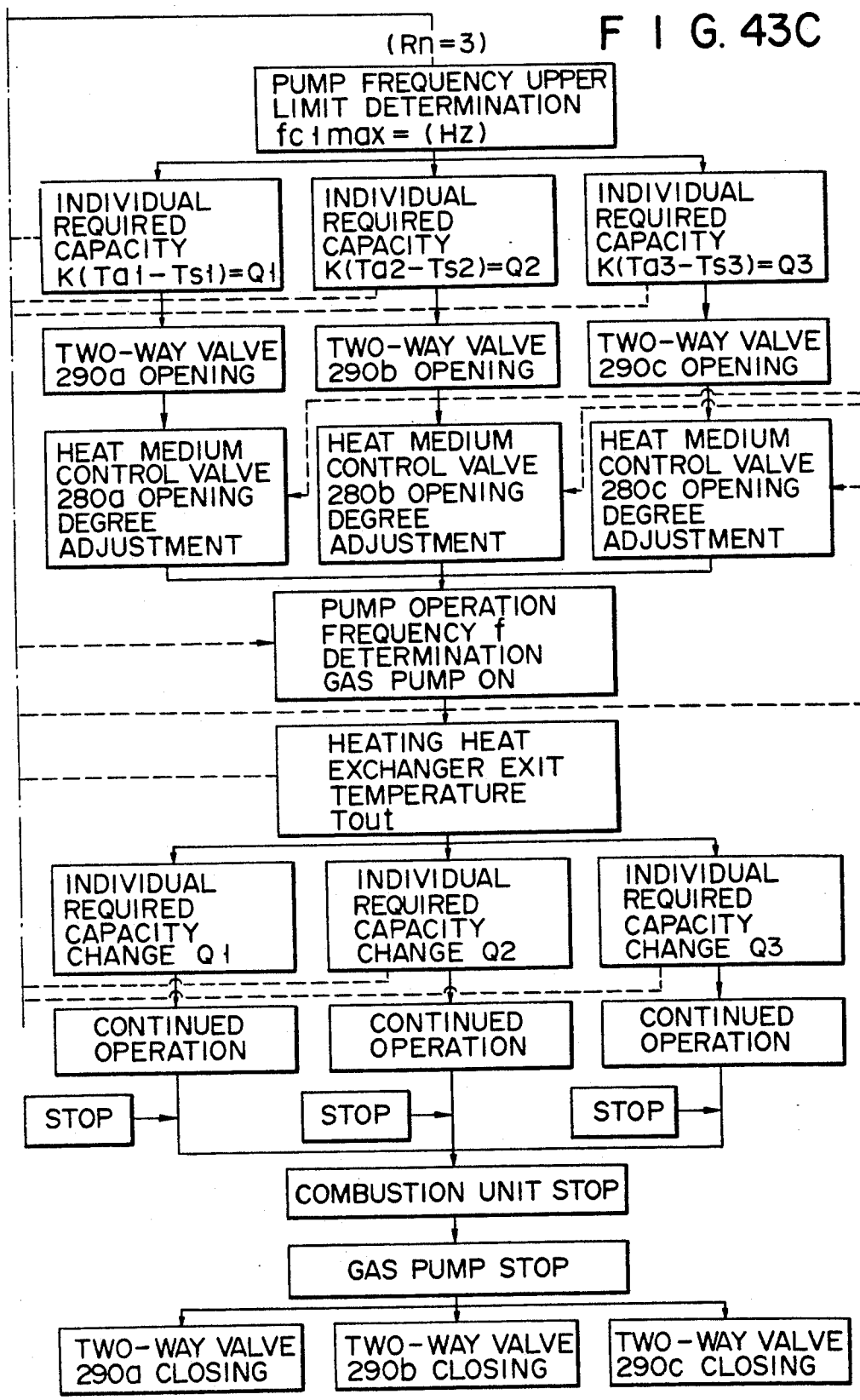
Figure 45:
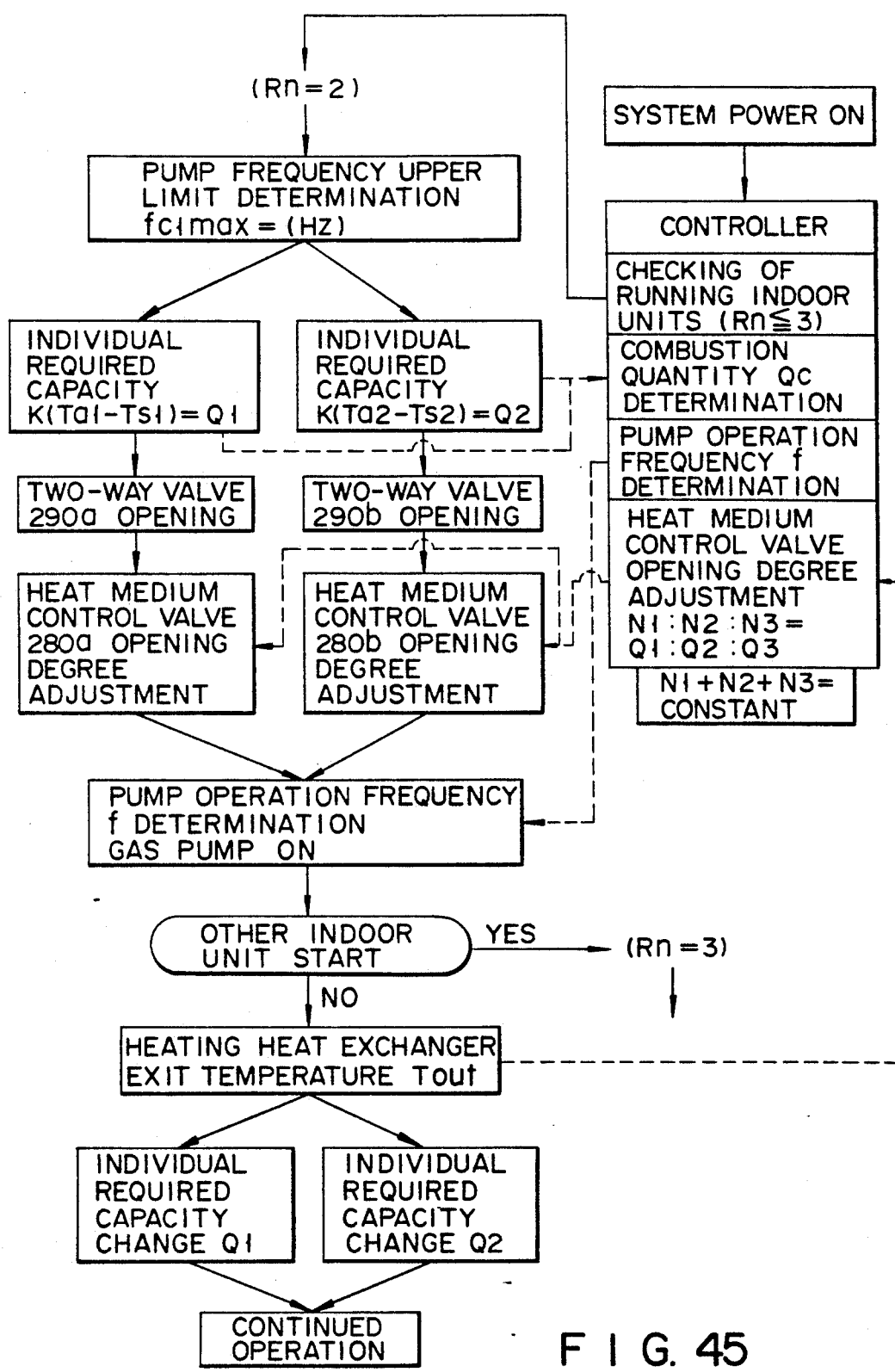
Figure 55:
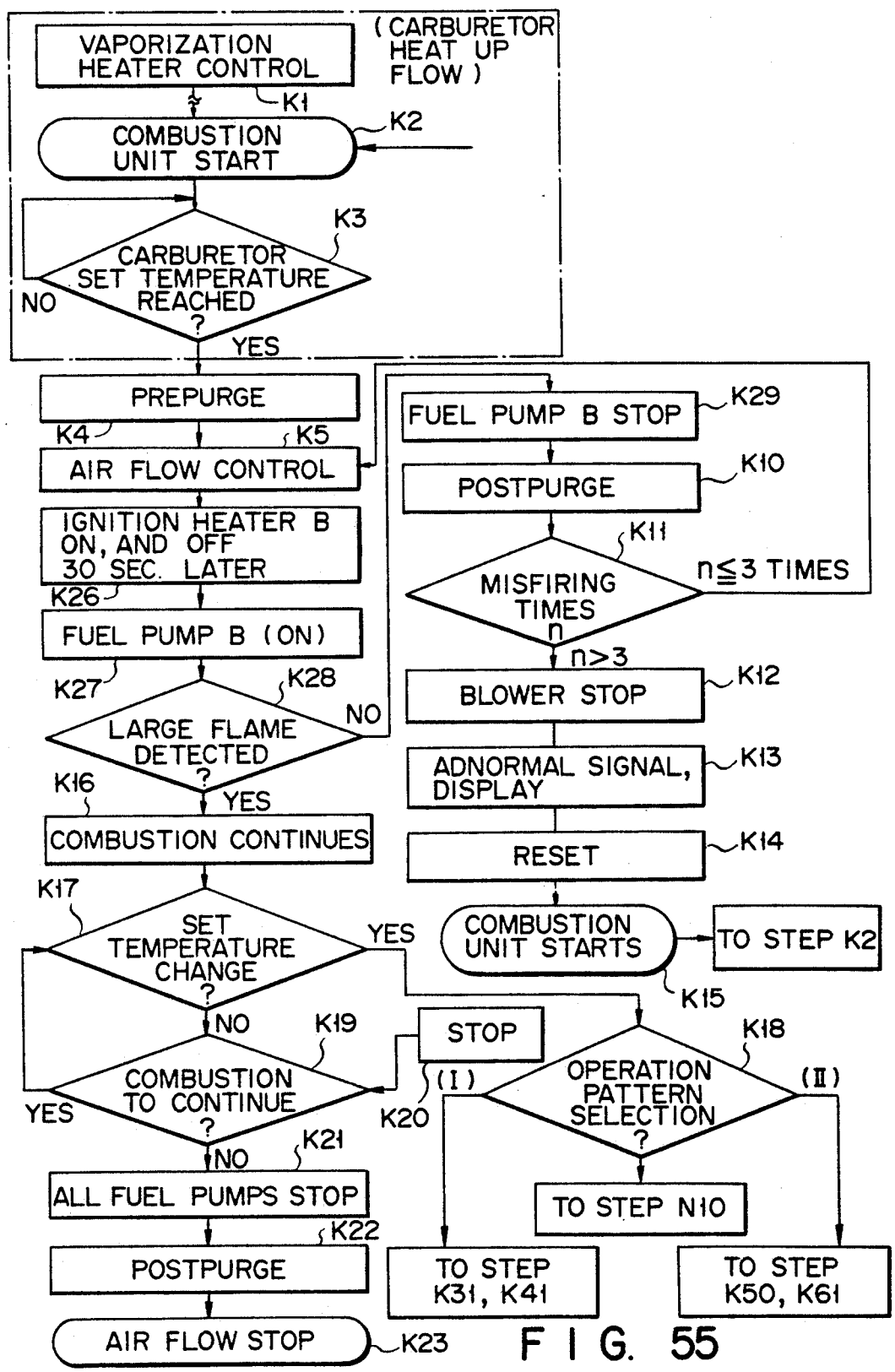
FIG. 55 is a control flow chart in the case of a single cylinder start of combustion unit.
Figure 56B:
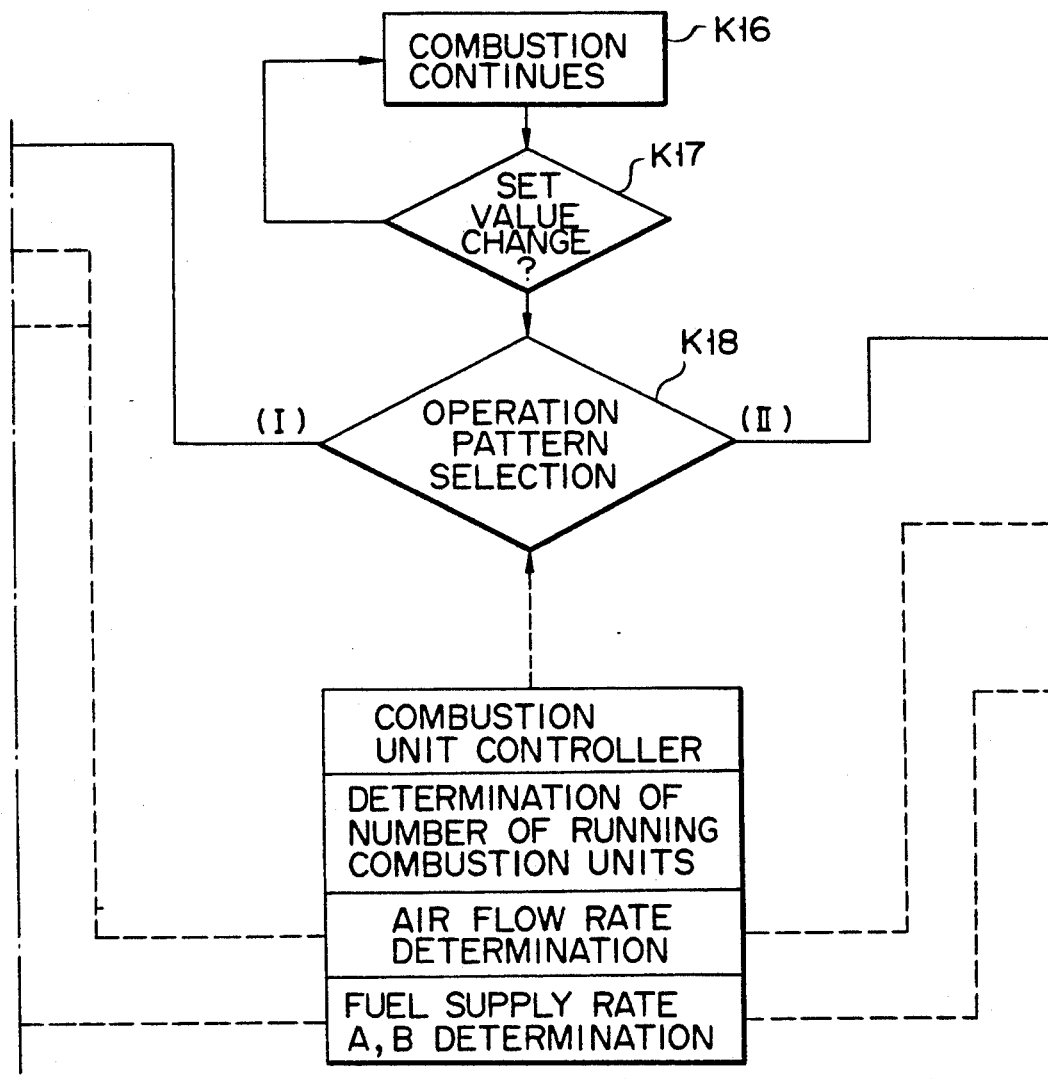
Figure 56C:
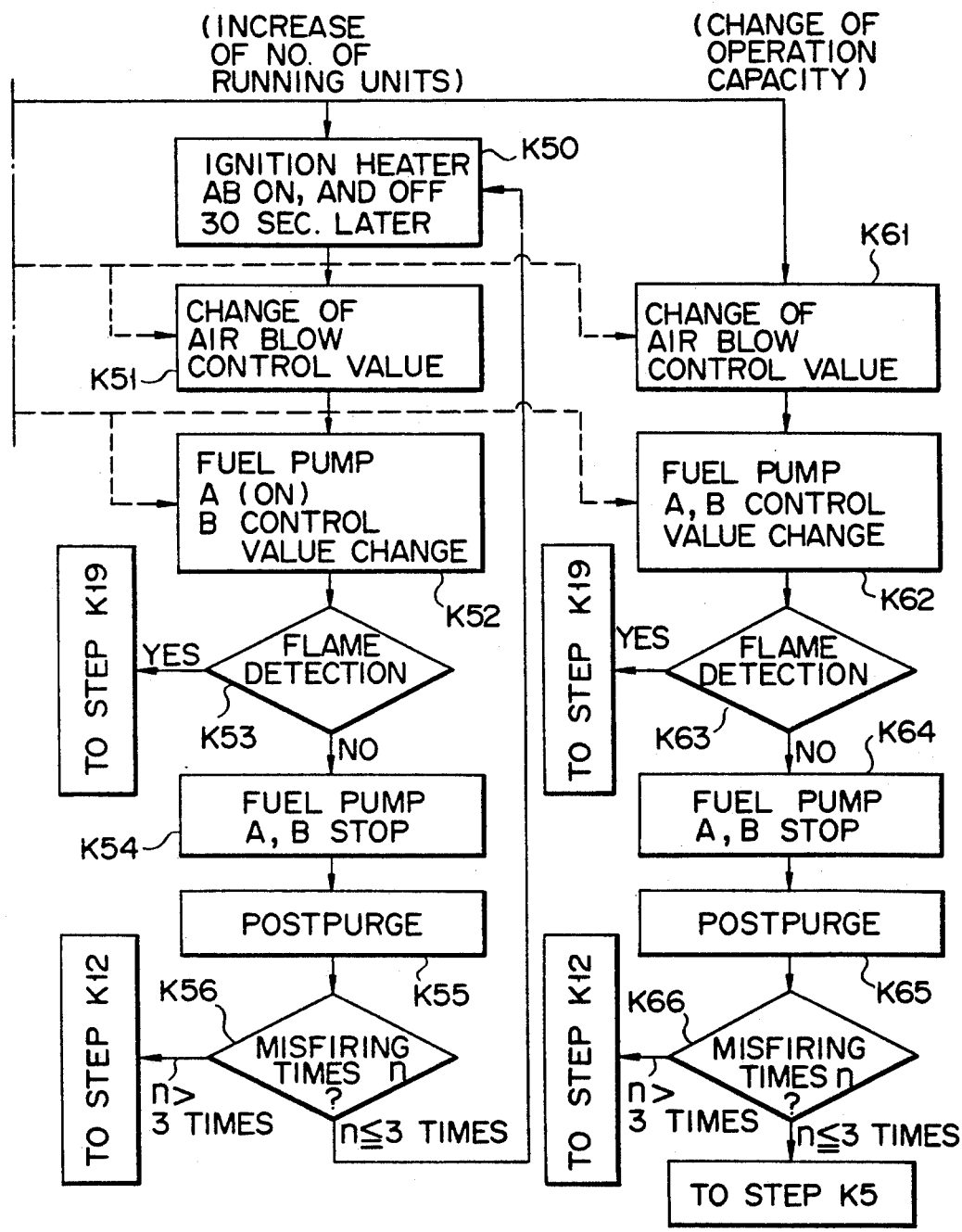

1. FIGS. 39A and 39B are to explain the basic operation of the system.
2. FIGS. 40A and 40B are to explain the functions of the outdoor unit controller 500.
3. FIGS. 41A and 41C are to explain the functions of the combustion unit controller 600.
4. FIG. 42 is to explain the relation of the indoor unit and outdoor unit controllers;
5. FIGS. 43A–43C to FIG. 51 are to explain the operation controls of the h eating cycle 150.
6. FIG. 52 and FIG. 53 are to explain the basic operation control of the combustion unit 222.
7. FIG. 54 is to explain the operation control in twin cylinder start of the combustion unit 222.
8. FIG. 55 is to explain the operation in single cylinder start of the combustion unit 222.
9. FIGS. 56A to 56C are to explain the operation control when changing operation patterns of the combustion unit 222.
10. FIG. 57 to FIG. 62 are to explain the other operation controls of the combustion unit 222.

[System basic operation]

First of all, the relation of individual controllers of the apparatus is described. In FIGS. 39A and 39B, at step A1, when the power source is turned on by a system power switch installed in any one of the indoor unit 100, the system of the outdoor unit controller 500 is reset at step A2. Here, in the case of quick start of the apparatus, the operation is transferred to step A3. On the other hand, at step B1, when the power source is turned on by the on/off switch 421 in the indoor radiator 100a, the system of the indoor unit controller 400 is reset at step B2. As a result of system resetting of this indoor unit controller 400, the outdoor unit controller 500 judges if the indoor radiators 100a to 100c are connected or not at step A4.

On the other hand, the indoor unit controller 400 sets the on/off timer by the timer switch 425 provided in the operation unit 420 of each indoor radiator 100 at step B3, and the operation of the indoor radiator 100 is started at step B4.

By this operation start, the outdoor unit controller 500 checks the number of indoor radiators 100 put in operation at step A4, and transmits the signal to the combustion unit controller 600 (step A6).

At step B5, from the room temperature information preset by the room temperature setting switch 422 in the indoor radiator 100, and the actual room temperature information measured by the room temperature sensor provided in the indoor radiator 100, the indoor unit controller 400 calculates the required heating capacity Qi of each indoor radiator 100, and sends this information to the outdoor unit controller 500. In consequence, the outdoor unit controller 500 determines the sum Qt of the required heating capacities Qi, and transmits this information to the combustion unit controller 600 (step A9).

The outdoor unit controller 500 determines the opening degree (distribution ratio) of each heating medium control valve 280 of the flow divider 270 at step A10, and successively determines the frequency of motor rotation of the gas pump 250 at step A11. At step A12, the outdoor unit controller 500 detects the temperature of the heating medium by the output from the temperature sensor 232 installed at the heating medium exit of the heat exchanger 230 for heating the heating medium of the heating medium heater 200.

At step A13, the outdoor unit controller 500 judges whether to continue or stop operation, and when continuing operation (NO), the operation returns to step A10 to go on operation. To stop operation here (YES), the outdoor controller 500 judges, at step A14, whether to stop due to abnormal action or not, and if stopping due to abnormality (YES), the operation advances to step A15. If not due to abnormality (NO), at step B5, from the stopping signal from the indoor unit controller 400 of the indoor radiator 100, the outdoor unit controller 500 judges stopping of operation at step A16, and sends a stop signal to the combustion unit controller 600 (step A17).

[Function of outdoor unit controller 500]

The function of the outdoor unit controller 500 is explained while referring to FIGS. 40A and 40B. When the system power is turned on (step A1), the system of the outdoor unit controller 500 is reset (step A2) as mentioned above, and the number of running units Rn of the indoor radiators 100 is checked from the information of the number of connected units (step B2) and the number of running units (step B4) of the indoor radiators from the indoor unit controller 400 (step A4).

On the basis of this information of number of running units Rn (step A5), the outdoor unit controller 500 determines the upper limit of the motor rotation frequency f of the gas pump 250 (step A7). Besides, the outdoor unit controller 500, by checking the number of running units Rn of the indoor radiators 100, urges to operate the heating medium control valve 280 of the flow divider 270, and transmits the information of the running units Rn to the combustion unit controller 600 (step A6). If there is any change in operation start, stop and room temperature preset value of the indoor radiators 100, such information is fed again into step A5.

The outdoor unit controller 500 determines the total required heating capacity Qt step A8) from the required heating capacity Qi (step A5) determined from the difference ΔTi of the set temperature Tsi of the indoor radiators 100 transmitted from the indoor unit controller 400 and the measured temperature Tai, and determines the combustion quantity Qc of the combustion unit 222 of the heating medium heater 220 from this total heating capacity Qt in equation (5), and transmits the information to the combustion unit controller 600 (step A9).

Furthermore, the outdoor unit controller 500 calculates the heating medium circulation amount G circulating in the cycle in equation (6) from the information (step A8) of the total heating capacity Qt, and determines the motor rotation frequency f of the gas pump 250 in equation (7) (step A11). This information is transmitted from the outdoor unit controller 500 to the inverter circuit 260 of the gas pump 250 (step A18).

The outdoor unit controller 600 determines the opening degree ratio Ni of each heating medium control valve 280 from the required heating capacity Qi (step B5) determined from the temperature difference Ti transmitted from each indoor unit controller 400 (step A10). This opening degree ratio Ni is equal to the ratio of the required heating capacity Qi of each indoor radiator 100 as shown in equation (10), and its sum is controlled at a specified value as far as the sum Qt of the required heating capacities Qi is not changed. The information of the opening degree ratio of the heating medium control valve 280 is transmitted from the outdoor unit controller 500 to each opening degree adjusting circuit 520 (step A19). The heating medium temperature at the exit of the heat exchanger 230 for heating the heating medium of the heating medium heater 220 is detected by the temperature sensor 232, and is used in the adjustment of superheat.

Furthermore, the outdoor unit controller 500 stops the apparatus (including stopping due to abnormality) by the temperature information signals from the temperature sensors 232 and 234 for detecting the heating medium temperature at the exit or in the middle of the heat exchanger 230 for heating the heating medium, or abnormality signal transmitted from the combustion unit controller 600 (step A20). In this stopping procedure, first the combustion unit 222 is stopped (step A21), and then the gas pump 250 is stopped (A22), and the two-way valve 290 is closed (step A23).

[Function of combustion unit controller 600]

The function of the combustion unit controller 600 is described below while referring to FIGS. 41A to 41C. The combustion unit controller 600 determines the number of running units of the combustion units 222 of the heating medium heater 220 from the information (step A6) of the number of running units Rn from the outdoor unit controller 500, and selects the operation pattern. That is, the combustion unit controller 600 selects the operation pattern [I] (step C1) when the number of running units Rn of the indoor radiators 100 is Rn=1, and the operation pattern [II] (step C6) when 1<Rn<3. The combustion unit controller 600, in the case of operation pattern [I] checks the combustion quantity Qc determined by the total heating capacity Qt at step C2, and operates either one (for example, 222a) of the combustion units 222a and 222b at step C3, and starts operation of the combustion unit 222 at step C4. In the case of operation pattern [II], the combustion unit controller 600 checks the combustion quantity Qc determined by the total heating capacity Qt at step C7, and when this combustion quantity Qc is more than the specified value (e.g. 2,000 kcal/h), the operation is transferred to step C3 to perform single cylinder operation of the combustion unit 222. The combustion unit controller 600, when the combustion quantity Qc is more than the specified value (e.g. 2,000 kcal/h), performs dual cylinder operation of the combustion unit 222 at step C8, and starts the operation of the combustion unit 222 at step C9.

Besides, the combustion unit controller 600, by the information of the number of running units Rn and required combustion quantity Qc, selects the operation pattern at step C10, and determines the air flow rate Va of the combustion air to be supplied into the combustion unit 222 at steps C11 and C12. The information of this air flow rate Va is transmitted to the drive circuit 620 of the air blow fan 224, and is used to control the air blow fan 224.

Likewise, the combustion unit controller 600 selects the operation pattern at step C13 depending on the information of the number of running units Rn and required combustion quantity Qc, and determines the fuel supply amounts Vfa and Vfb to be fed to the combustion unit 222 at step C14 and C15. This information of the fuel supply amounts Vfa and Vfb is transmitted to the inverter circuit 610 for driving the fuel pumps 226c and 226d, and is used for controlling the fuel pumps 226c and 226d.

The combustion unit controller 600 immediately stops the operation of the combustion unit 222 (step A21) when the combustion unit overheat preventive device or the like is actuated due to abnormal temperature rise of the heat exchanger 230 for heating the heating medium, flame detection by flame rod 222g, air blow detection by air blow switch, fuel shortage detection by level gauge, antiseismic automatic extinction by microswitch, fuse, thermo switch, and other detectors and safety devices, and the gas pump 250 is stopped (step A22), thereby closing the two-way valve 290 (step A23).

[Action timing of indoor unit controller 400 and outdoor unit controller 500]

The relation of the action timing of the indoor unit controller 400 and outdoor unit controller 500 is explained by referring to the operation timing chart in FIG. 42.

FIG. 42 is a schematic diagram showing the heating medium control valve 280, pump rotation frequency f of gas pump 250, and combustion quantity Qc of combustion unit 222 in terms of the changes of the required necessary heating capacity Qt, which is an indispensable sequence for filling the conditions of constant relation of the heating medium exit temperature of the heat exchanger 230 for heating the heating medium of the heating medium heater 220 and the superheat Δt at the exit of the heat exchanger 230.

By starting the operation of the indoor radiator 100, when the room temperature is set by the room temperature setting switch 422 disposed in the operation unit 420 of the indoor radiator 100, the necessary heating capacity Qi is determined by the indoor unit controller 400, and this information is transmitted to the outdoor unit controller 500. As a result, by this outdoor unit controller 500, the total required heating capacity Qt is determined (start). Slightly behind this start, the drive circuit 520 and inverter circuit 260 are controlled by the outdoor unit controller 500, and the operation of the heating medium control valve 280 and gas pump 250 is started. At this time, until the pressure in the cycle 150 is raised, the heating medium circulation amount G is not achieved at the motor rotating speed of the gas pump 250 depending on the combustion quantity Qc of the combustion unit 222 of the heating medium heater 220 (because of the characteristics of the heating medium). Accordingly, the combustion quantity Qc is gradually increased to approach the demanded combustion quantity, or the gas pump 250 is is operated at high speed for a preset time. In this example, the latter technique is applied, that is, the gas pump 250 is operated at high speed for a specified time when starting up the apparatus.

Further time t1 behind the start of operation of the heating medium control valve 280 and gas pump 250, a control signal is transmitted from the outdoor unit controller 500 to the combustion unit controller 600, and then the combustion is started. In a lapse of specified time after combustion is started, the pressure in the cycle goes up, and the heating medium circulation amount G becomes a stationary state suited to the motor rotating speed of the gas pump 250, so that the superheat Δt becomes small. Until this time, the motor of the gas pump 250 is rotated at high speed, and when the superheat Δt becomes small, the motor speed of the gas pump 250 is changed to a rotation suited to the combustion quantity Qc.

Thereafter, while monitoring the heating medium exit temperature Tout in the relation of Tout<Tmax by the temperature sensor 232 disposed at the exit of the heat exchanger 230 for heating the heating medium of the heating medium heater 220, the heating medium control valve 280 is finely adjusted by the opening degree adjusting circuit 520, by the signal from the outdoor unit controller 500 so that the superheat Δt may be constant (Δtmin<Δt<Δtmax).

Next, when the total required heating capacity Qt is increased, the operation becomes as follows. An increase signal of total required heating capacity Qt is transmitted from the indoor unit controller 400 to the outdoor unit controller 500, the drive circuit 520 and inverter circuit 260 are controlled by the outdoor unit controller 500, and the opening degree of the heating medium control valve 280 and the motor speed of the gas pump 250 are increased. Time t2 later, by the control signal transmitted from the outdoor unit controller 500 to the combustion unit controller 600, the fuel pumps 226c and 226d, and air blow fan 224 are controlled, and the combustion quantity Qc of the combustion unit 222 increases. Thereafter, the opening degree adjusting circuit 520 is controlled by the signal from the outdoor unit controller 500 so that the superheat Δt at the exit of the heat exchanger 230 for heating the heating medium may become as specified (Δtmin<Δt<Δtmax), and the heating medium control valve 280 is finely adjusted.

When the total required heating capacity Qt is decreased, on the other hand, the operation is as follows. A decrease signal of the total required heating capacity Qt is sent from the indoor unit controller 400 to the outdoor unit controller 500, and a control signal is transmitted at the same time from the outdoor unit controller 500 to the combustion unit controller 600, and the fuel pumps 226c and 226d, and air blow fan 224 are controlled by the combustion unit controller 600, thereby reducing the combustion quantity Qc of the combustion unit 222 to the value corresponding to the demanded capacity Qt. Afterwards, time t3 later, by the control signal from the outdoor unit controller 500, the opening degree of the heating medium control valve 280 and the motor speed of the gas pump 250 are reduced.

Thereafter, in order that the superheat Δt at the exit of the heat exchanger 230 for heating the heating medium may remain constant, the opening degree adjusting circuit 520 is controlled by the outdoor unit controller 500, and the heating medium control valve 280 is finely adjusted.

The case explained next is when the exit temperature of the heat exchanger 230 for heating the heating medium exceeds the maximum allowable temperature Tmax due to some cause. When the heating medium temperature Tout measured by the temperature sensor 232 disposed at the exit of the heating medium of the heat exchanger 230 becomes Tout>Tmax, a control signal is immediately set from the outdoor unit to the combustion unit controller 600, and the operation of the combustion unit 222 is stopped by this combustion unit controller 600. Then, time t4 later, by the outdoor unit controller 500, the gas pump 250 is stopped, and the heating medium control valve 280 is closed in succession.

In normal operation stopping, the operation stop signal is sent from the indoor unit controller 400 to the outdoor unit controller 500, while the control signal is transmitted from this outdoor unit controller 500 to the combustion unit controller 600 at the same time, and the operation of the combustion unit 222 is stopped by the combustion unit controller 600, and time t4 later, the operation of the gas pump 250 is stopped by the outdoor unit controller 500, thereby closing the heating medium control valve 280.

Thus, when stopping operation and when the total heating capacity Qt is decreased, first the combustion unit 222 is controlled, then the gas pump 250 and heating medium control valve 280 are controlled, or when starting the operation and when the total heating capacity Qt is increased, first the gas pump 250 and heating medium control valve 280 are controlled to allow to pass the heating medium, then the combustion unit 222 is controlled, and these controls are effected by the controllers 400, 500 and 600.

[Operation control of heating cycle 150]

Figure 46A:
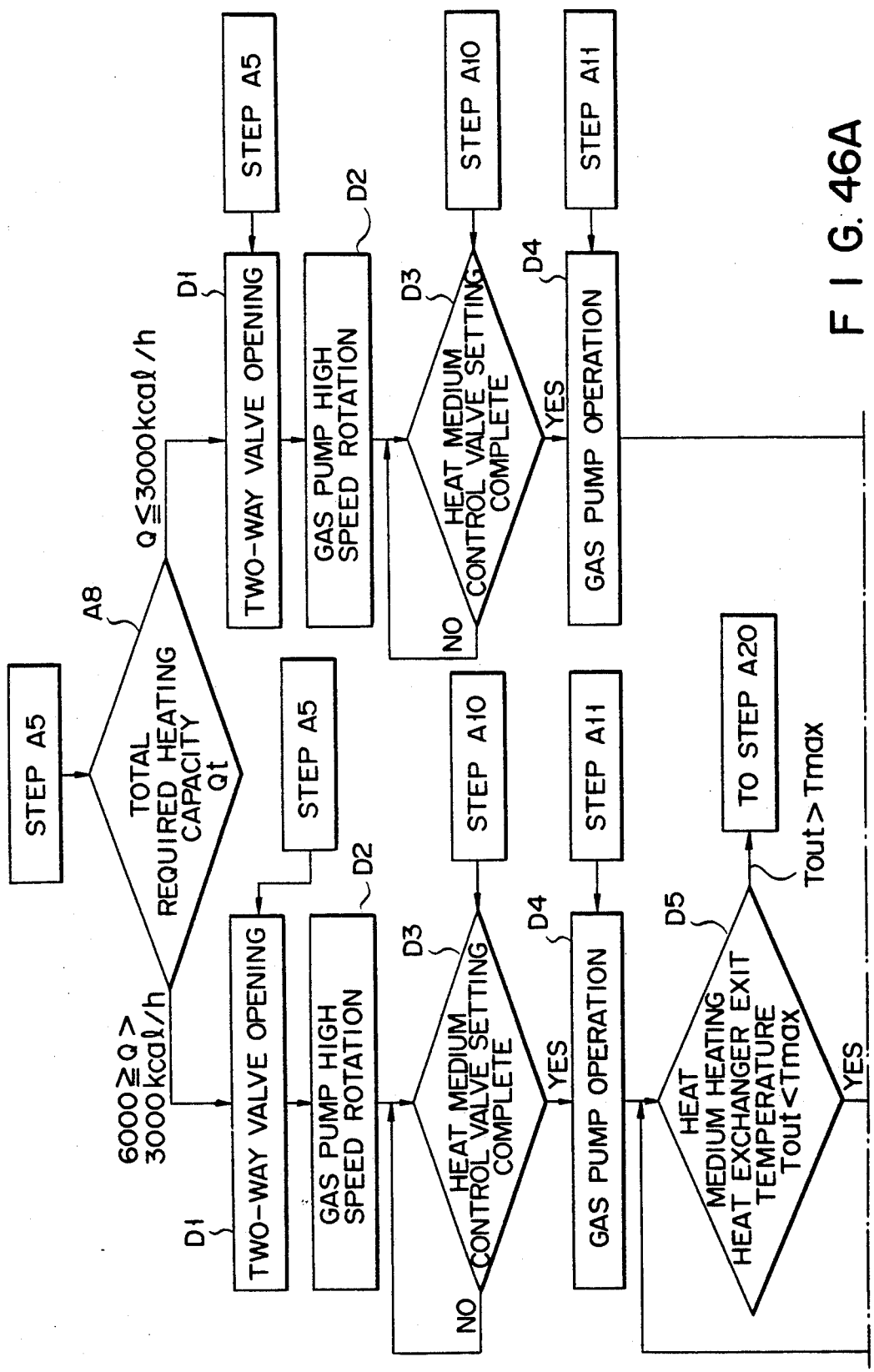
FIGS. 46A and 46B are standard operation control flow charts.
Figure 46B:
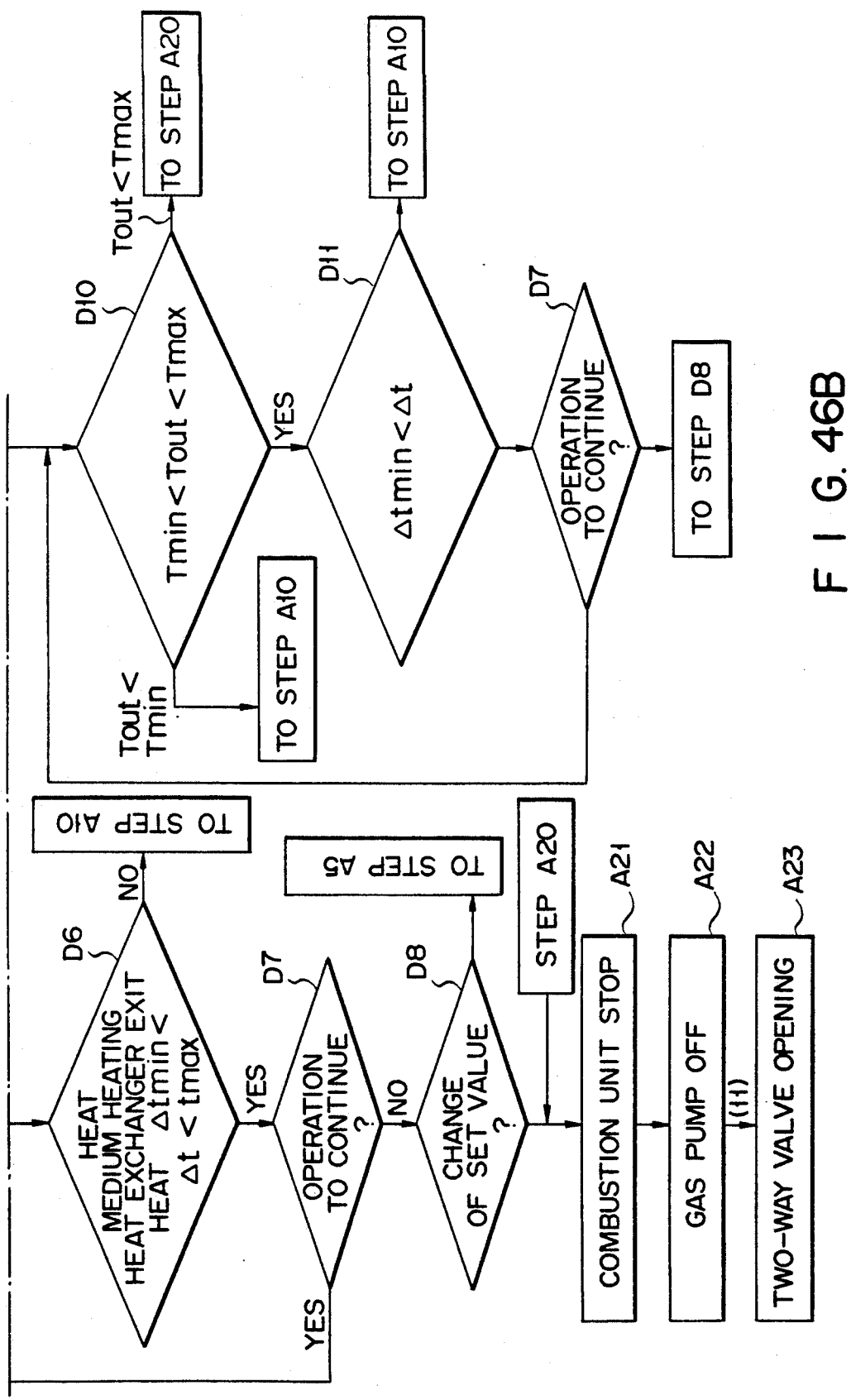

The operation control of heating cycle 150 is explained next. FIGS. 43A–43C to FIG. 45 are entire flow charts of this cycle. These diagrams show the entire control flows, and the flow charts in FIGS. 46A and 46B are mentioned in the following explanations. FIGS. 46A and 46B are control flow charts about standard operation of the heating cycle. First of all, the outdoor unit controller 500 selects the ordinary heating operation or low heating operation to start operation, depending on the required heating capacity Qt determined at step A8. More specifically, the standard operation control of the cycle is explained by dividing into two cases, when the total heating capacity Qt is in the ordinary heating operation region (for example, 6000 kcal/h≧Qt>3000 kcal/h), and when in low heating operation region (for example, Qt≦3000 kcal/h).

While the total heating capacity Qt is in the ordinary heating operation region (6000 kcal/h≦Qt<3000 kcal/h), the outdoor unit controller 500 receives an operation start signal from the indoor unit controller 400, and confirms the number of running units of the indoor radiators 100 (step A5), then the outdoor unit controller 500 controls the drive circuit 510 to open the two-way valve 290 corresponding to the running indoor radiator 100 (step D1). In succession, by controlling the inverter circuit 260 of the gas pump 250, the motor of the gas pump 250 is rotated at high speed (step D2). On the basis of the opening degree setting information (step A10) of the heating medium control valve 280, the opening degree of the heating medium control valve 280 is set (step D3), and when the opening degree setting of the heating medium control valve 280 is over (YES), the gas pump 250 is operated (D4) at the motor rotation frequency f (step A11) corresponding to the heating medium circulation amount G determined from the total heating capacity Qt. In this period, as mentioned above, the combustion unit 222 has started operation, and the heating medium exit temperature Tout of the heating medium heating heat exchanger 230 has been already raised. Measuring this temperature Tout by the temperature sensor 232, it is controlled so that this temperature Tout may be Tout<Tmax (step D5), and when becoming Tout<Tmax, the operation is stopped (step A20). In the case of Tout>Tmax, the outdoor unit controller 500 adjusts the heating medium control valve 280 so that the exit superheat Δt of the heat exchanger 230 may be constant (Δtmin<Δt<Δtmax) (step D6). The operation is continued in a constant state of this superheat Δt (step D7). Next, judging if the total heating capacity Qt is changed or not (step D8), and if changed (YES), returning to step A5, the change is recognized, and the operation from step D1 is repeated. If not changed (NO), the operation is continued as it is. By an operation stop command (step A20) by the outdoor unit controller 500, the combustion unit controller 600 stops the operation of the combustion unit 222 (step A21), and then the outdoor unit controller 500 stops the gas pump 250 (step A22), thereby closing the two-way valve 290 (step A23).

When the total heating capacity Qt is in the low heating operation region (Qt≦3000 kcal/h), same as mentioned above, the operation from step D1 to step D4 is effected. Consequently, the heating medium control valve 280 is controlled so that the heating medium exit temperature Tout of the heat exchanger 230 for heating the heating medium may be Tmin<Tout<Tmax (step D10). This is intended to control the exit temperature of the heat exchanger 230 over the minimum allowable temperature Tmin in order to prevent dew condensation in the heat absorbing chamber 350 in which the heat exchanger 230 of the heating medium heater 220 is disposed, because of low heating operation.

In this case, the superheat Δt may become Δt>Δtmax, but in this case the heating medium control valve 280 is not adjusted, and the operation is continued as far as the exit temperature of the heat exchanger 230 remains within the relation of Tout<Tmax (step D7). The control from step D8 is same as in the foregoing operation.

Described below is the operation control of the heating cycle for the optimum supply of heating medium. The heating medium in the cycle is charged in the amount suited to the operation of all indoor radiators 100 (three in this embodiment) connected to the system, and therefore, if all indoor radiators 100 of Rn=3 are running in the stage of checking the running units Rn from the indoor unit controller 400 by the outdoor unit controller 500, it is not necessary to adjust the quantity of heating medium. However, when the number of running units Rn is within 0<n<3, it is necessary to optimize the quantity of heating medium. Here, the control for the optimum supply of heating medium quantity is explained by dividing into ordinary heating operation and low heating operation as mentioned above.

FIG. 47 is a control flow chart of optimum supply of heating medium in ordinary heating operation. In the first place, from the information of the number of running units Rn of the indoor radiators 100 checked at step A5 by the outdoor unit controller 500, if the number of running units Rn is 3, the standard operation of the cycle mentioned above is effected (step A8 to step D5). If the number of running units Rn is within $0<Rn<3$, after step A3, step D1 to step D5 of the cycle standard operation above, the operation is divided in three controls at the stage (step D6) for detecting the superheat $\Delta t$ of the exit of the heat exchanger 230 for heating the heating medium.

Firstly, when the superheat $\Delta t$ is in a range of $\Delta tmin<\Delta t<\Delta tmax$, the ordinary heating operation is continued by returning to step D7 of the flow of cycle standard.

Secondly, when the superheat $\Delta t$ is in a range of $\Delta t>\Delta tmax$, in this case, feeding back to the outdoor unit controller 500, the opening degree of the heating medium control valve 280 is controlled by the outdoor unit 500 so that the superheat $\Delta t$ may be in a range of $\Delta tmin<\Delta t<\Delta tmax$, when the exit temperature Tout of the heat exchanger 230 for heating the heating medium is in a range of Tout$<$Tmax (step A10).

Thirdly, when the superheat $\Delta t$ is in a range of $\Delta t<\Delta tmin$, and in this case, too, same as in the second case, feeding back to the outdoor unit controller 500, the opening degree of the heating medium control valve 280 is adjusted so as to be in a range of $\Delta tmin<\Delta t<\Delta tmax$. However, if the heating medium amount is excessive, if the opening degree of the heating medium control valve 280 is continued to be adjusted, it hardly results in $\Delta t>\Delta tmin$. Accordingly, counting the number of feedback times Bn (step D12), when the counting becomes Bn=3, the two-way valve 290 corresponding to the indoor radiator 100 at rest is opened by the outdoor unit controller 500 (step D13), and the heating medium control valve 280 corresponding to the indoor radiator 100 at rest is slightly opened (step D14). Until the superheat $\Delta t$ at the exit of the heat exchanger 230 for heating the heat medium becomes $\Delta t>\Delta tmin$ (step D15), the heating medium control valve 289 remains slightly open. Afterwards, when the superheat $\Delta t$ becomes $\Delta t>\Delta tmin$, the two-way valve 290 and heating medium control valve 280 are closed (step D16 and step D17), and excessive heating medium is collected in the indoor radiator 100 at rest so as to optimize the heating medium quantity. Consequently, feeding back to the outdoor unit controller 500, the heating medium control valve 280 is adjusted until the superheat $\Delta t$ at the exit of the heat exchanger 230 for heating the heat exchanger becomes $\Delta tmin<\Delta t<\Delta tmax$.

The timing control for opening the two-way valve 290 and the heating medium control valve 280 corresponding to the indoor radiator 100 at rest is effected by counting the feedback times Bn. This is, however, not limitative, and for example, by setting the time, it may be also possible to employ a technique for opening the two-way valve 290 and heating medium control valve 280 by this time.

Figure 48:
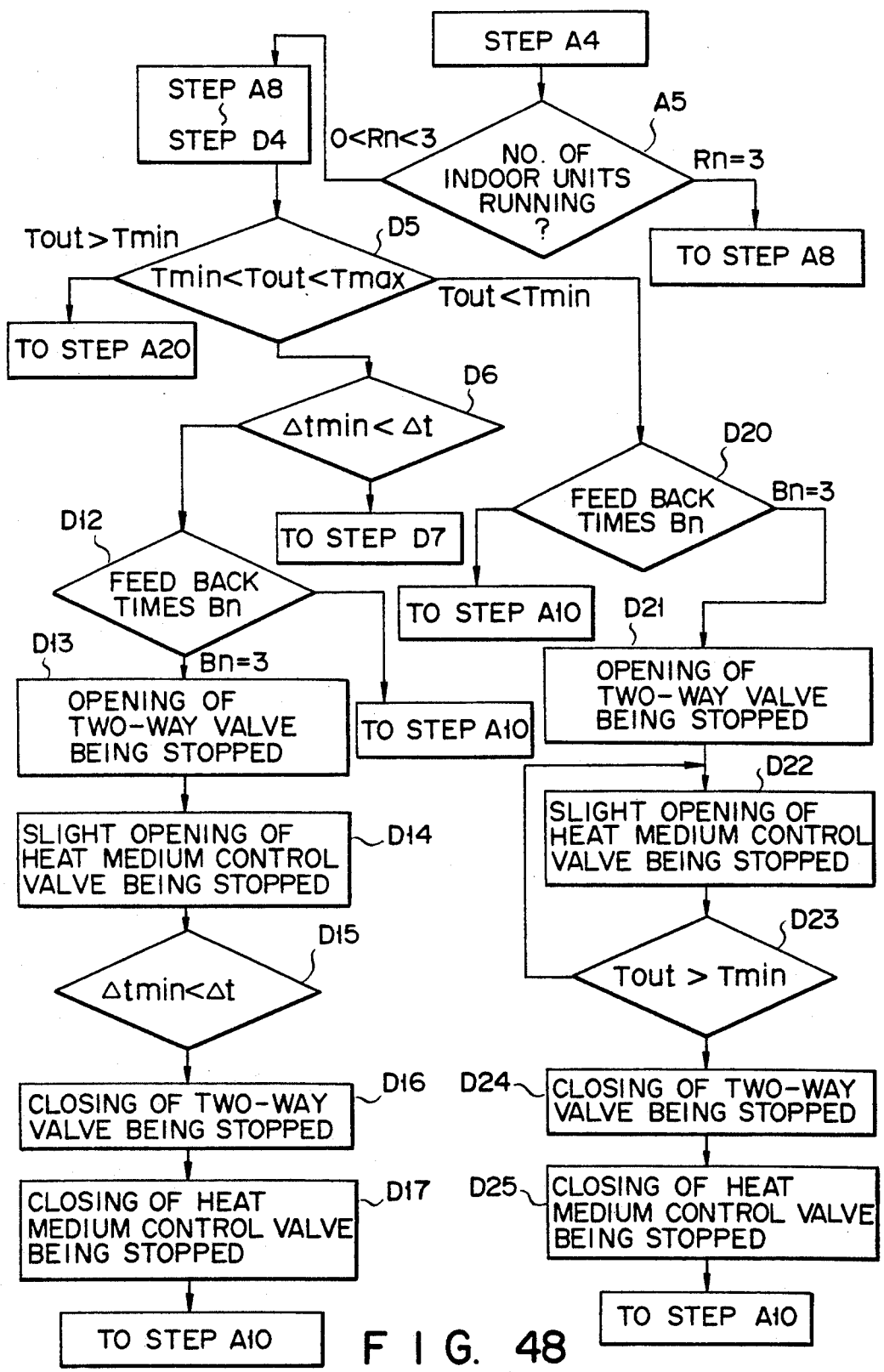
FIG. 48 is a heating medium optimum supply control flow chart in low heating operation.

FIG. 48 is a flow chart of heating medium optimum supply control in low heating operation. First, the outdoor unit controller 500 controls the standard operation of the cycle when the number of running units is Rn=3 from the information of the running units Rn of the indoor radiators 100 check at step A5 by the outdoor unit controller 500 (step A8 to step A23). Besides, when the number of running units Rn is in a range of $0<Rn<3$, it is necessary to optimize the heating medium quantity.

In this case, after performing from step A8, step D1 of the cycle standard operation above to step D4, the control is divided in three manners at the stage (step D5) of detecting the exit temperature of the heat exchanger 230 of the heating medium heater 220 in order to prevent dew condensation in the heat absorbing chamber 350 of the heating medium heater 220, and then the control is divided in two manners at the stage (step D6) of detecting the exit superheat $\Delta t$ of the heat exchanger 230.

Firstly, when the exit temperature Tout of the heat exchanger 230 is in a range of Tout$<$Tmin, the heating medium control valve 280 is adjusted by the outdoor unit controller 500 so that the exit temperature Tout may be in a range of Tmin$<$Tout$<$Tmax. It is, however, difficult to achieve if the quantity of the heating medium is much. Accordingly, counting the feedback times Bn (step D20), when reading the counting Bn=3, the outdoor unit controller 500 opens the two-way valve 290 corresponding to the indoor radiator 100 100 at rest (step D21), and the heating medium control valve 280 corresponding to the indoor radiator 100 at rest is slightly opened (step D22). Until the exit temperature Tout becomes Tout$<$Tmin, the heating medium control valve 280 is kept open slightly (step D23). Afterwards, when the exit temperature becomes Tout$<$Tmin, the two-way valve 290 and heating medium control valve 280 are closed (step D24 and step D25), and excess heating medium is entrapped in the indoor radiator 100 at rest to optimize the heating medium volume. Feeding back to the outdoor unit controller 500, the heating medium control valve 280 is adjusted so that the exit temperature Tout of the heat exchanger 230 may be Tmin$<$Tout$<$Tmax.

Secondly, when the exit temperature Tout of the heat exchanger 230 for heating the heating medium is in a range of Tmin$<$Tout$<$Tmax, the exit superheat $\Delta t$ is detected, and if this superheat $\Delta t$ is in a range of $\Delta t>\Delta tmin$, the operation returns to the cycle standard flow step D7, and ordinary heating operation is continued. Or when the superheat $\Delta t$ is in a range of $\Delta t<\Delta tmin$, the third control of the heating medium optimum supply control of the ordinary operation mentioned above is effected (step D12 to step D17).

Thirdly, when the exit temperature Tout of the heat exchanger 230 is in a range of Tout$>$Tmax, feeding back to the outdoor unit controller 500, the operation is stopped immediately (step A20).

Explained next is the control of weighting of the opening degree of the heating medium control valve 280.

FIG. 49 is a control flow chart relating to the weighting of the opening degree of the heating medium control valve.

As mentioned earlier, when installing, if there is a level difference in the indoor radiators 100, when the conventional heating medium distribution control is directly applied, in the indoor radiator 100 installed at a lower position than the outdoor unit 200, the heating medium, after releasing heat, is overcooled and collected in the outlet piping to work as resistance, thereby disturbing the flow of the heating medium.

On the other hand, the heating medium releasing heat in the indoor radiator 100 installed at a higher position, the conduit resistance is small and the heating medium flows easily when returning to the outdoor unit 200 because of the help of the gravity. When a same heating capacity is required, at a same opening degree of the heating medium control valve 280, appropriate heating medium may not be supplied to the required heating capacity.

Accordingly, by installing a DIP switch 530 corresponding to each indoor radiator 100 in the outdoor unit 200 to set the level difference, that is, by setting the heating medium control valve 280 corresponding to the indoor radiator 100 installed at a high position at the closing side, and the heating medium control valve 280 corresponding to the indoor radiator 100 installed at a low position at the opening side, the heating medium may be supplied appropriately in the running condition of the basic operation flow.

In other words, when installing, it is judged if the DIP switch 530 installed in the outdoor unit 200 must be set or not (step E1), and if not necessary to set (NO), the operation is carried out at the opening degree ratio Ni of the heating medium control valve 280 corresponding to the required heating capacity Qi of the ordinary indoor radiators 100 (step E2). If necessary to set (YES), setting the DIP switch 530, the opening degree of the heating medium control valve 280 is weighted (step E3), and the initial value of the opening degree of the heating medium control valve 280 is determined (step E4). An example of DIP switch 530 is shown in FIG. 50. In the diagram, the indoor radiators 100a, 100b and 100c correspond to DIP switches d1 sw, d2 sw and d3 sw. In this example, the indoor radiator 100a is installed at the same height as the outdoor unit 200, and the indoor radiators 100b and 100c, at higher positions than the outdoor unit 200. Here, the DIP switch d1 sw is not set, and the DIP switches d2 sw and d3 sw are set at +1. By thus setting, the distribution ratio of the heating medium to be supplied to each indoor radiator 100 may be corrected, and regardless of the installation height of the indoor radiator 100, it is possible to supply the heat suited to the required heating capacity in every indoor radiator 100.

This setting method is only one example, and there are other setting techniques. For example, by one DIP switch, both the level difference and piping distance of the indoor radiators 100 may be set.

Figure 51:
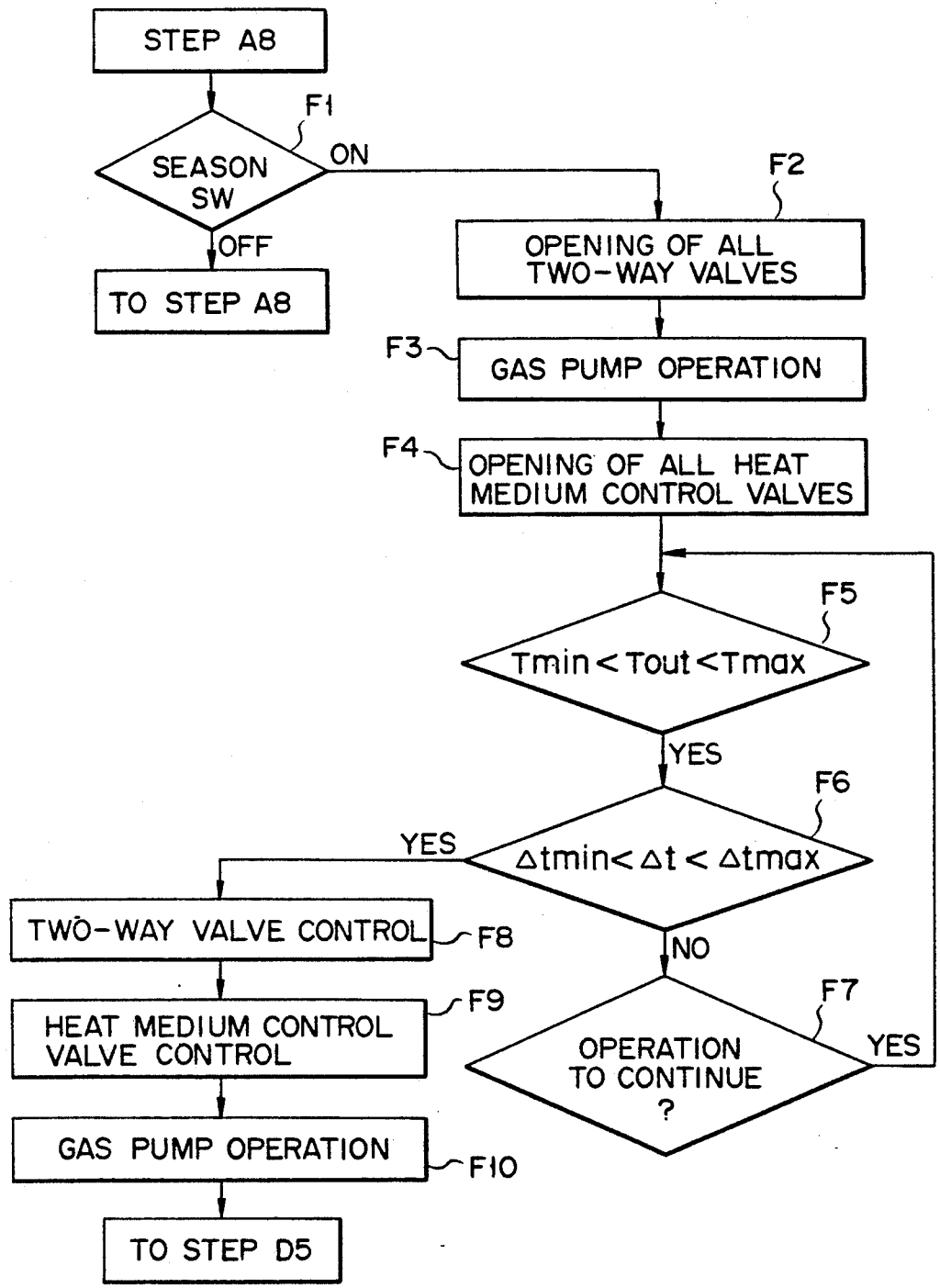
FIG. 51 is a control flow chart of heating medium recovery operation.

Incidentally, the operation control for recovering the heating medium collected in the parts of the heating cycle 150 in off season is as follows. FIG. 51 is a control flow chart of the heating recovery operation.

In this case, the season switch is provided in a specific indoor radiator 100 or in all indoor radiators 100, and by turning on this switch, the heating recovery is recovered before getting into ordinary operation process. The heating medium recovery operation is to recover the stagnant heating medium by feeding heating medium vapor into all indoor radiators 100 whether they are stopped or not. This operation is explained below.

When the season switch is turned on (step F1), all two-way valves 290 of the flow divider 270 are opened (step F2) by the outdoor unit controller 500, and the gas pump 250 rotates at a predetermined motor speed (step F3). Nearly at the same time, all heating medium control valves 280 of the flow divider 270 are opened to a specified angle, and the same opening degree is maintained (step F4). Then, as mentioned above, since the combustion unit 222 has started operation time t1 later, the heating medium exit temperature Tout of the heat exchanger 230 for heating the heating medium of the heating medium heater 220 goes up. Measuring the exit temperature Tout of the heat exchanger 230 by the temperature sensor 232, monitoring the exit temperature Tout (Tout<Tmax) (step F5), and feeding back to the outdoor unit controller 500, the heating medium control valve 280 is controlled (step F7) by the outdoor unit controller 500 so that the exit superheat $\Delta t$ of the heat exchanger 230 for heating the heating medium may be in a range of $\Delta tmin < \Delta t < \Delta tmax$ (step F6) while the exit temperature Tout may be in a range of Tmin<Tout<Tmax. When the superheat $\Delta t$ becomes in a range of $\Delta tmin < \Delta t < \Delta tmax$ (YES), a control signal is sent out from the outdoor unit controller 500 to the combustion unit controller 600, and the fuel pumps 226c and 226d and air blow fan 224 are controlled so as to operate the combustion unit 222 at the combustion quantity Qc corresponding to the total required heating capacity Qt by this combustion unit controller 600, and in the case of the indoor radiator 100 not in operation, the outdoor unit controller 500 closes the two-way valve 290 and heating medium control valve 280 corresponding to the indoor radiator 100 at rest, thereby adjusting the heating medium control valve 280 corresponding to the indoor radiator 100 in operation to the opening degree suited to the ratio of the required heating capacity Qi (step F8 and step F9). In consequence, the outdoor unit controller 500 controls the motor speed of the gas pump 250 to the rotating speed corresponding to the circulation amount G corresponding to the total required heating capacity Qt, thereby transferring to the standard operation.

[Basic operation control of combustion unit 222]

The operation control of the combustion unit 222 of the heating medium heater 220 is described below. For the combustion units 222 of the heating medium heater 220 used in this embodiment, two combustion units 222a and 222b of the same capacity (twin cylinder type) are used. The fuel is separately supplied into individual combustion units 222a and 222b to be fired, and the minimum combustion capacity is the minimum value of one combustion unit, and the maximum combustion capacity is the sum of the maximum values of two combustion units, so that the combustion width may be very broad.

FIG. 52A is a diagram showing the operation pattern of the twin cylinder type combustion units 222, in which numerals 1 to 6 of operation pattern [I] show the relations of the number of running units Rn of the indoor radiators 100, upper limit of combustion amount Qmax, combustion quantity, and number of running units of combustion units 222, and numerals 1 and 2 of operation pattern [II] indicate the vertical relation of operating two combustion units 222. The upper limit value Qmax and combustion amount Qc shown in the diagram are only to represent an example.

As shown in FIG. 52A, if only one indoor radiator 100 is used, one combustion unit 222 is put in operation, or even if two or three indoor radiators 100 are used, as far as the required combustion quantity Qc is less than 2,000 kcal/h, only one combustion unit 222 is put in operation. When two or three indoor radiators 100 are used and the required combustion quantity Qc is 2,000 kcal/h or more, two combustion units 222 are put inoperation. Or by on/off operation of the combustion unit 222, it is also possible to operate at the combustion quantity of less than 600 kcal/h. As mentioned above, when operating only one indoor radiator 100, it is not particularly necessary to use two combustion units 222, and the operation is enough with one combustion unit 222 up to the maximum combustion quantity of Qc of 2000 kcal/h. This is because, considering the scene of life of users, it seems that only one room is heated most frequently, and mainly the living room gathered by the family is mainly heated and the bed room or nursery room is used occasionally as required.

The basic operation control of the combustion unit 222 is explained below. FIG. 53 is a flow chart showing the control of basic operation of the combustion unit. The basic points of operation of the combustion unit 222 are ignition action and extinction action. As the condition for realizing start of combustion unit 222 of quick control performance, it may be considered to heat up the carburetors 226e and 226f of the combustion unit (energization to vaporization heater 226j). This heatup of the carburetors 226e and 226f is realized by the quick start system for energizing and controlling simultaneously with feed of the system power, and the energy-saving system for energizing and controlling simultaneously with start of operation of indoor unit, and their details are described later.

In basic control of the combustion unit 222, by the operation start signal of the combustion unit 222 from the combustion unit controller 600, when the combustion unit 222 is started (step S10), the vaporization heater 226j of the carburetors 226e and 226f is controlled (step S11) to start prepurge (step S12). After prepurge, the air blow fan 224 for blowing the combustion air is controlled to set to the air blow corresponding to the required combustion quantity Qc (step S13). In consequence, the ignition heater (ceramic heater 222f) is started with time limit (step S14), then fuel supply by fuel pumps 226c, 226d is started (step S15). Succeedingly, the flame is detected by the flame rod 222g (step S16). When this flame is detected, combustion continues (step S17). When a combustion stop is commanded from the combustion unit controller 600 (step S18), first the fuel pumps 226c, 226d are stopped (step S19), and postpurging is effected (step S20), and the air blow fan 224 is stopped (step S21), thereby stopping combustion. When the system power source is cut off (step S22), energization to the vaporization heater 226j is stopped (step S23). This is the control action of the basic operation of the combustion unit 222.

In the following case explained, the operation of the combustion unit 222 is started by two combustion units 222a and 222b. Operation of two combustion units 222 is started when two or three indoor radiators 100 are put in operation as shown in FIG. 52A, and moreover when the required combustion quantity is in a range of 2000 kcal/h $< QC \leq 6000$ kcal/h. FIG. 54 shows a control flow chart when starting with two combustion units 222. The range enclosed by single dot chain line in the diagram is the control of the carburetors 226e and 226f mentioned below, which shows a control flow chart of quick start. In this case, when the system power source in the outdoor unit 200 is turned on, it begins to feed power to the vaporization heater 226j of the carburetors 226e and 226f (step K1). When a command for start of operation of combustion unit 222 is transmitted from the outdoor unit controller 500 to the combustion unit controller 600, the number of running units of the combustion unit 222 is determined by this combustion unit controller 600, thereby starting operation of the combustion unit 222 (step K2). It is judged here whether the carburetor temperature has reached the preset temperature or not by the carburetor temperature detected by the temperature sensor 226c (step K3), and if not reaching (NO), energization to the vaporization heater 226j is continued. When reaching (YES), prepurging is effected (step K4). After prepurging, the combustion unit controller 600 controls the drive circuit 620 of the air blow fan 226 to feed combustion air into the combustion unit 222, thereby controlling to the air blow rate corresponding to the required combustion quantity Qc (step K5). Next, energization to the ignition heaters (ceramic heaters 222f) A and B of the individual combustion units 222 is started with a time limit (in this example, 30 seconds) (step K6). Waiting until the temperature of the ignition heater becomes stationary temperature, the inverter circuit 610 of the fuel pumps (pumps 226c and 226d) A and B for feeding fuel to the carburetors of the combustion units 222 is controlled by the combustion unit controller 600, and the operation of the fuel pumps A and B is started so as to supply the fuel corresponding to the required combustion quantity Qc to the carburetors of the combustion unit 222 (step K7). The fuel sent to the carburetors 226e and 226f is gasified, and ejected from the fuel nozzle 226k, and mixed with combustion air. As a result, a flame ignited by ignition heaters A and B is formed. This flame is detected by the flame rod 222g (step K8). Here, if flame is not detected (NO) in both or one of two combustion units 222, both fuel pumps A and B are stopped by the combustion unit controller 600 (step K9) to perform postpurging (step K10). Counting the misfiring times n (step K11), when n is 3 times or less, feeding back to the air blow control (step K5), the ignition action is repeated. When the misfiring times n becomes n>3, the combustion unit controller 600 stops the air blow fan 224 (step K12), and failure signal is sent to the outdoor unit controller 500 and indoor unit controller 400, and its message is shown in the display unit 410 of the indoor radiator 100 (step K13). Afterwards, the apparatus is reset (step K14), thereby waiting again for operation start of combustion unit (step K15).

At the time of detection of flame (step K8), when the flame is detected in both of two combustion units 222 (YES), combustion operation continues (step K16). Later, checking the number of running units of indoor radiator 100 and changes of total heating capacity Qt (change of set value) (step K17), and if there is any change (YES), the operation pattern is selected at step K18 so as to operate according to the changed total required heating capacity Qt.

Details are given later.

If there is no change of set value (NO), the combustion operation continues (step K19), and a combustion stop signal is transmitted from the outdoor unit controller 500 to the combustion unit controller 600 (step K20), and the combustion unit controller 600 stops the fuel pumps A and B (step K21) to perform postpurging (step K22), and the air blow fan 224 is stopped (step K23).

[Operation control upon single cylinder start of combustion unit 222]

In the next case, the operation of the combustion unit 222 is started by one combustion unit (for example, 222a). The combustion unit 222 is started by one unit when, as shown in FIG. 52A, only one indoor radiator 100 is used (the required combustion quantity Qc is in a range of 600 kcal/h $\leq$ Qc $<$ 3000 kcal/h) or when the required combustion quantity Qc is in a range of 600 kcal/h≦Qc<2000 kcal/h if two or more units are used.

FIG. 55 shows a control flow chart when starting with one combustion unit 222. In this case, from step K1 to step K5, the same control as in two-unit start is carried out. The draft control at step K5 requires a double draft at the same required combustion quantity Qc as compared with the two-unit start above. Next, one of the ignition heaters (ignition heater B in this example) of the combustion unit 222 is energized with a time limit (step K26). Waiting until the temperature of the ignition heater B reaches a stationary temperature, the combustion unit controller 600 controls the inverter circuit 610 of the fuel pump B to feed fuel to the carburetor 226e of the combustion unit 222, and starts operation of the fuel pump B so as to supply the fuel corresponding to the required combustion quantity Qc to the carburetor 226e (step K27). The fuel sent to the carburetor 226e is gasified and ejected from the fuel nozzle 226k, and mixed with combustion air in the mixing chamber 222d, and ignited by the ignition heater A at the flame hole 222e, thereby forming a flame. This flame is detected by the flame rod 222g (step K28). Here, if the flame is not detected in the combustion unit 222 (NO), the fuel pump B is stopped by the combustion unit controller 600 (step K29), and the same operation as mentioned above (step K10 to step K15) is carried out.

When the flame is detected in the combustion unit 222 at the time of flame detection (step K28) (YES), the same operation as in two-unit start (step K16 to step K23) is carried out.

[Control when changing operation pattern of combustion unit 222]

This is to explain the case of changing the operation pattern by increasing or decreasing the number of running units of the indoor radiators 100 and increasing or decreasing the required combustion quantity Qc after continuing operation by starting operation with one or two combustion units 222. FIGS. 56A to 56C show control flow charts for changing the operation pattern of combustion units 222.

First is shown a case of operating with one combustion unit 222 after changing the set value. This operation is effected when starting up the combustion, and if one indoor radiator 100 is put in operation, as far as the combustion quantity is within a range of 600 kcal/h≦Qc<3000 kcal/h, the operation continuous with one unit regardless of change of the required combustion quantity Qc. When two or three indoor radiators 100 are put in operation, only one combustion unit 222 is working as far as the combustion quantity Qc is in a relation of Qc<2000 kcal/h.

At step K17, if change of set value is requested (YES), the operation pattern is selected at step K18, and the combustion unit controller 600 controls the air blow fan 224 so as to obtain a draft to the combustion unit 222 suited to the requested combustion quantity Qc after change (step K31). Likewise, the combustion unit controller 600 controls the fuel pump B so that the fuel supply to the combustion unit 222 may be the fuel flow rate suited to the required combustion quantity Qc (step K32). The changing timing of the fuel supply and draft is usually the fuel supply is changed first, and then the draft is changed. It is assumed here that they are changed almost simultaneously. In other words, it is the general practice to vary the one inferior in controllability in the first place.

After changing the draft and fuel supply, the flame is detected by the flame rod 222g (step K33). When the flame is detected (YES), returning to step K19 of starting with one unit, combustion is continued. When the flame detection is interrupted (NO), it is regarded as misfiring, and the fuel pump B is stopped immediately by the combustion unit controller 600 (step K34). Afterwards, by the combustion unit controller 600, energization to the ignition heater B is started (step K35), and the fuel pump B is started again (step K36), thereby entering in ignition action. Here, again, the flame is detected by the flame rod 222g (step K37), and when detected (YES), combustion operation continues by returning to step K19. If flame is not detected (NO), it is a misfiring, and the fuel pump B is stopped immediately by the combustion unit controller (step K38). Then, by performing postpurging, the number of times of misfiring n is counted (steps K39 and K40). If the number of times of misfiring is n=3, ignition action at step K35 is repeated. If the misfirings are n<3, it is regarded as abnormality, and the operation is stopped by returning to step K12.

After changing the set value, the number of running units of the combustion unit 222 is changed from two to one, in the following case explained. This operation is effected when starting operation with two or three indoor radiators 1000, burning by setting the combustion quantity Qc in a range of Qc≧2000 kcal/h, and the set value is changed to the combustion quantity Qc of Qc<2000 kcal/h or one unit of indoor radiator 100.

If change of setting is requests at step K17 (YES), the operation pattern is selected at step K18, and the combustion unit controller 600 controls the air blow fan 224 so as to adjust to the draft to the combustion unit 222 suited to the requested combustion quantity Qc after change (step K41). Similarly, the combustion unit controller 600 stops the fuel pump A, and controls the fuel pump B so that the fuel supply may be the fuel flow suited to the requested combustion quantity Qc after change (step K42). The timing of changing the draft and fuel supply is same as mentioned above.

After change of draft and fuel supply, the flame is detected by the flame rod 222g (step K43). When the flame is detected here (YES), returning to step K19 of starting with one unit, the combustion operation continues. If not detected (NO), it is regarded as a misfiring, and the operation from step K34 to step K40 is repeated.

In the next case explained, after changing the set value, the number of running units of combustion units 222 is changed from one to two. This operation is effected when starting combustion operation by one indoor radiator 100, followed by operation of other indoor radiator 100 to run two or three units, and the required combustion quantity Qc becomes in a range of Qc≧2000 kcal/h, or when two or three indoor radiators 100 are running and the required combustion quantity Qc changes from Qc<2000 kcal/h to 2000 kcal/h≦Qc≦6000 kcal/h.

In this case, if change of set value is requested at step K17 (YES), the operation pattern is selected at step K18, and the combustion unit controller 600 energizes the ignition heater A and B for a specified time (step K50), and controls the air blow fan 224 so as to achieve the draft to the combustion unit 222 corresponding to the requested combustion quantity Qc after change (step K51). Likewise, the combustion controller 600 starts up the fuel pump A, changes the control value of the fuel pump B, and controls the fuel pumps A and B so as to reach the fuel flow rate corresponding to the changed combustion quantity Qc (step K52). This timing is same as above. Then, the flame of the both combustion units 222 is detected by the flame rod 222g (step K53).

When the flame is detected in both combustion units 222 (YES), returning to step K19 of starting with two units, the combustion operation continues. If flame is not detected in either one or both of combustion units 222 (NO), it is regarded as a misfiring, and the combustion unit controller 600 immediately stops the fuel pumps A and B (step K54). After postpurging (step K55), the number of times of misfiring n is counted (step K56). When the number of misfirings n is within n≦3, ignition action is effected by returning to step K50. If n<3, it is regarded as being abnormal, and the operation is stopped by returning to step K12.

Meanwhile, when changing the number of running units of the combustion unit 222 from one to two, or from two to one, the control mode is as shown in FIG. 52B, that is, the hysteresis characteristic is considered so as to define Qc≦3000 kcal/h in the former case, and Qc≦2000 kcal/h in the latter case, so that the number of running units may be changed smoothly.

Next, the required combustion quantity Qc is changed although two combustion units 222 remain in operation even after change of set value. This operation is effected when the combustion is started with two or three indoor radiators 100, and two or three units remain in operation even after the combustion quantity Qc is changed from 2000 kcal/h≦Qc≦6000 kcal/h and the combustion quantity Qc is within a range of 2000 kcal/h≦Qc≦6000 kcal/h.

In this case, at step K17, if change of set value is requested (YES), the operation pattern is selected at step K18, and the combustion unit controller 600 controls the air blow fan 224 to the draft corresponding to the requested combustion quantity Qc after change (step K61). Similarly, the combustion unit controller 600 controls the fuel pumps A and B to the fuel supply suited to the new combustion quantity Qc (step K62). This timing is same as above. Then flame is detected (step K63), and when the flame is detected in both combustion units 222 (YES), the combustion operation continues by advancing to step K19 of starting with two units. If the flame is not detected in either one or both of the combustion units 222 (NO), the fuel pumps A and B are stopped (step K64), and postpurging is effected (step K65), and the number of misfirings n is counted (step K66). When the number of misfirings n is in a range of n≦3, the ignition action is effected by returning to step K5. If the number of misfirings n is n>3, the stopping action is effected by returning to step K12. In this case, the combustion units 222 are not started as far as reset action (step K14) is effected.

[Other operation control of combustion unit 222]

Other operation control of combustion unit 222 is explained below.

FIG. 57 is a control flow chart for quick start of combustion unit 222. When the system power source is turned on, the quick operation (quick heating) can be selected (step N1), and if quick operation is not desired (usually), waiting for transmission of combustion unit start signal from the indoor unit controller 400 to the combustion unit controller 600 (step N2), the vaporization heater 226j of the carburetor is energized when transmitted (step N3), and the heater 226j is controlled so that the carburetor may reach the specified temperature (step N4), and upon reaching the specified temperature (step N5), the ignition action is effected by advancing to step K4.

In the case of quick operation (YES), simultaneously when the system power source is turned on, the combustion unit controller 600 energizes the vaporization heater 226j (step N6) to control the heater 226j so that the carburetor may reach the specified temperature (step N7). When the combustion start signal is transmitted from the indoor unit controller 400 to the combustion unit controller 600, the combustion is started simultaneously (step N8). Hence, there is no waiting time for excess heat of the carburetor, and the operation is started quickly.

Figure 58:
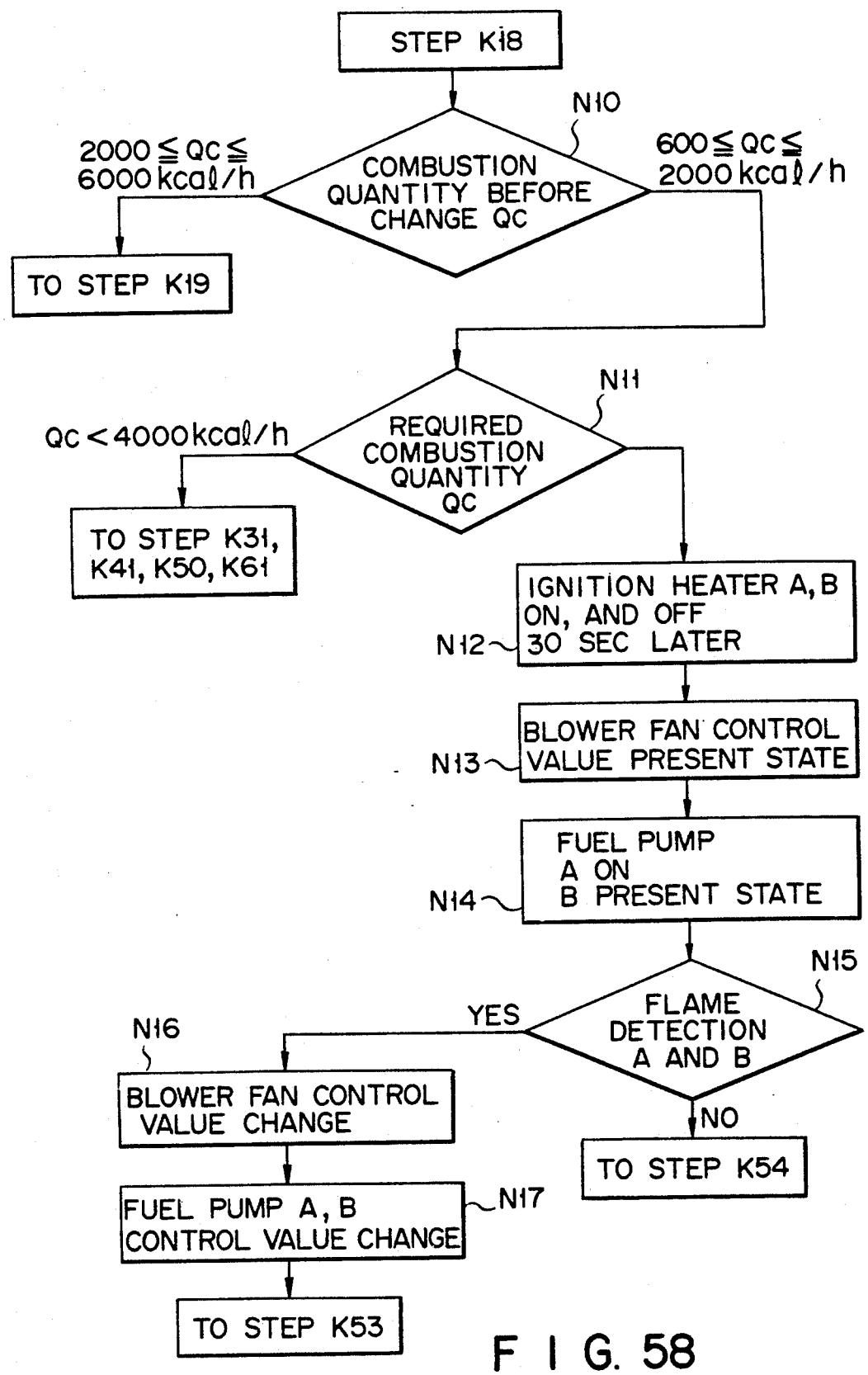
FIG. 58 is a control flow chart of second operation mode of combustion unit.

The second operation mode of the combustion unit 222 is explained below by referring to the control flow chart of the second operation mode of the combustion unit 222 in FIG. 58.

This operation is effected when the required combustion quantity Qc before change of set value (required combustion quantity) is within a range of 600 kcal/h≦Qc<200 kcal/h (one combustion unit 222 in operation) and the required combustion quantity after change of set value is in a range of Qc≧4000 kcal/h (two combustion units 222 in operation). The feature of this operation is that the capacity can be increased smoothly without lowering the heat of the combustion unit already in operation. This operation control is explained in the first place.

When change of set value is requested, the operation pattern is selected at step K18. The combustion unit controller 600 confirms the required combustion quantity Qc before change (step N10). When the combustion quantity Qc before change is within 2000 kcal/h≦Qc≦6000 kcal/h and two or three indoor radiators are in operation, the combustion continues by returning to step K19 of operation of two combustion units mentioned above. Or when the number of running units of indoor radiators 100 is one before change, or if two or three, as far as the required combustion quantity Qc is within a range of 600 kcal/h≦Qc<2000 kcal/h (one combustion unit 222 in operation), the required combustion quantity Qc after change is checked (step N11). When the required combustion quantity Qc after change is in a range of Qc<4000 kcal/h, the operation transfers to steps K31, K41, K50 and K61. If the required combustion quantity Qc after change is within a range of Qc≦4000 kcal/h, the combustion unit controller 600 energizes the ignition heaters A and B for a specified time, maintains the present control value of the air blow fan 224, and starts the fuel pump A, while the fuel pump B is unchanged, to effect the ignition action (steps N12 to N14). Later, the flame of the combustion unit is detected by the flame rod 222g (step N15). Here, if the flame is not detected in either combustion unit (NO), the operation returns to step N54. If the flame is detected in both combustion units (YES), the combustion unit controller 600 controls to adjust to the draft and fuel supply suited to the required combustion quantity after change (steps N16 and N17), thereby returning to step K53. By thus controlling, when changing from one-unit operation to two-unit operation of the combustion units 222, the combustion quantity may be smoothly raised without having to lower the combustion quantity of the combustion unit 222.

Figure 59:
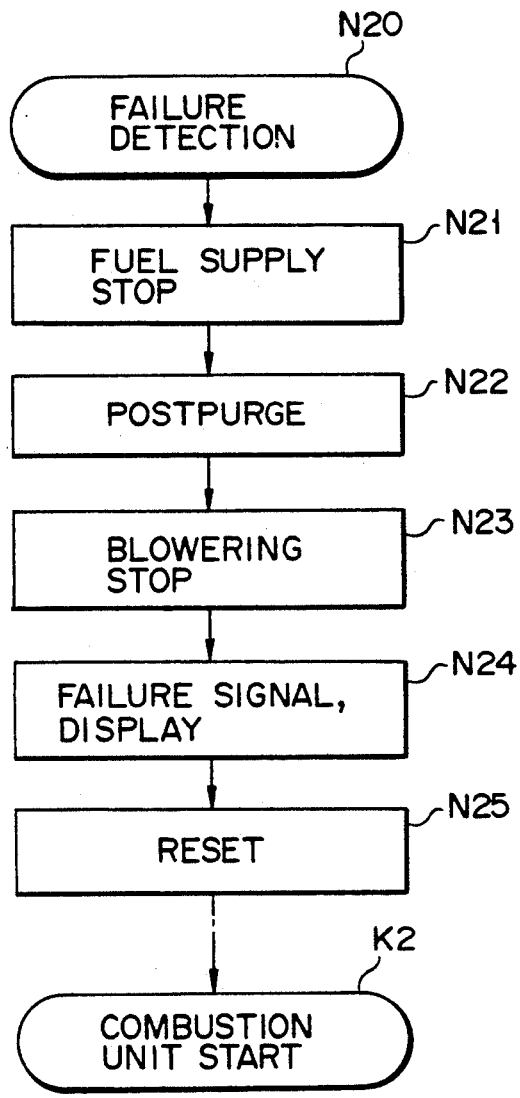
FIG. 59 is a control flow chart showing emergency stop due to detection of exit temperature of heating medium heat exchanger.

Referring now to the control flow chart of abnormal stop due to detection of exit temperature of the heat exchanger 230 for heating the heating medium of the heating medium heater 220 in FIG. 59, the operation of abnormal stop is explained. The exit temperature of the heat exchanger 230 is detected by the temperature sensor 232, and this temperature becomes Tout>Tmax, the combustion unit controller 600 judges abnormality (step N20), and the fuel pumps A and B are stopped (step N21). At this time, the gas pump 250 is still in operation, and by stopping the combustion unit and circulating the heating medium, the exit temperature Tout is brought closer to the relation of Tmin<Tout<Tmax. After stopping of fuel pumps A and B, the air blow fan 224 performs postpurging and stops blowing air (steps N23 and N24). The gas pump 250 is stopped somewhere between stop of fuel supply and stop of air blow. After stop of air blow, the combustion unit controller 600 sends an abnormality signal to the indoor unit controller 400, and the message appears in the display unit 410 of the indoor radiator 100, thereby resetting (steps N24, N25). Then the operation returns to step K2.

Figure 60:
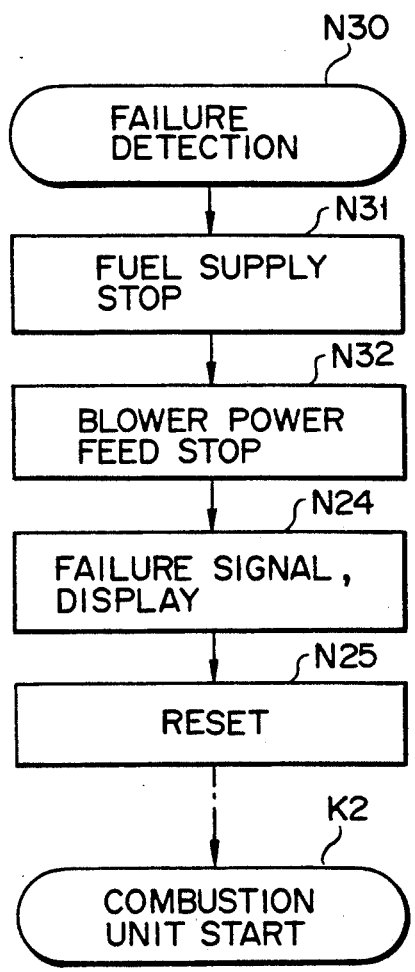
FIG. 60 is a control flow chart showing emergency stop due to detection of air flow rate.

By reference to the control flow chart of abnormal stop due to detection of draft in FIG. 60, the operation of abnormal stop is described below. If the air blow fan 224 does not operate at the time of prepurging when starting the combustion or during combustion operation, the combustion unit controller 600 judges abnormality, and stops the fuel pumps A and B, and stops energization to the air blow fan 224 (steps N30 to N32). Then operation from steps N24 to N25 is carried out.

By reference to the control flow chart of abnormal stop due to safety device in FIG. 61, the operation of abnormal stop id described below. In the event of power failure, antiseismic automatic putout and overheat prevention, the combustion unit controller 600 stops the fuel supply, air feed and power feed to the vaporization heater 226j to wait for recovery, and when recovered, by self-diagnosis, the message is shown in the display unit 410 of the indoor radiator 100, thereby resetting. By performing postpurging, the air blow fan 224 is stopped to wait for start signal of combustion unit (steps N40 to N47).

Figure 62:
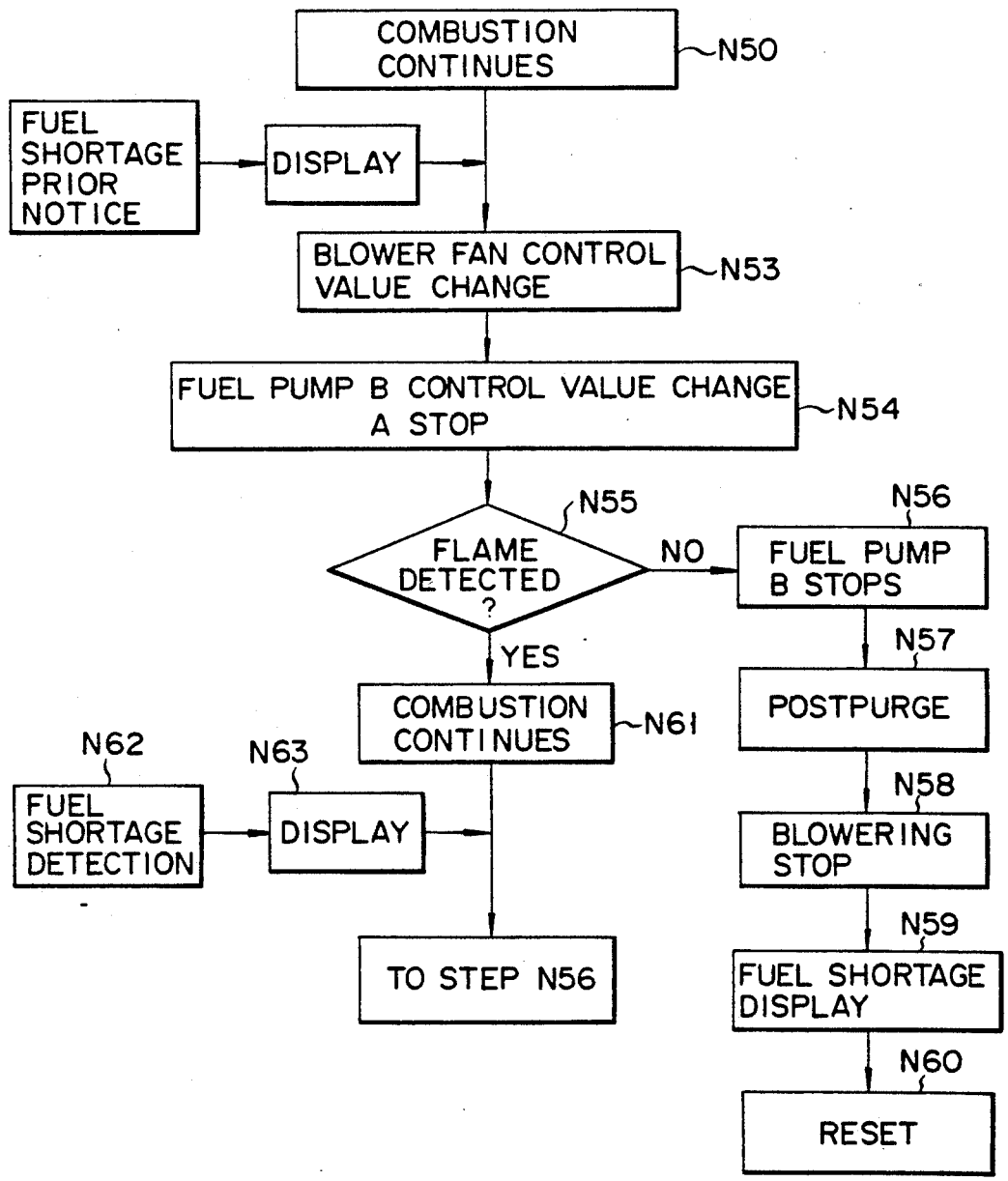

The operation in the case of running out of fuel is shown below by referring to the control flow chart of fuel shortage in FIG. 62.

During continued combustion operation (step N50), a prior notice of fuel shortage is issued by a level gauge 226g provided in the auxiliary tank 226b of the outdoor unit 200, and is sent to the combustion unit controller 600 (step N51). The combustion unit controller 600 sends this information to the indoor unit controller 400 to indicate in the display unit 410 of a specific or all indoor radiators 100 (step N52), urging to refill fuel. This display remains on until the fuel is completely refilled. If fuel is not refilled, the combustion unit controller 600 changes the control value of the draft by the air blow fan 224 after a specified time, and stops the fuel pump A, and runs only the fuel pump B to perform low combustion operation with one combustion unit 222 (steps N53, N54). At this time, the motor speed of the gas pump 250 is lowered also to operate at low load.

Afterwards, the flame is detected by the flame rod 222g (step N55), and if the flame is not detected (NO), the operation of the fuel pump B is stopped, and by performing postpurging, air blow by the air blow fan 224 is stopped (steps N56 to N58). The combustion unit controller 600 transmits a fuel shortage signal to the indoor unit controller 400 to display again in the display unit 410 of the indoor radiator 100 (step N59). After that, combustion operation is not resumed unless the fuel is replenished and the resetting action is done (step N60).

When the flame is detected (YES), the low combustion operation continues (step N61). As the fuel further decreases, the fuel shortage is detected by the level guage 226g, and this information is transmitted to the combustion unit controller 600 (step N62). The information signal is transmitted from the combustion unit controller 600 to the indoor unit controller 400, and the fuel shortage is indicated in the display unit 410 in specific or all indoor radiators 100 (step N63). Then the operation from step N56 to step N60 is conducted. In this apparatus, therefore, the fuel shortage is detected in two stages. The foregoing description refers to operation of two combustion units 222, but the fuel shortage is detected similarly in the case of operation of one unit. In this case, at step N53, the fuel pump B is controlled, and one combustion unit is set in low combustion operation.

Figure 63:
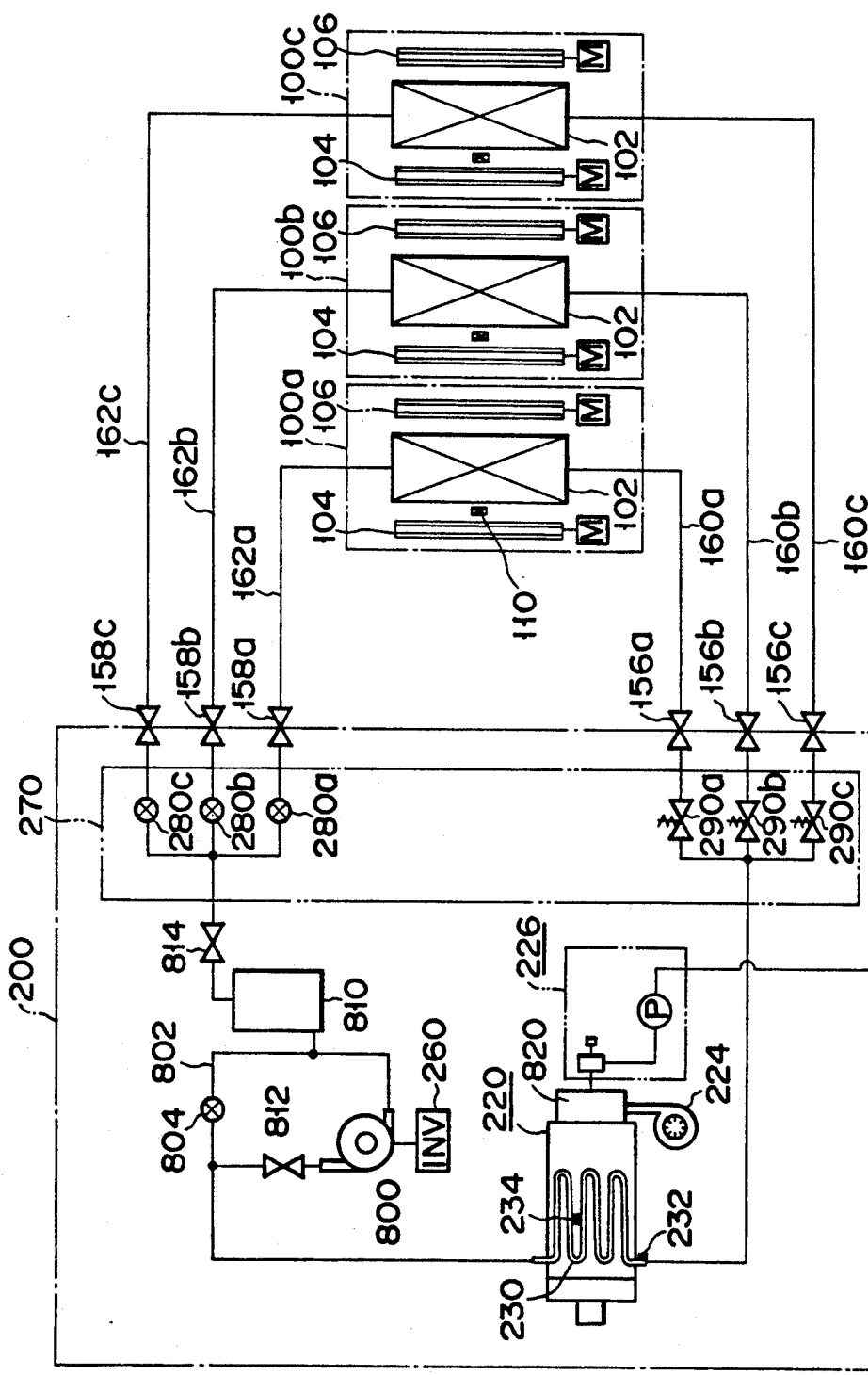
FIG. 63 is a system configuration diagram.

The second embodiment of the invention is described below. FIG. 63 is a system configuration of the heating apparatus according to the second embodiment of the invention. The same parts as in the first embodiment are identified with same reference numbers, and only the different parts are mainly described below.

In this embodiment, a liquid pump 800 is used instead of the gas pump 250, as the means for conveying the heating medium, heated in the heating medium heater 220 into the indoor radiator 100. While the gas pump 250 conveys the heating medium in vapor phase, the liquid pump 800 conveys the heating medium in liquid phase. Therefore, the liquid pump 800 is installed in a place where the heating medium is present in liquid phase, or a place capable of controlling the heating medium after condensation (in liquid phase) by releasing heat in the indoor radiator 100. More specifically, it is installed at the heating medium entrance side (upstream side) of the heating medium heater 220. This liquid pump is provided with an inverter circuit 260, which controls the motor speed of the liquid pump 800 by frequency so as to control the circulation amount of the heating medium variably.

The heating medium exit side and heating medium entrance side of the liquid pump 800 are linked by a bypass pipe 802. A heating medium control valve (bypass valve) 804 is incorporated in the bypass pipe 802. The bypass pipe 802 and heating medium control valve 804 are to variably control the flow rate of the heating medium circulating in the cycle by varying the quantity of heating medium running into the liquid pump 800.

The inverter circuit 260, bypass pipe 802 and heating medium control valve 804 are used in this embodiment, but it is possible to variably control the circulation amount of the heating medium by only one of them. Or the heating medium control valve 804 installed in the bypass pipe 802 may be a mere two-way valve if used in combination with the inverter circuit 260. By using a two-way valve, the cost may be lowered, and the frequency conversion capacity required in the inverter circuit 260 may be reduced to half. Furthermore, the bypass pipe 802 may be connected with the heating medium exit side of the liquid pump and the heating medium entrance side of the liquid tank 810 provided in the cycle.

The features of the liquid pump 800 are described below in comparison with the gas pump 250 used in the first embodiment. The gas pump 250 is installed at the downstream side of the heating medium heater 220, and therefore the temperature of the heating medium at the exit of the heater 220 cannot be higher than the withstand heat temperature of the gas pump 250. On the other hand, the liquid pump 800 is installed at the upstream side of the heater 220, and there is no such restriction as in the gas pump 250. Besides, in the gas pump 250, the temperature is limited also in the lubricating oil flowing in the cycle, together with the heating medium, for the purpose of lubrication within the cylinder, but the liquid pump 800 does not require lubricating oil and is free from such restriction. It is therefore possible to set the heating medium temperature at the exit of the heater 220 to a high temperature, and a high temperature air may be blown out by the indoor radiator 100. Moreover, in the case of the liquid pump 800, if the types of heating medium are exchanged, it does not matter as far as the heating medium is in liquid phase at the heating medium entrance side of the liquid pump, and any heating medium is used.

At the upstream side of the liquid pump 800, a liquid tank 810 is installed. This liquid tank 810 is intended to temporarily pool the liquid heating medium after releasing heat in the indoor radiator 100, and feeding the heating medium in liquid phase into the liquid pump. This is because the heating medium may be kept in liquid phase by pooling once in the liquid tank 810 to supply only the liquid heating medium in the liquid pump 800 even if the heating medium is not entirely in liquid phase after releasing heat in the indoor unit 100. Therefore, in the liquid tank 810, it is required that the heating medium be always present in liquid phase. The position of installation of this liquid tank 810 should be lower than the constituent elements, except for the liquid pump 800 in the outdoor unit 200, so that the liquid heating medium in the liquid tank 810 may not flow out. In relation to the liquid pump 800, it may be installed at a same height or higher than the liquid pump 800.

Valves 812, 814 are installed at the downstream side (heating medium exit side) of the liquid pump 800 and at the upstream side (heating medium entrance side) of the liquid tank 810. These valves 812 and 814 are provided as the maintenance measures in the off season of heating, and these valves 812 and 184 are closed in the off season in order to prevent the liquid heating medium from flowing out in order to maintain the liquid heating medium in the liquid pump 800 or liquid tank 810. This is intended to prevent trouble when starting operation at the beginning of the season because the heating medium is collected in the indoor radiator 100 as liquid, particularly in summer, when the ambient temperature is higher than the indoor temperature.

The heating medium heater 220 is provided with combustion unit 820. The combustion unit 820 is capable of varying the capacity in a wide range, and one combustion unit is equivalent to two combustion units of the foregoing embodiment in capacity. In other words, the combustion quantity is variably controlled from the combustion quantity corresponding to the sum of the preset maximum required heating capacity of each indoor radiator 100 to the present minimum heating capacity of one indoor radiator 100.

The heating medium heater 220 is furnished with the air blow fan 224 for feeding combustion air into the combustion unit 820, fuel supply system 226 for supplying fuel from the fuel tank 202 into the combustion unit 820, and heat exchanger 230 for heating the heating medium with the heat from the high temperature combustion gas produced from the combustion of the combustion unit 820 and preserving heat in the heating medium as latent heat.

The state of the heating medium in each constituent element and the connecting relation of principal constituent elements are described below. The heating medium becoming vapor as being heated by the combustion heat of the combustion unit 820 of the heating medium heater 220 is supplied into each indoor radiator 100 the rough each two-way valve 290 in the flow divider 270. The heating medium (vapor) supplied in each indoor radiator 100 releases the heat conveyed by the heating medium in the room by the radiator (heat exchanger) 102 of the indoor radiator 100, and the liquid heating medium after release of heat is once stored in the liquid tank 810 through the heating medium control valve 280 of the flow divider 270 in the outdoor unit 200 from the indoor radiator 100, and is supplied into the liquid pump 800. In this liquid pump 800, the conveying volume of the heating medium to be sent into each indoor radiator 100 is controlled, and the liquid heating medium is conveyed into the heating medium heater 220. After heating the heating medium gain in this heating medium heater 220, the heating medium becoming vapor as being heated is supplied again into the indoor radiators 100, and this operation is repeated.

Figure 64:
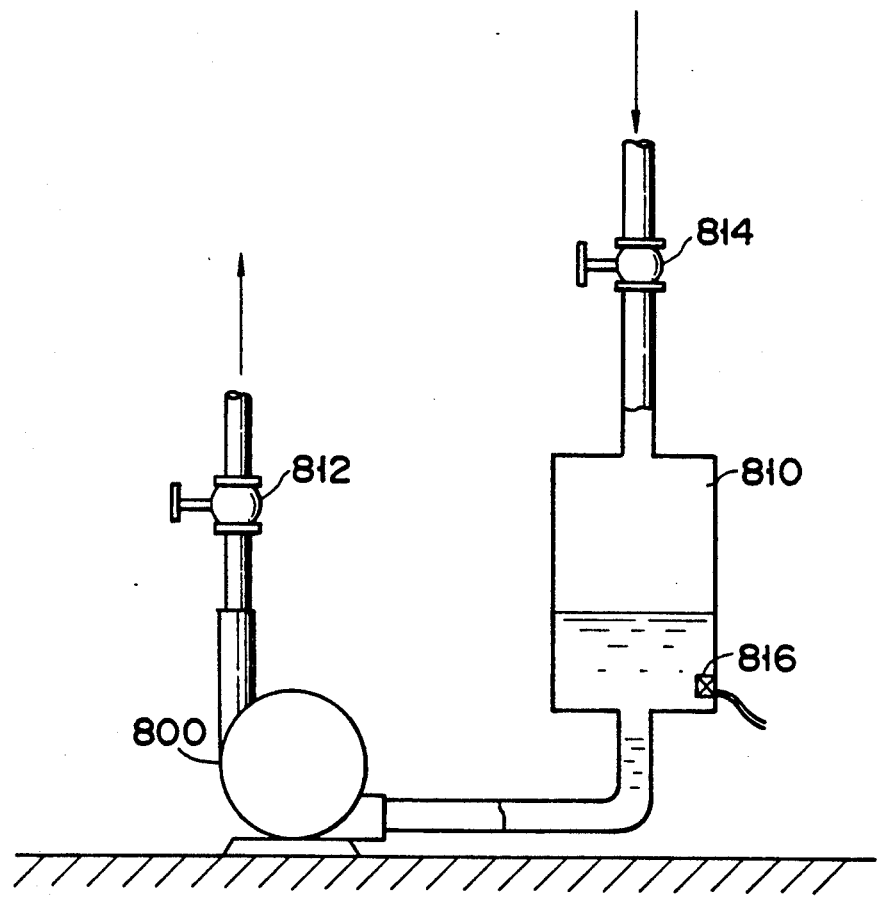
FIG. 64 is a structural drawing of a liquid tank.

The basic composition of the liquid tank 810 mentioned above is explained below while referring to the configuration drawing of the liquid tank in FIG. 64.

This liquid tank 810 has an inlet and an outlet, and it receives the heating medium from the indoor radiator 100 into the inlet through the valve 814, and sends out the heating medium from the outlet into the liquid pump.

As the measure of not taking in the heating medium of gas (vapor) into the liquid pump 800, the relation between the liquid tank 810 and the sealed heating medium volume in the cycle is defined as follows. That is, the volume of the liquid tank 810 is defined larger than the volume in the entire cycle excluding the liquid tank 810. As a result, in any running condition, or even if the heating medium is collected in the indoor radiator 100 while the operation is shut down, the heating medium is always present in the liquid tank 810, and feeding of heating medium in vapor phase into the liquid pump 800 is avoided.

Or when the liquid pump 800 is reduced in volume and the sealing amount of the heating medium is minimized, the heating medium may be condensed in any other place in the cycle in specific condition or during shutdown of operation, and the liquid may not be present in the liquid tank 810. In such a case, idling of the pump 800 occurs, and a sufficient circulation of heating medium is not obtained, and the heating capacity is lowered, or the heating medium heater 220 may be overheated to lead to a fatal damage.

In this apparatus, accordingly, a sensor to check if the liquid heating medium is present or not in the liquid tank 810 is provided, and the system operation is automatically stopped when running out of the liquid heating medium.

That is, using a gas-liquid judging sensor 816 as the sensor, and this gas-liquid judging sensor 816 is attached to the lower part in the liquid tank 810, judging if the sensor part is liquid or gas, and when judged to be gas, the system operation is stopped.

Aside from such gas-liquid judging sensor 816, for example, any other sensor may be used, such as one for detecting the resistance between electrodes to judge gas or liquid if the heating medium is conductive, and other for detecting the reflectivity of the fiber tip by using optical fiber or electrostatic capacitive type if the heating medium is nonconductive.

Actually, in ordinary operation, the liquid tank 810 will not go out of the liquid heating medium. Therefore, if the gas-liquid judging sensor 816 is actuated to stop the system, it means any abnormality, and the most likely trouble is the shortage of heating medium in the cycle as the heating medium is gradually collected in the indoor radiator 100 not in use (usually, detecting the exit superheat of the heat exchanger 230 for heating the heating medium, the heating medium is recovered as mentioned in the foregoing embodiment, and in reality abnormality hardly occurs). The control in this case is explained by referring to the control flow chart of liquid heating medium in the liquid tank in FIG. 65. Even in ordinary operation (step S100), the state in the liquid tank 810 is detected by the gas-liquid judging sensor 816 (step S101), and when the liquid is detected (YES), the operation continues, and when the gas is detected (NO), the outdoor unit controller 500 stops the operation (step S102). Then, after recovery of heating medium as mentioned above (step S103), it is detected again (step S104). If the gas is detected here (NO), the operation returns to step S103 to recover the heating medium. If the liquid is detected (YES), the operation starts (step S104).

Figure 66:
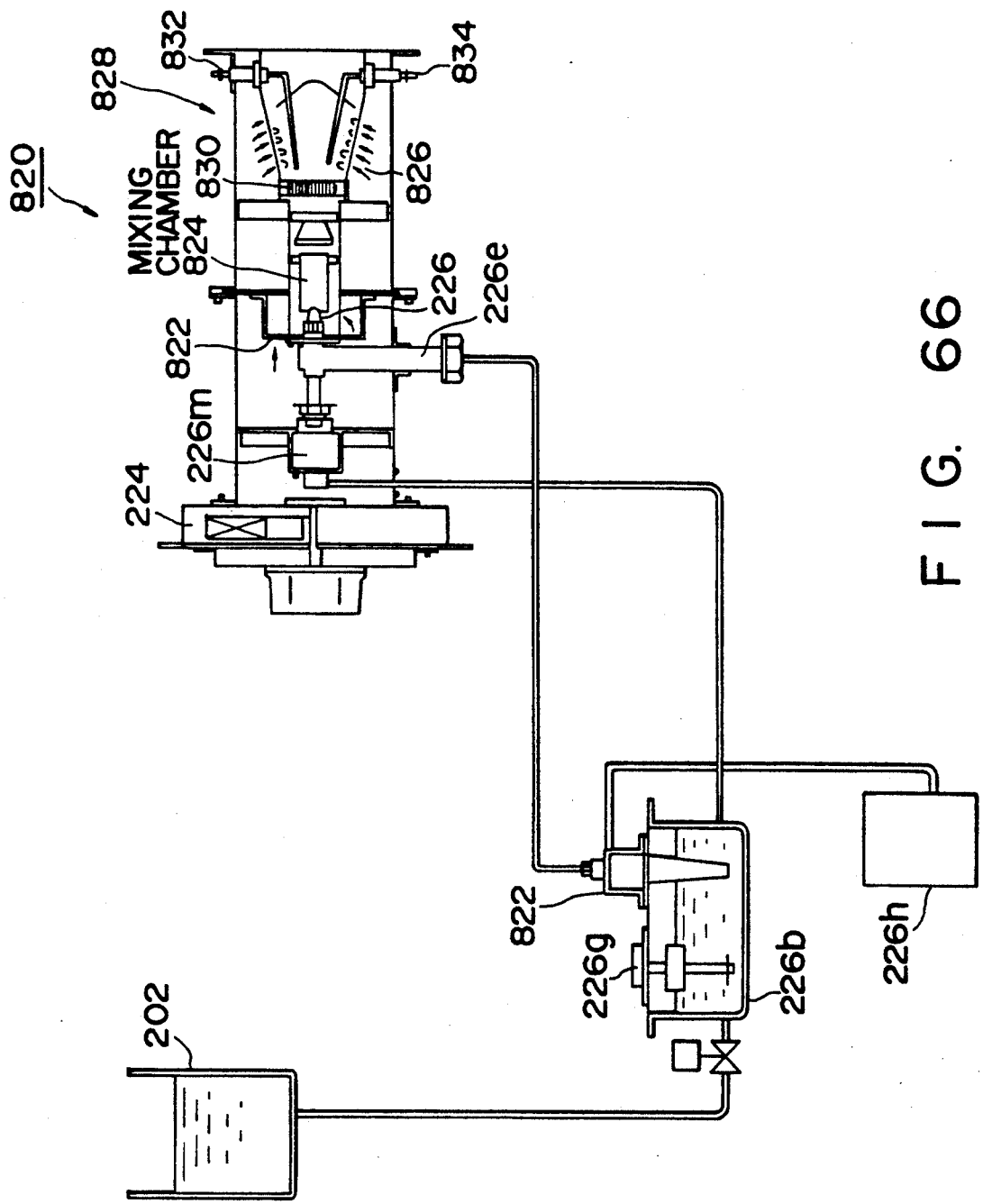
FIG. 66 is a combustion unit system structural drawing.

The basic system configuration of the combustion unit system of the heating medium heater 220 mentioned above is explained below while referring to the combustion unit system configuration diagram in FIG. 66.

Principal constituent elements of the system include, among others, combustion unit main body 820, air blow system (air blow fan 224), and fuel supply system 226. The principal constituent elements of the combustion unit system are explained below.

In the fuel supply system of the foregoing embodiment, two fuel pumps were installed, but in this embodiment, since there is only one combustion unit 820, one fuel pump 822 is capable of covering the entire capacity range of the combustion unit 822.

This pump 822 is designed to vary the fuel flow rate while changing the frequency f and pulse width $\tau$ of the plunger from the pump control device 226h. That is, as shown in FIGS. 67A and 67B, to decrease the fuel supply, the frequency f1 and pulse width $\tau$1 are reduced as in FIG. 67A. To increase the fuel supply, the frequency f2 and pulse width $\tau$2 are enlarged as in FIG. 67B. By controlling the frequency f and the pulse width $\tau$ in this way, the fuel supply to the combustion unit 820 may be freely controlled.

Figure 68:
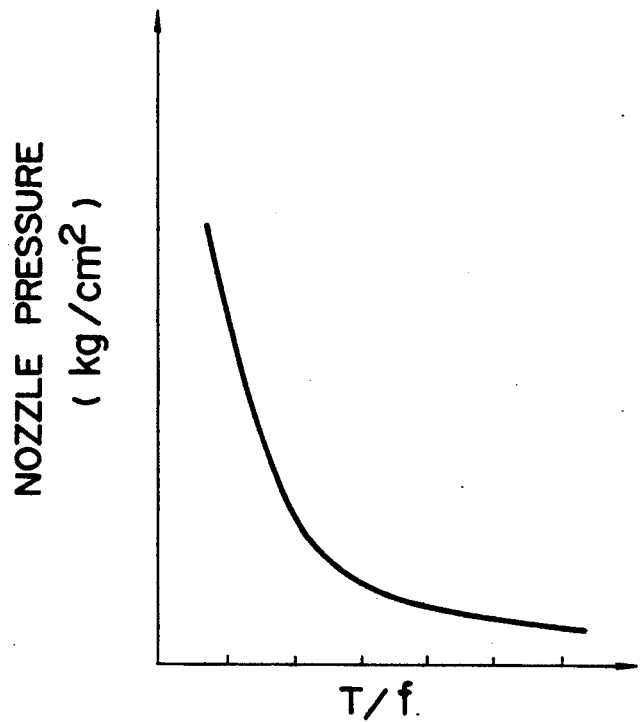
FIG. 68 is a characteristic diagram showing the relation between the pulse width against the frequency and the nozzle pressure.
Figure 69:
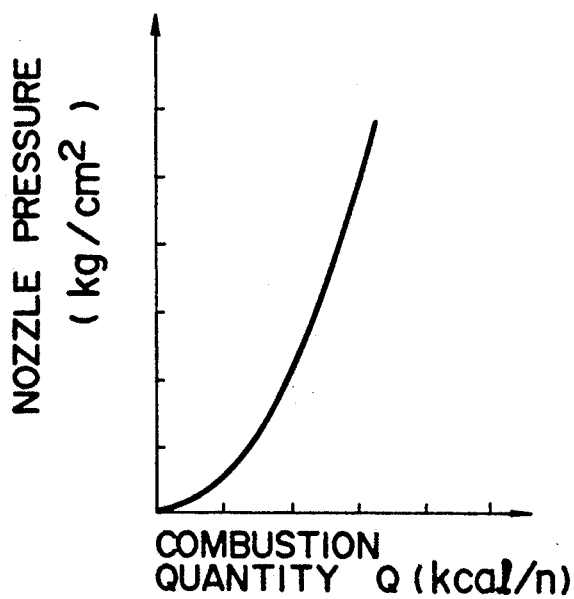
FIG. 69 is a characteristic diagram showing the relation between the nozzle pressure and the combustion quantity.

The relation of the pulse width $\tau$ and the nozzle pressure P to the frequency f is shown in FIG. 68. As shown in the diagram, as the value of $\tau/f$ becomes smaller, the fuel flow rate increases. That is, since the diameter of the nozzle injection port of the fuel nozzle is constant, the nozzle pressure P goes up. This relation between nozzle pressure P and combustion quantity Qc is shown in FIG. 69.

In other fuel supply system 226, each constituent component is changed to a singularity while two were used in the foregoing embodiment, and the composition and operation are same as in the prior embodiment. The air blow system 224 is same as in the above embodiment, and its explanation is omitted here.

In the main body of the combustion unit 820, the vapor fuel ejected from the fuel nozzle 226k, and combustion air taken in from the primary air hole 822 blown in from the air blow fan 224 are premixed in a mixing chamber 328 to prepare a premixed air. This premixed air is mixed with a secondary air taken in from the secondary air hole 826, thereby forming a flame at the flame hole plate 830 of the combustion chamber 828. Ignition to this mixed air is effected by a ceramic heater 832, and when the flame is formed, the flame is detected by the flame rod 834.

Figure 70:
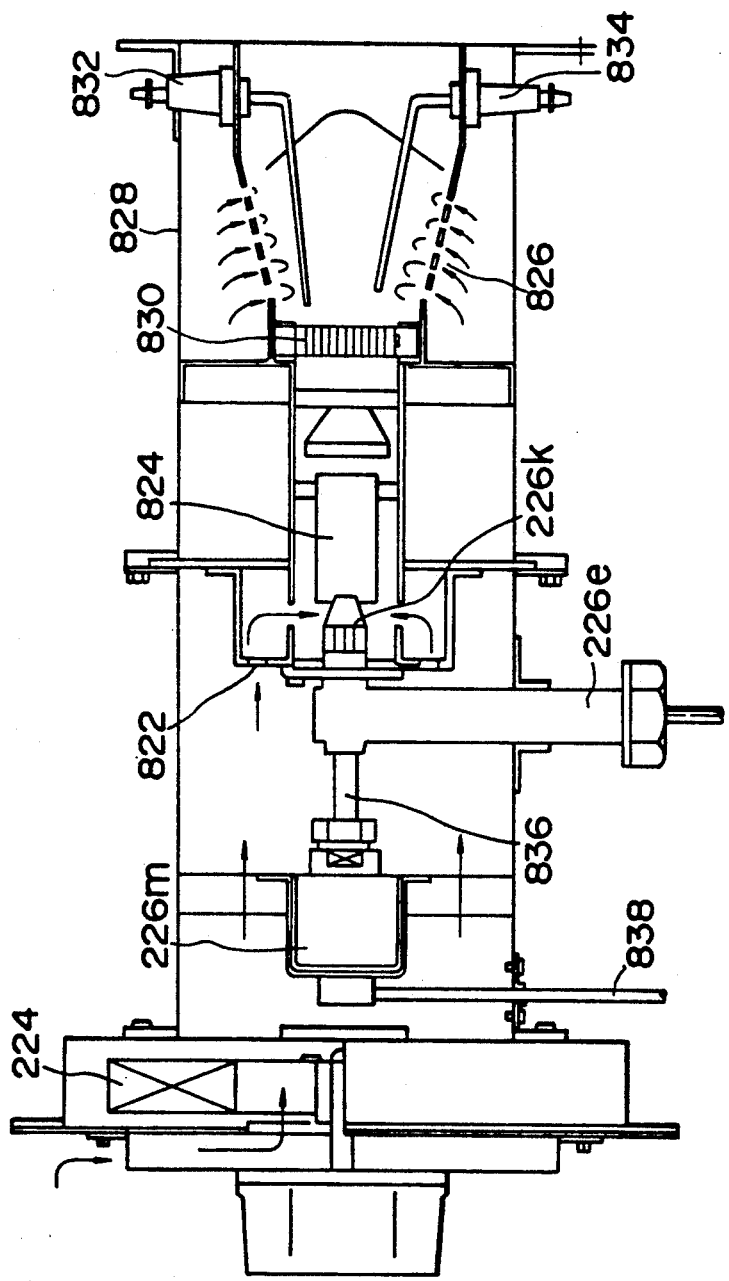
FIG. 70 is a structural drawing of a combustion unit.

The composition and operation of the combustion unit 820 are described in detail by referring to the combustion unit configuration in FIG. 70.

The air blow fan 224 blows the combustion air into the primary air holes 822 and the secondary air holes 826 in the combustion chamber 828. This air blow fan 224 is capable of blowing air in a required volume, from the minimum combustion amount to the maximum combustion amount, and this air volume is the minimum at the minimum combustion quantity and maximum at the maximum combustion quantity. This air blow fan 224 is interlocked with the fuel pump 822, and when the fuel supply increases in the fuel pump 822, the rotating speed of the air blow fan 224 increased to augment the air blow rate. Actually, it is controlled by the combustion unit controller 600.

The liquid fuel supplied from the fuel pump 833 is sent into the carburetor 226e. This liquid fuel is vaporized in the carburetor 226e to be a vapor fuel, which is injected into the mixing chamber 824 through the fuel nozzle 226k. The vapor fuel supplied into the mixing chamber 824 and the primary air taken in from the primary air holes 822 are mixed to produce a mixed air. The primary air volume should be about 0.4 to 0.8 times the theoretical air volume. This theoretical air volume varies with the type of fuel, and it is 13.4 m$^3$/kg in the case of kerosene.

The mixed air enters the combustion chamber 828 from the flame hole plate 830, and is ignited by the ceramic heater 832. When the mixed air is ignited, a flame is formed on the flame hole plate 830. Since this flame is short of air as mentioned above, it is mixed with the secondary air taken in from the secondary air holes 826 to burn completely.

While the combustion quantity is small, combustion is performed on the flame hole plate 830 and the secondary air hole 826 near the flame hole plate 830, and while the combustion quantity is large, combustion is performed by forming flames on the flame hole plate 830 and to the downstream side of the secondary air holes 826. Presence or absence of flame is detected by measuring the flame current by the flame rod 834. If the flame current is not detected, the operation of the fuel pump 822 is stopped immediately. Simultaneously with stopping of operation of the pump 822, the solenoid valve 226m is cut off, and a needle shaft 836 gets into the fuel nozzle 226k side, and the vapor fuel and liquid fuel pass through a return pipe 838 to return into the auxiliary tank 226b. In this combustion system, as mentioned above, since the combustion range is broad, a wide range of combustion quantity is obtained. Besides, owing to the complete combustion by the secondary air, the concentration of CO harmful for human health may be lowered.

The heating medium heater 220 is explained next. The heating medium heater 220 is composed as shown in FIG. 71 to FIG. 73.

The heating medium heater 220 mainly comprises the combustion unit 820 described above, and a heat absorbing chamber 350 disposed closely around the heat exchanger (heat absorber) 230 for heating the heating medium. That is, the combustion unit 820 is disposed in the horizontal direction, and adjacently to the downstream side of the combustion chamber 828 of this combustion unit 820, the heat absorbing chamber 350 is provided. The heat exchanger 230 disposed closely to the heat absorbing chamber 350 is disposed same as in the foregoing embodiment. In thus composed heating medium heater 220, the flow of combustion gas and heating medium is described below.

The combustion gas generated by combustion of the combustion unit 820 runs through the combustion chamber 828, and flows among the heat absorbing fins 354 of the combustion gas passage 352 of the heat absorbing chamber 350 to transmit heat to the heat absorbing fins 354. The heat reserved in the heat absorbing fins 354 exchanges heat with the heating medium flowing in the heat exchanger 230 for heating the heating medium disposed closely around the heat absorbing chamber 350 to provide the heating medium with heat. The heating medium provided with heat changes in phase from liquid to vapor to become vapor, and is conveyed into the indoor radiators 100.

The control blocks in this embodiment are same as in the foregoing embodiment as shown in FIG. 27 and FIG. 28.

Figure 74:
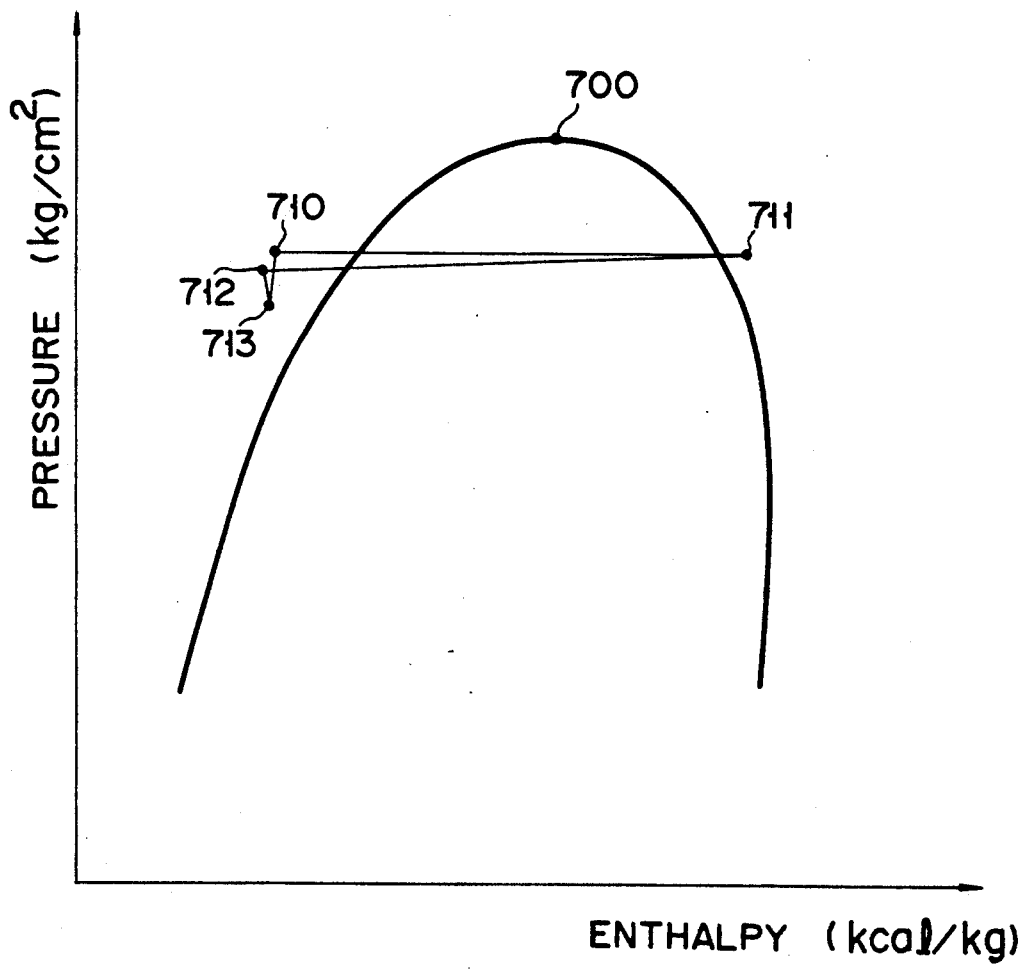
FIG. 74 is a Mollier chart.

The principle of system operation of the heating apparatus of the embodiment is explained by referring to the Mollier chart shown in FIG. 74. From point 710 to point 711, it shows the evaporation process by the heating medium heater 220. The heating medium at this time increases energy nearly at same pressure. That is, in the heat exchanger 230 of the heating medium heater 220, the heating medium is evaporated to change gradually from liquid phase to vapor phase, finally changing to a vapor phase having a certain superheat. From point 711 to point 712, it indicates the process of heat release, that is, condensation, in the individual indoor radiators 100, and the heating medium loses energy nearly at same pressure at this time to be in liquid phase, crossing over the saturation curve. From point 712 to point 713, it indicates pressure elevation by heating medium control valve 280, and the heating medium at this time increases a slight pressure and energy by the work of the liquid pump 800. This cycle is to repeat the above operation.

Figure 75A:
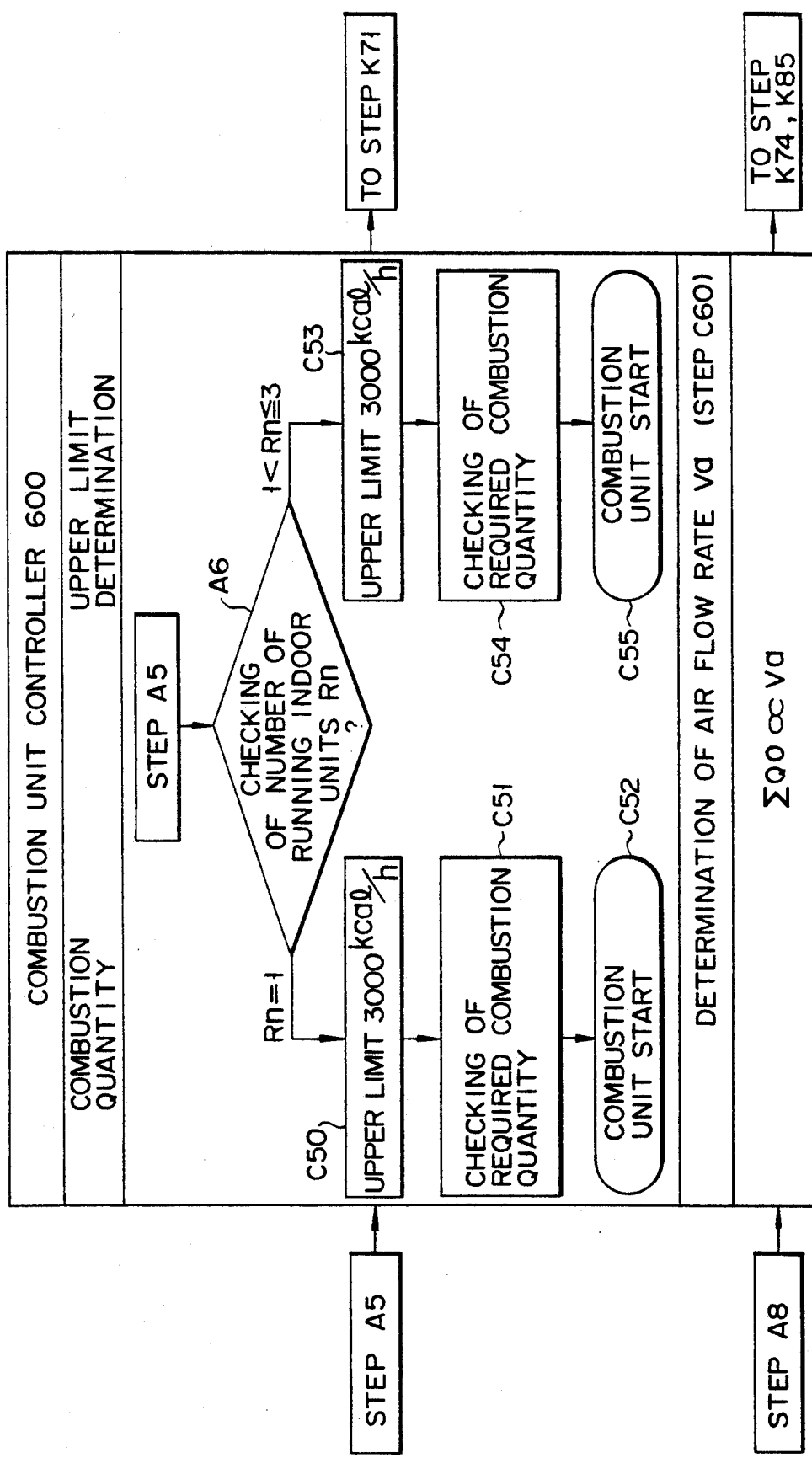
FIGS. 75A and 75B are combustion unit controller function diagrams.
Figure 75B:
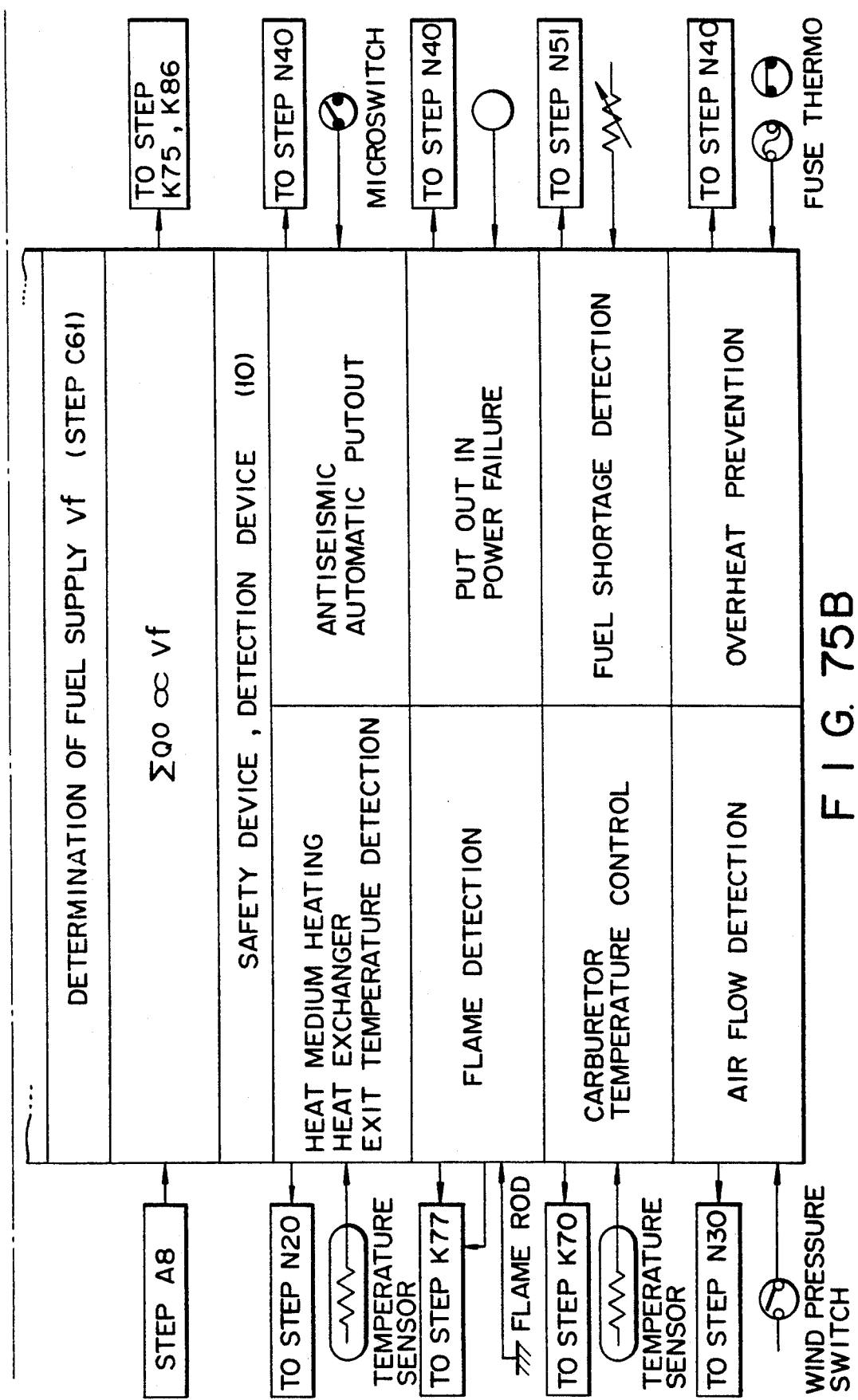

The function of the combustion unit controller 600 of the heating apparatus in this embodiment is explained by referring to FIGS. 75A and 75B. Incidentally, the functions of the outdoor unit controller 500 and indoor unit controller 400 are same as in the foregoing embodiment.

The combustion unit controller 600 selects the operation pattern from the information of the number of running units Rn (step A6) of the indoor radiators 100 from the outdoor unit controller 500. That is, if the number of running units Rn of the indoor radiators 100 is Rn=1, the upper limit of the combustion quantity Qc is determined (for example, 3000 kcal/h) (step C50), and the combustion quantity Qc determined by the total heating capacity Qt is confirmed (step C51), and the operation of the combustion unit 820 is started (step C52). When the number of running units Rn of the indoor radiators 100 is within $1 < Rn \leq 3$, too, the upper limit of combustion quantity Qc is determined (for example, 6000 kcal/h) (step C53), and the combustion quantity Qc determined by the total heating capacity Qt is confirmed (step C54), thereby starting the operation of the combustion unit 820 (step C55).

The combustion unit controller 600 determines the draft Va of the combustion air by the air blow fan 224 depending on the combustion quantity Qc, from the information of the combustion quantity Qc determined at step A8 of the outdoor unit controller 500 (step C60). This information of draft Va is sent to the drive circuit 620 of the air blow fan 224, thereby controlling the air blow fan 224.

Likewise, the combustion unit controller 600 determines the fuel supply Vf depending on the combustion quantity Qc, from the information of the combustion quantity Qc determined at step A8 of the outdoor unit controller 500 (step C61). This information of fuel supply Vf is sent to the inverter circuit 610 for driving the fuel pump 822, thereby controlling the fuel pump 822.

The combustion unit controller 600 stops the combustion of the combustion unit 820 immediately (step A21) and stops the pump 800 (step A22), and closes the two-way valve (step A23), when the abnormal temperature rise of the heat exchanger 230 for heating the heating medium 230 is detected by the detectors and safety devices, flame detection by flame rod 222g, air blow detection by draft switch, fuel shortage detection by level gauge, antiseismic automatic extinction by microswitch, or actuation of combustion unit overheat preventive device by fuse and thermoswitch, etc.

The details of the control of the system in this embodiment are same as in the previous embodiment, and are omitted herein (see the control flow charts from FIG. 42 to FIG. 51).

The operation control of combustion unit 820 of the heating medium heater 220 is explained below. As mentioned above, the combustion unit 820 used in this embodiment is capable of varying the capacity in a wide range by one combustion unit, and is equivalent to two combustion units 222 of the foregoing embodiment in capacity. Therefore, unlike the dual system as explained in the preceding embodiment, the operation pattern will not change depending on the number of running units Rn of the indoor radiators 100 or the required combustion capacity Qc at this time. It is only required to define the upper limit Qmax of the combustion quantity Qc depending on the number of running units Rn of the indoor radiators 100. Such upper limit is defined in order to avoid the following troubles.

That is, if it is prepared to operate the combustion unit 820 in full power in any circumstance, for example, in the case of operation of only one indoor radiator 100, the heat cannot be released completely because it is originally designed to be an indoor radiator for one room, and the pressure in the cycle goes up to be in critical state. To solve this problem, if the size of the indoor radiator 100 is increased, high temperature air may not be blown out when operating in multiple rooms, and an extra space is needed for installation. Or if the size of the indoor radiator is increased in part, it is necessary to change the flow dividing ratio of the heating medium depending on its combination, and the control is complicated. To solve such contradictory problems, it is decided to define the upper limit Qmax of the combustion quantity Qc depending on the number of running units Rn of the indoor radiators 100.

FIG. 76 shows an example of upper limit Qmax of the combustion quantity of the combustion unit 820. In this diagram, when the number of running units Rn of the indoor radiators 100 is one, the upper limit Qmax of the combustion quantity is defined at 3000 kcal/h, and Rn is 2 or 3, the upper limit Qmax is defined at 6000 kcal/h.

Figure 77:
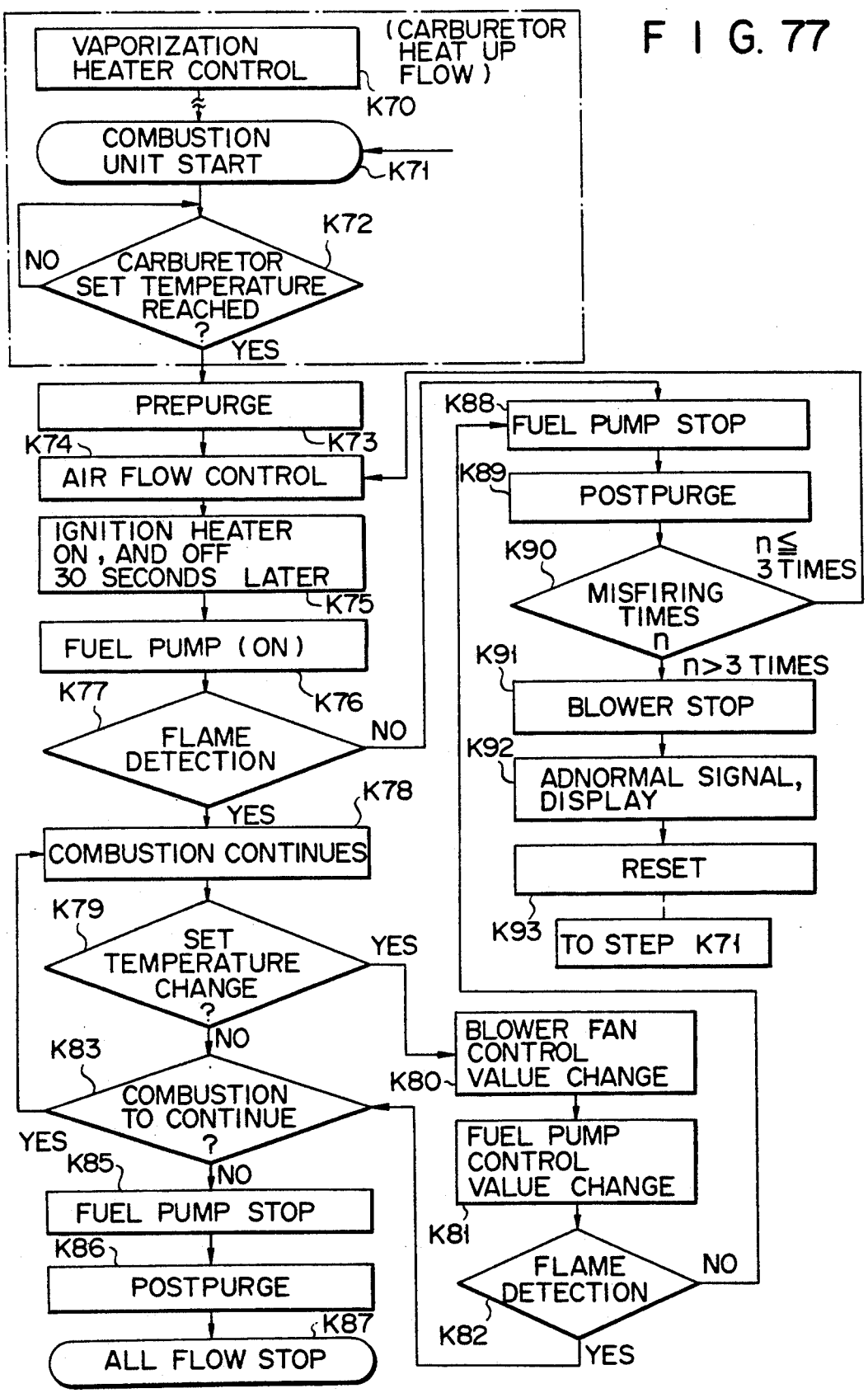
FIG. 77 is an operation control flow chart of a combustion unit.

The operation control of the combustion unit 820 is explained by referring to the operation control flow chart of the combustion unit 820 of FIG. 77. The range enclosed by a single dot chain line in FIG. 77 refers to the control flow chart of quick start. In this case, when the system power source provided in the outdoor unit 200 is turned on, energization of the vaporization heater of the carburetor 226e is started (step K70). The command for operation start of the combustion unit 820 is transmitted from the outdoor unit controller 500 to the combustion unit controller 600, then the operation of the combustion unit 820 is started by the combustion unit controller 600 (step K71).

At this step, whether the temperature of the carburetor 226e has reached the preset temperature by the vaporization heater 226j is judged by the carburetor temperature detected by the temperature sensor $226^1$ (step K72), and if not reaching (NO), energization to the vaporization heater 226j is continued. When reaching (YES), prepurging is effected by the air blow fan 224 (step K73). After prepurging, the combustion unit controller 600 controls the drive circuit 620 of the air blow fan 224 to feed combustion air into the combustion unit 820, and controls to the draft corresponding to the required combustion quantity Qc (step K74). Next, the ignition heater (ceramic heater 832) of the combustion unit 820 is energized with a time limit (30 seconds in this example) (step K75).

Waiting until the temperature of the ignition heater 832 reaches the ordinary temperature, the combustion unit controller 600 controls the inverter circuit 610 of the fuel pump 822 for supplying the fuel to the carburetor 226e of the combustion unit 820, and starts operation of the fuel pump 822 so as to supply fuel corresponding to the required combustion quantity Qc to the combustion unit 820 (step K76). The fuel sent to the carburetor 226e is mixed with combustion air in the mixing chamber 824, and this mixed air is ignited by the ignition heater 832 on the flame hole plate 830 to form a flame. This flame is detected by the flame rod 834 (step K77).

When the flame is detected (YES), the combustion operation is continued (step K79). When the set value is changed here (YES), the combustion unit controller 600 changes the control value of the air blow fan 224 to the value depending on the combustion quantity Qc corresponding to the total heating capacity Qt after change (step K80). In the same manner, the control value of the fuel pump 822 is also changed to a value depending on the combustion quantity Qc corresponding to the total heating capacity Qt after change (step K81).

The timing of changing the draft and fuel supply is simultaneous. At the moment of change, the flame is detected again (step K82), and if the flame is not detected (NO), the operation advances to step K88. When the flame is detected (YES), advancing to step K83, the combustion operation continues (step K83). At step K83, judging whether or not to continue combustion operation, and when continuing (YES), the operation returns to step K78 to continue combustion operation. When not continuing (NO), the combustion unit controller 600 stops the operation of the fuel pump 822 (step K85), and after postpurging (step K86), the operation of the air blow fan 224 is stopped (step K87).

If the flame is not detected at step K77 and step K82 (NO), the combustion unit controller 600 stops the operation of the fuel pump 822 (step K88), and postpurging is effected (step K89). Counting the number of misfirings n (step K90), if the number of misfirings n is 3 times or less, the ignition action is effected by feeding back to the draft control (step K74). If the number of misfirings n is n>3, the combustion unit controller 600 stops the operation of the air blow fan 224 (step K91), sends an abnormality signal to the indoor unit controller, and the message is displayed in the display unit 410 of the indoor radiator 100 (step K92). Thereafter, by resetting action (step K93), waiting for start of operation of the combustion unit 820, the operation returns to step K71 by the command of combustion start, and the same operation is repeated.

Modification and application examples of the heating apparatus of the invention are explained below while referring to the related drawings.

First is described prevention of short circuit in low heating operation. As mentioned above, the indoor radiator 100 of this apparatus is significantly compact in size as compared with the wall-mount type indoor unit generally used in the air-conditioner. This is because the condensation temperature of the indoor radiator 100 may be raised by using the combustion heat and the size of the heat exchanger (radiator) 102 may be reduced. In the indoor radiator 100 of the apparatus, since plural (two) indoor fans (lateral flow fans) 104 and 106 are used, the load per each indoor fan is light, and the indoor fan itself may be reduced in size and thickness.

By using these two indoor fans 104 and 106, short circuit may be prevented. In this case, short circuit means a phenomenon in which the air once heated as the indoor radiator installed laterally is blowing out hot air in heating operation rises up by its own buoyancy and is sucked again into the indoor radiator without reaching the living space in the room. In particular, when the draft is small, since the blowout velocity is slow, elevation by buoyancy becomes outstanding, and short circuit becomes serious. As the short circuit becomes serious, only the surrounding air of the indoor radiator is heated, and the living space is not heated at all. Or if the room temperature sensor is installed in the indoor radiator main body, the sensor judges that the living space is sufficiently heated, and commands to lower the heating capacity, and such spiral is repeated.

Figure 78:
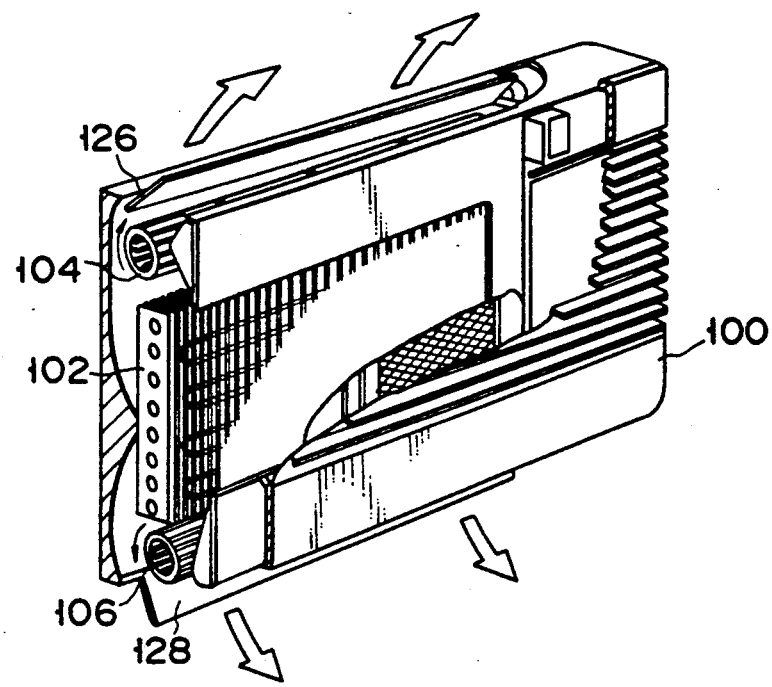
Figure 79:
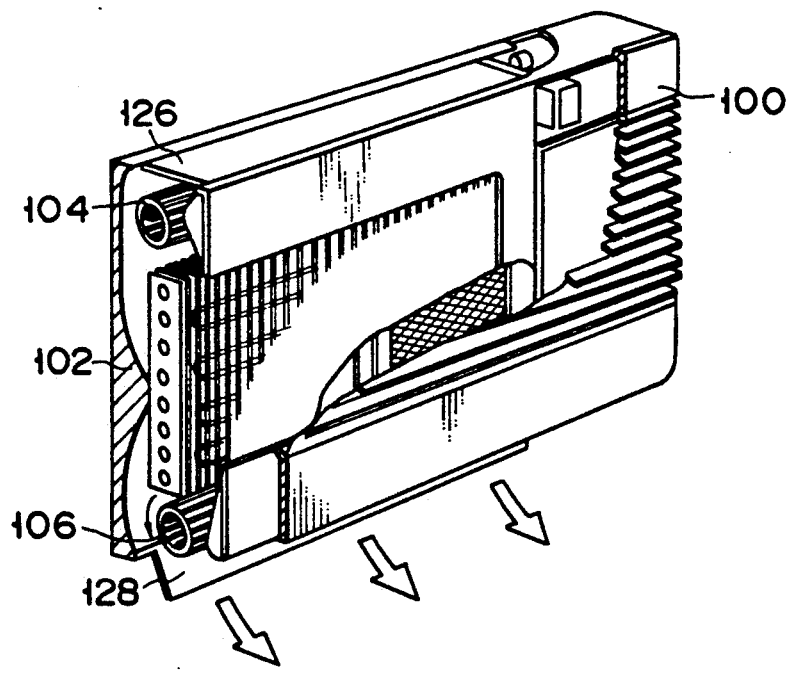

In this apparatus, therefore, the indoor radiator 100 is controlled as shown in the operation diagram in FIG. 78 and FIG. 79.

More specifically, in ordinary heating operation, as far as a sufficient air flow is maintained, the indoor unit controller 400 controls the drive circuits 440 and 450 as shown in FIG. 78, and operates the both indoor fans 104 and 106, and opens the turn louver 126 and 128 to blow out hot air in both upper and lower directions.

When the air flow is small in low heating operation, as shown in FIG. 78, by stopping the operation of one indoor fan 104, the blow velocity may be raised. Practically, in the case of lateral installation of the indoor radiator 100, the drive circuit 440 is controlled by the indoor unit controller 400 to stop the operation of the indoor fan 104 for upward blow, allowing only the indoor fan 106 for downward flow to operate. Controlling in this manner, the air flow for upward blow is transferred to the downward blow and the flow velocity can be raised, so that short circuit may be prevented. At this time, the turn louver 129 for upward blow is closed, while the turn louver 128 for downward blow is opened.

Figure 80:
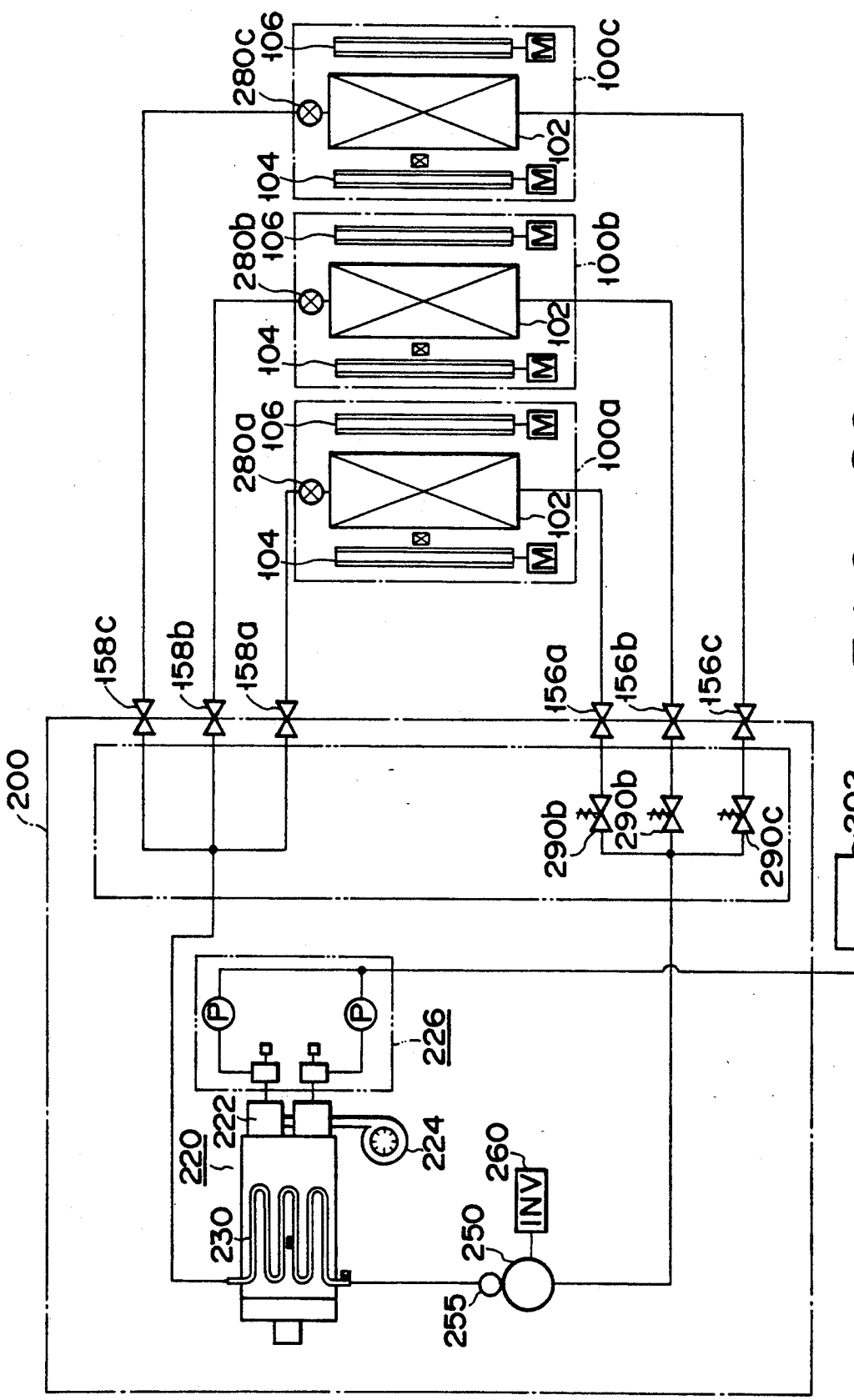

In the next case explained, the heating medium control valve 280 is incorporated into each indoor radiator 100. FIG. 80 is a system configuration in which the heating medium control valve is assembled in the indoor radiator. As shown in the diagram, by incorporating the heating medium control valve 280 in the indoor radiator 100, when controlling the distribution ratio (flow dividing ratio) of the heating medium, it can be controlled by the indoor unit controller 400 of the indoor radiator 100, and it is not necessary to transmit signal to the outdoor unit controller 500 of the outdoor unit 200. In particular, as a technique of flow dividing control, it may be effective means in the case of constant control of the overcooling degree of the heating medium. To begin with, this constant control of overcooling degree is explained below.

A relation as expressed in formula (8) is established between the heating capacity Qi of each indoor radiator 100 and the heating medium flow rate Gi flowing in each one. Since the enthalpies (hi in) of heating medium at entrances of the indoor radiators 100 are nearly equal, in order to pass the heating medium in proportion to the heating capacity Qi, it is enough to equalize the status amount of the heating medium at the exit of indoor radiators 100. In this apparatus, since the downstream side pressure of each indoor radiator 100 is nearly the same, in order to obtain an equal enthalpy (hi out), it is enough when the overcooling degrees are equal. Therefore, when the heating medium flow rate is controlled so as to make constant the overcooling degree at the downstream side of the indoor radiator 100, it is possible to control at the flow dividing rate (flow dividing ratio) depending on the heating capacity.

Actually, however, the heating capacity and required heating capacity are often different, and for this flow dividing control, it is necessary to adjust the heating capacity of the indoor radiator 100 to the required heating capacity by proper control means, that is, to control the air flow of the indoor fans 104, 106. Since the fan flow rate is approximately proportional to the rotating speed of the fan, the rotating speed ratio is as follows.

$$F1:F2:F3 = Q1/\Delta T1 : Q2/\Delta T2 : Q3/\Delta T3 \qquad (13)$$

where F is the rotating speed of the fan, Q is the required heating capacity of each indoor radiator, and $\Delta T$ is the difference between the condensation temperature and room temperature.

Figure 81:
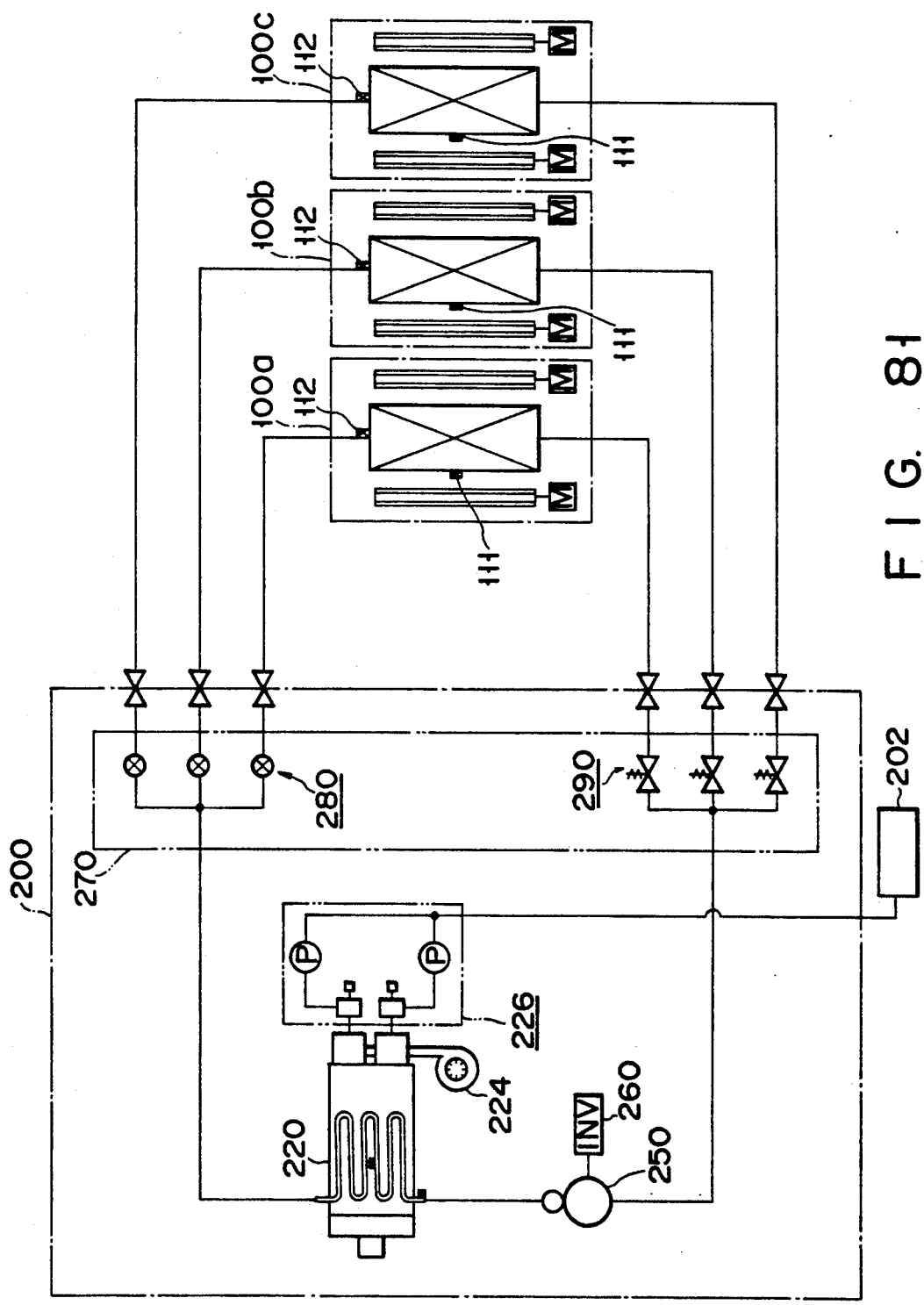

The overcooling degree is determined by the difference between the condensation temperature (actually, a temperature sensor 111 is installed in the middle part of the heat exchanger 102 of the indoor radiator 100, and the temperature of the heating medium in this middle part is measured), and the heating medium temperature at the exit of the temperture sensor 112 installed at the downstream side (exit) of the indoor radiator 100, as shown in the system configuration in FIG. 81. If this overcooling degree is excessive, the circulation of the heating medium is too small for the heating capacity, and therefore the heating medium control valve 280 is opened widely, and to the contrary if the overcooling degree is too small, it is controlled to throttle the opening degree of the heating medium control valve 280.

Considering here the mounting position of the heating medium control valve 280, when installed in the outdoor unit 200, the state of the overcooling degree must be transmitted to the outdoor unit controller 500, but when installed in the indoor radiator 100, such transmission is not needed, and the heating medium control valve 280 can be controlled by the indoor unit controller 400 alone, and it is very advantageous for the cost of control.

Besides, the overcooling degree at the exit of the indoor radiator 100 can be detected securely and easily at the indoor radiator 100 side, but an approximate value may be also obtained at the outdoor unit 200 side. This technique is explained below.

Figure 82:
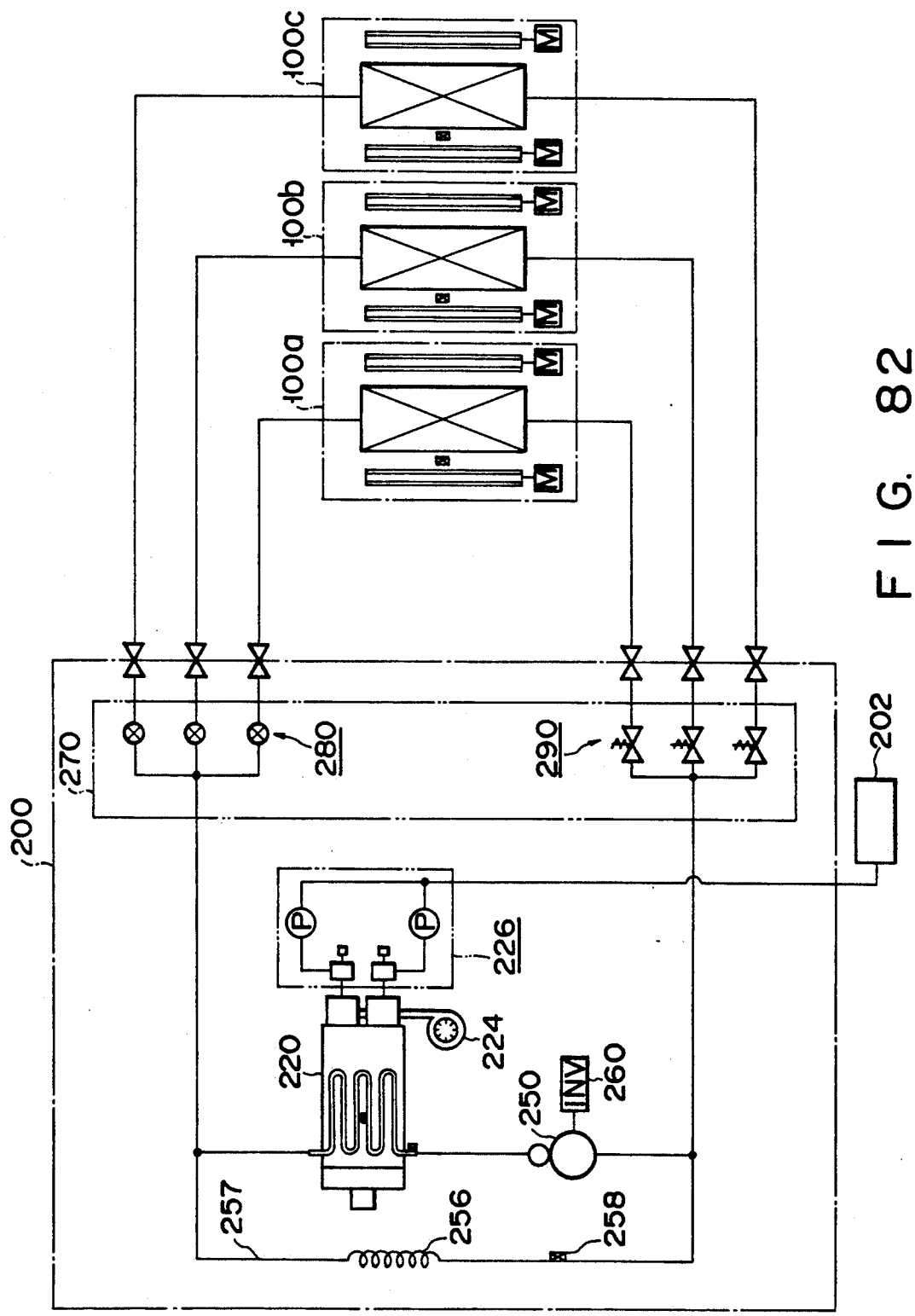

The exit temperature of the indoor radiator 100 may be also detected by the outdoor unit 200, but it is difficult to detect the condensation temperature. Accordingly, as shown in the system configuration in FIG. 82, a bypass piping 257 having a capillary tube 256 is installed from the exit of the gas pump 250 and the entrance of the heating medium heater 230. The heating medium flow passing this bypass piping 257 is very small because it is throttled by the capillary tube 256, and the vapor is gradually changed in phase to liquid by the release of heat from the outer wall of the bypass piping 257. In this case, the pressure of the upstream side of the capillary tube 256 of the bypass piping 257 is nearly equal to the pressure of the intermediate part of the heat exchanger 102 in the indoor radiator 100, and therefore the temperature in the condensation part in the bypass piping 257 becomes equal nearly to the condensation temperature of the indoor unit 100. Hence, by detecting the temperature of the condensation part of the bypass piping 257 by the temperature sensor 258 disposed in the bypass piping 257, the overcooling degree can be detected in the outdoor unit 200, and it is not necessary to send temperature signal to the indoor unit controller 400 of the indoor radiator 100. In this case, by installing the heating medium control valve 280 in the outdoor unit 200, constant control of overcooling degree may be effected.

In the case of constant control of overcooling degree, as the signal sent from the indoor unit controller 400 to the outdoor unit controller 500, it is necessary to transmit two signals, that is, the over-cooling degree signal and the frequency control signal of the gas pump 250, and by transmitting the overcooling degree signal and frequency control signal alternately, or by transmitting the overcooling degree signal by placing at specified interval in the hertz control signal, the two signals can be transmitted from the indoor unit controller 400 to the outdoor unit controller 500 without increasing the number of transmission bits.

Figure 83:
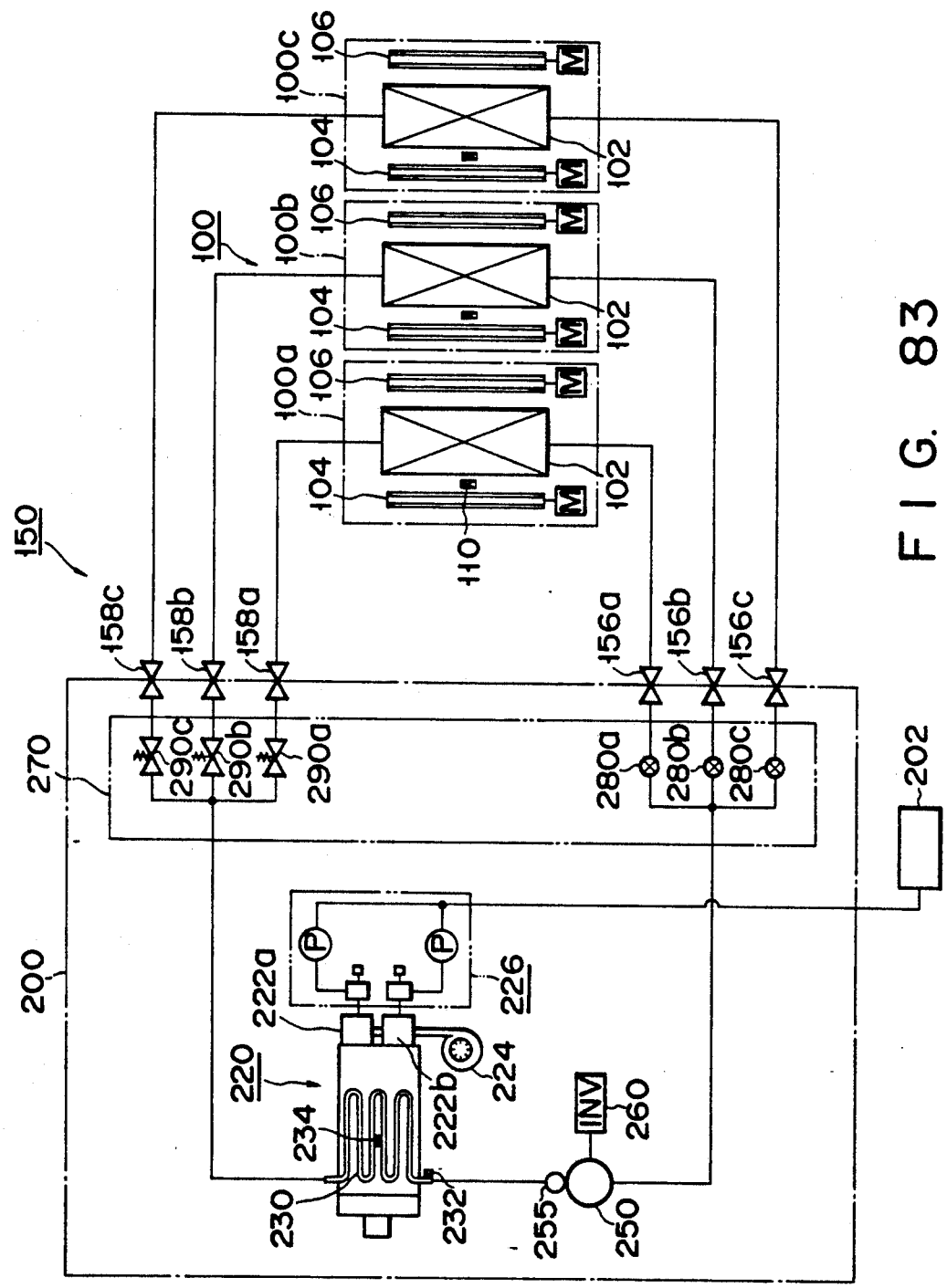

The system configuration in FIG. 83 shows the exchanged arrangement of the heating medium control valve 280 and two-way valve 290, and the heating medium control valve 280 is disposed at the downstream side of the gas pump 250 and the two-way valve at the upstream side of the heating medium heater 220. By thus laying out, the distribution ratio (flow dividing ratio) of the heating medium is controlled in the state of vapor. In this case, the heating medium control valve 280 itself becomes larger than in the foregoing embodiment, but the controllability is enhanced.

Explained next is how to deal with the extra heating medium left over during heating operation. In the case of three indoor radiators 100, supposing the operation modes of the indoor radiators 100, four patterns are considered, that is, one unit running, two units running, three units running, and three units stopping. The heating medium circulation of the cycle reaches the maximum when the heating capacity of all three units in operation is set to maximum, and becomes the minimum when the heating capacity is set to minimum in only one unit in operation. Since the amount of heating medium sealed in the cycle is constant, the heating medium is surplus when operating one unit or two units. If the heating medium is surplus, the heating medium is not evaporated completely in the heating medium heater 220, and the liquid is compressed at the entrance side of the gas pump 250. When liquid compression occurs, as mentioned above, it may lead to trouble of the gas pump 250. Accordingly, in order to deal with this surplus heating medium, as a technique of passing into the indoor radiator(s) 100 at rest, it may be considered to install a capillary tube at the inlet side of the indoor radiator 100 or adjust the opening degree of the heating medium control valve 280.

Figure 84:
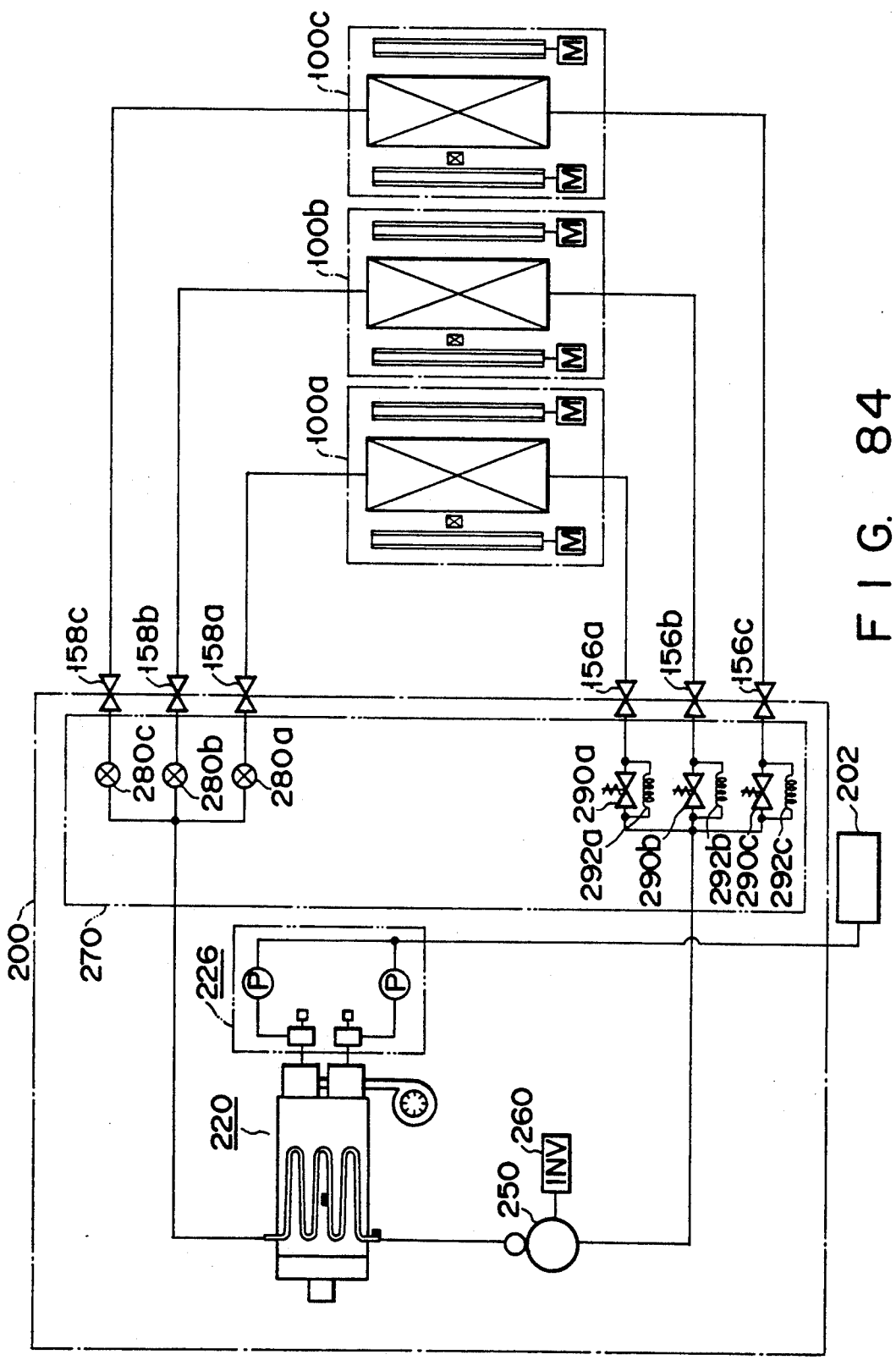

FIG. 84 shows a system configuration in which a capillary tube is installed at the entrance side of the indoor radiator. As shown in FIG. 84, capillary tubes 292a, 292b, 292c are disposed parallel to the two-way valves 290a to 290c of the flow divider 270 installed in the outdoor unit 200 of the heating medium inlet side (upstream side) of each indoor radiator 100.

The operation in the above constitution is described below. While three indoor radiators 100 are running, the two-way valves 290a to 290c are open, and the heating medium becoming vapor as being heated by the heating medium heater 230 passes through the two-way valves 290a to 290c by the gas pump 250, and supplied into the indoor radiators 100a to 100c, and after releasing heat in the indoor radiators 100a to 100c, the heating medium is condensed to be liquid, and returns to the heating medium heater 220 by way of the heating medium control valves 280a to 280c.

Here, when the operation action of the indoor radiator 100a is stopped, the two-way valve 290a is closed. When this two-way valve 290a is closed, the heating medium vapor flows slightly into the capillary tube 292a, and runs into the indoor radiator 100a. The slight heating medium vapor supplied in the indoor radiator 100 is condensed by the heat exchanger 102 in the indoor radiator 100, and is gradually turned to liquid heating medium to be discharged from the indoor radiator 100. The quantity of heating medium flowing into the indoor radiator 100 at rest is determined by the resistance of the capillary tube 292.

Thus, by installing capillary tubes 292 parallel to the two-way valves 290, a slight amount of heating medium vapor may be passed also into the indoor radiator 100 at rest, and the surplus heating medium is temporarily pooled in the indoor radiator 100 at rest, and is passed, so that a stable heating medium quantity may be supplied in the operation cycle.

The treatment of heating medium by adjustment of opening degree of heating medium control valve 280 is explained below by referring to the system configuration in FIG. 2. When one of the indoor radiators 100 is stopped, the two-way valve 290 at the upstream side of the indoor radiator 100 is closed. When this two-way valve 290 is closed, the heating medium is left over in the indoor radiator 100 which has been running so far. If the remaining degree is much, the heating medium in the operation cycle become insufficient, and the exit temperature of the heating medium heater 220 is raised. As a result, the circulation of the heating medium is insufficient, and the heating medium in the indoor radiator 100 at rest must be returned into the operation cycle. When returning into the operation cycle, the two-way valve 290 at the upstream side of the indoor radiator 100, and the heating medium control valve 280 is gradually opened from the stopped state. If opened at once, however, a cool heating medium enters the operation cycle, and therefore the temperature of the heater 220 is lowered and the hot air temperature of the indoor radiator 100 also declines.

In this two-way valve 290, since it is opened fully or closed fully because it cannot be opened or closed gradually, the flow rate is controlled at the side of the heating medium control valve 280. Thus, when the opening degree of the heating medium control valve 280 is adjusted, the cooled heating medium gradually enters the operation cycle from the indoor radiator 100 at rest, and sudden temperature changes are avoided, and a stable operation is realized.

Figure 85:
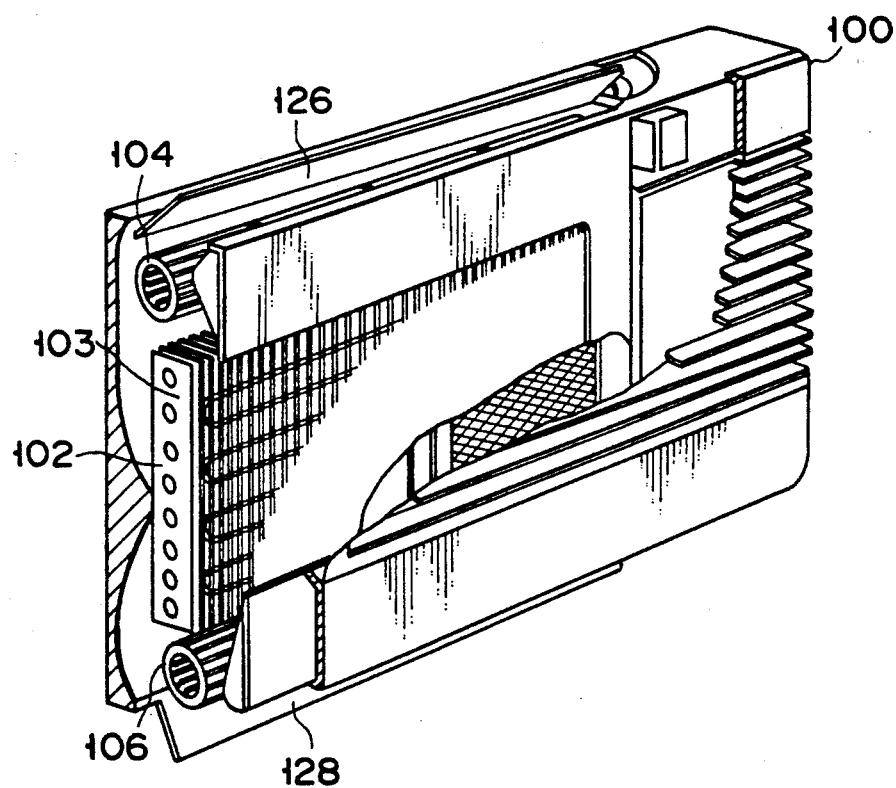

Recovery of heating medium by using liquid pump 800 is described below. In the cycle using liquid pump 800 (the second embodiment), in order to prevent idling of the liquid pump 800 when starting up, the heating medium must be recovered in the liquid pump 800 and liquid tank 810. The place where the heating medium is likely to be condensed while not in operation is inside the heat exchanger 102 of the indoor radiator 100, and as a technique for forcing out the heating medium collected in the heat exchanger 102, in this apparatus, a heater 103 is installed at the upstream side in the air flow direction of the heat exchanger 102 of the indoor radiator 100 as shown in the sectional structural drawing of the indoor radiator in FIG. 85. The heating medium in the closed cycle is evaporated at a place of high temperature, and is likely to be condensed at a place of low temperature, and by making use of this property, the heating medium is recovered. That is, when recovery of heating medium is necessary when starting up, the heater, or the heater 103 and fans 104 and 106 are operated to heat the heat exchanger 102, so that the heating medium collected inside the heat exchanger 102 can be forced out into the liquid tank 810 of the outdoor unit 200.

Figure 86:
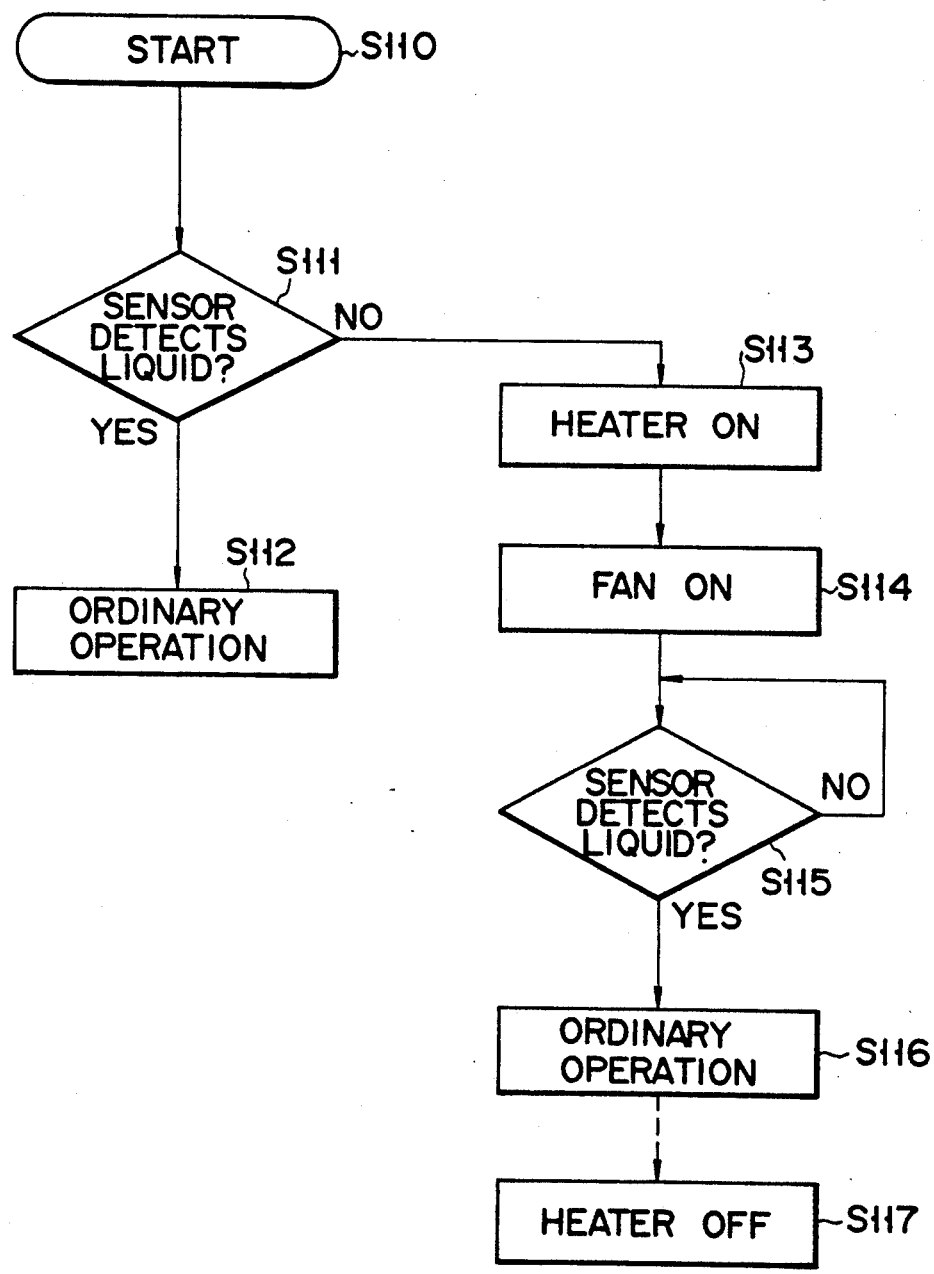

Here, control of the heating medium recovery in this composition is explained by referring to the heating medium recovery flow chart as shown in FIG. 86 and the operation timing chart in heating medium recovery as shown in FIG. 87. First, when the operation start switch is turned on (step S110), it is judged whether recovery of heating medium is necessary or not by seeing if there is heating medium in the liquid tank 810 or not by the gas-liquid judging sensor 816 in the liquid tank 810 disposed at the upstream side of the liquid pump 800 (step S111). When the gas-liquid judging sensor 816 detects liquid (YES), ordinary operation is effected (step S112). When the gas-liquid judging sensor 816 does not detect liquid (NO), the heater 103 disposed closely to the heat exchanger 102 in the indoor radiator 100 is energized (step S113), and the fans 104, 106 are put in rotation (step S114) to force out the heating medium collected in the heat exchanger 102 into the liquid tank 810 in the outdoor unit 200. Judging the state of the heating medium in the liquid tank 810 by the gas-liquid judging sensor 816 (step S115), steps S113 and S114 are repeated until the gas-liquid judging sensor 816 detects liquid. Or when the gas-liquid judging sensor 816 detects liquid (YES), the ordinary operation is set forth (step S116), and energization to the heater 103 is stopped. By operating in this way, the heating medium collected in the heat exchanger 102 in the indoor radiator 100 can be recovered.

Shown below is a modified example of control of dual cylinder type combustion unit 222 explained in the first embodiment. The control of burning the other combustion unit at low combustion while burning one combustion unit 222a of the dual cylinder type combustion unit 222 is explained by referring to FIG. 14 to FIG. 18. This control is intended to avoid the drop of the pressure in the heat absorbing chamber 350 and heat exchanger (heat absorber) 230 for heating the heating medium in low combustion operation so as to prevent dew condesantion. The operation of this control is explained below.

When the required heating capacity of the indoor radiator 100 becomes small, the combustion quantity drops as mentioned earlier. When the combustion quantity drops, since the heating area of the heat exchanger 230 for heating the heating medium is wide, the temperature of the heat absorbing chamber 350 and the heat exchanger 230 for heating the heating medium is lowered, and the steam contained in the combustion gas becomes lower than the condensation temperature and dew is condensed in the heat absorbing chamber 350 and heat exchanger 230 for heating the heat exchanger. To prevent this, one combustion unit 222b is burned in very feeble combustion. At this time, the other combustion unit 222a is burning at a combustion quantity corresponding to the required heating capacity of the indoor radiator 100. The feeble combustion operation of the combustion unit 222b may be either constant combustion or alternate operation of combustion and non-combustion. By such operation, lowering of temperature of the heat absorbing chamber 350 and heat exchanger 230 for heating the heat exchanger may be avoided, thereby preventing condensation of dew.

The control of passing air into the other combustion unit 222b while burning only one combustion unit 222a of the dual system 222 is explained by reference to FIG. 14 to FIG. 18. This control is also intended to avoid lowering of temperature in the heat absorbing chamber 350 and heat exchanger 350 for heating the heating medium in low combustion operation as in the former case so as to prevent dew condensation. The operation of this control is explained below.

When the required heating capacity of the indoor radiator 100 becomes smaller, the combustion quantity also drops as mentioned above. At this time, combustion air is passed into the other combustion unit 222b. At the same time, the combustion unit 222a is burning at the combustion quantity corresponding to the required heating capacity of the indoor radiator 100. By operating in this way, combustion gas hardly enters the heat absorbing chamber 350 for passing the combustion air, and the steam partial pressure in it becomes low, and the temperature drop of the heat absorbing chamber 350 and heat exchanger 350 for heating the heating medium may be prevented, so that dew condensation is avoided.

In the case of single operation of combustion unit 222, the combustion units 222a and 222b may be operated alternately at certain time intervals.

The draft adjustment of the combustion air into the dual cylinder combustion unit 222 employed in the first embodiment is explained below.

The combustion air into two combustion units 222 is sent in by one air blow fan 224. The total draft may be controlled by the rotating speed of the air blow fan 224 but in order to obtain a favorable combustion state, it is necessary to distribute the draft uniformly into the combustion units 222 by some means (in order to equalize the combustion quantity of the combustion units 222a and 222b). In the case of this apparatus, a wide variable range of capacity is required to heat one to three rooms (in this embodiment 600 kcal/h to 6000 kcal/h), and the combustion state is rather immoderate at the maximum and minimum combustion quantity. In particular, the imbalance of the draft of the combustion air is particularly notable at the minimum combustion, and it leads to unstable burning. The supply of air into the combustion air 222 may be improved when the flow is straightened, but the design is not made compact. Accordingly, if there is any adjusting member for distributing uniformly the draft so as not to affect the combustion state, the total draft may be supplied to the air blow fan 224, and the distribution may be adjusted relatively easily by such adjusting member.

If such adjusting member is not available, in spite of determination of the draft depending on the required combustion quantity, the air volume supplied into each combustion unit 222 may be either uniform or excessive on either side. This is due to the intrinsic bias of the air blow fan 224 or laying route of the draft duct. If the air blow fan is biased, the combustion quantity of the smaller draft side may be decreased and the combustion quantity of the larger draft side may be increased, but it it necessary to adjust every time the required combustion quantity changes, and sensing means for understanding the combustion state is needed and the control is complicated and becomes unrealistic.

Accordingly, as shown in the configuration of the combustion air adjusting section in FIG. 88 to FIG. 93, it is designed to adjust the bias if the draft by a single knob. This structure is explained below.

Numeral 750 is a wind box, in which two combustion units 222a and 222b are incorporated. The combustion units 222a and 222b are provided with an air intake port 752 for taking in air necessary for combustion. On the opposite side of the air intake port 752, an air duct 754 of the wind box 750 is positioned. In the air duct 754, there is an member 756 crossing over its shaft. When the adjusting member 756 is positioned as shown in the top view, side view and front view of the combustion air adjusting section in FIG. 88 to FIG. 90, much air can be supplied into the combustion unit 222a, and when positioned as shown in the top view, side view and front view of the combustion air adjusting section in FIG. 91 to FIG. 93, much air can be supplied into the combustion unit 222b. When the adjusting member 756 can be easily adjusted outside of the air duct 754, the bias of the draft may be adjusted in a short time when assembling the combustion unit.

Aside from the adjusting member 756, in another technique, adjusting means may be disposed at each air intake port 752 (possible where the variable width of capacity is small). In this case, the both may be disposed. The reason is that the total air volume is determined by the rotating speed of the air blow fan, and by opening or closing the one side to determine the air distribution into the own side, the air volume entering the other side is automatically determined. In the case of the adjusting member in the throttling direction, a slightly more air volume is distributed from the beginning into the combustion unit having the adjusting member, and to the contrary in the case of the adjusting member in the opening direction, it is necessary to set to a slightly smaller volume.

An example of control by one carburetor of the dual cylinder combustion unit 222 in the first embodiment is explained here. In the first embodiment, two carburetors were used for two combustion units 222. At this time, the gasification of the fuel treated by one carburetor is at a rate of 6000 kcal/h to 3000 kcal/h or 5:1. By contrast, using one carburetor only, the rate is double to 10:1. If the required combustion quantity varies significantly from the minimum to the maximum in this range, or from the maximum to the minimum, or when commuting between the maximum and the minimum, the fuel flow rate into the carburetor changes drastically, and the carburetor temperature which is desired to be controlled constant is not stabilized. When the carburetor temperature tends to be lower for some time, the tarry deposit may be formed in the carburetor. Or when the temperature drops, the fuel is left over in the carburetor, and the controllability is worsened. Accordingly, in spite of lowering of combustion quantity, the fuel injection volume may not be changed. To make the matter worse, the delay time varies with the combustion time already at the combustion quantity, and is not constant. It is hence difficult to adjust the combustion air depending on the combustion quantity, and the combustion performance may be lowered to release exhaust gas containing soot or offensive smell.

To prevent this, it is necessary to increase the heat capacity of the carburetor or increase the capacity of the heater. The former technique of increasing the heat capacity is accompanied by increase of heat release and takes a longer starting time. Besides, the size of the carburetor is larger and the compact design is not expected. Solving of this problem may lead to increase of the heater size. In the latter technique, although a large current is needed when starting up the gas pump in the present state, a larger electric power cannot be supported. The heater input is not so large usually (maximum about 280 W), and constant control by increased size becomes complicated and the cost may be raised.

Considering such situation, when the required combustion quantity is increased, the fuel is supplied by controlling the carburetor temperature higher than the specified value preliminarily. When the combustion is stabilized, or after passing a specific time, it is returned to the specified value to continue control.

In a similar technique, it is known to vary gradually. In this case, too, sudden temperature rise or drop is rarely caused, and such inconvenience may be avoided. In this case, it is necessary to vary gradually the rotating speed of the air blow fan also in accordance with the fuel supply amount.

Next is explained a technique of preventing sudden drop of carburetor temperature when igniting the combustion unit 222. When the sum of the required combustion quantity is closer to Qmax, if feeding at once into the carburetor, the carburetor temperature may temporarily drop. At the carburetor temperature control side, only when this temperature drop occurs, the input is increased, and a delay is caused to induce such incovenience. To solve such problem, it is necessary to preheat the carburetor temperature to a specified level before the fuel suited to the required combustion is fed. By employing this technique, even if there is a sudden temperature drop in the carburetor, the carburetor temperature will not decline below the specified value, and such problem is avoided without having to increase the capacity of the carburetor or capacity of the heater.

Also a technique of gradually increasing the input is known. In this case, the control of the rotating speed of the air blow fan must be also variable depending on the supply amount of the fuel. At this time, when the number of running units is increased from one to two, and two to three, the heating capacity drops temporarily regardless of the request from the already running indoor unit, the blowout temperature may drop, which may be felt unreliable for the user.

In another technique, it is possible to start at specified combustion quantity any time. The optimum starting combustion quantity is determined in relation with the thermal capacity of the carburetor and the combustion quantity. When this technique is employed, although it is not possible to respond quickly to the required heat, secure ignition is achieved while sudden lowering of carburetor temperature may be prevented.

An example of the technique for preventing sudden drop of the carburetor temperature has been described above.

Figure 94:
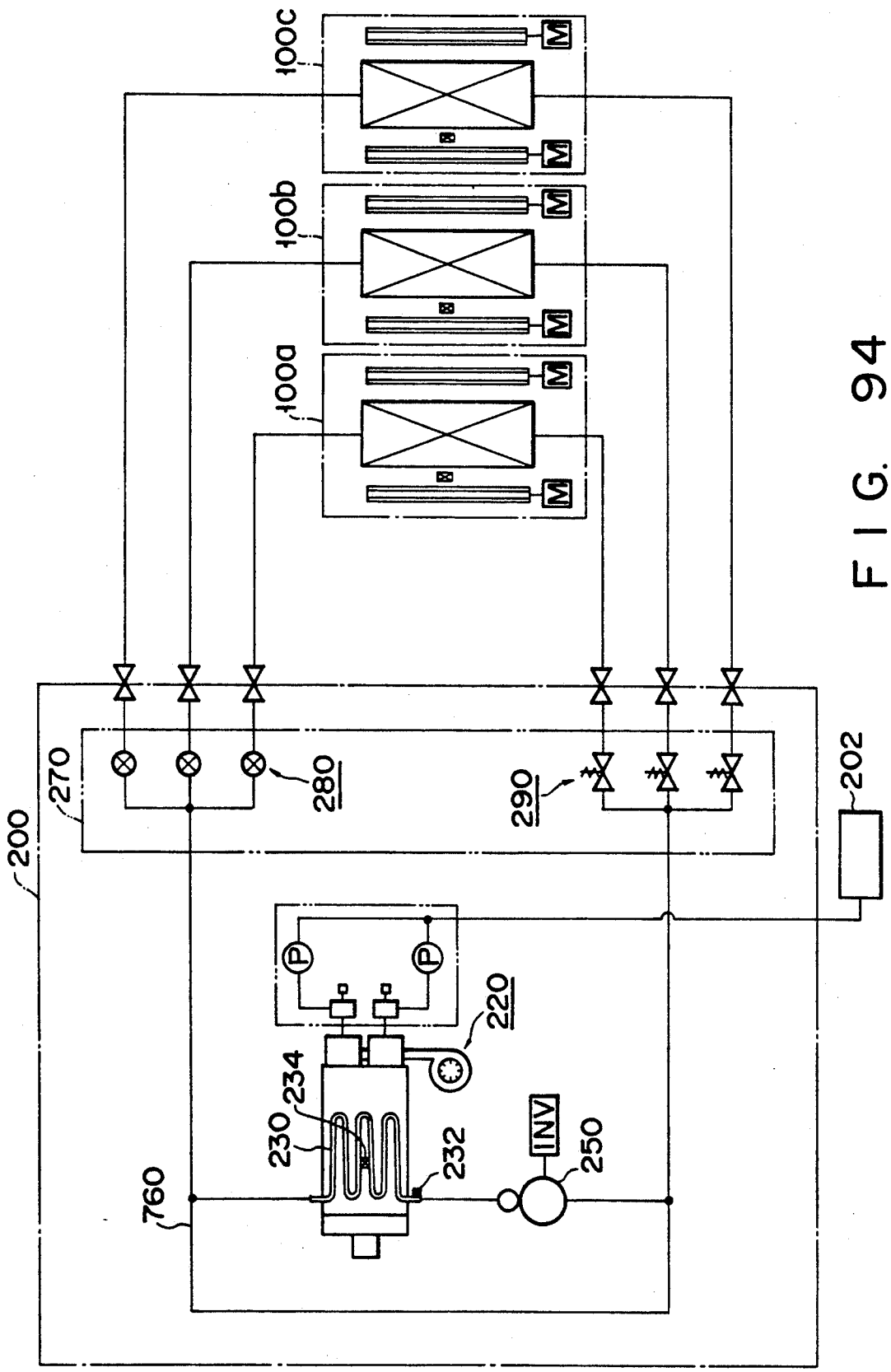
Figure 95:
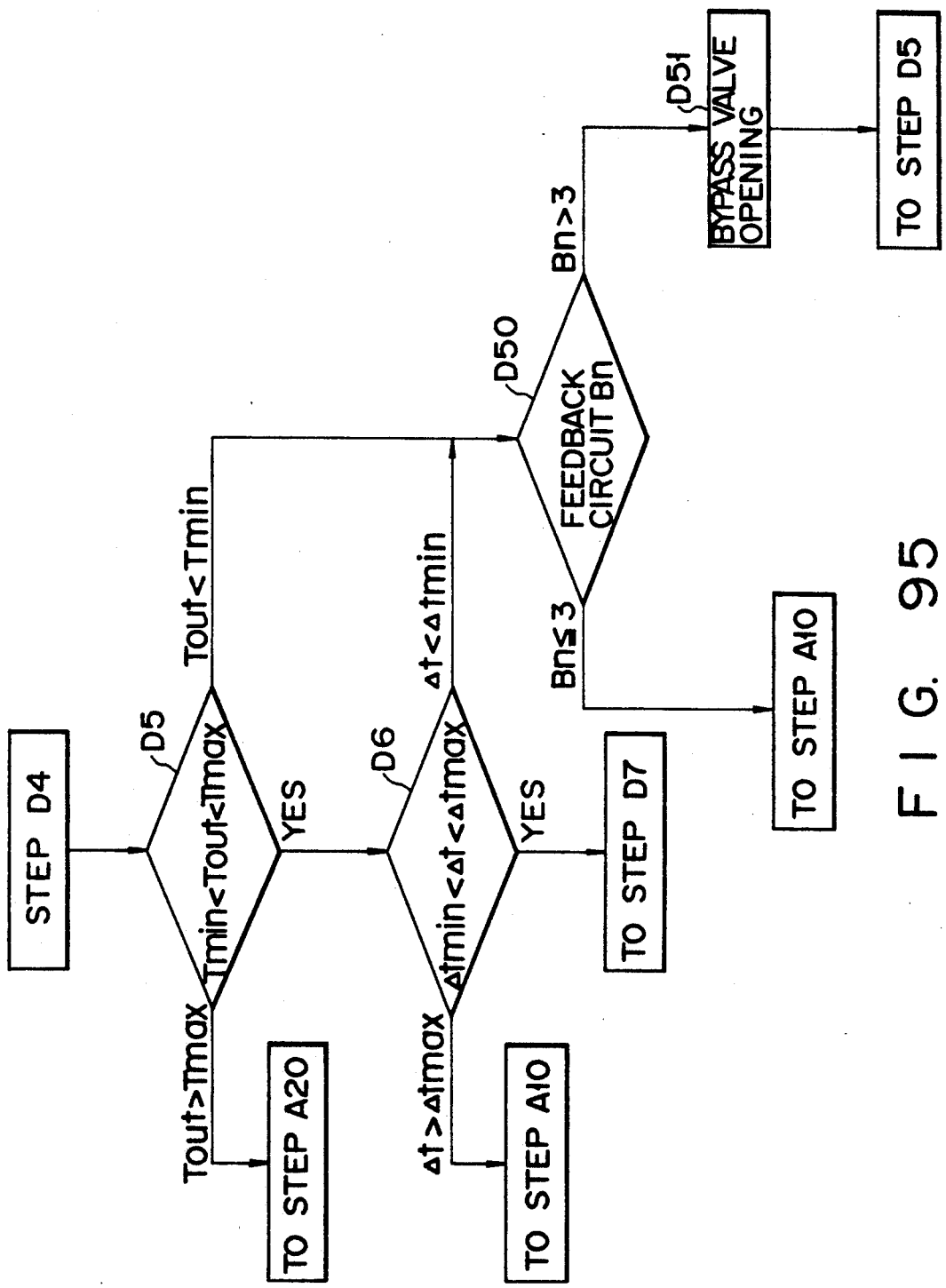

The control of the heating medium circulation in the case of installing a bypass route in the heating cycle of the first embodiment is described below. FIG. 94 is a system configuration diagram including a bypass circuit. As shown in the diagram, the downstream side of the gas pump 250 and the upstream side of the heating medium heater 220 are connected with a bypass piping 760, and a heating medium control valve (a bypass valve) 762 is installed in this bypass piping 760. By installing the bypass piping 760 and bypass valve 762, the circulation amount can be corrected in relation to the limit of the adjustment of the circulation amount by the inverter of the gas pump 250. Hereinafter, the operation of the circulation amount control is explained by referring to the heating medium circulation control flow chart in FIG. 95.

After start of operation of the apparatus (step D4), the exit temperature Tout of the heat exchanger 230 of the heating medium heater 220 is detected by the temperature sensor 232, and it is judged if this temperature is within the allowable temperature range (Tmin<Tout<Tmax) (step D5). At this time, if the exit temperature Tout is in a range of Tout>Tmax, returning to step A20, the combustion unit 222 is stopped. If Tmin<Tout<Tmax, the super heat Δt of the exit is detected, and it is judged if this superheat Δt is within an allowable range (Δtmin<Δt<Δtmax) or not (step D6). When the superheat Δt is in a range of Δt>Δtmax, the operation continues (step D7). At step D5, if the exit temperature Tout is in a range of Tout<Tmin, or when the superheat Δt is in a range of Δt<Δtmin, the information signal is fed back from the combustion unit controller 600 to the indoor unit controller 500, and the bypass valve 280 is adjusted to control so that the superheat Δt may be constant (Δt<Δt<Δtmax), but counting the number of times of feedback Bn (step D50), if Bn≦3, stopping action is effected (step A20).

When the number of times of feedback Bn is in a range of Bn>3, the bypass valve 762 of the bypass piping 760 is opened, and the heating medium is passed into the bypass piping 760 to optimize the circulation amount. Afterwards, returning to step D5, while monitoring the exit temperature Tout, the bypass valve 762 is adjusted so that the superheat Δt may be constant. If the condition is not satisfied here, same as previously, the number of times of feedback Bn is counted, and opening or closing of the bypass valve 762 of the bypass piping 760 is judged. By operating in this way, the heating medium circulation amount is optimized. Or as the timing for opening the bypass valve 762, it is also possible to control by using the timer.

Figure 96:
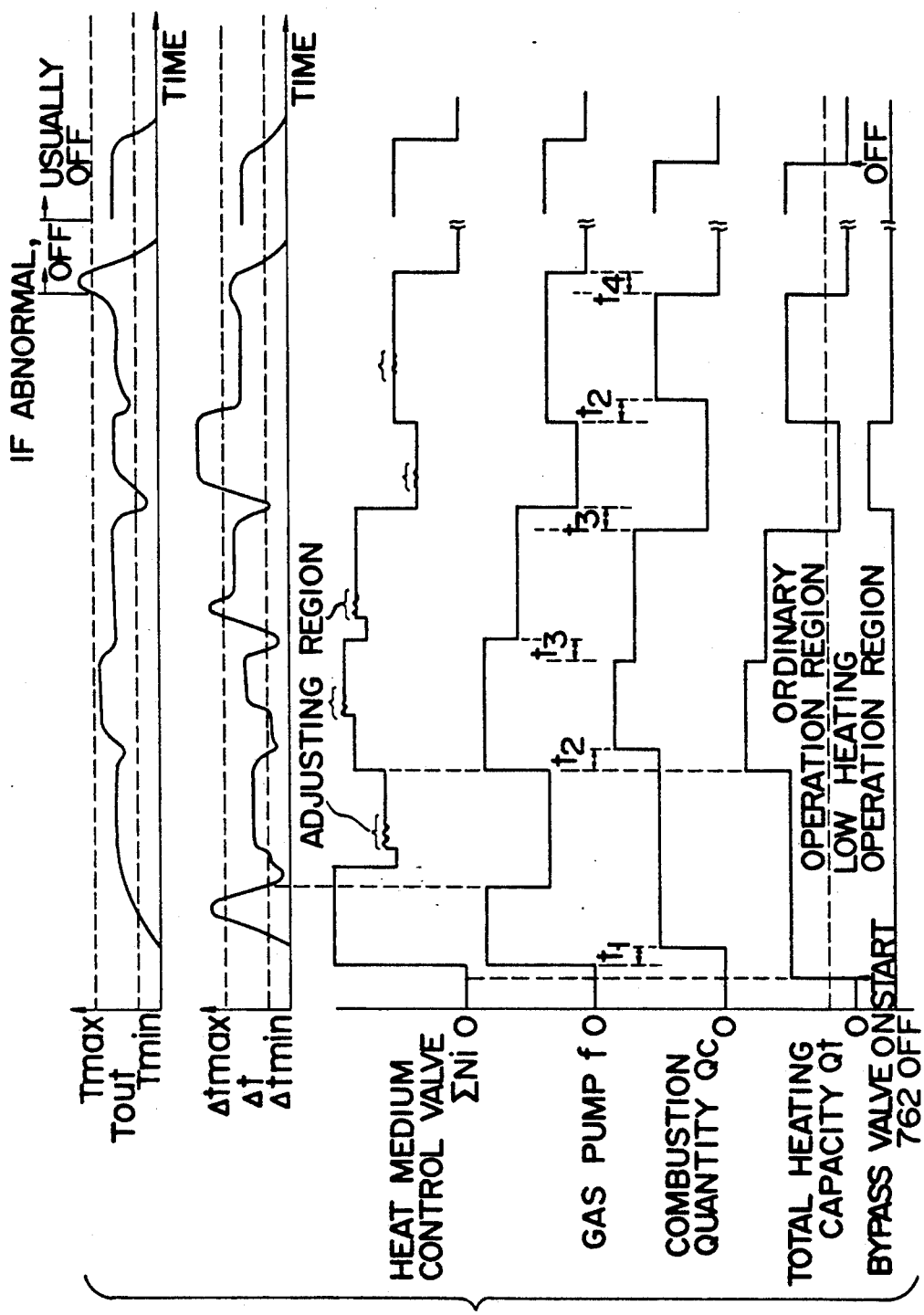

The timing of opening and closing the bypass valve 762 of the bypass piping 760 is explained by referring to the timing chart in FIG. 96. After the total heating capacity Qt explained in FIG. 42 is lowered, the total heating capacity Qt is further decreased to enter into the low heating operation region, and this state is explained below. The decrease signal of the total heating capacity Qt is transmitted from the indoor unit controller 400 to the outdoor unit controller 500, and at the same time a control signal is sent from the outdoor unit controller 500 to the combustion unit controller 600, and by this combustion unit controller 600, the fuel pumps 226c and 226d, and air blow fan 224 are controlled, and the combustion quantity Qc of the combustion unit 222 is reduced to the value corresponding to the required heating capacity Qt.

Afterwards, time t3 later, by the control signal from the outdoor unit controller 500, the opening degree of the heating medium control valve 280 and the motor speed of the gas pump 250 are decreased. At this time, since the heating medium in the cycle is more than the appropriate value, the bypass valve 762 is opened almost simultaneously with the adjustment of the heating medium control valve 280, and the heating medium is passed into the bypass piping 760, thereby optimizing by short-circuiting the heating medium.

Thereafter, the heating medium control valve 280 is finely adjusted so as to keep the superheat $\Delta t$ constant. At this time, in order to prevent dew condensation on the heat exchanger 230 for heating the heating medium, the heating medium control valve 280 is adjusted so that the exit temperature Tout of the heat exchanger may be in a range of Tmin<Tout<Tmax. Only at this time, it is possible that the superheat $\Delta t$ may be in a relation of $\Delta t > \Delta t\text{max}$, but the heating medium control valve 280 is not adjusted, and the operation continues as far as the exit temperature Tout remains in a relation of Tout<Tmax.

Afterwards, when the total heating capacity Qt increases to get into the ordinary operation region, along with the increase, the bypass valve 762 is closed, and the opening degree of the heating medium control valve 280 and the motor speed of the gas pump 250 are increased. Time t2 later, the combustion quantity Qc is increased to control the superheat $\Delta t$ constant.

The control of other heating medium quantity is described below in relation to the system configuration in FIG. 97. As shown in the diagram, connecting the downstream side of the gas pump 250 and the upstream side of the heating medium heater 220 with a bypass piping 770, heat exchanger 772, liquid sump 774, and heating medium control valve (bypass valve) 776 are installed from the side closer to the gas pump 250 of the bypass piping 770. The liquid sump 774 is intended to pool the surplus heating medium when only one or two indoor radiators 100 are put in operation. The heat exchanger 772 is installed through a duct 778 so as to receive the draft from the air blow fan 224 for sending out the combustion air. This circulation amount control is explained below.

As mentioned earlier, the heating medium in this apparatus is charged in a sufficient quantity required when three indoor radiators 100 are put in operation, and therefore the heating medium is surplus in the case of operation with one or two units. Accordingly, when only one or two indoor radiators 100 are put in use, the bypass valve 776 of the bypass piping 770 is opened to a predetermined opening degree to pass the heating medium into the bypass piping 770. This heating medium flows into the heat exchanger 772, and is cooled by the draft from the air blow fan 224 at the heat exchanger 772 to be condensed into liquid phase and collected in the liquid sump 774. While repeating this operation, the heating medium circulation amount is optimized, and the exit temperature Tout of the heat exchanger 230 for heating the heating medium of the heating medium heater 220 settles within the allowable temperature range. Receiving this information, closing the bypass valve 776, the extra heating medium is collected in the liquid sump 774. When increasing the number of running units of the indoor radiators 100, the bypass valve 776 is opened to pass the heating medium at once into the bypass piping 770, and the opening degree of the bypass valve 776 is adjusted while monitoring the exit temperature Tout of the heat exchanger 230 for heating the heating medium, thereby optimizing the circulation amount of the heating medium.

Explained below is the recovery of the heating medium when dismounting the indoor radiators 100. As the heating medium, chlorofluorocarbons are widely used, and some of them contain components that destroy the ozone layer and discharge of such components casts a serious environmental problem. Or if there is naked flame or fire nearby, toxic gas such as phosgene is generated to be set in a dangerous state. At the machine side, even the lubricating oil may be discharged along with the release of the heating medium, or rusting of the rotary machine may be feared. It is necessary to evacuate when sealing again, but once released, it is difficult to evacuate because of mixture of impurities and it takes time in field job. Or when the heating medium is charged in this state, the thermal efficiency may be lowered. Or if dismounted without recovering, a proper heating medium quantity is not obtained when resuming operation, and the capacity is insufficient. (It is difficult to judged the refilling amount because the storage amount is not known.) Accordingly, the heating medium is recovered in the following technique.

First referring to the basic cycle configuration in FIG. 2, a general recovery technique is explained.

In this case, the gas pump 250 is operated by using the heating medium control valves 280 and two-way valves 290. At this time, the fans 104 and 106 of the indoor radiators 100 are not put in operation. By the heating medium gas from the gas pump 250, the indoor radiators 100 are clarified, and the two-way valves 290 and heating medium control valve 280 are closed. As a result, almost all heating medium can be recovered from the indoor radiators 100 into the piping at the upstream side of the heating medium heater 220 of the outdoor unit 200. If the recovery container is too small, a liquid sump may be provided. The heating medium gas left over in the indoor radiators 100 is only the portion of the saturated steam of temperature, and the heating medium of this amount is released into the atmosphere by detaching the indoor radiators 100. When mounting, therefore, after completion of connection of pipings, fill with heating medium gas (equivalent to ambient saturation vapor pressure) by using the packed valves 156a to 156c, 158a to 158c to cover up for the released portion of the heating medium. In this way, nearly the same heating medium amount as before dismounting is obtained.

Referring to the cycle configuration in FIG. 97, the technique for recovery of heating medium by connecting the bypass piping 770 is explained. In this case, while stopping the fans 104 and 106 of the indoor radiators 100, the gas pump 250 and heating medium heater 220 are sequentially put into specified heating medium recovery operation (weak operation). To begin with, the two-way valve 290 and heating medium control valve 280 are opened, and after a specific time the two-way valve 290 is closed. At this time, when the bypass valve 776 is opened, the heating medium flows into bypass piping 770, and after releasing heat at the heat exchanger 772, it is condensed to be liquid, and is supplied in the liquid sump 774. As the heating medium circulation amount decreases and when reaching the exit temperature of the heat exchanger 230 for heating the heating medium defined in the heating medium recovery operation, the combustion is stopped, the gas pump 250 is stopped, and the two-way valve 290 and bypass valve 776 are closed. By operating in this way, the heating medium can be entrapped in the liquid sump 774 in the bypass piping 770 or the piping in the outdoor unit 200. In this way, the heating medium is recovered when dismounting the indoor radiator 100.

Figure 98:
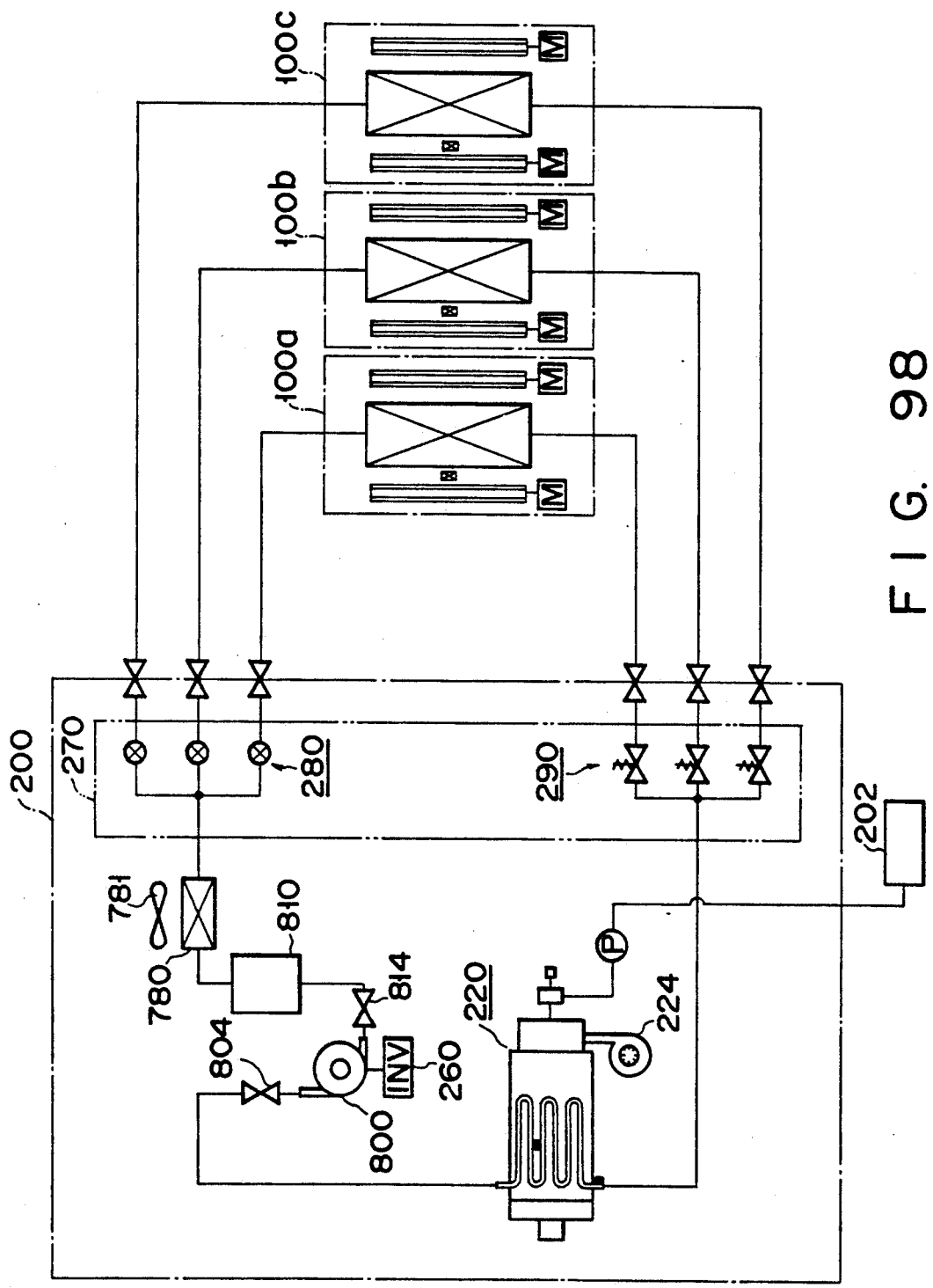

Described below is a modified example of prevention of idling of the liquid pump 800 when using the liquid pump 800. FIG. 98 is a system configuration for preventing idling of the liquid pump. As shown in the diagram, a heat exchanger 780 is disposed at the upstream side of the liquid tank 810. In ordinary operation, the state of the heating medium at the downstream side (heating medium exit side) of the indoor radiator 100 is slightly overcooled, but when the operating condition is suddenly changed, the heating medium may not be always overcooled. In such a case, the vapor is mixed in to form gas-liquid two-phase state, and the circulation flow rate is lowered by the portion of the vapor. At this time, the exit temperature of the heat exchanger 230 of the heating medium heater 220 is raised, and the cycle is adversely affected. Here, the heating medium sent from the indoor radiator 100 in the gas-liquid two-phase state is cooled by the heat exchanger 780 to return to the liquid state securely, and by passing only the liquid heating medium to the liquid pump 800, idling of the liquid pump 800 may be prevented, so that a sufficient heating medium circulation may be obtained. By providing the heat exchanger 780 with a fan 781, the heat exchanger 780 may be reduced in size. This fan 781 may be operated when a sufficient overcooling degree is not obtained by sensing the overcooling degree. This fan may be also used commonly with the combustion air blow fan 224 for cooling the heat exchanger 780.

Figure 99:
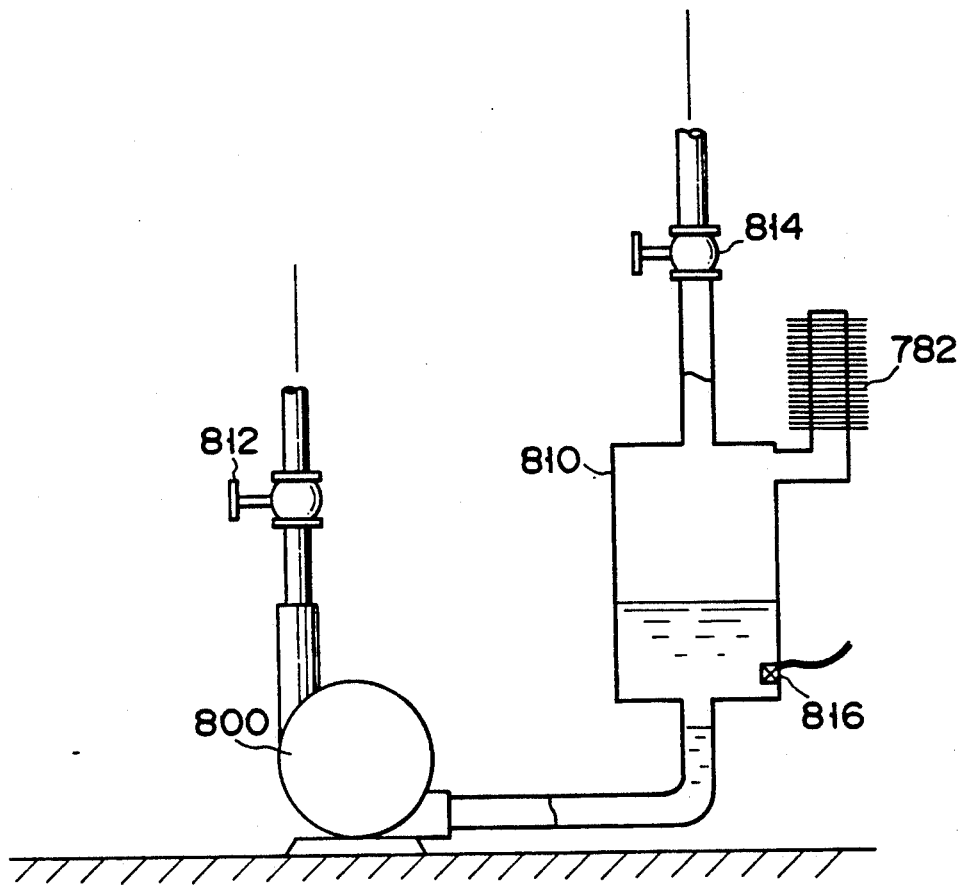

As other technique of preventing idling, as shown in the configuration of the liquid tank in FIG. 99, by installing a radiator 782 above the liquid tank 810, the heating medium, if entering the liquid tank 810 in the gas-liquid two-phase state is condensed in the radiator 782 to be liquid heating medium, which ropes into the tank 810, and a perfect liquid heating medium only is sent into the liquid pump 800. Hence, idling of the pump 810 may be prevented.

As the technique for preventing mixture of vapor into the pump 800, the vibration of liquid pump 800 may be detected. In this technique, when vapor is mixed in the liquid pump 800, as compared with the normal operation, the vibration of the liquid pump 800 increases, and by detecting the vibration of this pump, mixture of vapor may be detected. As the sensor for detecting this vibration, a vibration pickup is used in the case explained below.

As the vibration pickup, an accelerometer is generally used. A typical piezoelectric accelerometer is shown in FIG. 100. This piezoelectric accelerometer is composed of a relatively heavy mass 790, two piezoelectric element 791 supported by this mass 790, and a housing 792 for supporting them, and the mass 790 so preliminarily loaded with a spring 793. According to the principle of operation, as the mass 790 is vibrated, a force is applied to the piezoelectric element 791, and this force is converted into an electric signal by the piezoelectric effect to detect the vibration, and this signal is transmitted from the output cable 794 into the outdoor unit controller 500.

This vibration pickup (piezoelectric accelerometer) is adhered to the liquid pump 800 or the piping near the liquid pump 800, and when the vibration of this part exceeds a certain allowable value, the entire system including the liquid pump 800 is stopped, and the entry of vapor into the liquid pump 800 may be quickly detected, so that breakdown of the pump may be prevented.

Next is explained other technique for weighting (determining the base value of) the opening degree of the heating medium control valve 280. This is to teach the difference in the pending degree of the heating medium control valve 280 due to pressure loss in the indoor radiator 100 in trial operation mode after installation of the apparatus to the outdoor unit controller 500. This operation is explained below.

When the apparatus is installed in the house, each indoor radiator 100 is burned at specified combustion quantity to perform heating operation, and the opening degree of the heating medium control valve 280 is adjusted so that the superheat $\Delta t$ at the exit of the heat exchanger 230 for heating the heating medium of the heating medium heater 220 may be constant. On the basis of the opening degree of the heating medium control valve 280 at this time, the base value is determined. Various methods may be considered for determining the base value, and the simplest technique is to use the opening degree at this time directly at the base value. This operation is effected in every indoor radiator 100, and after determining each base value, the trial operation mode is cleared to change to the ordinary operation mode. According to this technique, it is possible to determine the base value including not only the level difference of the indoor radiators 100, but also the pressure loss due to difference in length of the heating medium piping, and all other effects, and a more accurate base value is obtained. Or even if the configuration of the indoor radiators 100 is changed by moving of the house or other changes, the base value may be determined by performing trial run again.

Figure 101:
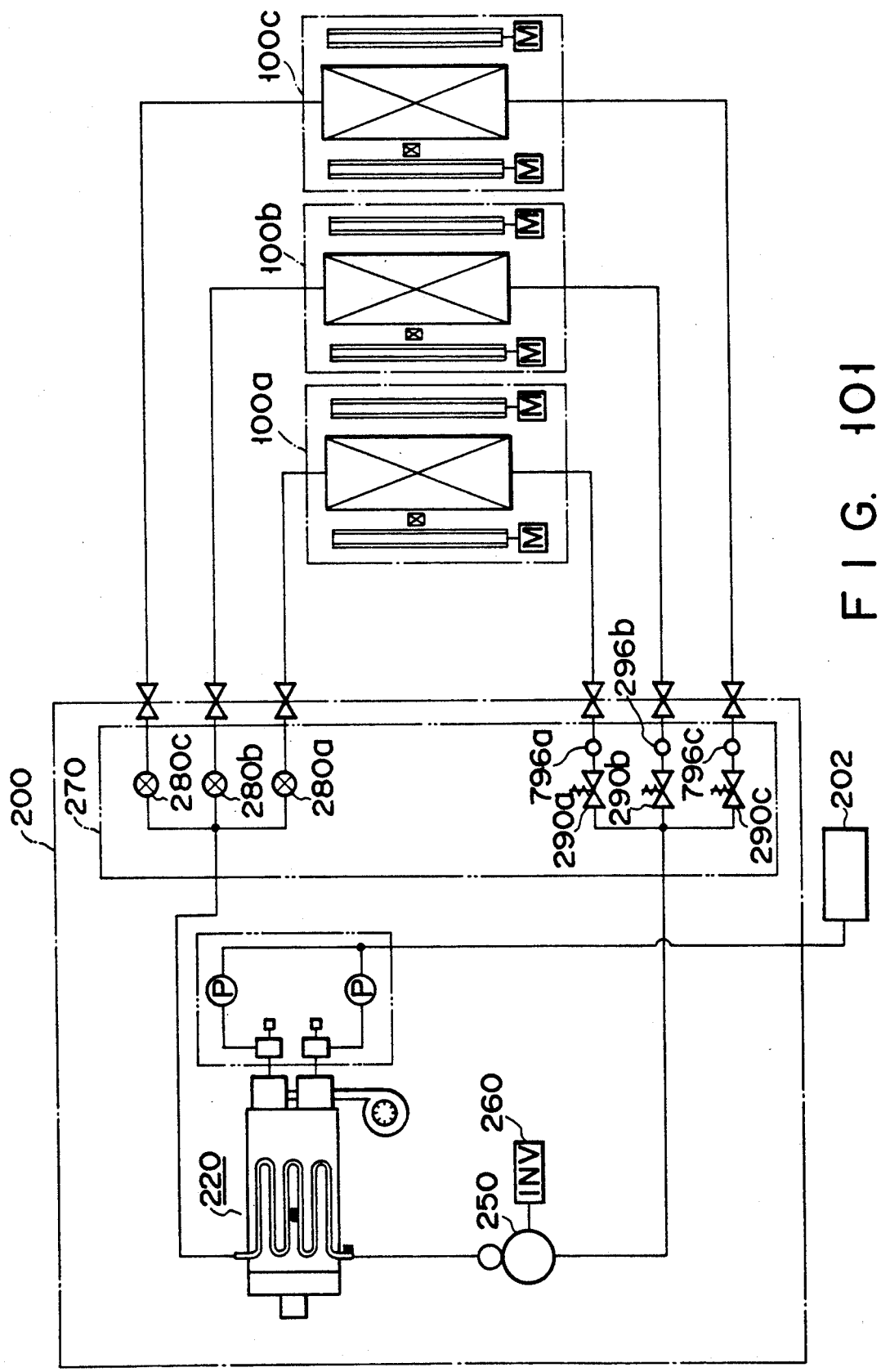

Other embodiment of the control technique of the heating medium amount to be supplied into each indoor radiator 100 is explained below. The method explained herein is the technique for controlling the determination of the opening degree of the heating medium control valve 280 by feeding back, by detecting the actual flow dividing flow. In other words, the valve opening degree is increased when the flow rate is small, and is reduced when the flow rate is large. FIG. 101 shows a system configuration of this embodiment. As shown in the diagram, in order to determine the flow dividing amount of the heating medium, a speed sensor 796 is disposed at the downstream side of each two-way valve 290 installed in the flow divider of the outdoor unit 200. By this temperature sensor 796, the vapor flow velocity of the heating medium supplied into each indoor radiator 100 is detected. Between the flow velocity and the mass flow rate, the following relation is established where R is the mass flow rate, V is the flow velocity, A is the piping sectional area, and r is the specific weight. Actually, the piping sectional area A is equal and the vapor side pressure and temperature after flow dividing are same, the specific weight is naturally equal. Therefore, the flow velocity V and the mass flow rate R are in proportional relation, and the mass flow rate R is indirectly determined from the flow velocity V. In reality, it is not necessary to determine the absolute value of the flow dividing rate, and it is enough to know the ratio of the flow velocity V of the heating medium flowing into the indoor radiator 100. By the ratio of this flow velocity V, the opening degree ratio of heating medium control valves 280 is determine as shown below.

Thus, by installing the speed sensor 796, the flow dividing ratio of the heating medium may be determined by the outdoor unit controller 500 in the outdoor unit 200, and hence it is not necessary to receive the information from the indoor unit controller 400 of the indoor radiator. Instead of the speed sensor, meanwhile, a sensor for detecting the mass flow rate directly may be also used.

Figure 102:
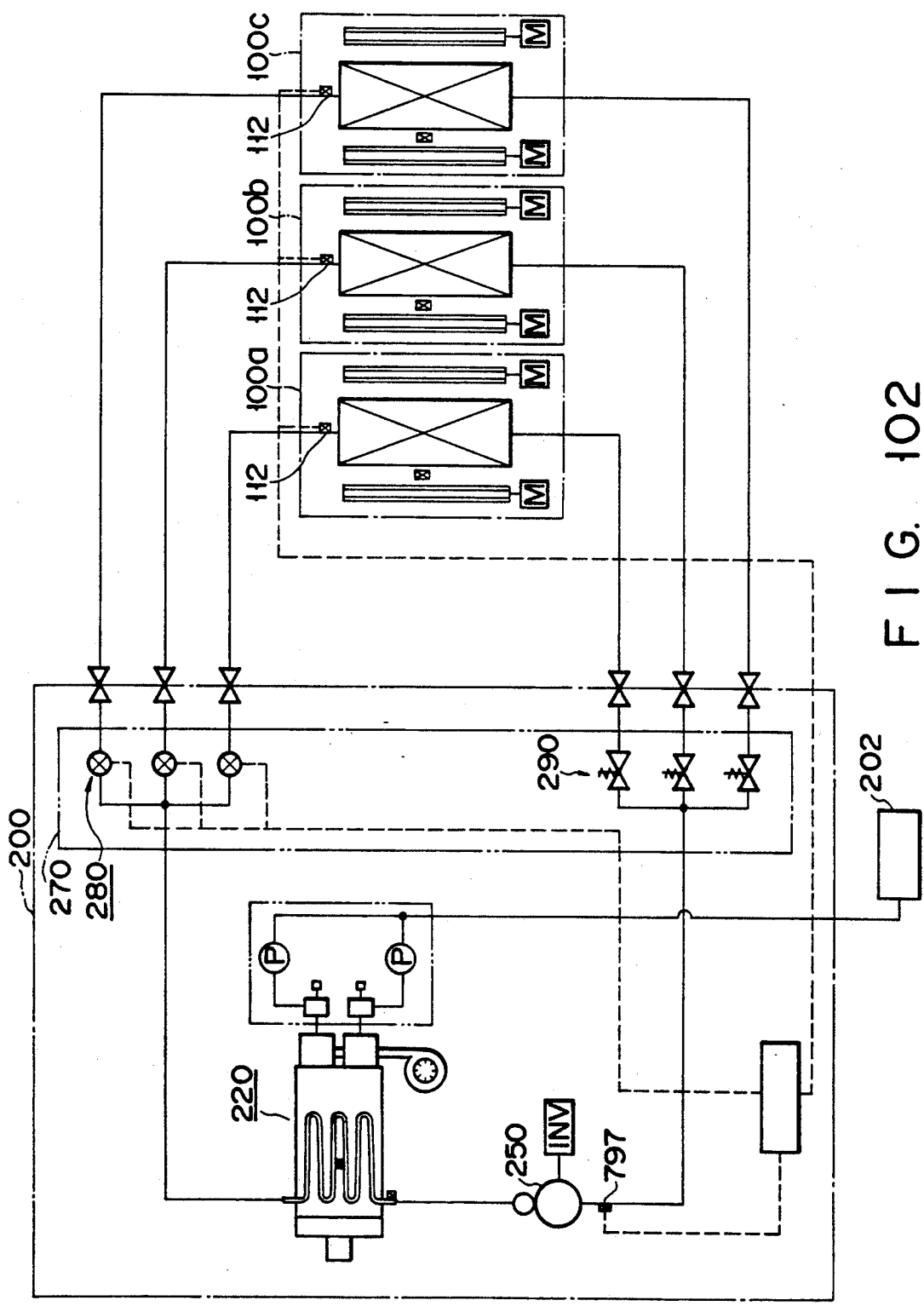

A modified example of adjustment of opening degree of the heating medium control valve 280 is explained by referring to the system configuration diagram of FIG. 102. The technique explained herein is to detect the exit pressure of the gas pump 250 and the exit temperature of the indoor radiator 100, and to adjust the opening degree of the heating medium control valve 280 so that this pressure may be less than the saturated liquid pressure. As shown in the diagram, at the heating medium exit side of each indoor radiator 100, a temperature sensor 112 is disposed, and at the heating medium exit side of the gas pump 250, a pressure sensor 797 is disposed. The information detected by these temperature sensor 112 and pressure sensor 797 is sent to the arithmetic unit (outdoor unit controller) 500, and the saturation liquid pressure is calculated in this arithmetic unit 500, and the opening degree of the heating medium control valve 280 is adjusted to be throttled gradually so that the exit pressure of the gas pump 250 may be lower than this saturation liquid pressure. When the opening degree of the heating medium control valve 280 is changed suddenly, the pressure in the cycle changes largely to be in a very dangerous state. Accordingly, the opening degree of the heating medium control valve 280 must be changed gradually. FIG. 103 shows the relation between the opening degree adjusting time and the opening of the heating medium control valve 280. In the diagram, it shows that the control valve opening degree 1 is gradually throttled with the passing of the time from the full opening state. When the difference between the exit pressure of the gas pump 250 and the saturation liquid pressure becomes small, this throttling degree may be reduced. By operating in this manner, the indoor radiator may be used in various manners.

The technique for covering up for the shortage of the heating medium due to extension of indoor radiators 100 is explained below.

Figure 104:
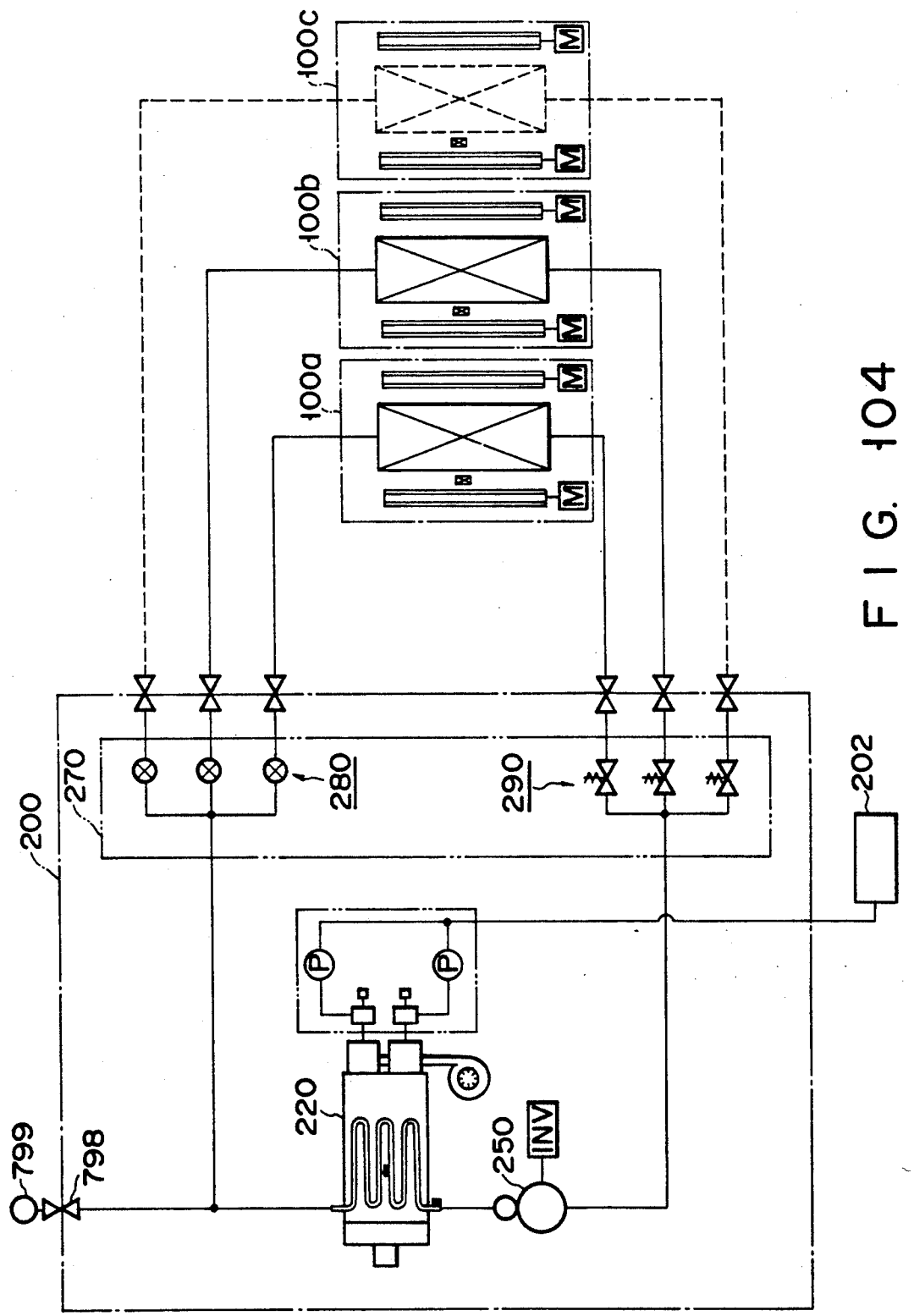

This system is designed to install up to three indoor radiators for one outdoor unit. When the customer buys this system, suppose one outdoor unit and two indoor radiators are installed, and then if another indoor radiator is purchased and installed, the heating medium volume in the cycle of the initially purchases system becomes insufficient. To compensate for this shortage, a cartridge tank is provided. The cycle diagram in this case is shown in FIG. 104. In the diagram, the indoor radiators 100a and 100b are initially installed ones, and the indoor radiator 100c is the one installed later. At the end of the installation and piping work for the indoor radiator 100c, after evacuating the piping, the packed valves 158a to 158c at the heating medium liquid side are closed, and the gas pump 250 is rotated to lower the pressure between the heating medium heater 220 and the heating medium controller 280, and at this time the heating medium inlet valve 798 is opened to seal the heating medium in the heating medium cartridge tank 799 into the cycle.

This cartridge tank 799 contains the heating medium necessary for one indoor radiator to prevent overfilling with heating medium. When filling with the heating medium is over, the heating medium inlet valve 798 is closed, and the gas pump 250 is stopped. By thus composing, the indoor radiators 199 may be extended easily, and since the heating medium is sealed in from the cartridge tank 799, a specified amount of heating medium may be supplied into the cycle.

Figure 105:
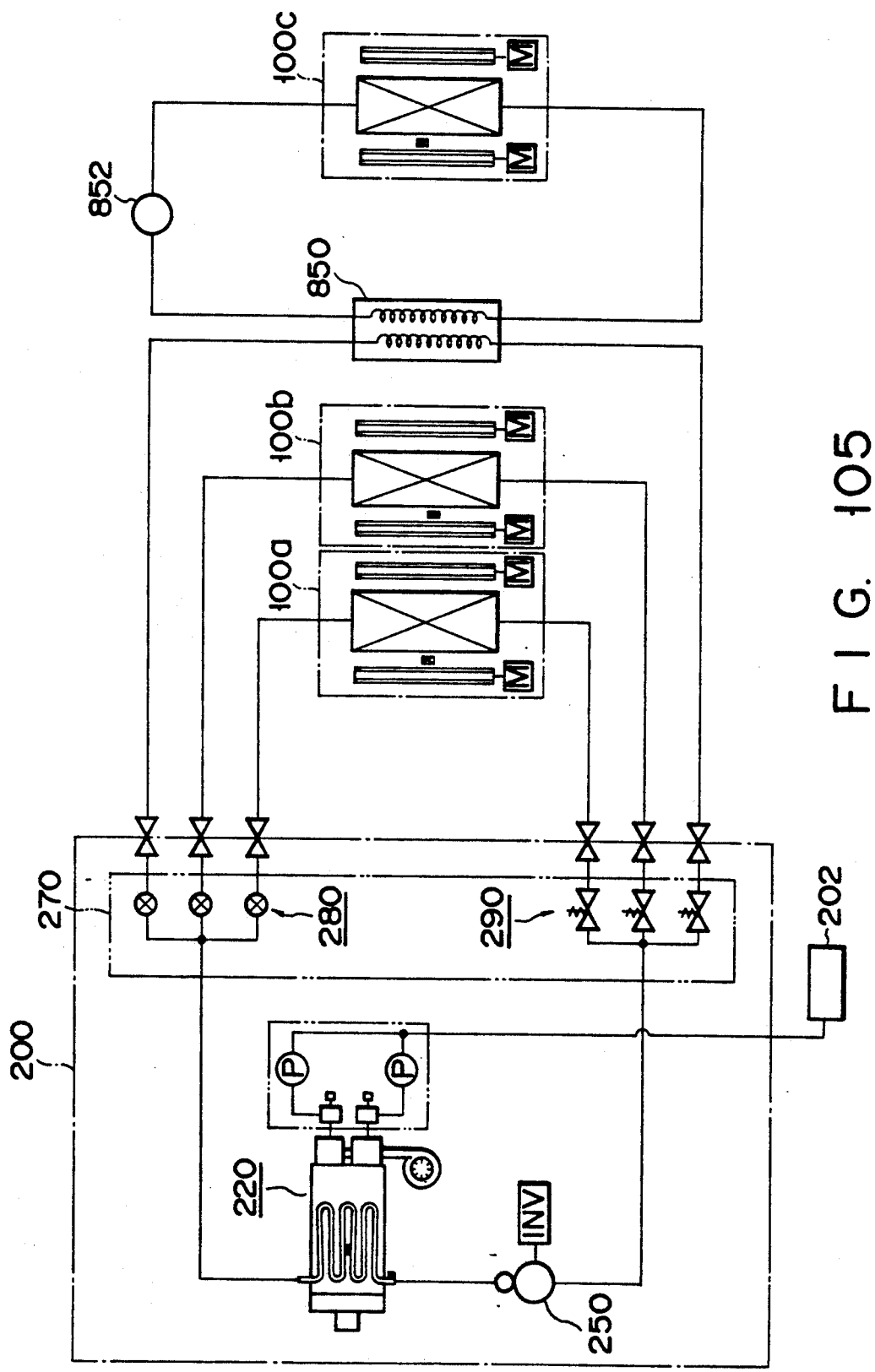

Referring now to the system configuration in FIG. 105, the control when the indoor radiator 100 is distant from the outdoor unit 200 is explained below. If the distance from the gas pump 250 in the outdoor unit 200 to the indoor radiator 100 is long or the level difference is excessive, the distant indoor radiator 100 cannot be adjusted of the circulation flow rate within the correction range of the heating medium control valve 280, and in order to be equal in the circulation flow rate to the other indoor radiators 100, the indoor radiator 100c distant from the gas pump 250 is designed to pick up the heat from an intermediate heat exchanger 850 by a pump 852 through this intervening intermediate heat exchanger, so as to be free from problems of distance or height from the gas pump 250 till the indoor radiators 100. Besides, by composing to reserve the excessive heat by storing the intermediate heat exchanger 850 in the heat reserve tank, it may be designed to pick up the heat only when required in a room having problems of distance or height of installation.

Figure 106:
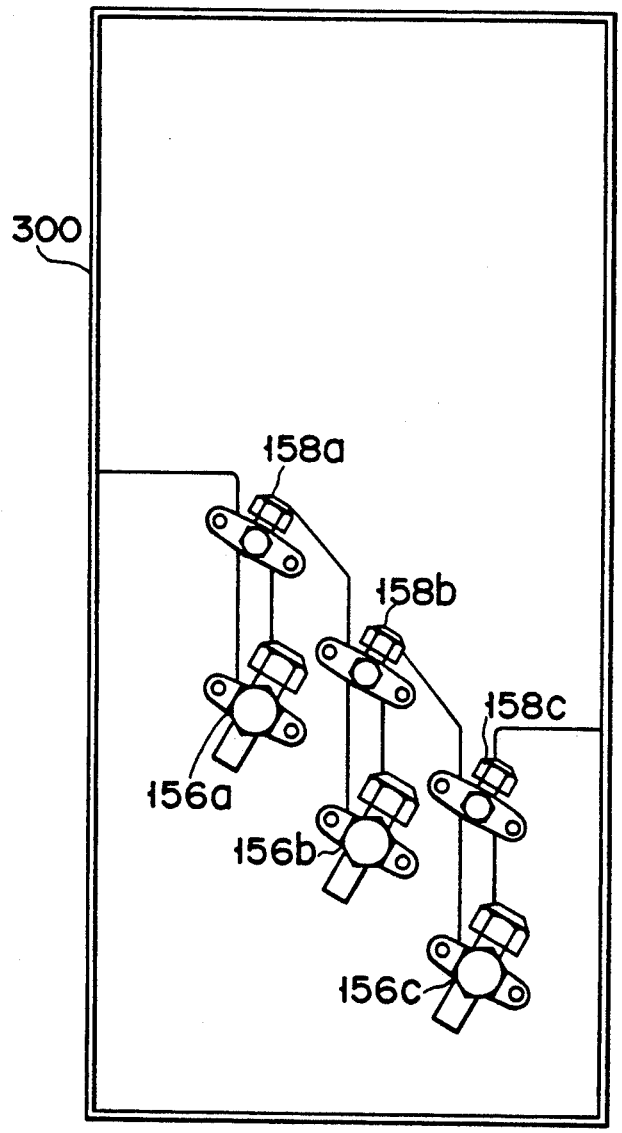

A modified example of arrangement of packed valves 156a to 156c and 158a to 158c in the cabinet 300 of the outdoor unit 200 is explained below by referring to the side view of the outdoor unit in FIG. 106. As shown in the diagram, by arranging the packed valves 156a to 156c and 158a to 158c, same as in the first embodiment, piping works between the outdoor unit 200 and indoor radiators 100 may be slightly easier.

This invention is not, however, limited to the foregoing embodiments, but other modifications and changes may be considered as far as not departing from the true spirit and scope of the invention, such as heating by radiation by operating while stopping the fans 104 and 106 in the nighttime operation, and selection of air flow rate depending on the position of installation and direction.

As described herein, the invention may greatly enhance the heating capacity, and what is more since the heating medium heater is installed outdoors, the combustion gas is not released in the room, and the room air is not contaminated, and an air heating apparatus capable of heating cleanly may be presented.

Besides, the safety against flame is high. Moreover, since the cycle is composed in an enclosed system, the sealing amount of the heating medium is constant, and maintenance is not needed, and a heating medium of which freezing point and evaporation temperature are far lower than water may be used, so as to be free from, problems of freezing or leakage.

In addition, the heating medium equal in the ratio of the required heating capacity in each room is divided into each room by the flow dividing means, and plural rooms can be heated by one combustion unit. Furthermore, since the heating medium may be raised to high temperature by the heating medium conveying means, and hence the blowout temperature into the room may be set higher, making it possible to present a heating apparatus bringing about a more comfortable feel of heating.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A multi-type air heating apparatus comprising:
an outdoor unit having a combustion unit for heating a heating medium by combustion heat, thereby changing a phase of the heating medium from liquid to gas;
a plurality of indoor units each including an indoor heat exchanger for transferring heat from the gas phase heating medium to a region to be heated and changing the heating medium to liquid phase, and means for detecting a required heating capacity of the region to be heated required for the indoor heat exchanger wherein the required heating capacity detecting means comprises means for setting a desired room temperature, means for detecting a room temperature, and means for delivering required heating capacity data in the region to be heated according to a difference between a temperature set by the room temperature setting means and a temperature detected by the room temperature detecting means;
distributing means for coupling the plurality of indoor units to the outdoor unit in order to form enclosed heating medium circulation cycles; and
control means for controlling a combustion quantity of the combustion unit of the outdoor unit and amount of the heating medium to be supplied to the enclosed heating medium circulation cycles according to the sum of the required heating capacity data from the required heating capacity detecting means of the plurality of indoor units, and controlling the heating medium distribution amount of the distributing means in order to distribute the heating medium into each indoor heat exchanger of the plurality of indoor units according to a ratio of the required heating capacity data.

2. A multi-type air heating apparatus according to claim 1, wherein the control means includes means for correcting the quantity of the heating medium distributed from the distributing means depending on the ratio of the required heating capacity in each region to be heated, according to at least one of a distance and a height from a heating part of the heating medium, until the heating part in every region is heated.

3. A multi-type air heating apparatus according to claim 2, wherein the correction means includes a plurality of switches externally connected to the control means, the plurality of switches generating specified correction amounts which are preset individually.

4. A multi-type air heating apparatus according to claim 1, wherein the distributing means includes means for variably setting a flow passage sectional area of the heating medium, the variably setting means of the flow passage sectional area comprising a mechanical part capable of setting an initial value for correcting the ratio of distribution of the heating medium according to at least one of a distance and a height from a heating part of the heating medium until the heating part in every region is heated.

5. A multi-type air heating apparatus according to claim 2, wherein the correction means defines a control value as a heating medium circulation amount so that the required heating quantity is equal in each region to be heated as the distributing means distributes the heating medium independently in each region to be heated before the enclosed heating medium circulation cycles enter ordinary operation.

6. A multi-type air heating apparatus according to claim 1, wherein the control means, in order to control the quantity of the heating medium distributed from the distributing means depending on the ratio of required heating capacity in each region to be heated, includes means for measuring the heating medium flow rate passing in each region to be heated in the enclosed heating medium circulation cycle.

7. A multi-type air heating apparatus according to claim 6, wherein the heating medium flow rate in each region to be heated is set in proportion to the required heating capacity of each region to be heated.

8. A multi-type air heating apparatus according to claim 1, wherein the control means comprises means for maintaining the total ratio of distributing the heating medium in every region to be heated, wherein the total sum of the required heating capacities is not changed even if the required heating capacity in every region to be heated varies due to a fluctuation in the difference between the set temperature and the detected temperature in each region to be heated, and means for distributing a quantity of the heating medium depending on the ratio of the required heating capacity in each region to be heated.

9. A multi-type air heating apparatus according to claim 1, wherein the control means comprises means for maintaining the total ratio of distribution of the heating medium in every region to be heated at a set value and corresponding to a changed portion of the sum of the required heating capacities, when the sum of the required heating capacities in every region to be heated varies due to a fluctuation in the difference between the set temperature and the detected temperature in at least one region to be heated, and means for distributing a quantity of the heating medium depending on the ratio of the required heating capacity in each region to be heated.

10. A multi-type air heating apparatus according to claim 9, wherein the control means comprises means for commanding the increase of distribution of heating means to the distributing means in the enclosed heating medium circulation cycle when the total of the ratio of distributing the heating medium in each region to be heated is increased, and then commanding the increase of the heating quantity to the combustion unit.

11. A multi-type air heating apparatus according to claim 10, wherein the control means comprises means for increasing the distribution of the heating medium in the enclosed heating medium circulation cycles when the total ratio of distributing the heating medium in each region to be heated is increased, then increasing the heating quantity to the combustion unit, and decreasing the heating quantity to the combustion unit when the total is decreased, then the decreasing distribution of the heating medium to the distributing means.

12. A multi-type air heating apparatus according to claim 1, wherein the distributing means comprises means for controlling the stopping and starting of heat release for heating by independently starting and stopping the heating medium in each of the enclosed heating medium circulation cycles.

13. A multi-type air heating apparatus according to claim 12, wherein the control means comprises means for increasing the distribution of the heating medium to the distributing means in the enclosed heating medium circulation cycles, when starting to release heat for heating in a desired region of the regions to be heated, then increasing the heating quantity to the combustion unit.

14. A multi-type air heating apparatus according to claim 12, wherein the control means comprises means for increasing the distribution of the heating medium to the distributing means in the enclosed heating medium circulation cycles, when starting to release heat for heating in a desired region of the regions to be heated then increasing the heating quantity to the combustion unit, and decreasing the heating quantity to the combustion unit, when stopping to release heat in a desired region, then decreasing the distribution of the heating medium to the distributing means.

15. A multi-type air heating apparatus according to claim 1, wherein the combustion quantity in the combustion unit is changed and corresponds to the sum of a preset maximum required heating capacities in the regions to be heated, the sum being the maximum combustion quantity.

16. A multi-type air heating apparatus according to claim 15, wherein the combustion quantity is determined in a combination of combustion units.

17. A multi-type air heating apparatus according to claim 15, wherein the control means comprises means for heating the heating medium of one combustion unit when the sum of the required heating capacities of at least two regions to be heated is a heating capacity corresponding to a combustion quantity less than a specified combustion quantity and less than the maximum combustion quantity of one combustion unit and greater than a preset minimum combustion quantity, or when heating is requested from one region to be heated, and heating the heating medium by a combination of combustion units when the sum of the required heating capacities exceeds the heating capacity corresponding to the specified combustion quantity and heating is requested from the regions to be heated.

18. A multi-type air heating apparatus according to claim 17, wherein the control means heats the heating medium at a combustion quantity equivalent to the quotient of the sum of the required heating capacities of the regions to be heated divided by the number of units of the combustion units when heating the heating medium by a combination of combustion units.

19. A multi-type air heating apparatus according to claim 16, wherein the control means comprises means for detecting the flame state of the combustion unit, stopping supply of fuel to the combustion unit if the flame is abnormal, and repeating combustion unit purification ignition, fuel supply, and flame state detection by a specified number of times, thereby determining whether or not to continue or to stop combustion, wherein the control means further determines whether or not the combustion unit is working properly, while heating the heating medium in the enclosed heating medium circulation cycles in a combination of the combustion units.

20. A multi-type air heating apparatus according to claim 19, wherein the control means comprises means for heating the heating medium in the enclosed heating medium circulation cycles by continuing combustion in combustion units other than the combustion unit in which the abnormal flame has been detected, while heating the heating medium in the enclosed heating medium circulation cycles in a combination of the combustion units.

21. A multi-type air heating apparatus according to claim 17, wherein the control means comprises means for starting combustion with the combustion quantity nearly corresponding to the heating capacity calculated by dividing each required heating capacity by the number of running units of the combustion units, when it is requested to heat the heating medium in the combination of combustion units during heating operation by one of the combustion units.

22. A multi-type air heating apparatus according to claim 17, wherein the control means comprises means for increasing the heating quantity to the heating medium with respect to the required heating capacity, while controlling the combustion quantity of the combustion unit to be newly ignited, without lowering the heating capacity of the combustion unit in operation, when it is requested to heat in the combination of combustion units, when the required heating capacity varies with the combustion unit and the required heating capacity after being varied is at least twice the required heating capacity in heating operation by one combustion unit, during heating operation in the heating capacity of one combustion unit as the required heating capacity from the regions to be heated out of the combustion units.

23. A multi-type air heating apparatus comprising:
an outdoor unit having first and second combustion units, each having equal combustion capacity, for heating a heating medium with specified combustion heat, to thereby change a phase of the heating medium from liquid to gas;
a plurality of indoor units each including an indoor heat exchanger for transferring heat from the gas phase heating medium to a region to be heated and changing the heating medium to liquid phase, and means for detecting a required heating capacity of the region to be heated required for the indoor heat exchanger wherein the required heating capacity detecting means comprises means for setting a desired room temperature, means for detecting a room temperature, and means for delivering the required heating capacity data in the region to be heated according to a difference between a temperature set by the room temperature setting means and a temperature detected by the room temperature detecting means;
distributing means for coupling the plurality of indoor units to the outdoor unit in order to form enclosed heating medium circulation cycles; and
control means for controlling a number of running units of the first and second combustion units, the combustion quantity of the outdoor unit and amount of the heating medium to be supplied to the enclosed heating medium circulation cycles according to the sum of the required heating capacity data from the required heating capacity detecting means in the plurality of indoor units, and controlling the heating medium distribution amount of the distributing means in order to distribute the heating medium into each indoor heat exchanger of the plurality of indoor units according to a ratio of the required heating capacity data.

24. A multi-type air heating apparatus according to claim 23, wherein the control means comprises means for applying hysteresis characteristic to the combustion quantity when changing over the number of running units of the first and second combustion units from one to two or from two to one.

25. A multi-type air heating apparatus comprising:
a plurality of indoor units each including an indoor heat exchanger for releasing heat to a region to be heated, and means for detecting a required heating capacity of the region to be heated required for the indoor heat exchanger, wherein the required heating capacity detecting means comprises means for setting a desired room temperature, means for detecting a room temperature, and means for delivering required heating capacity data in the region to be heated according to a difference between a temperature set by the room temperature setting means and a temperature detected by the room temperature detecting means;
an outdoor unit including a combustion unit of variable combustion quantity type having a maximum combustion capacity nearly corresponding to the sum of the maximum required heating capacities that can be set in each one of the plurality of indoor units, and heat absorbing means for heating a heating medium with the combustion heat from the combustion unit, to thereby change a phase of the heating medium from liquid to gas;
distributing means for coupling the plurality of indoor units to the outdoor unit in order to form enclosed heating medium circulation cycles; and
control means for controlling a combustion quantity of the combustion unit of the outdoor unit and amount of the heating medium to be supplied to the enclosed heating medium circulation cycles according to the sum of the required heating capacity data from the required heating capacity detecting means in the plurality of indoor units, and controlling the heating medium distribution amount of the distributing means in order to distribute the heating medium into each indoor heat exchanger in the plurality of indoor units according to a ratio of the required heating capacity data.

26. A multi-type air heating apparatus according to claim 25, wherein the enclosed heating medium circulation cycle includes a gas pump as the heating medium circulation means, the gas pump being disposed at the heating medium exit side of the heat absorbing means, when supplying the heating medium to the heat absorbing means for absorbing the combustion heat of the combustion unit, the enclosed heating medium circulation cycles having the indoor heat exchangers of the plurality of indoor units each connected in parallel, and the indoor heat exchangers each connected in series to the heat absorbing means and the gas pump, wherein means for individually controlling independent circulation flow rates of the heating medium are connected in series to each one of the indoor heat exchangers.

27. A multi-type air heating apparatus comprising:
an outdoor unit including a combustion unit for heating a heating medium of liquid with the combustion heat variably controlled, having a specified minimum heating quantity, thereby changing a phase of the heating medium from liquid to gas;
a plurality of indoor units each including an indoor heat exchanger for transferring heat from the gas phase heating medium to a region to be heated and changing the heating medium to liquid phase, and means for detecting the required heating capacity of the region to be heated required for the indoor heat exchanger, wherein the required heating capacity detecting means comprises means for setting a desired room temperature, means for detecting a room temperature, and means for delivering the required heating capacity data indicative of the region to be heated according to a difference between a temperature set by the room temperature setting means and a temperature detected by the room temperature detecting means;
distributing means for coupling the plurality of indoor units to the outdoor unit in order to form enclosed heating medium circulation cycles;
excess heating medium preserve means coupled with a specific portion of the enclosed heating medium circulation cycle being selectably communicable to preserve the excess heating medium in the enclosed heating medium circulation cycle; and
control means for variably controlling a combustion quantity of the combustion unit of the outdoor unit and amount of the heating medium to be supplied to the enclosed heating medium circulation cycles according to the sum of the required heating capacity data from the required heating capacity detecting means in the plurality of indoor units, controlling the heating medium distribution amount of the distributing means in order to distribute the heating medium into each indoor heat exchanger of the plurality of indoor units according to the ratio of the required heating capacity data, and controlling the heating medium circulation amounts in the enclosed heating medium circulation cycles at a proper value, when the sum of the required heating capacities becomes lower than the heating capacity given in the specified minimum heating quantity of the combustion unit, by coupling the excess heating medium preserve means with the enclosed heating medium circulation cycle.

28. A multi-type air heating apparatus comprising:
an outdoor unit including a combustion unit generating a combustion heat variably controlled having a specified minimum heating quantity, heat absorbing means for heating the heating medium with the combustion heat from the combustion unit, to thereby change a phase of the heating medium from liquid to gas, and heating medium transferring means for transferring the heating medium to the outdoor unit through the heat absorbing means;
a plurality of indoor units each including an indoor heat exchanger for transferring heat from the heating medium to a region to be heated and changing the heating medium to liquid phase, and means for detecting the required heating capacity of the region to be heated required for the indoor heat exchanger, wherein the required heating capacity detecting means comprises means for setting a desired room temperature, means for detecting a room temperature, and means for delivering the required heating capacity data in the region to be heated according to a difference between a temperature set by the room temperature setting means and a temperature detected by the room temperature detecting means;

distributing means for coupling the plurality of indoor units to the outdoor unit in order to form enclosed heating medium circulation cycles;

heating medium bypass means coupled between the heat absorbing means of the outdoor unit and the heating medium transferring means in order to bypass the heating medium outside the enclosed heating medium circulation cycles in a specific state; and control means for variably controlling a combustion quantity of the combustion unit of the outdoor unit, an amount of the heating medium to be supplied to the enclosed heating medium circulation cycles and the heating medium transferring capacity of the heating medium transferring means according to the sum of the required heating capacity data from the required heating capacity detecting means in the plurality of indoor units, controlling the heating medium distribution amount of the distributing means in order to distribute the heating medium into each indoor heat exchanger of the plurality of indoor units according to the ratio of the required heating capacity data, and controlling the heating medium circulation amount in the enclosed heating medium circulation cycles at a proper value, when the sum of the required heating capacities becomes lower than the heating capacity given by the specific minimum heating quantity of the combustion unit, by activating the heating medium bypass means.

29. A multi-type air heating apparatus according to claim 28, wherein the heating medium bypass means is capable of selectively communicating a part of the heating medium circulating in the enclosed heating medium circulation cycle.

30. A multi-type air heating apparatus according to claim 28, wherein the heating medium bypass means in which a part of the heating medium circulating in the enclosed heating medium circulation cycle comprises means for controlling the flow rate of the heating medium to be bypassed.

31. A multi-type air heating apparatus according to claim 30, wherein the heating medium bypass means comprises a tank for temporarily pooling the liquefied heating medium, disposed before the bypass means.

32. A multi-type air heating apparatus comprising:
a plurality of indoor units each including an indoor heat exchanger for transferring heat to a region to be heated, and means for detecting the required heating capacity of the region to be heated required for the indoor heat exchanger, wherein the required heating capacity detecting means comprises means for setting a desired room temperature, means for detecting a room temperature, and means for delivering required heating capacity data indicative of the region to be heated based upon a difference between a temperature set by the room temperature setting means and a temperature detected by the room temperature detecting means;

an outdoor unit including heating means capable of setting a total heating quantity corresponding to the sum of required heating capacities to be set in each one of the plurality of indoor units, in combination with a plurality of combustion units, a heat absorbing chamber for passing a combustion gas disposed at a downstream side of the plurality of combustion units of the heating means, a heat absorbing pipe disposed adjacent to the heat absorbing chamber for passing a heating medium, and a pump for transferring the heating medium to the outdoor unit through the heat absorbing pipe, wherein the heating medium is heated by the combustion gas flowing in the heat absorbing chamber communicating with the heat absorbing pipe, and the phase of the heating medium is changed from liquid to gas;

distributing means for coupling the plurality of indoor units parallel to the outdoor unit in order to form enclosed heating medium circulation cycles; and control means for controlling a combustion quantity, the number of running units of the plural combustion units of the outdoor unit, the heating medium transferring capacity of the heating medium transferring means and amount of the heating medium to be supplied to the enclosed heating medium circulation cycles according to the sum of the required heating capacity data from the heating capacity detecting means of the plurality of indoor units, and controlling the heating medium distribution amount of the distributing means in order to distribute the heating medium into each indoor heat exchanger of the plurality of indoor units according to the ratio of the required heating capacity data.

33. A multi-type air heating apparatus according to claim 32, wherein the heat absorbing pipe adjacent to the heat absorbing chamber is disposed along the flow direction of the combustion gas flowing in the heat absorbing chamber, and the inside of the heat absorbing chamber is divided into plural compartments along the flow direction of the combustion gas of the combustion units.

34. A multi-type air heating apparatus comprising:
an outdoor unit including a combustion unit for generating combustion heat, heat absorbing means for heating a heating medium with the combustion heat to change phase of the heating medium from liquid to gas, means for detecting the temperature of the heat absorbing means, and heating medium transferring means for transferring the heating medium to the outdoor unit through the heat absorbing means;

a plurality of indoor units each including an indoor heat exchanger for transferring heat from the heating medium to a region to be heated and changing the heating medium to liquid phase, and means for detecting the required heating capacity of the region to be heated required for the indoor heat exchanger, wherein the required heating capacity detecting means comprises means for setting a desired room temperature, means for detecting a room temperature, and means for delivering required heating capacity data in the region to be heated according to a difference between a temperature set by the room temperature setting means and a temperature detected by the room temperature detecting means;

distributing means coupling the plurality of indoor units to the outdoor unit in order to form enclosed heating medium circulation cycles, the distributing means including a plurality of passage opening and closing means in every one of the enclosed heating medium circulation cycles; and control means for controlling a combustion quantity of the combustion units of the outdoor unit, an amount of the heating medium to be supplied to the enclosed heating medium circulation cycles and the heating medium transferring capacity of the heating medium transferring means according to the sum of the required heating capacity data from the required heating capacity detecting means of the plurality of indoor units, controlling opening and closing of the plural passage opening and closing means of the distributing means and the heating medium distribution amount of the distribution means in order to distribute the heating medium into each indoor heat exchanger of the plural indoor units according to the ratio of the required heating capacity data, and controlling the passage opening and closing means from the closed state to an open state, while stopping the heat release action of the corresponding indoor heat exchanger, when the detection-temperature from the heat absorbing temperature detecting means for detecting the temperature of the heat absorbing means of the outdoor unit exceeds a specified value while at least one of the plural passage opening and closing means is in the closed state.

35. A multi-type air heating apparatus according to claim 34, wherein the heat absorbing temperature detecting means detects the outlet side temperature of the heat absorbing means of the heating medium.

36. A multi-type air heating apparatus comprising:
an outdoor unit including a combustion unit for generating combustion heat, heat absorbing means for heating the heating medium with the combustion heat to change phase of the heating medium from liquid to gas, means for detecting the temperature of the heat absorbing means, and heating medium conveying means for conveying the heating medium to the outdoor unit through the heat absorbing means;

a plurality of indoor units each including an indoor heat exchanger for transferring heat from the heating medium to a region to be heated and changing the heating medium to liquid phase, and means for detecting the required heating capacity of the region to be heated required for the indoor heat exchanger, wherein the required heating capacity detecting means comprises means for setting a desired room temperature, means for detecting a room temperature, and means for delivering required heating capacity data in the region to be heated according to a difference between a temperature set by the room temperature setting means and a temperature detected by the room temperature detecting means;

distributing means coupling the plurality of indoor units to the outdoor unit in order to form enclosed heating medium circulation cycles, wherein the distributing means includes a plurality of passage opening and closing means in every one of the enclosed heating medium circulation cycles; and control means for controlling a combustion quantity of the combustion units of the outdoor unit and the heating medium transferring capacity of the heating medium transferring means according to the sum of the required heating capacity data from the required heating capacity detecting means of the plurality of indoor units, controlling opening and closing of the plurality of passage opening and closing means of the distributing means and the heating medium distribution amount of the distribution means in order to distribute the heating medium into each indoor heat exchanger of the plurality of indoor units according to a ratio of the required heating capacity data, and controlling the passage opening and closing means from the closed state to an open state, while stopping the heat release action of the corresponding indoor heat exchanger, when the detection-temperature from the heat absorbing temperature detecting means for detecting the temperature of the heat absorbing means of the outdoor unit exceeds a specified value while at least one of the plural passage opening and closing means is in the closed state, and controlling the passage opening and closing means from the closed state to an open state, while stopping the heat release action of the corresponding indoor heat exchanger, when the detection temperature from the room temperature detecting means of the indoor unit becomes lower than a specified value, with at least one of the plural passage opening and closing means in the closed state.

37. A multi-type air heating apparatus according to claim 36, wherein the room temperature detecting means detects the inlet side temperature of the indoor heat exchanger of the heating medium.

38. A multi-type air heating apparatus comprising:
an outdoor unit including a combustion unit for generating combustion heat, heat absorbing means for heating a heating medium with the combustion heat to change phase of the heating medium from liquid to gas, means for detecting a temperature of the heat absorbing means, and heating medium transferring means for transferring the heating medium to the outdoor unit through the heat absorbing means;

a plurality of indoor units each including an indoor heat exchanger for transferring heat from the heating medium to a region to be heated, and means for detecting a required heating capacity of the region to be heated required for the indoor heat exchanger, wherein the required heating capacity detecting means comprises means for setting a desired room temperature, means for detecting a room temperature, and means for delivering required heating capacity data indicative of the region to be heated based upon a difference between a temperature set by the room temperature setting means and a temperature detected by the room temperature detecting means;

distributing means for coupling the plurality of indoor units parallel to the outdoor unit in order to form enclosed heating medium circulation cycles, the distributing means including a plurality of passage opening and closing means in every one of the enclosed heating medium circulation cycles; and control means for controlling a combustion quantity of the combustion units of the outdoor unit, an amount of the heating medium to be supplied to the enclosed heating medium circulation cycles and the heating medium transferring capacity of the heating medium transferring means according to the sum of the required heating capacity data from the required heating capacity detecting means of the plurality of indoor units, controlling opening and closing of the plural passage opening and closing means of the distributing means and the heating medium distribution amount of the distribution means in order to distribute the heating medium into each indoor heat exchanger of the plurality of indoor units according to the ratio of the required heating capacity data, and controlling the passage opening and closing means from the closed state to an open state, while stopping the heat release action of the corresponding indoor heat exchanger, when the detection-temperature from the heat absorbing temperature detecting means for detecting the temperature of the heat absorbing means of the outdoor unit exceeds a specified value while at least one of the plurality of passage opening and closing means is in closed state, and controlling the passage opening and closing means from the closed state to an open state, while stopping the heat release action of the corresponding indoor heat exchanger, when at least one of the plurality of passage opening and closing means is in the closed state.

39. A multi-type air heating apparatus according to claim 34, wherein the control means comprises means for opening the passage opening and closing means, and then closing the passage opening and closing means after a specified time.

40. A multi-type air heating apparatus according to claim 34, wherein the control means comprises means for opening the passage opening and closing means in, and then closing the passage opening and closing means when the temperature detected from the room temperature detecting means exceeds a specified value.

41. A multi-type air heating apparatus according to claim 34, wherein the control means comprises means for opening the passage opening and closing means in, and then closing the passage opening and closing means when the temperature detected from the heat absorbing temperature detection means exceeds a specified value.

42. A multi-type air heating apparatus according to claim 36, wherein the control means comprises means for opening the passage opening and closing means, and then closing the passage opening and closing means after a specified time.

43. A multi-type air heating apparatus according to claim 36, wherein the control means comprises means for opening the passage opening and closing means, and then closing the passage opening and closing means when the temperature detected from the room temperature detecting means exceeds a specified value.

44. A multi-type air heating apparatus according to claim 38, wherein the control means comprises means for opening the passage opening and closing means, and then closing the passage opening and closing means after a specified time.

45. A multi-type air heating apparatus according to claim 38, wherein the control means comprises means for opening the passage opening and closing means, and then closing the passage opening and closing means when the temperature detected from the room temperature detecting means exceeds a specified value.

46. A multi-type air heating apparatus comprising:

an outdoor unit including a combustion unit for generating combustion heat, heat absorbing means for heating a heating medium with the combustion heat to change phase of the heating medium from liquid to gas, means for detecting the temperature of the heat absorbing means, and heating medium transferring means for transferring the heating medium to the outdoor unit through the heat absorbing means;

a plurality of indoor units each including an indoor heat exchanger for transferring heat from the heating medium to a region to be heated, and means for detecting a required heating capacity of the region to be heated required for the indoor heat exchanger, wherein the required heating capacity detecting means comprises means for setting a desired room temperature, means for detecting a room temperature, and means for delivering required heating capacity data indicative of the region to be heated according to a difference between a temperature set by the room temperature setting means and a temperature detected by the room temperature detecting means;

distributing means coupling the plurality of indoor units parallel to the indoor unit in order to form enclosed heating medium circulation cycles, wherein the distributing means includes a plurality of passage opening and closing means in every one of the enclosed heating medium circulation cycles; and control means for controlling a combustion quantity of the combustion units of the outdoor unit, an amount of the heating medium to be supplied to the enclosed heating medium circulation cycles and the heating medium transferring capacity of the heating medium transferring means according to the sum of the required heating capacity data from the required heating capacity detecting means of the plurality of indoor units, controlling opening and closing of the plural passage opening and closing means of the distributing means and the heating medium distribution amount of the distribution means in order to distribute the heating medium into each indoor heat exchanger of the plurality of indoor units according to the ratio of the required heating capacity data, and controlling the passage opening and closing means from the closed state to an open state, while stopping the heat release action of the corresponding indoor heat exchanger, when the detection-temperature from the heat absorbing temperature detecting means for detecting the temperature of the heat absorbing means of the outdoor unit exceeds a specified value while at least one of the plurality of passage opening and closing means is in closed state, and controlling the heating medium so as to be distributed and passed by a smaller heating medium distribution amount than the heating medium distribution amount by the distribution means contained in the enclosed heating medium circulation cycles including the indoor heat exchanger in the heat release action, with respect to the distribution means and passage opening and closing means included in the enclosed heating medium circulation cycles containing the indoor heat exchanger stopped in the heat release action during action of the heating medium conveying means.

47. A multi-type air heating apparatus according to claim 25, wherein the outdoor unit further comprises heating medium conveying means, the heating medium conveying means having a liquid pump disposed at the heating medium inlet side when supplying the heating medium to the heat absorbing means for absorbing the combustion heat of the combustion unit, wherein at the suction side of the heating medium of the liquid pump, a liquid tank is disposed for temporarily storing the heating medium liquefied by the heat release action of the indoor heat exchangers to separate the heating medium into gas and liquid, and supplying the liquid heating medium into the pump.

48. A multi-type air heating apparatus according to claim 47, wherein the control means comprises means for directing storage of the liquid heating medium in the liquid tank from the enclosed heating medium circulation cycle into the liquid tank, when the liquid level stored in the liquid tank is lower than a specified level.

49. A multi-type air heating apparatus according to claim 1, wherein the control means comprises means for supplying to the distributing means a larger quantity of the heating medium than the heating medium amount supplied to each region to be heated in the enclosed heating medium circulation cycles, the larger quantity being determined by the required heating capacity based upon the difference between the set temperature and the detected temperature, and supplying to the combustion unit the combustion quantity corresponding to the required heating capacity, a specified time later.

50. A multi-type air heating apparatus according to claim 1, wherein the control means comprises mens for supplying to the distributing means to each region to be heated the heating medium amount determined by the required heating capacity based upon the difference between the set temperature and the detected temperature when starting operation and raising the combustion quantity to the combustion unit gradually from the combustion quantity corresponding to a preset minimum required heating capacity until reaching the combustion quantity corresponding to the required heating capacity.

* * * * *